US012670883B2

(12) United States Patent
Stack et al.

(10) Patent No.: US 12,670,883 B2
(45) Date of Patent: Jun. 30, 2026

(54) LOW POWER DISPLAY STATE

(71) Applicant: Apple Inc., Cupertino, CA (US)

(72) Inventors: Caelan G. Stack, Belmont, CA (US);
Nathan De Vries, Alameda, CA (US);
Christopher P. Foss, San Francisco,
CA (US); William M. Tyler, San
Francisco, CA (US)

(73) Assignee: Apple Inc., Cupertino, CA (US)

( * ) Notice: Subject to any disclaimer, the term of this
patent is extended or adjusted under 35
U.S.C. 154(b) by 274 days.

(21) Appl. No.: 18/126,292

(22) Filed: Mar. 24, 2023

(65) Prior Publication Data

US 2023/0368750 A1    Nov. 16, 2023

Related U.S. Application Data

(60) Provisional application No. 63/349,065, filed on Jun.
4, 2022, provisional application No. 63/340,442, filed
on May 10, 2022.

(51) Int. Cl.
*G09G 5/10* (2006.01)
*G06F 1/3231* (2019.01)
*G06F 3/0488* (2022.01)

(52) U.S. Cl.
CPC ............ *G09G 5/10* (2013.01); *G06F 1/3231*
(2013.01); *G06F 3/0488* (2013.01); *G09G*
*2320/0626* (2013.01); *G09G 2330/021*
(2013.01); *G09G 2354/00* (2013.01)

(58) Field of Classification Search
None
See application file for complete search history.

(56) References Cited

U.S. PATENT DOCUMENTS

| | | | |
|---|---|---|---|
| 5,408,275 | A | 4/1995 | Song et al. |
| 6,353,449 | B1 | 3/2002 | Gregg et al. |
| 6,683,653 | B1 | 1/2004 | Miyake et al. |
| 6,806,893 | B1 | 10/2004 | Kolawa et al. |
| 6,982,695 | B1 | 1/2006 | Canova et al. |
| 7,036,025 | B2 | 4/2006 | Hunter |
| 7,113,809 | B2 | 9/2006 | Noesgaard et al. |
| 8,041,968 | B2 | 10/2011 | Tupman |
| 8,046,617 | B2 | 10/2011 | Fleck et al. |
| 8,238,876 | B2 | 8/2012 | Teng et al. |
| 8,245,143 | B2 | 8/2012 | Yach et al. |
| 8,635,475 | B2 | 1/2014 | Lin et al. |
| 8,725,842 | B1 | 5/2014 | Al-Nasser |

(Continued)

FOREIGN PATENT DOCUMENTS

| | | | |
|---|---|---|---|
| CA | 2986980 | A1 | 5/2019 |
| CN | 1870796 | A | 11/2006 |

(Continued)

OTHER PUBLICATIONS

Office Action received for European Patent Application No. 17853656.
1, mailed on Apr. 24, 2024, 7 pages.

(Continued)

*Primary Examiner* — Peter Hoang
(74) *Attorney, Agent, or Firm* — YHE Law LLP

(57) ABSTRACT

The present disclosure generally relates to techniques and
user interfaces for changing the display state of a display,
controlling the display state of a display, transitioning
between display states of a display, and displaying notifi-
cations.

41 Claims, 48 Drawing Sheets

(56) References Cited

U.S. PATENT DOCUMENTS

| | | |
|---|---|---|
| 8,775,844 B1 | 7/2014 | Peterson |
| 8,847,903 B2 | 9/2014 | Stokes et al. |
| 8,854,925 B1 | 10/2014 | Lee et al. |
| 9,152,211 B2 | 10/2015 | Gunn et al. |
| 9,152,212 B2 | 10/2015 | Gunn |
| 9,197,738 B2 | 11/2015 | Peev et al. |
| 9,436,269 B2 | 9/2016 | Yang |
| 9,557,806 B2 | 1/2017 | Väyrynen |
| 9,568,891 B2 | 2/2017 | Adams et al. |
| 9,609,230 B1 | 3/2017 | Bakshi et al. |
| 9,625,987 B1 | 4/2017 | Lapenna et al. |
| 9,635,255 B1 | 4/2017 | Baldwin |
| 9,651,922 B2 | 5/2017 | Hysek et al. |
| 9,756,172 B2 | 9/2017 | Piemonte et al. |
| 9,939,872 B2 | 4/2018 | Graham et al. |
| 10,183,622 B2 | 1/2019 | Taguchi et al. |
| 10,275,148 B2 | 4/2019 | Matas et al. |
| 10,303,289 B2 | 5/2019 | Sepulveda et al. |
| 10,317,977 B2 | 6/2019 | Yang |
| 10,459,887 B1 | 10/2019 | Dvortsov et al. |
| 10,649,644 B2 | 5/2020 | Ma |
| 10,852,905 B1 | 12/2020 | Guzman et al. |
| 10,878,782 B1 | 12/2020 | Guzman et al. |
| 10,908,559 B1 | 2/2021 | Guzman et al. |
| 10,936,345 B1 | 3/2021 | Guzman et al. |
| 11,435,887 B1 | 9/2022 | Mirho et al. |
| 2003/0052928 A1 | 3/2003 | Williams |
| 2003/0169306 A1 | 9/2003 | Makipaa et al. |
| 2005/0052446 A1 | 3/2005 | Plut |
| 2005/0124389 A1 | 6/2005 | Yang |
| 2005/0168566 A1 | 8/2005 | Tada et al. |
| 2005/0272462 A1 | 12/2005 | Okamoto |
| 2006/0087502 A1 | 4/2006 | Karidis et al. |
| 2006/0128419 A1 | 6/2006 | Shimizu et al. |
| 2006/0129948 A1 | 6/2006 | Hamzy et al. |
| 2007/0146344 A1 | 6/2007 | Martin et al. |
| 2007/0277127 A1 | 11/2007 | Carlson et al. |
| 2008/0005599 A1 | 1/2008 | Theocharous et al. |
| 2008/0143729 A1 | 6/2008 | Wyatt et al. |
| 2008/0167834 A1 | 7/2008 | Herz et al. |
| 2008/0168402 A1 | 7/2008 | Blumenberg |
| 2008/0170058 A1 | 7/2008 | Ahn et al. |
| 2008/0174606 A1 | 7/2008 | Rengarajan et al. |
| 2008/0195961 A1 | 8/2008 | Bae et al. |
| 2008/0224988 A1 | 9/2008 | Whang |
| 2009/0066533 A1 | 3/2009 | Park et al. |
| 2009/0195497 A1 | 8/2009 | Fitzgerald et al. |
| 2009/0249247 A1 | 10/2009 | Tseng et al. |
| 2009/0284389 A1 | 11/2009 | Klassen et al. |
| 2009/0315834 A1 | 12/2009 | Nurmi et al. |
| 2010/0088597 A1 | 4/2010 | Shin et al. |
| 2010/0100841 A1 | 4/2010 | Shin et al. |
| 2010/0146437 A1 | 6/2010 | Woodcock et al. |
| 2010/0146463 A1 | 6/2010 | Cho et al. |
| 2010/0157742 A1 | 6/2010 | Relyea et al. |
| 2011/0003616 A1 | 1/2011 | Gorsica et al. |
| 2011/0003621 A1 | 1/2011 | Atsumi |
| 2011/0003665 A1 | 1/2011 | Burton et al. |
| 2011/0117902 A1 | 5/2011 | Chang et al. |
| 2011/0128311 A1 | 6/2011 | Wakatsuki et al. |
| 2011/0129311 A1 | 6/2011 | Itoh |
| 2011/0182151 A1 | 7/2011 | Geyer et al. |
| 2012/0013552 A1 | 1/2012 | Ahn |
| 2012/0019152 A1 | 1/2012 | Barnhoefer et al. |
| 2012/0077554 A1 | 3/2012 | Ahn et al. |
| 2012/0098639 A1 | 4/2012 | Ijas |
| 2012/0127198 A1 | 5/2012 | Gundavarapu |
| 2012/0151341 A1 | 6/2012 | Ko et al. |
| 2012/0182226 A1 | 7/2012 | Tuli |
| 2012/0288139 A1 | 11/2012 | Singhar |
| 2012/0319984 A1 | 12/2012 | Borovsky et al. |
| 2012/0320081 A1 | 12/2012 | Kim et al. |
| 2013/0036377 A1 | 2/2013 | Colley |
| 2013/0147825 A1 | 6/2013 | Martin et al. |
| 2013/0162611 A1 | 6/2013 | Lim et al. |
| 2013/0176293 A1 | 7/2013 | Pantfoerder |
| 2013/0345980 A1 | 12/2013 | Van Os et al. |
| 2014/0063049 A1 | 3/2014 | Armstrong-Muntner |
| 2014/0086123 A1 | 3/2014 | Deivasigamani et al. |
| 2014/0139637 A1 | 5/2014 | Mistry et al. |
| 2014/0143737 A1 | 5/2014 | Mistry et al. |
| 2014/0155031 A1 | 6/2014 | Lee et al. |
| 2014/0189578 A1 | 7/2014 | Shuttleworth et al. |
| 2014/0192244 A1 | 7/2014 | Ishihara et al. |
| 2014/0201655 A1 | 7/2014 | Mahaffey et al. |
| 2014/0210708 A1 | 7/2014 | Simmons et al. |
| 2014/0210801 A1 | 7/2014 | Li |
| 2014/0256298 A1 | 9/2014 | Moss et al. |
| 2014/0267103 A1 | 9/2014 | Chaudhri |
| 2014/0285699 A1 | 9/2014 | Kato et al. |
| 2014/0310643 A1 | 10/2014 | Karmanenko et al. |
| 2014/0320434 A1 | 10/2014 | Pantel |
| 2014/0344820 A1 | 11/2014 | Kumar |
| 2014/0359477 A1 | 12/2014 | Chen |
| 2014/0361955 A1 | 12/2014 | Goncalves |
| 2014/0362105 A1 | 12/2014 | Kocienda et al. |
| 2015/0002735 A1 | 1/2015 | Moskovchenko |
| 2015/0054846 A1 | 2/2015 | Okada et al. |
| 2015/0061988 A1 | 3/2015 | Galu, Jr. |
| 2015/0062130 A1 | 3/2015 | Ho |
| 2015/0128042 A1 | 5/2015 | Churchill et al. |
| 2015/0185703 A1 | 7/2015 | Tanaka |
| 2015/0194137 A1 | 7/2015 | Wyatt |
| 2015/0207922 A1 | 7/2015 | Kobayashi et al. |
| 2015/0220299 A1 | 8/2015 | Kim et al. |
| 2015/0228048 A1 | 8/2015 | Heo et al. |
| 2015/0241939 A1 | 8/2015 | Im et al. |
| 2015/0261284 A1 | 9/2015 | Lee et al. |
| 2015/0262548 A1 | 9/2015 | Lin |
| 2015/0277545 A1 | 10/2015 | Flowers et al. |
| 2015/0286285 A1 | 10/2015 | Pantelopoulos et al. |
| 2015/0286391 A1 | 10/2015 | Jacobs et al. |
| 2015/0346694 A1 | 12/2015 | Hoobler et al. |
| 2015/0346824 A1 | 12/2015 | Chen et al. |
| 2015/0365892 A1 | 12/2015 | Ma et al. |
| 2015/0379476 A1 | 12/2015 | Chaudhri et al. |
| 2016/0004345 A1 | 1/2016 | Imana |
| 2016/0018872 A1 | 1/2016 | Tu et al. |
| 2016/0034133 A1 | 2/2016 | Wilson et al. |
| 2016/0034152 A1 | 2/2016 | Wilson et al. |
| 2016/0041597 A1 | 2/2016 | Graham et al. |
| 2016/0041755 A1 | 2/2016 | Crowther et al. |
| 2016/0044091 A1 | 2/2016 | Doumet |
| 2016/0049106 A1 | 2/2016 | Connell et al. |
| 2016/0058375 A1 | 3/2016 | Rothkopf |
| 2016/0062450 A1 | 3/2016 | Han et al. |
| 2016/0062589 A1 | 3/2016 | Wan et al. |
| 2016/0077718 A1 | 3/2016 | Kwon et al. |
| 2016/0098137 A1 | 4/2016 | Kim et al. |
| 2016/0134737 A1 | 5/2016 | Pulletikurty |
| 2016/0162112 A1 | 6/2016 | Lee et al. |
| 2016/0180780 A1 | 6/2016 | Chen et al. |
| 2016/0189328 A1 | 6/2016 | Vranjes et al. |
| 2016/0205167 A1 | 7/2016 | Kolam et al. |
| 2016/0205241 A1 | 7/2016 | Atsumi |
| 2016/0205244 A1 | 7/2016 | Dvortsov |
| 2016/0205267 A1 | 7/2016 | Vaughn et al. |
| 2016/0252978 A1 | 9/2016 | Yoo et al. |
| 2016/0259535 A1 | 9/2016 | Fleizach et al. |
| 2016/0313908 A1 | 10/2016 | Matas et al. |
| 2016/0342327 A1 | 11/2016 | Chi et al. |
| 2016/0357151 A1 | 12/2016 | Block et al. |
| 2016/0357282 A1 | 12/2016 | Block et al. |
| 2016/0357394 A1 | 12/2016 | Tae et al. |
| 2016/0357413 A1 | 12/2016 | Block et al. |
| 2017/0004798 A1 | 1/2017 | Park et al. |
| 2017/0040001 A1 | 2/2017 | Zhang et al. |
| 2017/0046024 A1 | 2/2017 | Dascola et al. |
| 2017/0061934 A1 | 3/2017 | Shin |
| 2017/0070716 A1 | 3/2017 | Kim et al. |
| 2017/0075316 A1 | 3/2017 | Berdinis et al. |
| 2017/0075563 A1 | 3/2017 | Bauer et al. |
| 2017/0109011 A1 | 4/2017 | Jiang |
| 2017/0123603 A1 | 5/2017 | Chang |

(56) References Cited

U.S. PATENT DOCUMENTS

| | | |
|---|---|---|
| 2017/0160898 A1 | 6/2017 | Lee et al. |
| 2017/0164292 A1 | 6/2017 | Santamaria et al. |
| 2017/0212648 A1 | 7/2017 | Choi et al. |
| 2017/0236497 A1 | 8/2017 | Huitema et al. |
| 2017/0257426 A1 | 9/2017 | Wilbur et al. |
| 2017/0277136 A1 | 9/2017 | Minami et al. |
| 2017/0322658 A1 | 11/2017 | Lee et al. |
| 2017/0325196 A1 | 11/2017 | Cho et al. |
| 2017/0357358 A1 | 12/2017 | Teutschler et al. |
| 2017/0357413 A1 | 12/2017 | Green |
| 2017/0357426 A1 | 12/2017 | Wilson et al. |
| 2017/0357427 A1 | 12/2017 | Wilson et al. |
| 2017/0357495 A1 | 12/2017 | Crane et al. |
| 2017/0358276 A1 | 12/2017 | Mese et al. |
| 2017/0371394 A1 | 12/2017 | Chan et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0088733 A1 | 3/2018 | Syed et al. |
| 2018/0088797 A1 | 3/2018 | Mcatee et al. |
| 2018/0120927 A1 | 5/2018 | Ma et al. |
| 2018/0121060 A1 | 5/2018 | Jeong et al. |
| 2018/0150443 A1 | 5/2018 | Singleton |
| 2018/0174550 A1 | 6/2018 | Zhang et al. |
| 2018/0188925 A1 | 7/2018 | Na et al. |
| 2018/0261183 A1 | 9/2018 | Gou et al. |
| 2018/0275739 A1 | 9/2018 | Minami et al. |
| 2018/0335939 A1* | 11/2018 | Karunamuni .......... G06F 9/445 |
| 2018/0336866 A1 | 11/2018 | Triverio et al. |
| 2018/0341389 A1 | 11/2018 | Kim et al. |
| 2018/0348844 A1 | 12/2018 | Lingutla et al. |
| 2018/0366068 A1 | 12/2018 | Liu et al. |
| 2018/0374429 A1 | 12/2018 | Nakamura |
| 2019/0018445 A1 | 1/2019 | Watanabe et al. |
| 2019/0069244 A1 | 2/2019 | Jeon et al. |
| 2019/0079576 A1 | 3/2019 | Liu et al. |
| 2019/0163142 A1 | 5/2019 | Chang et al. |
| 2019/0212707 A1 | 7/2019 | Minami et al. |
| 2019/0237003 A1 | 8/2019 | Cao et al. |
| 2019/0281154 A1 | 9/2019 | Choi et al. |
| 2019/0324620 A1 | 10/2019 | Gu et al. |
| 2020/0073122 A1 | 3/2020 | Rothkopf et al. |
| 2020/0242228 A1 | 7/2020 | Farraro et al. |
| 2020/0279539 A1 | 9/2020 | Triverio et al. |
| 2020/0319348 A1 | 10/2020 | Oshita et al. |
| 2020/0327862 A1 | 10/2020 | Sinha et al. |
| 2021/0149694 A1 | 5/2021 | Guzman et al. |
| 2021/0201732 A1 | 7/2021 | Ranjan et al. |
| 2021/0208903 A1 | 7/2021 | Zhang et al. |
| 2022/0184309 A1 | 6/2022 | Rosinko et al. |
| 2022/0206681 A1 | 6/2022 | Mcatee et al. |
| 2022/0342514 A1 | 10/2022 | Chao et al. |
| 2022/0351702 A1 | 11/2022 | Triverio et al. |
| 2023/0071987 A1 | 3/2023 | Zeng et al. |
| 2024/0257786 A1 | 8/2024 | Triverio et al. |
| 2024/0353998 A1 | 10/2024 | Mcatee et al. |

FOREIGN PATENT DOCUMENTS

| | | |
|---|---|---|
| CN | 1932590 A | 3/2007 |
| CN | 101273324 A | 9/2008 |
| CN | 100492288 C | 5/2009 |
| CN | 101432722 A | 5/2009 |
| CN | 101584124 A | 11/2009 |
| CN | 102067070 A | 5/2011 |
| CN | 102376265 A | 3/2012 |
| CN | 102681648 A | 9/2012 |
| CN | 102831404 A | 12/2012 |
| CN | 103019567 A | 4/2013 |
| CN | 103281419 A | 9/2013 |
| CN | 103294197 A | 9/2013 |
| CN | 103399661 A | 11/2013 |
| CN | 103544920 A | 1/2014 |
| CN | 103631496 A | 3/2014 |
| CN | 103853328 A | 6/2014 |
| CN | 103929662 A | 7/2014 |
| CN | 104732956 A | 6/2015 |
| CN | 104978904 A | 10/2015 |
| CN | 105045079 A | 11/2015 |
| CN | 105204620 A | 12/2015 |
| CN | 105204931 A | 12/2015 |
| CN | 105264479 A | 1/2016 |
| CN | 105430154 A | 3/2016 |
| CN | 105516824 A | 4/2016 |
| CN | 105677179 A | 6/2016 |
| CN | 106056848 A | 10/2016 |
| CN | 106486044 A | 3/2017 |
| CN | 106598201 A | 4/2017 |
| CN | 106605201 A | 4/2017 |
| CN | 107239101 A | 10/2017 |
| CN | 107643677 A | 1/2018 |
| CN | 109313655 A | 2/2019 |
| CN | 109690445 A | 4/2019 |
| CN | 110708581 A | 1/2020 |
| CN | 110471582 B | 10/2021 |
| EP | 1750242 A2 | 2/2007 |
| EP | 2175367 A2 | 4/2010 |
| EP | 2565602 A1 | 3/2013 |
| EP | 2449434 B1 | 3/2014 |
| EP | 2869292 A2 | 5/2015 |
| EP | 3376342 A1 | 9/2018 |
| EP | 3465408 B1 | 8/2020 |
| JP | 54-92359 A | 7/1979 |
| JP | 2002-259046 A | 9/2002 |
| JP | 2003-196593 A | 7/2003 |
| JP | 2004-184396 A | 7/2004 |
| JP | 2004-251719 A | 9/2004 |
| JP | 2005-16962 A | 1/2005 |
| JP | 2006-287949 A | 10/2006 |
| JP | 2006-293340 A | 10/2006 |
| JP | 2007-150831 A | 6/2007 |
| JP | 2011-166679 A | 8/2011 |
| JP | 2011-203707 A | 10/2011 |
| JP | 2012-189422 A | 10/2012 |
| JP | 2012-531607 A | 12/2012 |
| JP | 2013-11931 A | 1/2013 |
| JP | 2016-20931 A | 2/2016 |
| JP | 2016-85364 A | 5/2016 |
| JP | 2016-120890 A | 7/2016 |
| JP | 2017-531225 A | 10/2017 |
| JP | 2020-169845 A | 10/2020 |
| KR | 10-2004-0107472 A | 12/2004 |
| KR | 10-2007-0025292 A | 3/2007 |
| KR | 10-0864578 B1 | 10/2008 |
| KR | 10-2010-0025846 A | 3/2010 |
| KR | 10-2010-0025853 A | 3/2010 |
| KR | 10-2014-0120470 A | 10/2014 |
| KR | 10-2015-0057307 A | 5/2015 |
| KR | 10-2015-0093090 A | 8/2015 |
| KR | 10-2016-0030832 A | 3/2016 |
| KR | 10-2016-0066813 A | 6/2016 |
| KR | 10-2016-0076957 A | 7/2016 |
| KR | 10-2018-0011581 A | 2/2018 |
| KR | 10-2018-0078355 A | 7/2018 |
| KR | 10-2019-0035800 A | 4/2019 |
| KR | 10-2019-0071285 A | 6/2019 |
| KR | 10-2020-0130382 A | 11/2020 |
| KR | 10-2021-0002617 A | 1/2021 |
| WO | 2006/131780 A1 | 12/2006 |
| WO | 2007/043222 A1 | 4/2007 |
| WO | 2007/124364 A2 | 11/2007 |
| WO | 2008/083360 A1 | 7/2008 |
| WO | 2008/085402 A1 | 7/2008 |
| WO | 2010/061887 A1 | 6/2010 |
| WO | 2011/145256 A1 | 11/2011 |
| WO | 2014/024366 A1 | 2/2014 |
| WO | 2014/105274 A1 | 7/2014 |
| WO | 2015/034965 A1 | 3/2015 |
| WO | 2016/022203 A1 | 2/2016 |
| WO | 2016/022496 A2 | 2/2016 |
| WO | 2016/036472 A1 | 3/2016 |
| WO | 2016/039587 A1 | 3/2016 |
| WO | 2016/144563 A1 | 9/2016 |
| WO | 2017/000522 A1 | 1/2017 |

(56)                References Cited

FOREIGN PATENT DOCUMENTS

| WO | 2017/027526 A1 | 2/2017 |
| WO | 2017/213937 A1 | 12/2017 |
| WO | 2018/048700 A1 | 3/2018 |
| WO | 2018/057271 A1 | 3/2018 |
| WO | 2018/213451 A1 | 11/2018 |
| WO | 2019/232428 A1 | 12/2019 |
| WO | 2020/117189 A1 | 6/2020 |
| WO | 2020/227330 A1 | 11/2020 |
| WO | 2020/236148 A1 | 11/2020 |
| WO | 2021/050190 A1 | 3/2021 |

OTHER PUBLICATIONS

Result of Consultation received for European Patent Application No. 20180900.1, mailed on May 6, 2024, 7 pages.

Notice of Allowance received for Chinese Patent Application No. 202210265746.X, mailed on Apr. 25, 2024, 4 pages (1 page of English Translation and 3 pages of Official Copy).

Office Action received for Chinese Patent Application No. 202210263607.3, mailed on Apr. 15, 2024, 12 pages (4 pages of English Translation and 8 pages of Official Copy).

Notice of Allowance received for U.S. Appl. No. 17/697,749, mailed on Apr. 10, 2024, 5 pages.

Office Action received for Korean Patent Application No. 10-2024-7007452, mailed on Apr. 1, 2024, 17 pages (9 pages of English Translation and 8 pages of Official Copy).

Supplemental Notice of Allowance received for U.S. Appl. No. 17/697,749, mailed on Apr. 17, 2024, 2 pages.

Applicant-Initiated Interview Summary received for U.S. Appl. No. 17/158,936, mailed on Oct. 18, 2024, 5 pages.

Applicant-Initiated Interview Summary received for U.S. Appl. No. 18/629,155, mailed on Nov. 22, 2024, 2 pages.

International Preliminary Report on Patentability received for PCT Patent Application No. PCT/US2023/021409, mailed on Nov. 21, 2024, 18 pages.

Non-Final Office Action received for U.S. Appl No. 18/629,155, mailed on Nov. 6, 2024, 21 pages.

Notice of Allowance received for Japanese Patent Application No. 2024-067669, mailed on Oct. 25, 2024, 5 pages (1 page of English Translation and 4 pages of Official Copy).

Notice of Allowance received for Korean Patent Application No. 10-2024-7007452, mailed on Oct. 15, 2024, 8 pages (2 pages of English Translation and 6 pages of Official Copy).

Notice of Allowance received for U.S. Appl. No. 17/546,630, mailed on Nov. 15, 2024, 6 pages.

Office Action received for Chinese Patent Application No. 202210263607.3, mailed on Sep. 19, 2024, 10 pages (5 pages of English Translation and 5 pages of Official Copy).

Office Action received for Japanese Patent Application No. 2023-105300, mailed on Oct. 4, 2024, 8 pages (4 pages of English Translation and 4 pages of Official Copy).

Supplemental Notice of Allowance received for U.S. Appl. No. 17/546,630, mailed on Oct. 1, 2024, 3 pages.

Office Action received for Australian Patent Application No. 2022228204, mailed on Jul. 3, 2024, 6 pages.

Office Action received for Japanese Patent Application No. 2023-560221, mailed on Jun. 28, 2024, 6 pages (3 pages of English Translation and 3 pages of Official Copy).

Supplemental Notice of Allowance received for U.S. Appl. No. 17/697,749, mailed on Jun. 14, 2024, 2 pages.

Notice of Allowance received for U.S. Appl. No. 17/546,630, mailed on Aug. 23, 2024, 48 pages.

Notice of Allowance received for Japanese Patent Application No. 2022-174879, mailed on Mar. 22, 2024, 5 pages (1 page of English Translation and 4 pages of Official Copy).

Advisory Action received for U.S. Appl. No. 16/792,096, mailed on Nov. 18, 2021, 4 pages.

Andro Dollar, Huawei Watch GT Always on Mode Update is finally here! LK, Online Available at: https://www.youtube.com/watch?v=AJw_FIAf7v4, Jun. 6, 2019, 4 pages.

Android Tips, "Create a Minimal Lock Screen with WidgetLocker", Online Available at: http://appstap192.blogspot.com/2012/01/create-minimal-lock-screen-with.html, Jan. 18, 2012, 6 pages.

AOD too dim. I've answered my own question to help others, Online Available: https://forums.androidcentral.com/samsung-galaxy-s9-s9-plus/874444-aod-too-dim-ive-answered-my-own-question-help-others.html, Mar. 11, 2018, 3 pages.

Applicant Initiated Interview Summary received for U.S. Appl. No. 15/713,544, mailed on Apr. 6, 2020, 7 pages.

Applicant Initiated Interview Summary received for U.S. Appl. No. 15/713,544, mailed on Oct. 24, 2019, 4 pages.

Applicant Initiated Interview Summary received for U.S. Appl. No. 16/584,445, mailed on Mar. 17, 2020, 5 pages.

Applicant Interview Summary received for U.S. Appl. No. 16/584,281, mailed on Mar. 9, 2020, 5 pages.

Applicant Interview Summary received for U.S. Appl. No. 16/584,281, mailed on Sep. 14, 2020, 6 pages.

Applicant Interview Summary received for U.S. Appl. No. 16/585,714, mailed on Jul. 20, 2020, 5 pages.

Applicant Interview Summary received for U.S. Appl. No. 16/585,721, mailed on Aug. 31, 2020, 5 pages.

Applicant Interview Summary received for U.S. Appl. No. 16/585,721, mailed on Mar. 13, 2020, 5 pages.

Applicant Interview Summary received for U.S. Appl. No. 16/792,096, mailed on May 17, 2021, 6 pages.

Applicant Interview Summary received for U.S. Appl. No. 16/792,096, mailed on Oct. 18, 2021, 6 pages.

Applicant Interview Summary received for U.S. Appl. No. 17/158,936, mailed on Dec. 28, 2022, 4 pages.

Applicant Interview Summary received for U.S. Appl. No. 17/676,034, mailed on Feb. 27, 2023, 4 pages.

Big Phil Tv, "Gear S3 Watch faces with great always on display (A O D)", Available online at: https://www.youtube.com/watch?v=2cxMnrMiGU8, Apr. 5, 2017, 3 pages.

Board Decision received for Chinese Patent Application No. 201780002643.1, mailed on Dec. 15, 2021, 2 pages (1 page of English Translation and 1 page of Official Copy).

Bond John-Michael, "The 4 Best Free Flashlight Apps for Android and iOS", Online Available at: https://www.dailydot.com/debug/best-free-flashlight-apps/, Apr. 2, 2017, 8 pages.

Brightness on lock screen, Online Available at: https://www.reddit.com/r/galaxys10/comments/b4d5fb/brightness_on_lock_screen/, 2019, 1 page.

Cengic Suad, "Samsung Gear S3—Display Always On! Cool!", Available online at: https://www.youtube.com/watch?v=ceeDinbPwOY, Mar. 10, 2017, 3 pages.

Certificate of Examination received for Australian Patent Application No. 2018101947, mailed on Feb. 18, 2019, 2 pages.

Certificate of Examination received for Australian Patent Application No. 2020102158, mailed on Jun. 8, 2021, 2 pages.

Corrected Notice of Allowance received for U.S. Appl. No. 15/713,544, mailed on Feb. 3, 2022, 2 pages.

Corrected Notice of Allowance received for U.S. Appl. No. 15/713,544, mailed on Feb. 10, 2022, 2 pages.

Corrected Notice of Allowance received for U.S. Appl. No. 15/713,544, mailed on Feb. 23, 2022, 2 pages.

Corrected Notice of Allowance received for U.S. Appl. No. 15/791,829, mailed on Jan. 16, 2020, 2 pages.

Corrected Notice of Allowance received for U.S. Appl. No. 16/792,096, mailed on Jan. 11, 2022, 3 pages.

Dan, "Get This Look: 'Minimal' Zooper Widget", Online Available at: https://www.androidguys.com/featured/customize/get-look-minimal-zooper-widget/, Mar. 7, 2014, 2 pages.

Decision on Appeal received for U.S. Appl. No. 15/713,544, mailed on Dec. 14, 2021, 10 pages.

Decision to Grant received for Danish Patent Application No. PA201770387, mailed on Aug. 30, 2018, 2 pages.

Decision to Grant received for Danish Patent Application No. PA201970596, mailed on Feb. 26, 2021, 2 pages.

(56)                    References Cited

OTHER PUBLICATIONS

Decision to Grant received for Danish Patent Application No. PA201970597, mailed on Aug. 19, 2021, 2 pages.
Decision to Grant received for European Patent Application No. 18172554.0, mailed on Jul. 30, 2020, 2 pages.
Decision to Grant received for European Patent Application No. 21177569.7, mailed on Apr. 6, 2023, 3 pages.
Disrapptive "Flashlight for Android Wear", Online Available at: <https://www.youtube.corn/watch?v=HVNxxUI57BM>, Jul. 10, 2014, 5 pages.
Download Ultitorch for APK latest version app for android devices, Online Available at: https://apkgk.com/com.qasq.torchpro, Jan. 8, 2016, 4 pages.
Droid Life, "How to: Use Always-on Apps with Android Wear", Available online at: https://www.youtube.com/watch?v=_-xYB9EBTaA, Jun. 26, 2015, 3 pages.
Examiner's Answer to Appeal Brief received for U.S. Appl. No. 15/713,544, mailed on Apr. 5, 2021, 15 pages.
Examiner's Answer to Appeal Brief received for U.S. Appl. No. 15/713,544, mailed on Apr. 9, 2021, 15 pages.
Extended European Search Report received for European Patent Application No. 17853656.1, mailed on Jul. 3, 2019, 9 pages.
Extended European Search Report received for European Patent Application No. 18172554.0, mailed on Aug. 3, 2018, 10 pages.
Extended European Search Report received for European Patent Application No. 20180900.1, mailed on Sep. 18, 2020, 7 pages.
Extended European Search Report received for European Patent Application No. 21169911.1, mailed on Sep. 20, 2021, 9 pages.
Extended European Search Report received for European Patent Application No. 21177569.7, mailed on Sep. 20, 2021, 8 pages.
Final Office Action received for U.S. Appl. No. 15/713,544, mailed on Jul. 19, 2019, 20 pages.
Final Office Action received for U.S. Appl. No. 15/713,544, mailed on May 20, 2020, 14 pages.
Final Office Action received for U.S. Appl. No. 15/791,829, mailed on Mar. 7, 2019, 23 pages.
Final Office Action received for U.S. Appl. No. 16/584,281, mailed on Apr. 15, 2020, 26 pages.
Final Office Action received for U.S. Appl. No. 16/585,721, mailed on Apr. 1, 2020, 28 pages.
Final Office Action received for U.S. Appl. No. 16/792,096, mailed on Aug. 9, 2021, 17 pages.
Final Office Action received for U.S. Appl. No. 17/158,936, mailed on Apr. 7, 2023, 18 pages.
Haidar Rawand, "How to Use Android Wear Smartwatch as a Flashlight!", Available online at: <https://howto.highonandroid.com/android-wear-tutorials/how-to-use-android-wear-smartwatch-as-a-flashlight-flashlight-app/>, Sep. 13, 2015, 6 pages.
Hoffman Chris, "5+ Cool Uses for Android's Daydream Mode", retrieved from https://www.howtogeek.com/170990/5-cool-uses-for-androids-daydream-mode, Jul. 12, 2017, 8 pages.
Hollywoodfrodo, "Free Flashlight Android App by Asus Best Flashlight App on Google Play", Online Available at: <https://www.youtube.corn/watch?v=K_kFa7PoVsc>, Sep. 9, 2016, 3 pages.
Huawei Watch FAQS-en_us-V2.8, Online available at https://maplindownloads.s3-eu-west-1.amazonaws.com/A27WH-9512.pdf, Apr. 11, 2016, 135 pages.
Intention to Grant received for Danish Patent Application No. PA201770387, mailed on Apr. 4, 2018, 2 pages.
Intention to Grant received for Danish Patent Application No. PA201770387, mailed on May 24, 2018, 2 pages.
Intention to Grant Received for Danish Patent Application No. PA201970596, mailed on Dec. 1, 2020, 2 pages.
Intention to Grant received for Danish Patent Application No. PA201970597, mailed on Apr. 20, 2021, 2 pages.
Intention to Grant received for European Patent Application No. 18172554.0, mailed on Feb. 17, 2020, 8 pages.
Intention to Grant received for European Patent Application No. 20761084.1, mailed on Mar. 27, 2023, 10 pages.

Intention to Grant received for European Patent Application No. 21169911.1, mailed on Mar. 6, 2023, 9 pages.
Intention to Grant received for European Patent Application No. 21177569.7, mailed on Oct. 27, 2022, 8 pages.
International Preliminary Report on Patentability received for PCT Patent Application No. PCT/US2017/049793, mailed on Apr. 4, 2019, 15 pages.
International Preliminary Report on Patentability received for PCT Patent Application No. PCT/US2018/032385, mailed on Nov. 28, 2019, 10 pages.
International Preliminary Report on Patentability received for PCT Patent Application No. PCT/US2020/045814, mailed on Mar. 17, 2022, 12 pages.
International Search Report and Written Opinion received for PCT Patent Application No. PCT/US2017/049793, mailed on Dec. 27, 2017, 19 pages.
International Search Report and Written Opinion received for PCT Patent Application No. PCT/US2018/032385 mailed on Aug. 3, 2018, 14 pages.
International Search Report and Written Opinion received for PCT Patent Application No. PCT/US2020/045814, mailed on Jan. 20, 2021, 16 pages.
International Search Report and Written Opinion received for PCT Patent Application No. PCT/US2022/026371, mailed on Oct. 12, 2022, 16 pages.
Invitation to Pay Additional Fees received for PCT Patent Application No. PCT/US2017/049793, mailed on Nov. 3, 2017, 2 pages.
Invitation to Pay Additional Fees received for PCT Patent Application No. PCT/US2020/045814, mailed on Nov. 18, 2020, 11 pages.
Invitation to Pay Additional Fees received for PCT Patent Application No. PCT/US2022/026371, mailed on Aug. 18, 2022, 9 pages.
Invitation to Pay Search Fees received for European Patent Application No. 20761084.1, mailed on Dec. 7, 2021, 3 pages.
Kubo et al., "Watch Commander: A Gesture-based Invocation System for Rectangular Smartwatches using B2B-Swipe", UIST'16 Adjunct, Available online at: https://dl.acm.org/doi/pdf/10.1145/2984751.2985697, Oct. 16-19, 2016, pp. 37-39.
Looking for a launcher that changes the default homescreen or widgets based on wifi, location, or other context., Online Available at: https://www.reddit.com/r/androidapps/comments/35lu90/looking_for_a_launcher_that_changes_the_default/, 2015, 2 pages.
Non-Final Office Action received for U.S. Appl. No. 15/713,544, mailed on Dec. 11, 2019, 19 pages.
Non-Final Office Action received for U.S. Appl. No. 15/713,544, mailed on Jan. 24, 2019, 16 pages.
Non-Final Office Action received for U.S. Appl. No. 15/791,829, mailed on Nov. 8, 2018, 18 pages.
Non-Final Office Action received for U.S. Appl. No. 16/584,281, mailed on Dec. 10, 2019, 23 pages.
Non-Final Office Action received for U.S. Appl. No. 16/584,445, mailed on Dec. 26, 2019, 19 pages.
Non-Final Office Action received for U.S. Appl. No. 16/585,714, mailed on Apr. 16, 2020, 18 pages.
Non-Final Office Action received for U.S. Appl. No. 16/585,721, mailed on Dec. 27, 2019, 25 pages.
Non-Final Office Action received for U.S. Appl. No. 16/792,096, mailed on Feb. 12, 2021, 16 pages.
Non-Final Office Action received for U.S. Appl. No. 17/158,936, mailed on Nov. 30, 2022, 17 pages.
Non-Final Office Action received for U.S. Appl. No. 17/546,630, mailed on Mar. 30, 2023, 41 pages.
Non-Final Office Action received for U.S. Appl. No. 17/676,034, mailed on Jan. 24, 2023, 15 pages.
Non-Final Office Action received for U.S. Appl. No. 17/697,749, mailed on Mar. 27, 20123 20 pages.
Notice of Acceptance received for Australian Patent Application No. 2017330211, mailed on May 11, 2020, 3 pages.
Notice of Acceptance received for Australian Patent Application No. 2020217354, mailed on May 31, 2022, 3 pages.
Notice of Acceptance received for Australian Patent Application No. 2020309093, mailed on Jul. 8, 2021, 3 pages.

(56)    References Cited

OTHER PUBLICATIONS

Notice of Acceptance received for Australian Patent Application No. 2021202834, mailed on Jul. 15, 2021, 3 pages.
Notice of Acceptance received for Australian Patent Application No. 2021202836, mailed on Jun. 25, 2021, 3 pages.
Notice of Acceptance received for Australian Patent Application No. 2021245228, mailed on Oct. 4, 2022, 3 pages.
Notice of Allowance received for Chinese Patent Application No. 201780002643.1, mailed on Jan. 6, 2022, 5 pages (1 page of English Translation and 4 pages of Official Copy).
Notice of Allowance received for Chinese Patent Application No. 202110194015.6, mailed on Mar. 9, 2022, 6 pages (3 pages of English Translation and 3 pages of Official Copy).
Notice of Allowance received for Chinese Patent Application No. 202110454541.1, mailed on May 31, 2022, 6 pages (3 pages of English Translation and 3 pages of Official Copy).
Notice of Allowance received for Japanese Patent Application No. 2019-511611, mailed on Jul. 20, 2020, 4 pages (1 page of English Translation and 3 pages of Official Copy).
Notice of Allowance received for Japanese Patent Application No. 2022-512865, mailed on Oct. 3, 2022, 4 pages (1 page of English Translation and 3 pages of Official Copy).
Notice of Allowance received for Korean Patent Application No. 10-2019-7005734, mailed on Oct. 20, 2020, 4 pages (1 page of English Translation and 3 pages of Official Copy).
Notice of Allowance received for Korean Patent Application No. 10-201-7002083, mailed on Jun. 18, 2021, 5 pages (1 2 pageof English Translation and 3 pages of Official Copy).
Notice of Allowance received for Korean Patent Application No. 10-2021-7002597, mailed on Feb. 25, 2021, 5 pages (1 page of English Translation and 4 pages of Official Copy).
Notice of Allowance received for Korean Patent Application No. 10-2021-7013453, mailed on Aug. 11, 2021, 5 pages (2 pages of English Translation and 3 pages of Official Copy).
Notice of Allowance received for Korean Patent Application No. 10-2021-7013454, mailed on Aug. 12, 2020, 4 pages (1 page of English Translation and 3 pages of Official Copy).
Notice of Allowance received for Korean Patent Application No. 10-2021-7030552, mailed on May 6, 2022, 5 pages (2 pages of English Translation and 3 pages of Official Copy).
Notice of Allowance received for Korean Patent Application No. 10-2021-7036678, mailed on Mar. 7, 2022, 5 pages (1 page of English Translation and 4 pages of Official Copy).
Notice of Allowance received for Korean Patent Application No. 10-2022-7019205, mailed on Jan. 5, 2023, 8 pages (2 pages of English Translation and 6 pages of Official Copy).
Notice of Allowance received for Korean Patent Application No. 10-2022-7027441, mailed on Dec. 2, 2022, 7 pages (2 pages of English Translation and 5 pages of Official Copy).
Notice of Allowance received for U.S. Appl. No. 15/713,544, mailed on Jan. 14, 2022, 5 pages.
Notice of Allowance received for U.S. Appl. No. 15/791,829, mailed on Oct. 4, 2019, 9 pages.
Notice of Allowance received for U.S. Appl. No. 16/584,281, mailed on Nov. 18, 2020, 8 pages.
Notice of Allowance received for U.S. Appl. No. 16/584,281, mailed on Sep. 29, 2020, 5 pages.
Notice of Allowance received for U.S. Appl. No. 16/584,445, mailed on Apr. 17, 2020, 9 pages.
Notice of Allowance received for U.S. Appl. No. 16/584,445, mailed on Jul. 23, 2020, 8 pages.
Notice of Allowance received for U.S. Appl. No. 16/584,445, mailed on Jun. 24, 2020, 5 pages.
Notice of Allowance received for U.S. Appl. No. 16/584,445, mailed on May 29, 2020, 5 pages.
Notice of Allowance received for U.S. Appl. No. 16/584,445, mailed on Oct. 21, 2020, 6 pages.
Notice of Allowance received for U.S. Appl. No. 16/585,714, mailed on Jan. 8, 2021, 8 pages.

Notice of Allowance received for U.S. Appl. No. 16/585,714, mailed on Jan. 27, 2021, 2 pages.
Notice of Allowance received for U.S. Appl. No. 16/585,714, mailed on Sep. 25, 2020, 15 pages.
Notice of Allowance received for U.S. Appl. No. 16/585,721, mailed on Oct. 30, 2020, 9 pages.
Notice of Allowance received for U.S. Appl. No. 16/585,721, mailed on Sep. 30, 2020, 15 pages.
Notice of Allowance received for U.S. Appl. No. 16/792,096, mailed on Dec. 29, 2021, 11 pages.
Nova Launcher—Lock Screen Edit, Online Available at: https://forums.androidcentral.com/ask-question/835057-nova-launcher-lock-screen-edit.html, Sep. 2017, 2 pages.
Office Action and Search Report received for Danish Patent Application No. PA201970598, mailed on Jan. 28, 2020, 6 pages.
Office Action received for Australian Patent Application No. 2017330211, mailed on Dec. 5, 2019, 3 pages.
Office Action received for Australian Patent Application No. 2018100179, mailed on Jun. 4, 2018, 4 pages.
Office Action received for Australian Patent Application No. 2018100179, mailed on Nov. 20, 2018, 7 pages.
Office Action received for Australian Patent Application No. 2018100179, mailed on Sep. 14, 2018, 4 pages.
Office Action received for Australian Patent Application No. 2020102158, mailed on Apr. 27, 2021, 5 pages.
Office Action received for Australian Patent Application No. 2020102158, mailed on Dec. 8, 2020, 9 pages.
Office Action received for Australian Patent Application No. 2020217354, mailed on Jan. 17, 2022, 5 pages.
Office Action received for Australian Patent Application No. 2020217354, mailed on Jul. 22, 2021, 3 pages.
Office Action received for Australian Patent Application No. 2020309093, mailed on Jan. 21, 2021, 3 pages.
Office Action received for Australian Patent Application No. 2021202834, mailed on May 28, 2021, 2 pages.
Office Action received for Australian Patent Application No. 2021245228, mailed on Aug. 31, 2022, 2 pages.
Office Action received for Chinese Patent Application No. 201780002643.1, mailed on Aug. 2, 2021, 20 pages (6 pages of English Translation and 14 pages of Official Copy).
Office Action received for Chinese Patent Application No. 201780002643.1, mailed on Dec. 31, 2020, 26 pages (6 pages of English Translation and 20 pages of Official Copy).
Office Action received for Chinese Patent Application No. 201780002643.1, mailed on Jun. 17, 2020, 30 pages (10 pages of English Translation and 20 pages of Official Copy).
Office Action received for Chinese Patent Application No. 201810467061.7, mailed on Apr. 11, 2022, 19 pages (11 pages of English Translation and 8 pages of Official Copy).
Office Action received for Chinese Patent Application No. 201810467061.7, mailed on Aug. 15, 2019, 13 pages (7 pages of English Translation and 6 pages of Official Copy).
Office Action received for Chinese Patent Application No. 201810467061.7, mailed on Feb. 22, 2019, 19 pages (10 pages of English Translation and 9 pages of Official Copy).
Office Action received for Chinese Patent Application No. 201810467061.7, mailed on Jun. 22, 2022, 15 pages (1 page of English Translation and 14 pages of Official Copy).
Office Action received for Chinese Patent Application No. 2018104670617, mailed on Feb. 18, 2020, 12 pages (6 pages of English Translation and 6 pages of Official Copy).
Office Action received for Chinese Patent Application No. 202110194015.6, mailed on Sep. 28, 2021, 13 pages (6 pages of English Translation and 7 pages of Official Copy).
Office Action received for Chinese Patent Application No. 202110453180.9, mailed on Dec. 26, 2022, 13 pages (8 pages of English Translation and 5 pages of Official Copy).
Office Action received for Chinese Patent Application No. 202110453180.9, mailed on Jun. 16, 2022, 14 pages (7 pages of English Translation and 7 pages of Official Copy).
Office Action received for Chinese Patent Application No. 202110453180.9, mailed on Nov. 8, 2021, 21 pages (11 pages of English Translation and 10 pages of Official Copy).

(56)　　　　　References Cited

OTHER PUBLICATIONS

Office Action received for Chinese Patent Application No. 202110454541.1, mailed on Oct. 20, 2021, 19 pages (10 pages of English Translation and 9 pages of Official Copy).
Office Action received for Danish Patent Application No. PA201770387, mailed on Feb. 1, 2018., 3 Pages.
Office Action received for Danish Patent Application No. PA201970596, mailed on May 6, 2020, 4 pages.
Office Action received for Danish Patent Application No. PA201970597, mailed on Oct. 29, 2020, 4 pages.
Office Action received for Danish Patent Application No. PA201970598, mailed on Apr. 15, 2021, 6 pages.
Office Action received for Danish Patent Application No. PA201970598, mailed on Oct. 9, 2020, 4 pages.
Office Action received for Danish Patent Application No. PA201970599, mailed on Jan. 23, 2020, 6 pages.
Office Action received for Danish Patent Application No. PA201970599, mailed on Mar. 1, 2021, 4 pages.
Office Action received for Danish Patent Application No. PA201970599, mailed on May 27, 2020, 4 pages.
Office Action received for European Patent Application No. 17853656.1, mailed on Mar. 25, 2021, 8 pages.
Office Action received for European Patent Application No. 17853656.1, mailed on May 3, 2022, 7 pages.
Office Action received for European Patent Application No. 18172554.0, mailed on Jul. 12, 2019, 10 Pages.
Office Action received for European Patent Application No. 20180900.1, mailed on Feb. 14, 2022, 8 pages.
Office Action received for European Patent Application No. 20761084.1, mailed on Dec. 14, 2022, 5 pages.
Office Action received for European Patent Application No. 20761084.1, mailed on May 9, 2022, 9 pages.
Office Action received for European Patent Application No. 21169911.1, mailed on Dec. 1, 2022, 4 pages.
Office Action received for European Patent Application No. 21169911.1, mailed on Jun. 3, 2022, 5 pages.
Office Action received for European Patent Application No. 21177569.7, mailed on Jun. 9, 2022, 5 pages.
Office Action received for Indian Patent Application No. 202118025047, mailed on Apr. 26, 2022, 6 pages.
Office Action received for Japanese Patent Application No. 2019-511611, mailed on Feb. 28, 2020, 4 pages (2 pages of English Translation and 2 pages of Official Copy).
Office Action received for Japanese Patent Application No. 2020-137007, mailed on Feb. 10, 2023, 4 pages (2 pages of English Translation & 2 pages of Official Copy).
Office Action received for Japanese Patent Application No. 2020-137007, mailed on Jun. 21, 2021, 7 pages (3 pages of English Translation and 4 pages of Official Copy).
Office Action received for Japanese Patent Application No. 2020-137007, mailed on May 9, 2022, 8 pages (4 pages of English Translation and 4 pages of Official Copy).
Office Action received for Korean Patent Application No. 10-2019-7005734, mailed on Feb. 24, 2020, 13 pages (7 pages of English Translation and 6 pages of Official Copy).
Office Action received for Korean Patent Application No. 10-2019-7005734, mailed on Jul. 14, 2020, 8 pages (4 pages of English Translation and 4 pages of Official Copy).
Office Action received for Korean Patent Application No. 10-2021-7002083, mailed on Feb. 10, 2021, 7 pages (3 pages of English Translation and 4 pages of Official Copy).
Office Action received for Korean Patent Application No. 10-2021-7013453, mailed on Jun. 5, 2021, 6 pages (2 pages of English Translation and 4 pages of Official Copy).
Office Action received for Korean Patent Application No. 10-2021-7013454, mailed on Jun. 5, 2021, 6 pages (2 pages of English Translation and 4 pages of Official Copy).
Office Action received for Korean Patent Application No. 10-2021-7030552, mailed on Nov. 22, 2021, 14 pages (8 pages of English Translation and 6 pages of Official Copy).

Office Action received for Korean Patent Application No. 10-2021-7036678, mailed on Dec. 22, 2021, 6 pages (2 pages of English Translation and 4 pages of Official Copy).
Office Action received for Korean Patent Application No. 10-2022-7019205, mailed on Sep. 21, 2022, 6 pages (2 pages of English Translation and 4 pages of Official Copy).
Office Action received for Korean Patent Application No. 10-2022-7027441, mailed on Aug. 24, 2022, 11 pages (6 pages of English Translation and 5 pages of Official Copy).
Phandroid, "New Android Wear Wrist Gestures in Marshmallow", Available online at: https://www.youtube.com/watch?v= 0WhKuklpQ9A, Feb. 11, 2016, 3 pages.
Search Report and Opinion received for Danish Patent Application No. PA201770387, mailed on Oct. 12, 2017, 8 pages.
Search Report and Opinion received for Danish Patent Application No. PA201970596, mailed on Dec. 4, 2019, 11 pages.
Search Report and Opinion received for Danish Patent Application No. PA201970597, mailed on Dec. 18, 2019, 10 pages.
Search Report and Opinion received for Danish Patent Application No. PA201970598, mailed on Oct. 31, 2019, 9 pages.
Search Report and Opinion received for Danish Patent Application No. PA201970599, mailed on Nov. 8, 2019, 12 pages.
Spears Ann, "dimming screen before/instead of screensaver?", retrieved from—https://discussions.apple.com/thread/339700, Jan. 28, 2006, 1 page.
Wade Cliff, "Get the most out of Nova Launcher: Changing Icon Sizes", Online Available at: https://www.androidguys.com/tips-tools/ get-nova-launcher-changing-icon- sizes/, Nov. 16, 2015, 6 pages.
Wade Cliff, "Get the most out of Nova Launcher: Customizing the Dock (Contest Included)", Online Available at: https://www. androidguys.com/tips-tools/get-nova-launcher-customizing-dockcontest-included/, Dec. 1, 2015, 5 pages.
Zephyrnix, "Steam's In-Game Home menu", Online Available at: <https://www.youtube.com/watch?v=jLoRFiPkcUw>, see 0;00-1;06., Feb. 15, 2011, 3 pages.
Dre, SM, "Android 8 How to use Picture in Picture (with YouTube)", available online at: https://youtu.be/H4w4EdizqEg?si= OZJm2exdqF27hDBC, Nov. 27, 2017, 8 pages,.
Final Office Action received for U.S. Appl. No. 17/158,936, mailed on Aug. 19, 2024, 25 pages.
Gotta Be Mobile, "How to Use Picture-in-Picture Mode on Android 8.0 Oreo", available online at: https://www.youtube.com/watch?v= 305V9aP3BEs, Oct. 31, 2017, 1 page.
Gupta Information Systems, "Enable Picture in Picture Mode on Android Oreo 8.0", available online at: https://www.youtube.com/ watch?v=whcee_eSwtc, May 19, 2017, 1 page.
Office Action received for Japanese Patent Application No. 2024-067669, mailed on Jul. 12, 2024, 5 pages (2 pages of English Translation and 3 pages of Official Copy).
Stack Overflow, "Play video from YouTube in picture-in-picture mode", available online at: https://stackoverflow.com/questions/ 54043791/play-video-from-youtube-in-picture-in-picture-mode, Jan. 4, 2019, 5 pages.
Advisory Action received for U.S. Appl. No. 17/158,936, mailed on Jul. 24, 2023, 4 pages.
Applicant Initiated Interview Summary received for U.S. Appl. No. 17/546,630, mailed on May 22, 2023, 4 pages.
Applicant-Initiated Interview Summary received for U.S. Appl. No. 17/546,630, mailed on Aug. 9, 2023, 4 pages.
Applicant-Initiated Interview Summary received for U.S. Appl. No. 17/546,630, mailed on Nov. 6, 2023, 3 pages.
Applicant-Initiated Interview Summary received for U.S. Appl. No. 17/676,034, mailed on Oct. 31, 2023, 2 pages.
Applicant-Initiated Interview Summary received for U.S. Appl. No. 17/676,034, mailed on Sep. 18, 2023, 2 pages.
Applicant-Initiated Interview Summary received for U.S. Appl. No. 17/697,749, mailed on Feb. 22, 2024, 5 pages.
Applicant-Initiated Interview Summary received for U.S. Appl. No. 17/697,749, mailed on May 30, 2023, 3 pages.
Applicant-Initiated Interview Summary received for U.S. Appl. No. 17/697,749, mailed on Oct. 10, 2023, 5 pages.
Decision to Grant received for European Patent Application No. 20761084.1, mailed on Jul. 27, 2023, 4 pages.

(56) References Cited

OTHER PUBLICATIONS

Decision to Grant received for European Patent Application No. 21169911.1, mailed on Jun. 29, 2023, 3 pages.
Extended European Search Report received for European Patent Applicaion No. 23176305.3, mailed on Sep. 13, 2023, 8 pages.
Final Office Action received for U.S. Appl. No. 17/546,630, mailed on Jun. 27, 2023, 31 pages.
Final Office Action received for U.S. Appl. No. 17/676,034, mailed on Jul. 24, 2023, 19 pages.
Final Office Action received for U.S. Appl. No. 17/697,749, mailed on Aug. 10, 2023, 8 pages.
International Preliminary Report on Patentability received for PCT Patent Application No. PCT/US2022/026371, mailed on Nov. 9, 2023, 11 pages.
International Preliminary Report on Patentability received for PCT Patent Application No. PCT/US2023/021409, mailed on Nov. 9, 2023, 23 pages.
Invitation to Pay Additional Fees and Partial International Search Report received for PCT Patent Application No. PCT/US2023/021409, mailed on Sep. 19, 2023, 17 pages.
Non-Final Office Action received for U.S. Appl. No. 17/158,936, mailed on Mar. 26, 2024, 20 pages.
Non-Final Office Action received for U.S. Appl. No. 17/546,630, mailed on Oct. 3, 2023, 36 pages.
Non-Final Office Action received for U.S. Appl. No. 17/676,034, mailed on Oct. 11, 2023, 23 pages.
Non-Final Office Action received for U.S. Appl. No. 17/697,749, mailed on Dec. 4, 2023, 21 pages.
Notice of Acceptance received for Australian Patent Application No. 2022287595, mailed on Aug. 29, 2023, 3 pages.
Notice of Allowance received for Japanese Patent Application No. 2020-137001, mailed on May 29, 2023, 5 pages (1 page of English Translation and 4 pages of Official Copy).
Notice of Allowance received for Korean Patent Application No. 10-2023-7011744, mailed on Sep. 4, 2023, 8 pages (2 pages of English Translation and 6 pages of Official Copy).
Notice of Allowance received for Korean Patent Application No. 10-2023-7040267, mailed on Dec. 5, 2023, 8 pages (2 pages of English Translation and 6 pages of Official Copy).
Notice of Allowance received for U.S. Appl. No. 17/676,034, mailed on Nov. 17, 2023, 9 pages.
Notice of Hearing received for Indian Patent Application No. 202118025047, mailed on Mar. 14, 2024, 2 pages.
Office Action received for Australian Patent Application No. 2022228204, mailed on Feb. 15, 2024, 3 pages.
Office Action received for Australian Patent Application No. 2022228204, mailed on Jul. 27, 2023, 5 pages.
Office Action received for Australian Patent Application No. 2022287595, mailed on Jul. 20, 2023, 3 pages.
Office Action received for Chinese Patent Application No. 202210263607.3, mailed on Oct. 23, 2023, 18 pages(7 pages of English Translation and 11 pages of Official Copy).
Office Action received for Chinese Patent Application No. 202210265746.X, mailed on Oct. 11, 2023, 13 pages (6 pages of English Translation and 7 pages of Official Copy),.
Office Action received for European Patent Application No. 20180900.1, mailed on Dec. 21, 2023, 5 pages.
Office Action received for European Patent Application No. 20180900.1, mailed on May 3, 2023, 6 pages.

Office Action received for Indian Patent Application No. 202118025046, mailed on Mar. 18, 2024, 6 pages.
Office Action received for Indian Patent Application No. 202118025048, mailed on Sep. 22, 2023, 8 pages.
Office Action received for Japanese Patent Application No. 2022-174879, mailed on Dec. 8, 2023, 8 pages (4 pages of English Translation and 4 pages of Official Copy).
Office Action received for Korean Patent Application No. 10-2023-7011744, mailed on May 15, 2023, 11 pages (5 pages of English Translation and 6 pages of Official Copy).
Supplemental Notice of Allowance received for U.S. Appl. No. 17/676,034, mailed on Feb. 14, 2024, 4 pages,.
Supplemental Notice of Allowance received for U.S. Appl. No. 17/676,034. mailed on Mar. 4, 2024, 10 pages.
Hoffman Chris, "5+ Cool Uses for Android's Daydream Mode", Online Available at: https://www.howtogeek.com/170990/5-cool-uses-for-androids-daydream-mode/, Jul. 12, 2017, 8 pages.
Houben et al., "WatchConnect: A Toolkit for Prototyping Smartwatch-Centric Cross-Device Applications", Proceedings of the 33rd Annual ACM Conference on Human Factors in Computing Systems, Online available at: https://dl.acm.org/doi/10.1145/2702123.2702215, 2015, pp. 1247-1256.
Knight Jon, "Use the New Picture-in-Picture Mode in Android O", Gadget Hacks, Retrieved from: https://android.gadgethacks.com/how-to/ use-new-picture-picture-mode-android-o-0178324/, Jun. 23, 2017, 6 pages.
Applicant-Initiated Interview Summary received for U.S. Appl. No. 17/158,936, mailed on May 29, 2024, 4 pages.
Final Office Action received for U.S. Appl. No. 18/764,031, mailed on Oct. 7, 2025, 10 pages.
Office Action received for Australian Patent Application No. 2024205134, mailed on Sep. 29, 2025, 2 pages.
Applicant-Initiated Interview Summary received for U.S. Appl. No. 18/764,031, mailed on Jul. 31, 2025, 6 pages.
Decision to Grant received for European Patent Application No. 23176305.3, mailed on Sep. 11, 2025, 4 pages.
Notice of Allowance received for Korean Patent Application No. 10-2023-7033682, mailed on Sep. 3, 2025, 7 pages (2 pages of English Translation and 5 pages of Official Copy).
Corrected Notice of Allowance received for U.S. Appl. No. 17/158,936, mailed on Jun. 2, 2025, 3 pages.
Non-Final Office Action received for U.S. Appl. No. 18/764,031, mailed on Jun. 12, 2025, 8 pages.
Office Action received for Japanese Patent Application No. 2024-203362, mailed on Jun. 30, 2025, 11 pages (5 pages of English Translation and 6 pages of Official Copy).
Result of Consultation received for European Patent Application No. 17853656.1, mailed on Jun. 12, 2025, 4 pages.
Intention to Grant received for European Patent Application No. 17853656.1, mailed on Aug. 18, 2025, 9 pages.
Intention to Grant received for European Patent Application No. 23176305.3, mailed on Apr. 29, 2025, 9 pages.
Notice of Allowance received for Japanese Patent Application No. 2023-560221, mailed on May 12, 2025, 4 pages (1 page of English Translation and 3 pages of Official Copy).
Notice of Allowance received for U.S. Appl. No. 17/158,936, mailed on May 9, 2025, 9 pages.
Office Action received for European Patent Application No. 23728944.2, mailed on Nov. 11, 2025, 10 pages.

* cited by examiner

Portable Multifunction Device 100

210 is SIM card slot
212 is headphone jack

Speaker 111

Optical Sensor 164

Proximity Sensor 166

Touch Screen 112

Contact Intensity Sensor(s) 165

Tactile Output Generator(s) 167

Microphone 113

Home 204

Accelerometer(s) 168

External Port 124

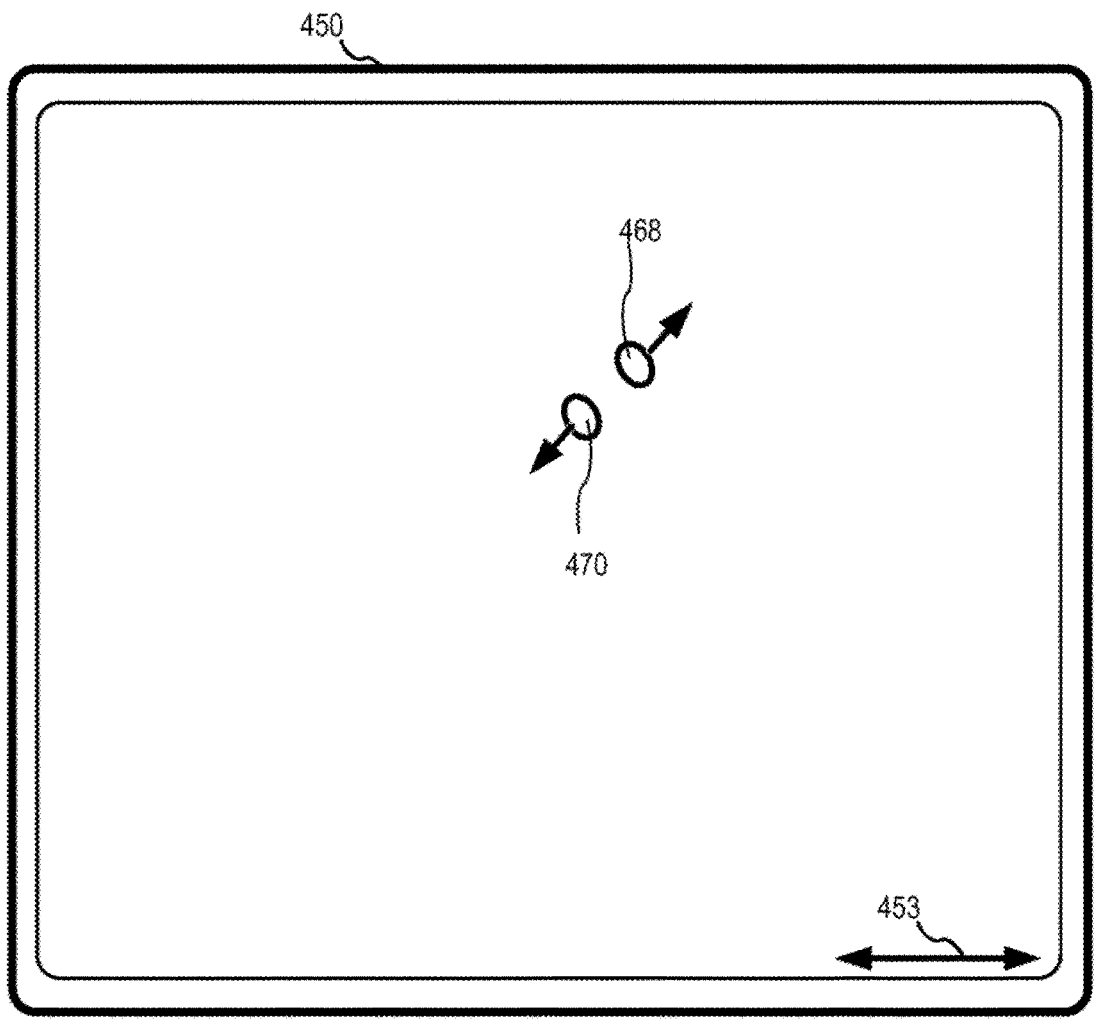
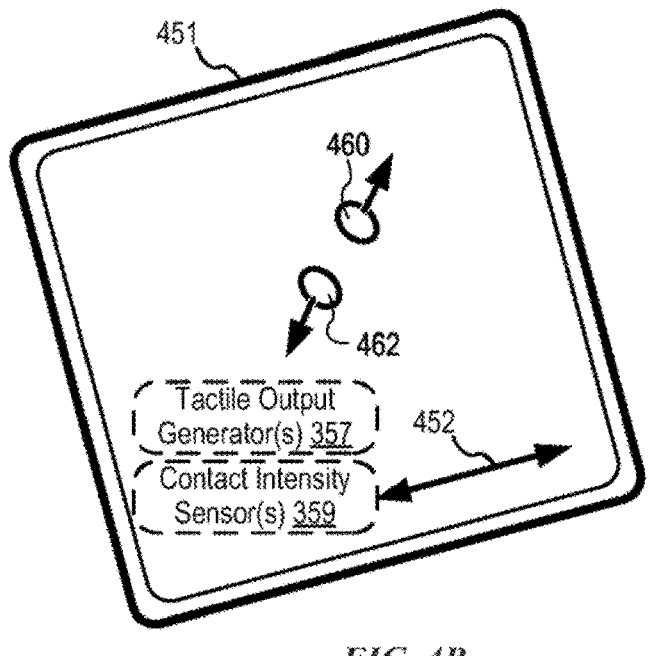
*FIG. 4B*

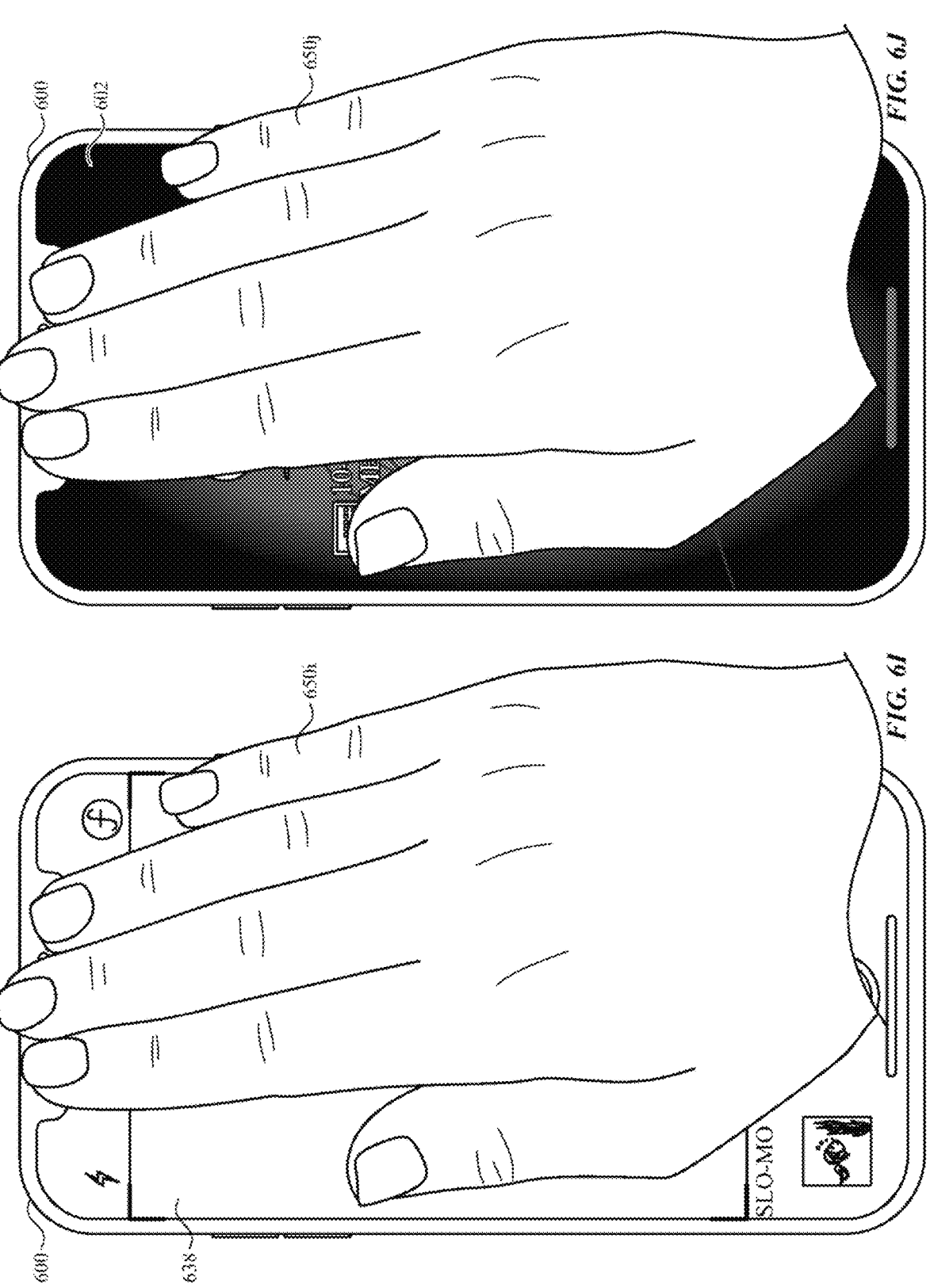

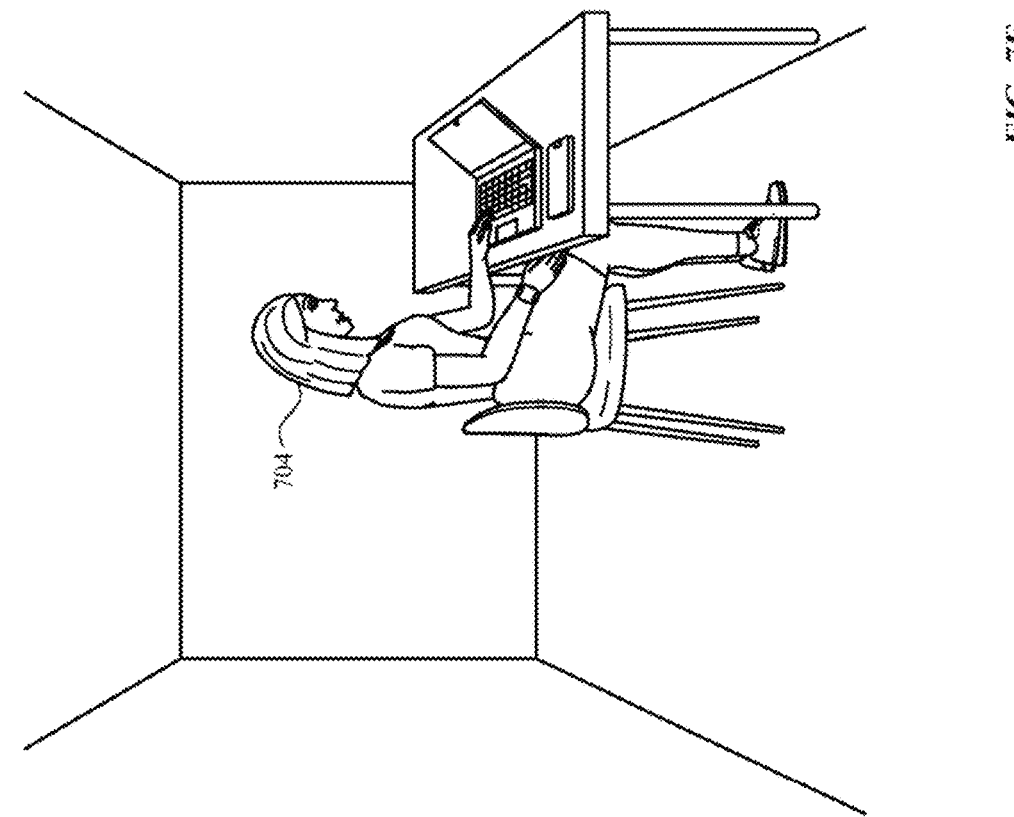
FIG. 7E

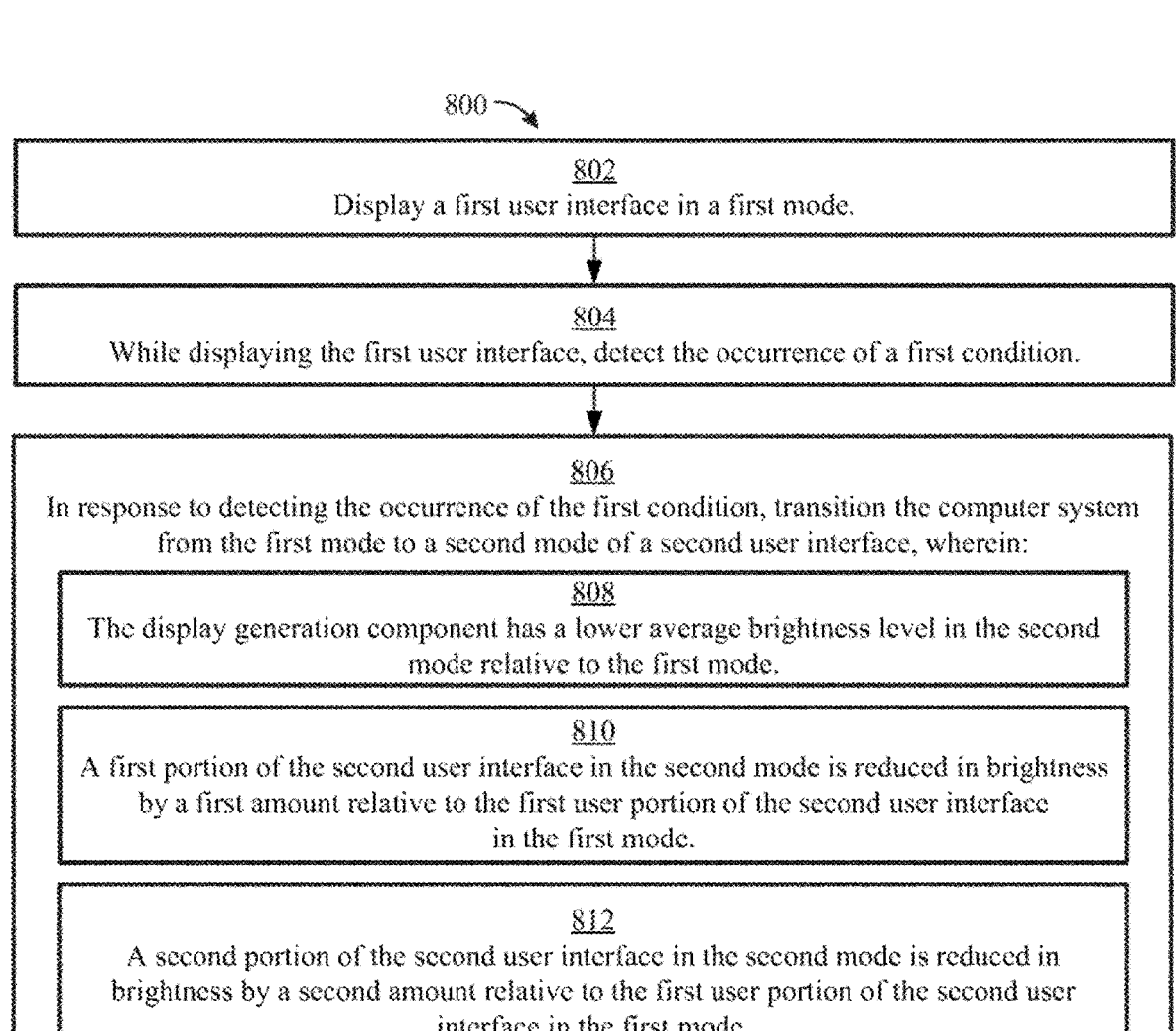

800

802
Display a first user interface in a first mode.

804
While displaying the first user interface, detect the occurrence of a first condition.

806
In response to detecting the occurrence of the first condition, transition the computer system from the first mode to a second mode of a second user interface, wherein:

808
The display generation component has a lower average brightness level in the second mode relative to the first mode.

810
A first portion of the second user interface in the second mode is reduced in brightness by a first amount relative to the first user portion of the second user interface in the first mode.

812
A second portion of the second user interface in the second mode is reduced in brightness by a second amount relative to the first user portion of the second user interface in the first mode.

814
The second amount is different from the first amount.

816
While the computer system is in the second mode, detect the occurrence of a second condition.

818
In response to detecting the occurrence of the second condition, transition the computer system from the second mode to a third mode, wherein the display generation component has a lower average brightness level in the third mode relative to the second mode.

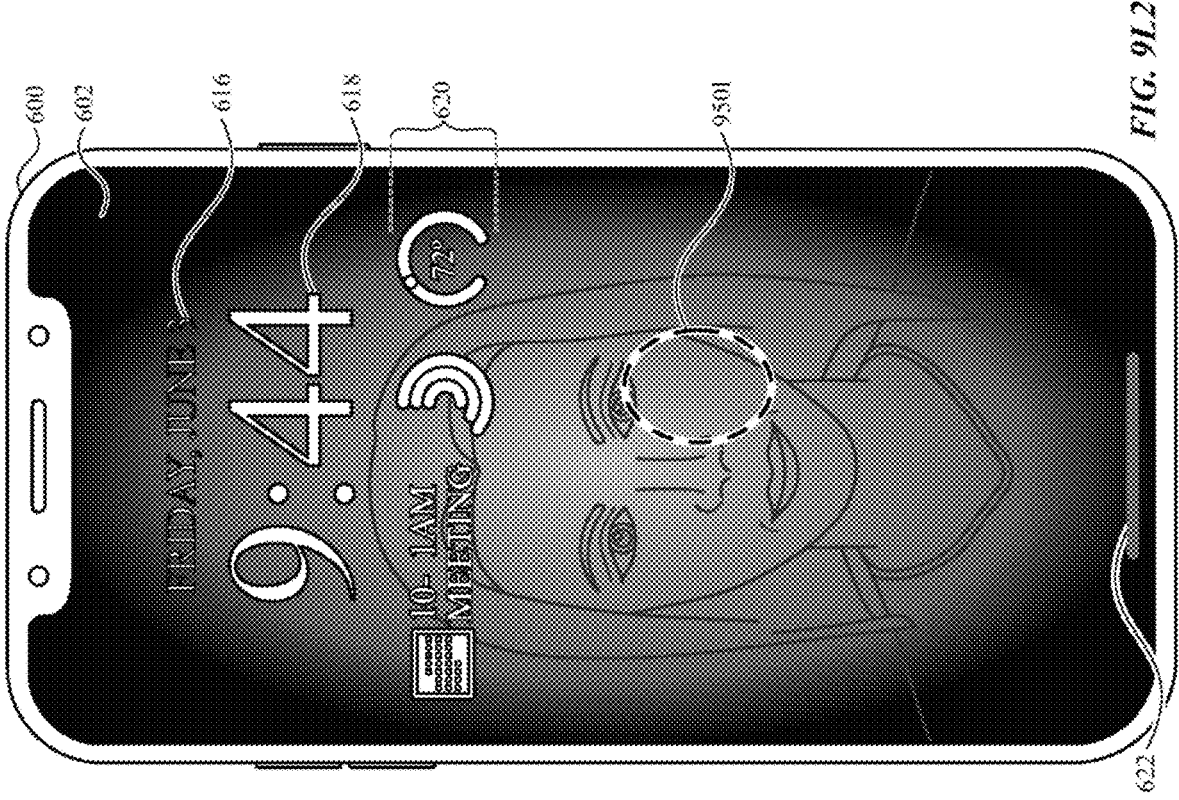
FIG. 9L2
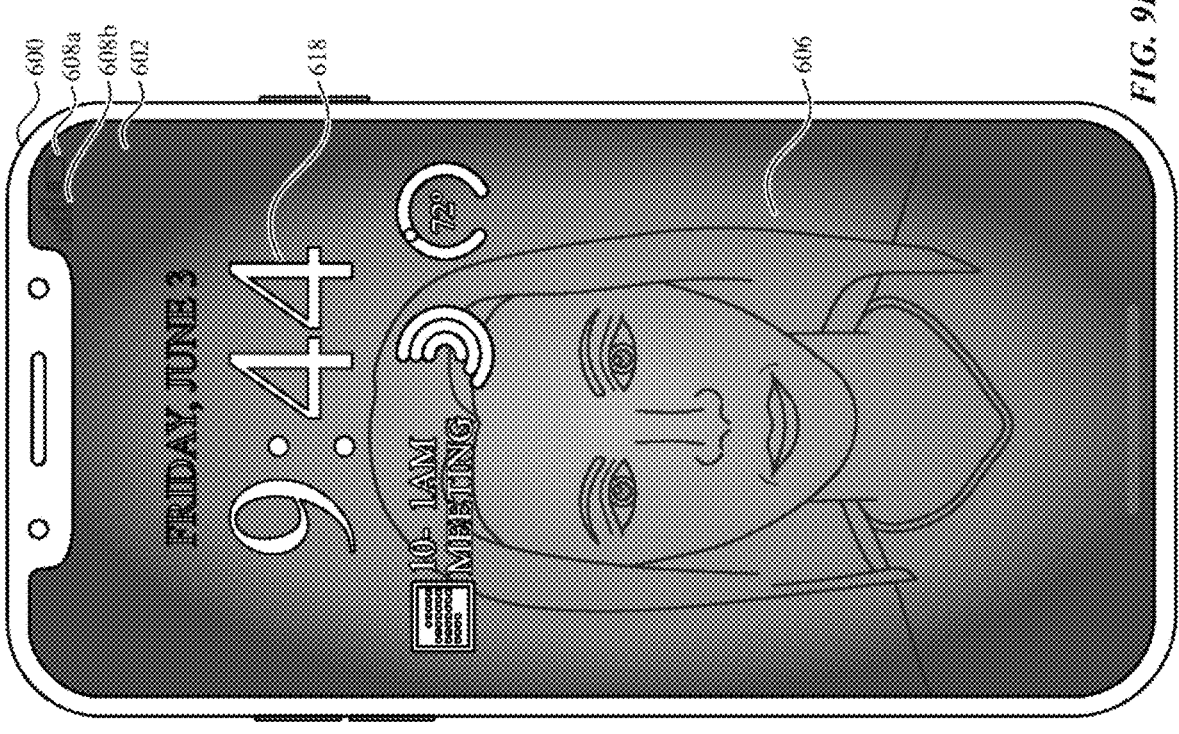
FIG. 9L1

Figure 10:
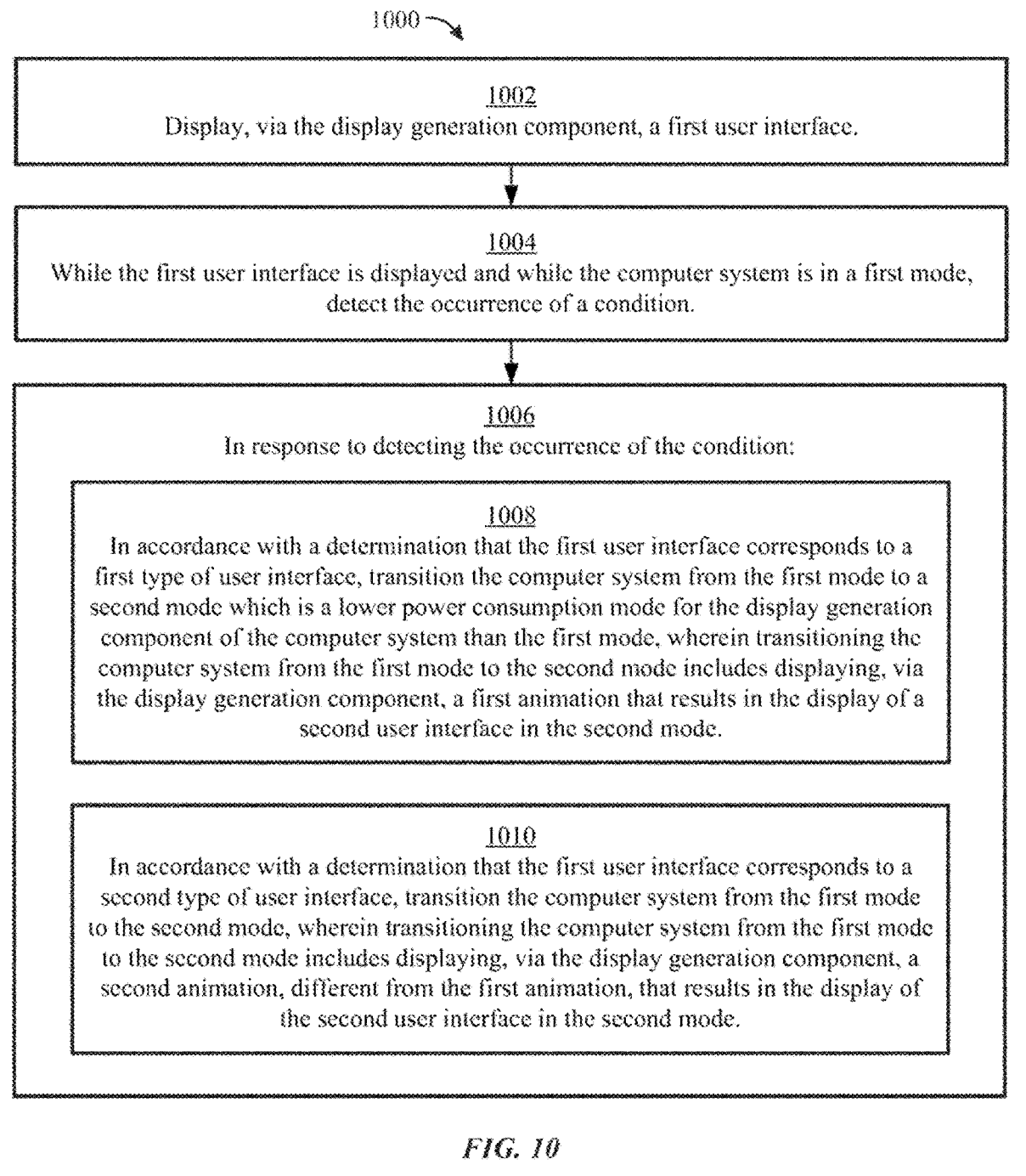

1000 ↘

| 1002 |
|---|
| Display, via the display generation component, a first user interface. |

↓

| 1004 |
|---|
| While the first user interface is displayed and while the computer system is in a first mode, detect the occurrence of a condition. |

↓

1006
In response to detecting the occurrence of the condition:

1008
In accordance with a determination that the first user interface corresponds to a first type of user interface, transition the computer system from the first mode to a second mode which is a lower power consumption mode for the display generation component of the computer system than the first mode, wherein transitioning the computer system from the first mode to the second mode includes displaying, via the display generation component, a first animation that results in the display of a second user interface in the second mode.

1010
In accordance with a determination that the first user interface corresponds to a second type of user interface, transition the computer system from the first mode to the second mode, wherein transitioning the computer system from the first mode to the second mode includes displaying, via the display generation component, a second animation, different from the first animation, that results in the display of the second user interface in the second mode.

*FIG. 11F3*
*FIG. 11F2*

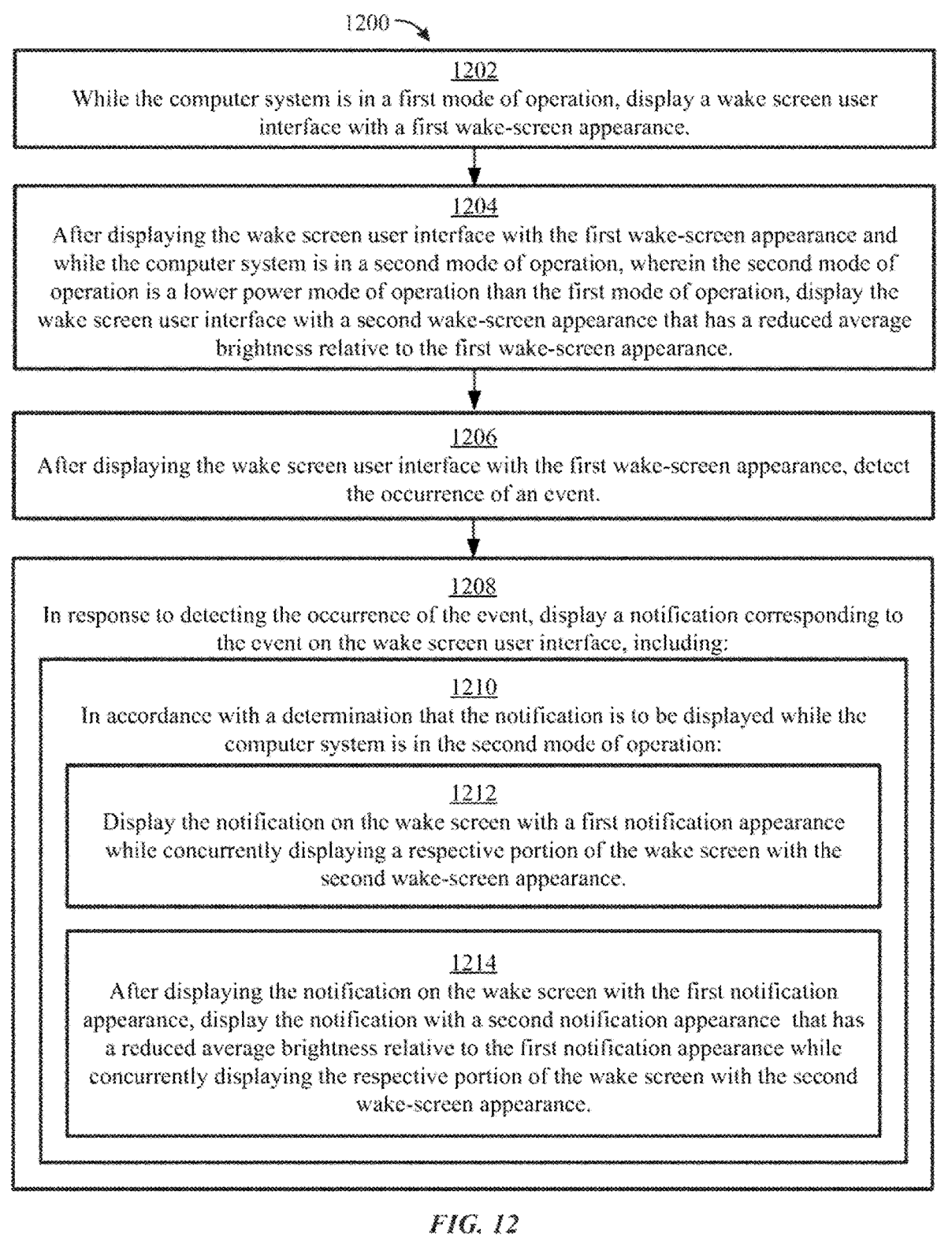

1200 ⟍

1202
While the computer system is in a first mode of operation, display a wake screen user interface with a first wake-screen appearance.

↓

1204
After displaying the wake screen user interface with the first wake-screen appearance and while the computer system is in a second mode of operation, wherein the second mode of operation is a lower power mode of operation than the first mode of operation, display the wake screen user interface with a second wake-screen appearance that has a reduced average brightness relative to the first wake-screen appearance.

↓

1206
After displaying the wake screen user interface with the first wake-screen appearance, detect the occurrence of an event.

↓

1208
In response to detecting the occurrence of the event, display a notification corresponding to the event on the wake screen user interface, including:

1210
In accordance with a determination that the notification is to be displayed while the computer system is in the second mode of operation:

1212
Display the notification on the wake screen with a first notification appearance while concurrently displaying a respective portion of the wake screen with the second wake-screen appearance.

1214
After displaying the notification on the wake screen with the first notification appearance, display the notification with a second notification appearance that has a reduced average brightness relative to the first notification appearance while concurrently displaying the respective portion of the wake screen with the second wake-screen appearance.

*FIG. 12*

LOW POWER DISPLAY STATE

CROSS-REFERENCE TO RELATED APPLICATIONS

This application claims priority to U.S. Patent Application No. 63/340,442, entitled "LOW POWER DISPLAY STATE," filed on May 10, 2022 and to U.S. Patent Application No. 63/349,065, entitled "LOW POWER DISPLAY STATE," filed on Jun. 4, 2022. The entire contents of each of these applications are hereby incorporated by reference in their entireties.

FIELD

The present disclosure relates generally to computer user interfaces, and more specifically to techniques for managing the brightness of a display.

BACKGROUND

Computer systems include a display for displaying user interfaces. The brightness at which the display operates at impacts the power consumption of the computer system. Reducing the power brightness at which the display operates reduces the power consumption of the computer system.

BRIEF SUMMARY

Some techniques for managing the display brightness of a display using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing the brightness of a display. Such methods and interfaces optionally complement or replace other methods for managing the brightness of a display. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component is described. The method comprises: displaying a first user interface in a first mode; while displaying the first user interface, detecting the occurrence of a first condition; and in response to detecting the occurrence of the first condition, transitioning the computer system from the first mode to a second mode of a second user interface, wherein: the display generation component has a lower average brightness level in the second mode relative to the first mode; a first portion of the second user interface in the second mode is reduced in brightness by a first amount relative to the first user portion of the second user interface in the first mode; a second portion of the second user interface in the second mode is reduced in brightness by a second amount relative to the first user portion of the second user interface in the first mode; and the second amount is different from the first amount; while the computer system is in the second mode, detecting the occurrence of a second condition; and in response to detecting the occurrence of the second condition, transitioning the computer system from the second mode to a third mode, wherein the display generation component has a lower average brightness level in the third mode relative to the second mode.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying a first user interface in a first mode; while displaying the first user interface, detecting the occurrence of a first condition; and in response to detecting the occurrence of the first condition, transitioning the computer system from the first mode to a second mode of a second user interface, wherein: the display generation component has a lower average brightness level in the second mode relative to the first mode; a first portion of the second user interface in the second mode is reduced in brightness by a first amount relative to the first user portion of the second user interface in the first mode; a second portion of the second user interface in the second mode is reduced in brightness by a second amount relative to the first user portion of the second user interface in the first mode; and the second amount is different from the first amount; while the computer system is in the second mode, detecting the occurrence of a second condition; and in response to detecting the occurrence of the second condition, transitioning the computer system from the second mode to a third mode, wherein the display generation component has a lower average brightness level in the third mode relative to the second mode.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying a first user interface in a first mode; while displaying the first user interface, detecting the occurrence of a first condition; and in response to detecting the occurrence of the first condition, transitioning the computer system from the first mode to a second mode of a second user interface, wherein: the display generation component has a lower average brightness level in the second mode relative to the first mode; a first portion of the second user interface in the second mode is reduced in brightness by a first amount relative to the first user portion of the second user interface in the first mode; a second portion of the second user interface in the second mode is reduced in brightness by a second amount relative to the first user portion of the second user interface in the first mode; and the second amount is different from the first amount; while the computer system is in the second mode, detecting the occurrence of a second condition; and in response to detecting the occurrence of the second condition, transitioning the computer system from the second mode to a third mode, wherein the display generation component has a lower average brightness level in the third mode relative to the second mode.

In accordance with some embodiments, a computer system configured to communicate with a display generation component is described. The computer system comprises: one or more processors; and memory storing one or more programs configured to be executed by the one or more processors, the one or more programs including instructions for: displaying a first user interface in a first mode; while displaying the first user interface, detecting the occurrence of a first condition; and in response to detecting the occurrence of the first condition, transitioning the computer system from the first mode to a second mode of a second user interface, wherein: the display generation component has a lower average brightness level in the second mode relative to the first mode; a first portion of the second user interface in the second mode is reduced in brightness by a first amount relative to the first user portion of the second user interface in the first mode; a second portion of the second user interface in the second mode is reduced in brightness by a second amount relative to the first user portion of the second user interface in the first mode; and the second amount is different from the first amount; while the computer system is in the second mode, detecting the occurrence of a second condition; and in response to detecting the occurrence of the second condition, transitioning the computer system from the second mode to a third mode, wherein the display generation component has a lower average brightness level in the third mode relative to the second mode.

In accordance with some embodiments, a computer system configured to communicate with a display generation component is described. The computer system comprises: means for displaying a first user interface in a first mode; means for, while displaying the first user interface, detecting the occurrence of a first condition; and means for, in response to detecting the occurrence of the first condition, transitioning the computer system from the first mode to a second mode of a second user interface, wherein: the display generation component has a lower average brightness level in the second mode relative to the first mode; a first portion of the second user interface in the second mode is reduced in brightness by a first amount relative to the first user portion of the second user interface in the first mode; a second portion of the second user interface in the second mode is reduced in brightness by a second amount relative to the first user portion of the second user interface in the first mode; and the second amount is different from the first amount; means for, while the computer system is in the second mode, detecting the occurrence of a second condition; and means for, in response to detecting the occurrence of the second condition, transitioning the computer system from the second mode to a third mode, wherein the display generation component has a lower average brightness level in the third mode relative to the second mode.

In accordance with some embodiments, a computer program product is described. The computer program product comprises: one or more programs configured to be executed by one or more processors of a computer system that is in communication with a display generation component, the one or more programs including instructions for: displaying a first user interface in a first mode; while displaying the first user interface, detecting the occurrence of a first condition; and in response to detecting the occurrence of the first condition, transitioning the computer system from the first mode to a second mode of a second user interface, wherein: the display generation component has a lower average brightness level in the second mode relative to the first mode; a first portion of the second user interface in the second mode is reduced in brightness by a first amount relative to the first user portion of the second user interface in the first mode; a second portion of the second user interface in the second mode is reduced in brightness by a second amount relative to the first user portion of the second user interface in the first mode; and the second amount is different from the first amount; while the computer system is in the second mode, detecting the occurrence of a second condition; and in response to detecting the occurrence of the second condition, transitioning the computer system from the second mode to a third mode, wherein the display generation component has a lower average brightness level in the third mode relative to the second mode.

In accordance with some embodiments, a method performed at a computer system that is in communication with a display generation component is described. The method comprises: displaying, via the display generation component, a first user interface; while the first user interface is displayed and while the computer system is in a first mode, detecting the occurrence of a condition; and in response to detecting the occurrence of the condition: in accordance with a determination that the first user interface corresponds to a first type of user interface, transitioning the computer system from the first mode to a second mode which is a lower power consumption mode for the display generation component of the computer system than the first mode, wherein transitioning the computer system from the first mode to the second mode includes displaying, via the display generation component, a first animation that results in the display of a second user interface in the second mode; and in accordance with a determination that the first user interface corresponds to a second type of user interface, transitioning the computer system from the first mode to the second mode, wherein transitioning the computer system from the first mode to the second mode includes displaying, via the display generation component, a second animation, different from the first animation, that results in the display of the second user interface in the second mode.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a first user interface; while the first user interface is displayed and while the computer system is in a first mode, detecting the occurrence of a condition; and in response to detecting the occurrence of the condition: in accordance with a determination that the first user interface corresponds to a first type of user interface, transitioning the computer system from the first mode to a second mode which is a lower power consumption mode for the display generation component of the computer system than the first mode, wherein transitioning the computer system from the first mode to the second mode includes displaying, via the display generation component, a first animation that results in the display of a second user interface in the second mode; and in accordance with a determination that the first user interface corresponds to a second type of user interface, transitioning the computer system from the first mode to the second mode, wherein transitioning the computer system from the first mode to the second mode includes displaying, via the display generation component, a second animation, different from the first animation, that results in the display of the second user interface in the second mode.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a first user interface; while the first user interface is displayed and while the computer system is in a first mode, detecting the occurrence of a condition; and in response to detecting the occurrence of the condition: in accordance with a determination that the first user interface corresponds to a first type of user interface, transitioning the computer system from the first mode to a second mode which is a lower power consumption mode for the display generation component of the computer system than the first mode, wherein transitioning the computer system from the first mode to the second mode includes displaying, via the display generation component, a first animation that results in the display of a second user interface in the second mode; and in accordance with a determination that the first user interface corresponds to a second type of user interface, transitioning the computer system from the first mode to the second mode, wherein transitioning the computer system from the first mode to the second mode includes displaying, via the display generation component, a second animation, different from the first animation, that results in the display of the second user interface in the second mode.

In accordance with some embodiments, a computer system configured to communicate with a display generation component is described. The computer system comprises: one or more processors; and memory storing one or more programs configured to be executed by the one or more processors, the one or more programs including instructions for: displaying, via the display generation component, a first user interface; while the first user interface is displayed and while the computer system is in a first mode, detecting the occurrence of a condition; and in response to detecting the occurrence of the condition: in accordance with a determination that the first user interface corresponds to a first type of user interface, transitioning the computer system from the first mode to a second mode which is a lower power consumption mode for the display generation component of the computer system than the first mode, wherein transitioning the computer system from the first mode to the second mode includes displaying, via the display generation component, a first animation that results in the display of a second user interface in the second mode; and in accordance with a determination that the first user interface corresponds to a second type of user interface, transitioning the computer system from the first mode to the second mode, wherein transitioning the computer system from the first mode to the second mode includes displaying, via the display generation component, a second animation, different from the first animation, that results in the display of the second user interface in the second mode.

In accordance with some embodiments, a computer system configured to communicate with a display generation component is described. The computer system comprises: means for displaying, via the display generation component, a first user interface; means for, while the first user interface is displayed and while the computer system is in a first mode, detecting the occurrence of a condition; and means for, in response to detecting the occurrence of the condition: in accordance with a determination that the first user interface corresponds to a first type of user interface, transitioning the computer system from the first mode to a second mode which is a lower power consumption mode for the display generation component of the computer system than the first mode, wherein transitioning the computer system from the first mode to the second mode includes displaying, via the display generation component, a first animation that results in the display of a second user interface in the second mode; and in accordance with a determination that the first user interface corresponds to a second type of user interface, transitioning the computer system from the first mode to the second mode, wherein transitioning the computer system from the first mode to the second mode includes displaying, via the display generation component, a second animation, different from the first animation, that results in the display of the second user interface in the second mode.

In accordance with some embodiments, a computer program product is described. The computer program product comprises: one or more programs configured to be executed by one or more processors of a computer system that is in communication with a display generation component, the one or more programs including instructions for: displaying, via the display generation component, a first user interface; while the first user interface is displayed and while the computer system is in a first mode, detecting the occurrence of a condition; and in response to detecting the occurrence of the condition: in accordance with a determination that the first user interface corresponds to a first type of user interface, transitioning the computer system from the first mode to a second mode which is a lower power consumption mode for the display generation component of the computer system than the first mode, wherein transitioning the computer system from the first mode to the second mode includes displaying, via the display generation component, a first animation that results in the display of a second user interface in the second mode; and in accordance with a determination that the first user interface corresponds to a second type of user interface, transitioning the computer system from the first mode to the second mode, wherein transitioning the computer system from the first mode to the second mode includes displaying, via the display generation component, a second animation, different from the first animation, that results in the display of the second user interface in the second mode.

In accordance with some embodiments, a method performed at a computer system that is in communication with a display generation component is described. The method comprises: while the computer system is in a first mode of operation, displaying a wake screen user interface with a first wake-screen appearance; after displaying the wake screen user interface with the first wake-screen appearance and while the computer system is in a second mode of operation, wherein the second mode of operation is a lower power mode of operation than the first mode of operation, displaying the wake screen user interface with a second wake-screen appearance that has a reduced average brightness relative to the first wake-screen appearance; after displaying the wake screen user interface with the first wake-screen appearance, detecting the occurrence of an event; and in response to detecting the occurrence of the event, displaying a notification corresponding to the event on the wake screen user interface, including: in accordance with a determination that the notification is to be displayed while the computer system is in the second mode of operation: displaying the notification on the wake screen user interface with a first notification appearance while concurrently displaying a respective portion of the wake screen user interface with the second wake-screen appearance; and after displaying the notification on the wake screen user interface with the first notification appearance, displaying the notification with a second notification appearance that has a reduced average brightness relative to the first notification appearance while concurrently displaying the respective portion of the wake screen user interface with the second wake-screen appearance.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while the computer system is in a first mode of operation, displaying a wake screen user interface with a first wake-screen appearance; after displaying the wake screen user interface with the first wake-screen appearance and while the computer system is in a second mode of operation, wherein the second mode of operation is a lower power mode of operation than the first mode of operation, displaying the wake screen user interface with a second wake-screen appearance that has a reduced average brightness relative to the first wake-screen appearance; after displaying the wake screen user interface with the first wake-screen appearance, detecting the occurrence of an event; and in response to detecting the occurrence of the event, displaying a first notification corresponding to the event on the wake screen user interface, including: in accordance with a determination that the first notification is to be displayed while the computer system is in the second mode of operation: displaying the first notification on the wake screen user interface with a first notification appearance while concurrently displaying a respective portion of the wake screen user interface with the second wake-screen appearance; and after displaying the first notification on the wake screen user interface with the first notification appearance, displaying the first notification with a second notification appearance that has a reduced average brightness relative to the first notification appearance while concurrently displaying the respective portion of the wake screen user interface with the second wake-screen appearance.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while the computer system is in a first mode of operation, displaying a wake screen user interface with a first wake-screen appearance; after displaying the wake screen user interface with the first wake-screen appearance and while the computer system is in a second mode of operation, wherein the second mode of operation is a lower power mode of operation than the first mode of operation, displaying the wake screen user interface with a second wake-screen appearance that has a reduced average brightness relative to the first wake-screen appearance; after displaying the wake screen user interface with the first wake-screen appearance, detecting the occurrence of an event; and in response to detecting the occurrence of the event, displaying a first notification corresponding to the event on the wake screen user interface, including: in accordance with a determination that the first notification is to be displayed while the computer system is in the second mode of operation: displaying the first notification on the wake screen user interface with a first notification appearance while concurrently displaying a respective portion of the wake screen user interface with the second wake-screen appearance; and after displaying the first notification on the wake screen user interface with the first notification appearance, displaying the first notification with a second notification appearance that has a reduced average brightness relative to the first notification appearance while concurrently displaying the respective portion of the wake screen user interface with the second wake-screen appearance.

In accordance with some embodiments, a computer system configured to communicate with a display generation component is described. The computer system comprises: one or more processors; and memory storing one or more programs configured to be executed by the one or more processors, the one or more programs including instructions for: while the computer system is in a first mode of operation, displaying a wake screen user interface with a first wake-screen appearance; after displaying the wake screen user interface with the first wake-screen appearance and while the computer system is in a second mode of operation, wherein the second mode of operation is a lower power mode of operation than the first mode of operation, displaying the wake screen user interface with a second wake-screen appearance that has a reduced average brightness relative to the first wake-screen appearance; after displaying the wake screen user interface with the first wake-screen appearance, detecting the occurrence of an event; and in response to detecting the occurrence of the event, displaying a first notification corresponding to the event on the wake screen user interface, including: in accordance with a determination that the first notification is to be displayed while the computer system is in the second mode of operation: displaying the first notification on the wake screen user interface with a first notification appearance while concurrently displaying a respective portion of the wake screen user interface with the second wake-screen appearance; and after displaying the first notification on the wake screen user interface with the first notification appearance, displaying the first notification with a second notification appearance that has a reduced average brightness relative to the first notification appearance while concurrently displaying the respective portion of the wake screen user interface with the second wake-screen appearance.

In accordance with some embodiments, a computer system configured to communicate with a display generation component is described. The computer system comprises: means for, while the computer system is in a first mode of operation, displaying a wake screen user interface with a first wake-screen appearance; means for, after displaying the wake screen user interface with the first wake-screen appearance and while the computer system is in a second mode of operation, wherein the second mode of operation is a lower power mode of operation than the first mode of operation, displaying the wake screen user interface with a second wake-screen appearance that has a reduced average brightness relative to the first wake-screen appearance; means for, after displaying the wake screen user interface with the first wake-screen appearance, detecting the occurrence of an event; and means for, in response to detecting the occurrence of the event, displaying a first notification corresponding to the event on the wake screen user interface, including: in accordance with a determination that the first notification is to be displayed while the computer system is in the second mode of operation: displaying the first notification on the wake screen user interface with a first notification appearance while concurrently displaying a respective portion of the wake screen user interface with the second wake-screen appearance; and after displaying the first notification on the wake screen user interface with the first notification appearance, displaying the first notification with a second notification appearance that has a reduced average brightness relative to the first notification appearance while concurrently displaying the respective portion of the wake screen user interface with the second wake-screen appearance.

In accordance with some embodiments, a computer program product is described. The computer program product comprises: one or more programs configured to be executed by one or more processors of a computer system that is in communication with a display generation component, the one or more programs including instructions for: while the computer system is in a first mode of operation, displaying a wake screen user interface with a first wake-screen appearance; after displaying the wake screen user interface with the first wake-screen appearance and while the computer system is in a second mode of operation, wherein the second mode of operation is a lower power mode of operation than the first mode of operation, displaying the wake screen user interface with a second wake-screen appearance that has a reduced average brightness relative to the first wake-screen appearance; after displaying the wake screen user interface with the first wake-screen appearance, detecting the occurrence of an event; and in response to detecting the occurrence of the event, displaying a first notification corresponding to the event on the wake screen user interface, including: in accordance with a determination that the first notification is to be displayed while the computer system is in the second mode of operation: displaying the first notification on the wake screen user interface with a first notification appearance while concurrently displaying a respective portion of the wake screen user interface with the second wake-screen appearance; and after displaying the first notification on the wake screen user interface with the first notification appearance, displaying the first notification with a second notification appearance that has a reduced average brightness relative to the first notification appearance while concurrently displaying the respective portion of the wake screen user interface with the second wake-screen appearance.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing the display brightness of a display, thereby increasing the effectiveness, efficiency, and user satisfaction with such devices. Such methods and interfaces may complement or replace other methods for managing the display brightness of a display.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7F illustrate exemplary user interfaces for controlling the display state of a display.

FIG. 8 is a flow diagram illustrating a method for changing the display state of a display.

FIG. 10 is a flow diagram illustrating a method for transitioning between display states of a display.

FIG. 12 is a flow diagram illustrating a method for displaying notifications.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing the brightness of a display. For example, there is a need for electronic devices to allow a user the ability to quickly and easily reduce the brightness of a display such that the battery of the electronic device is conserved. Such techniques can reduce the cognitive burden on a user who manages the brightness of a display, thereby enhancing productivity. Further, such techniques can reduce processor and battery power otherwise wasted on redundant user inputs.

Figure 9A:
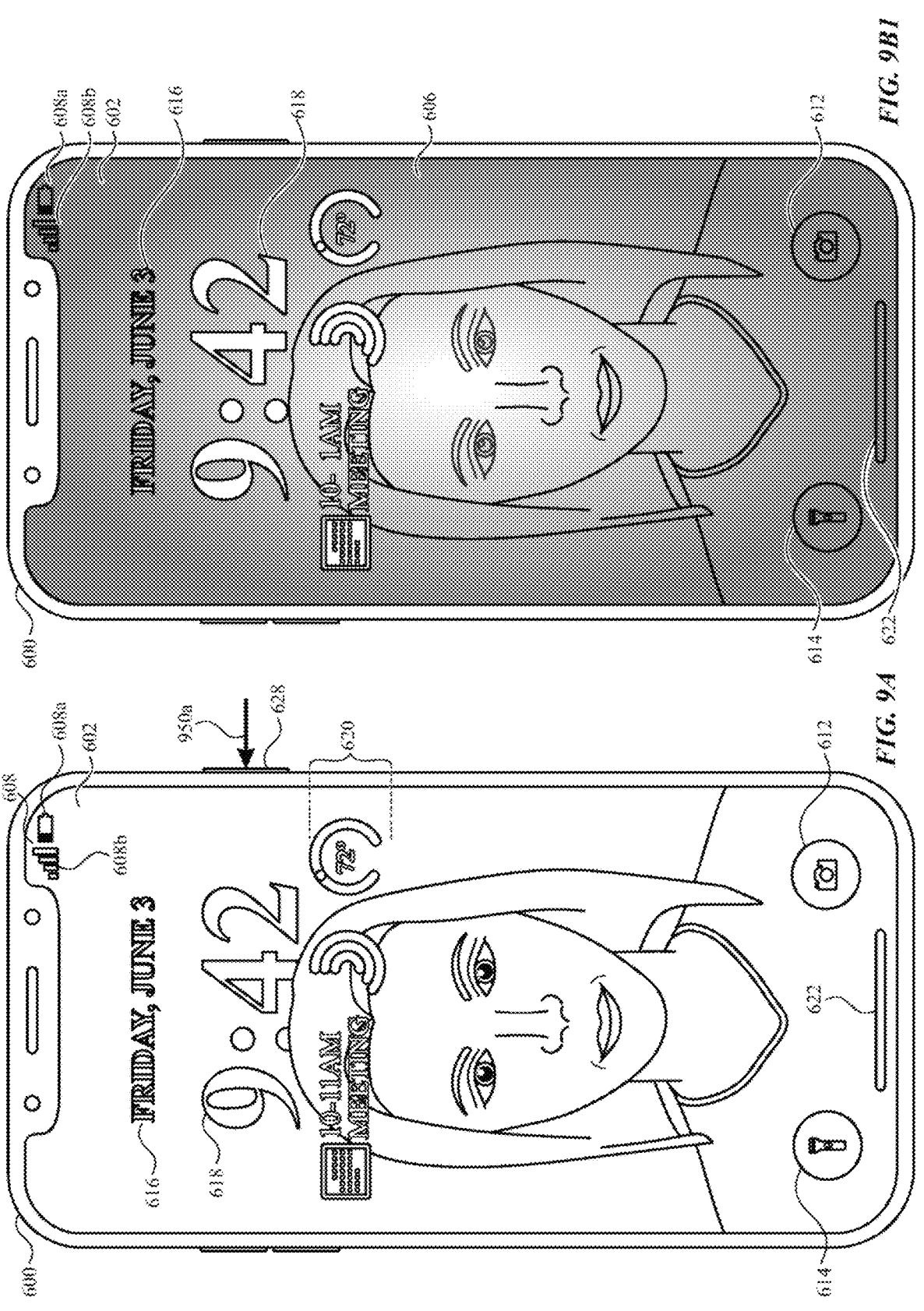
FIGS. 9A-9V illustrate exemplary user interfaces for transitioning between display states of a display.

Below, FIGS. 1A-1B, 2, 3, 4A-4B, and 5A-5B provide a description of exemplary devices for performing the techniques for managing event notifications. FIGS. 6A-6T illustrate exemplary user interfaces for changing the display state of a display in accordance with some embodiments. FIGS. 7A-7F illustrate exemplary user interfaces for controlling the display state of a display in accordance with some embodiments. FIG. 8 is a flow diagram illustrating methods of changing the display state of a display in accordance with some embodiments. The user interfaces in FIGS. 6A-6T and FIGS. 7A-7F are used to illustrate the processes described below, including the processes in FIG. 8. FIGS. 9A-9V illustrate exemplary user interfaces for transitioning between various display states of a display in accordance with some embodiments. FIG. 10 is a flow diagram illustrating methods of transitioning between various display states of a display in accordance with some embodiments. The user interfaces in FIGS. 9A-9V are used to illustrate the processes described below, including the processes in FIG. 10. FIGS. 11A-11O illustrate exemplary user interfaces for displaying notifications in accordance with some embodiments. FIG. 12 is a flow diagram illustrating methods of displaying notifications in accordance with some embodiments. The user interfaces in FIGS. 11A-11O are used to illustrate the processes described below, including the processes in FIG. 12

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
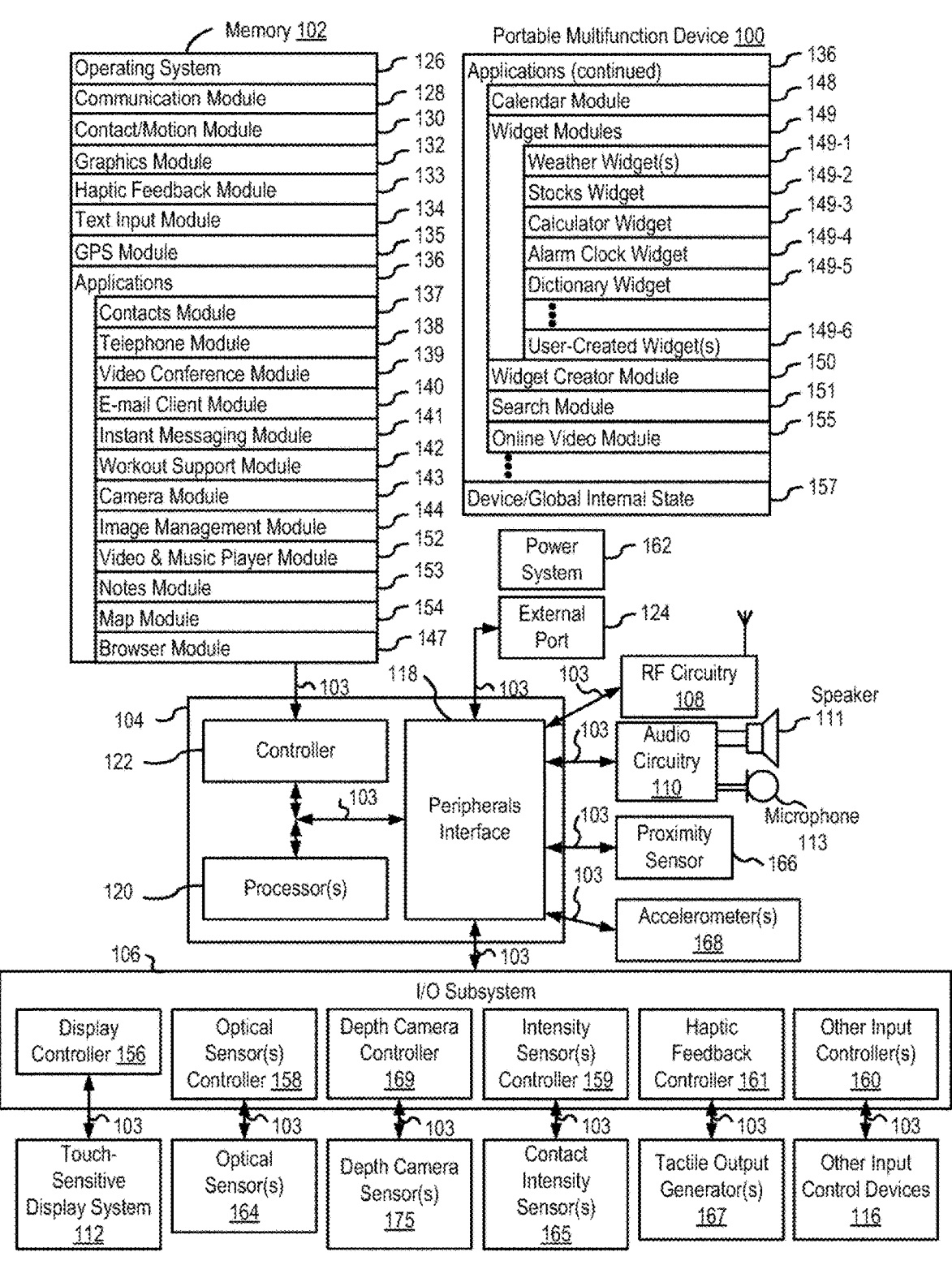
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
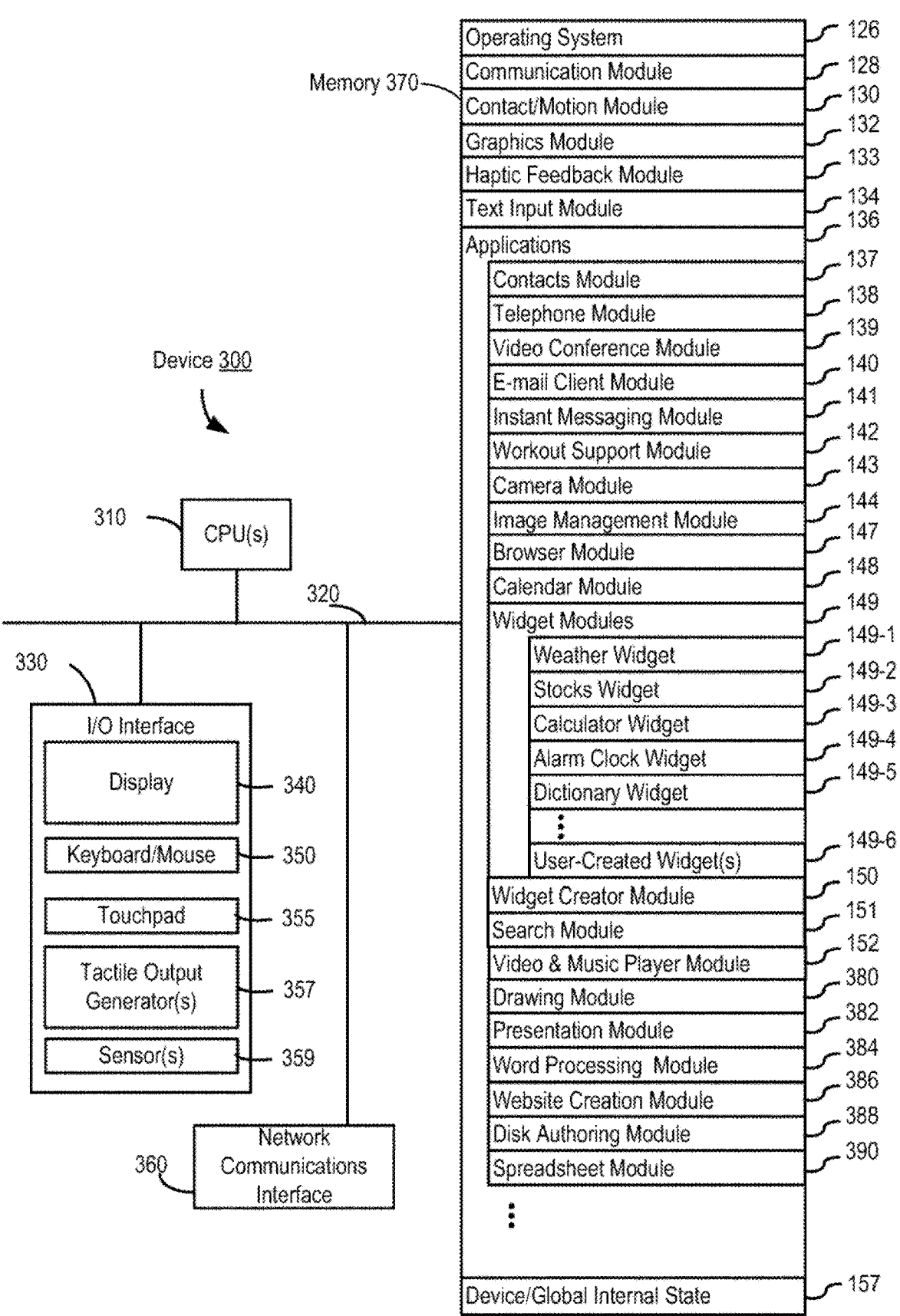
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module

147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
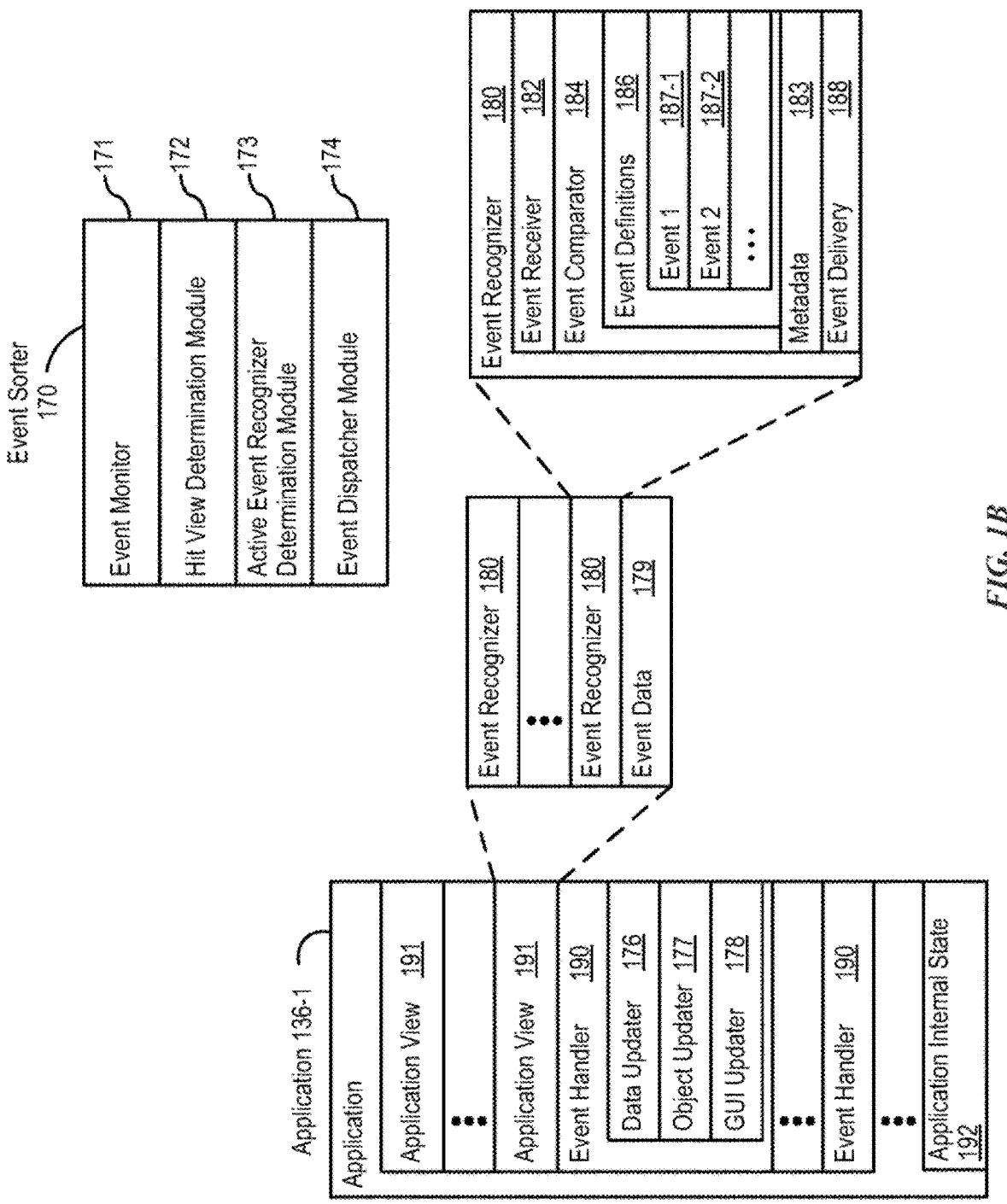
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
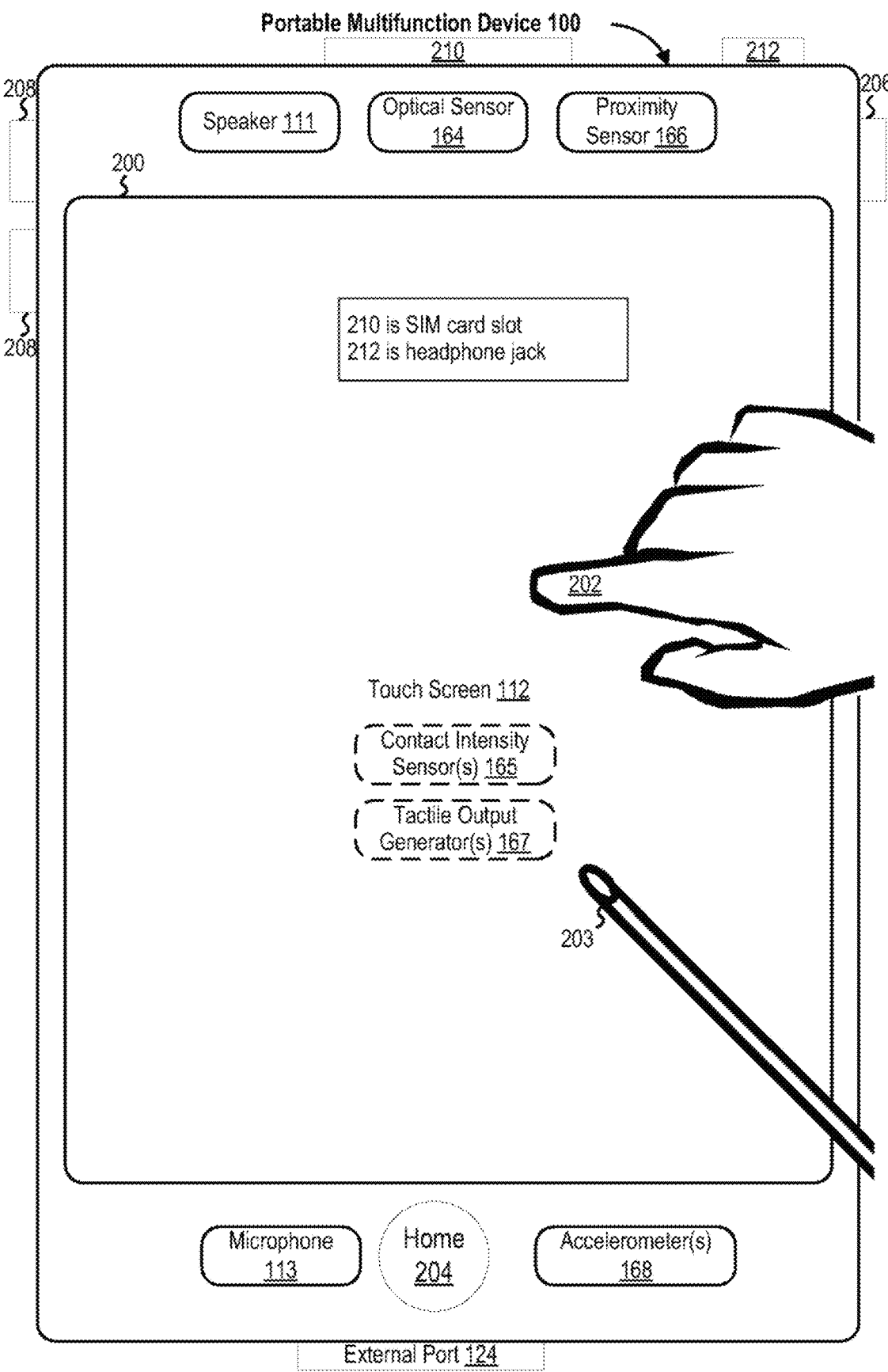
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the FIG.) or one or more styluses 203 (not drawn to scale in the FIG.). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
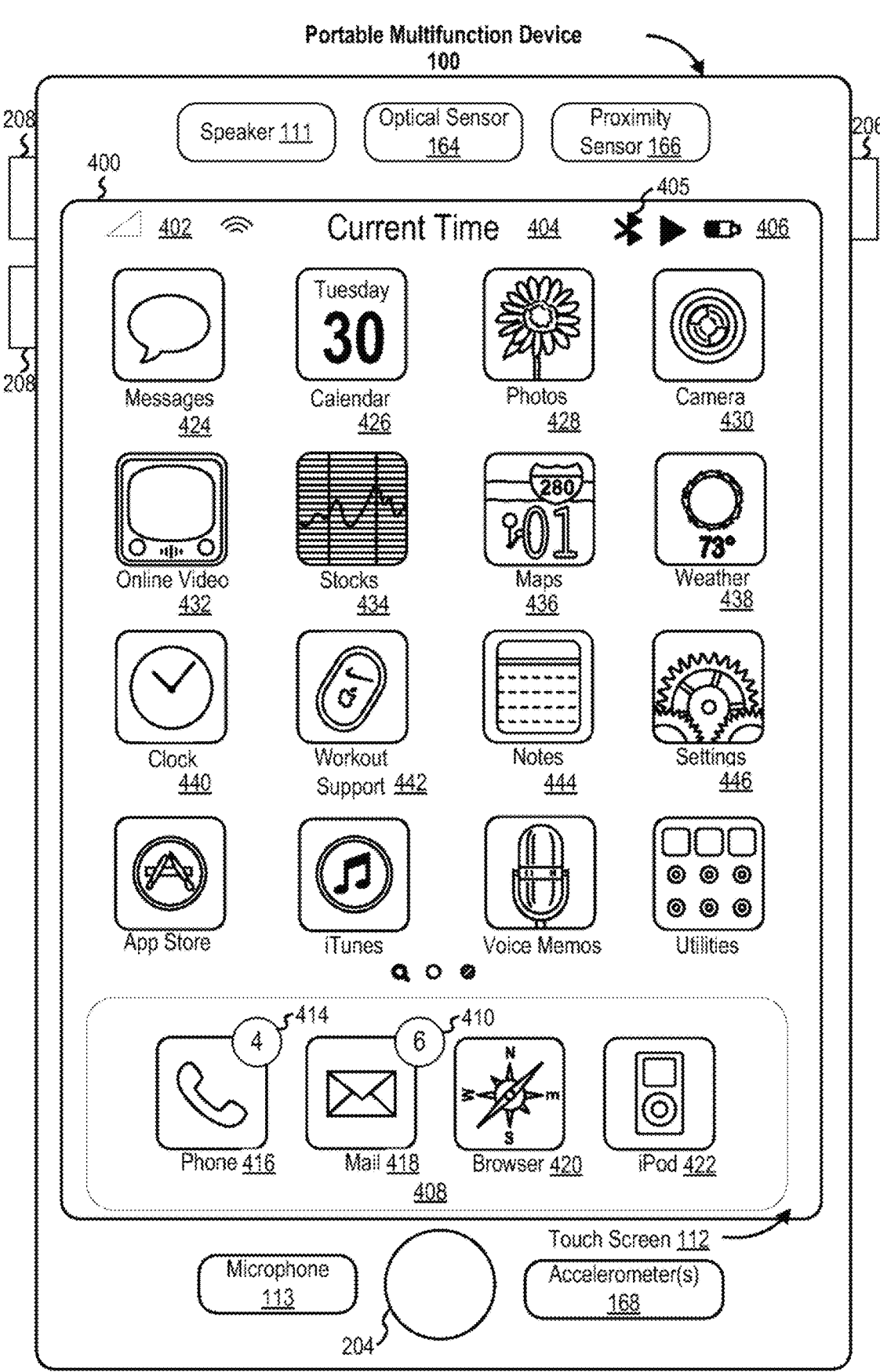
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
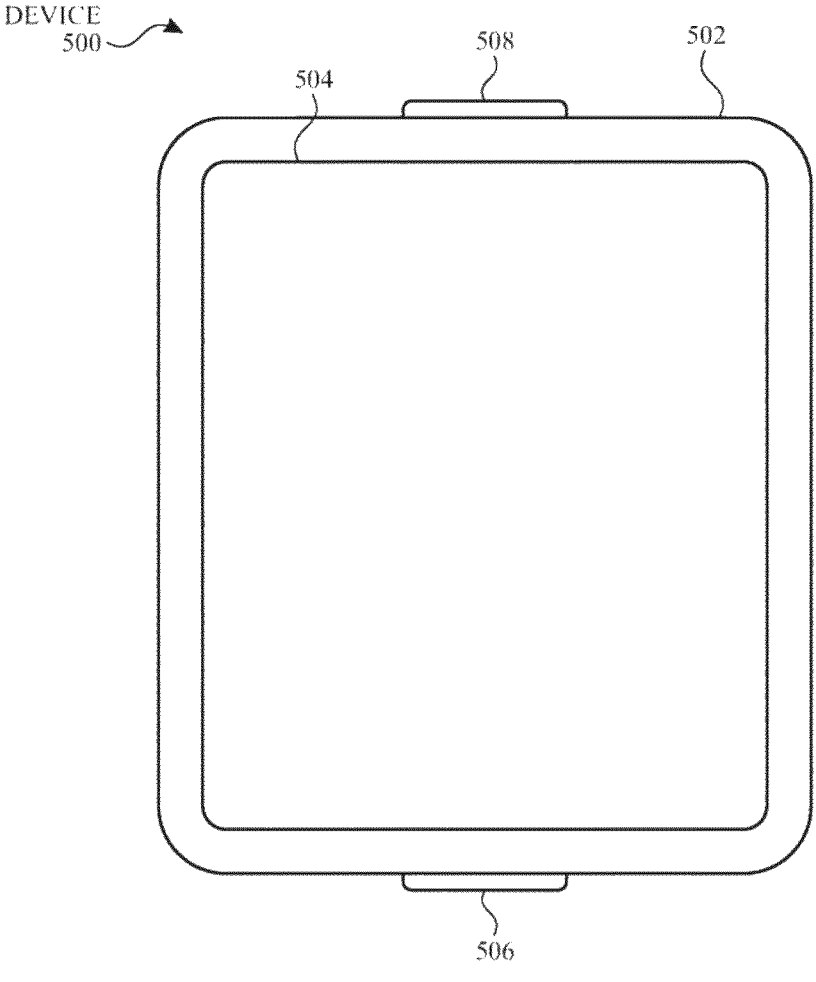
FIG. 5A illustrates a personal electronic device in accordance with some embodiments.
Figures 6A, 6B:
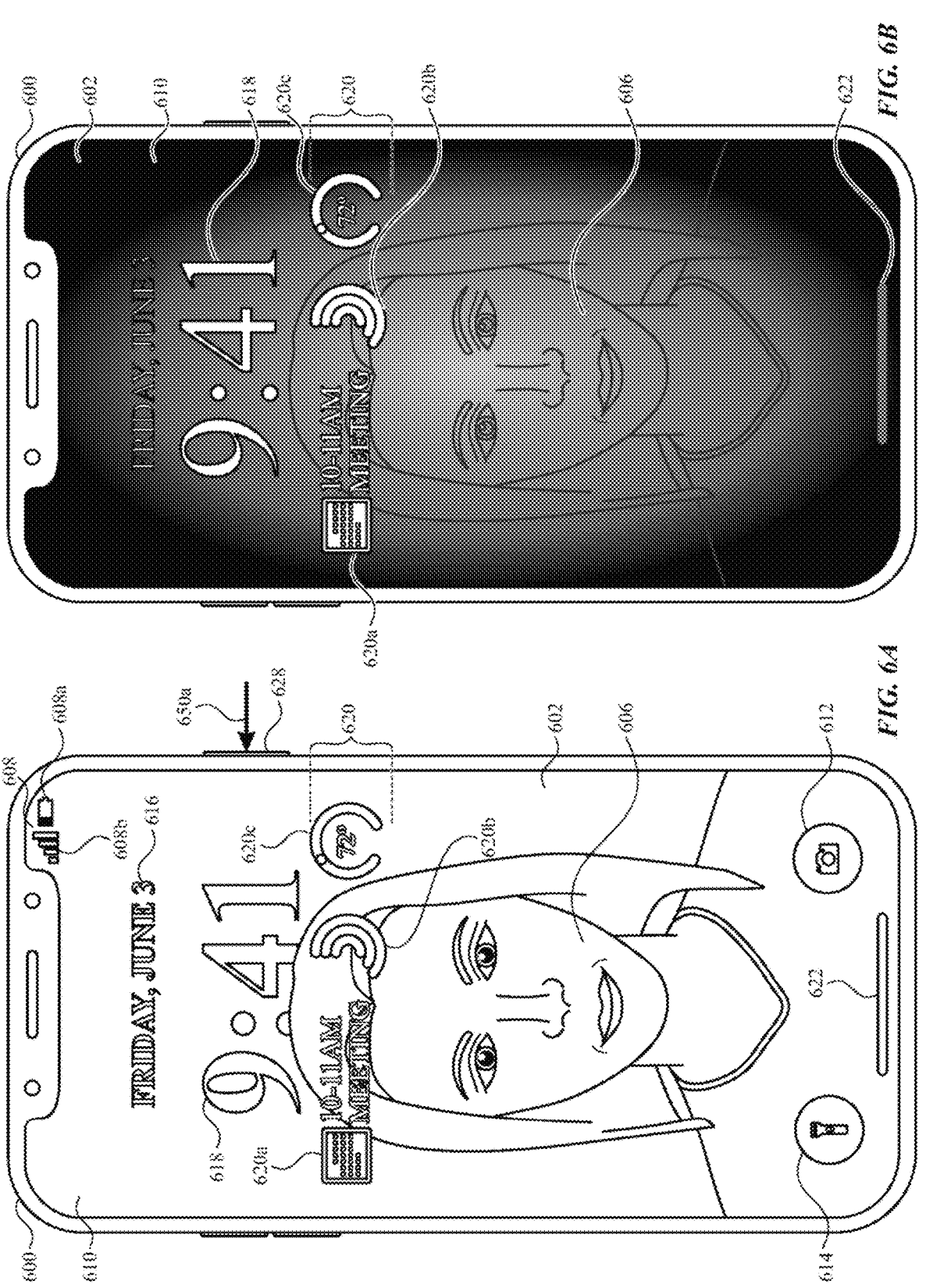
FIGS. 6A-6T illustrate exemplary user interfaces for changing the display state of a display.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
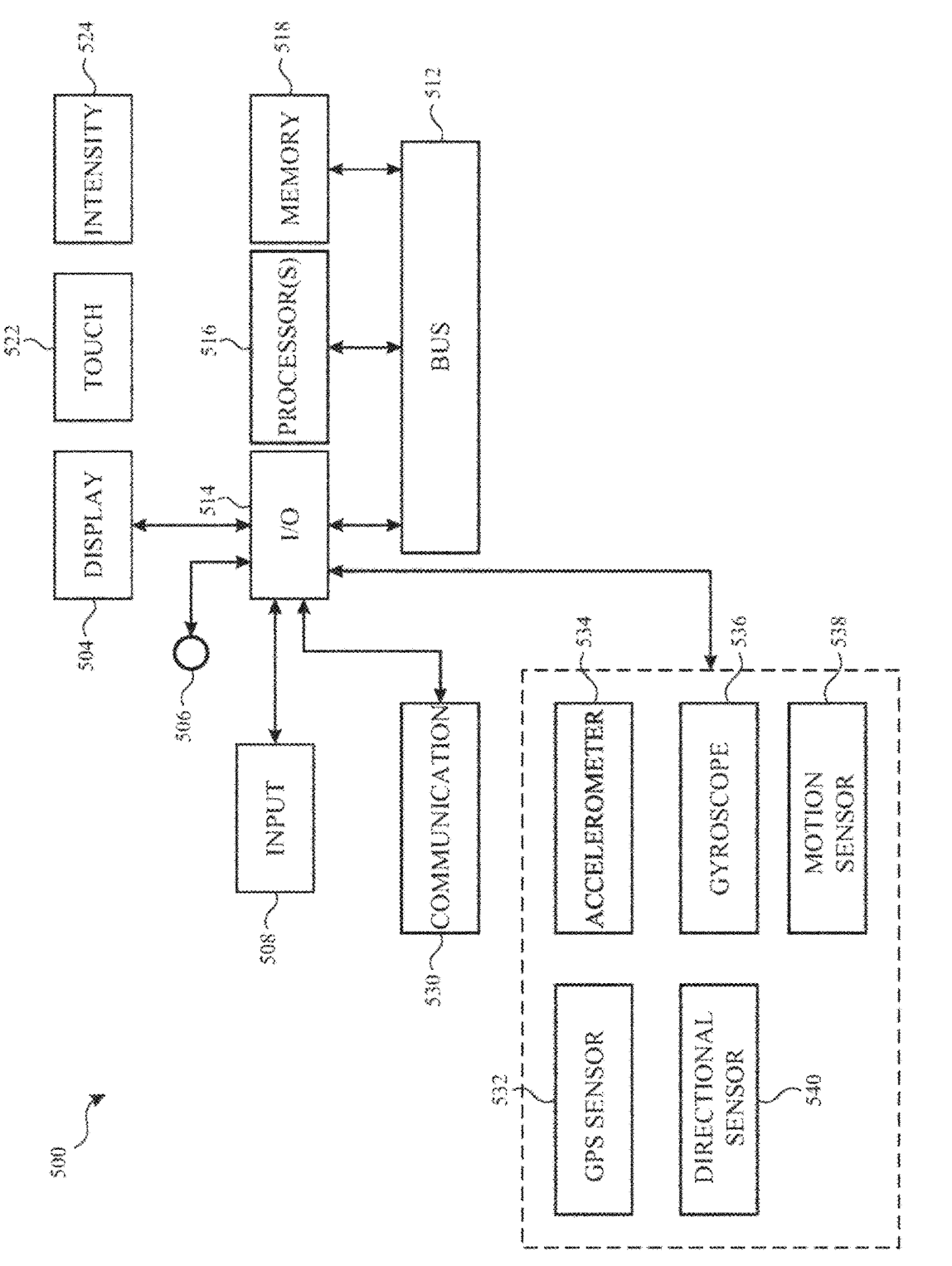
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800, 1000, and 1200 (FIGS. 8, 10, and 12). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UP") and associated processes that are implemented on an electronic device, such as portable multifunction device 100, device 300, or device 500.

FIGS. 6A-6T illustrate exemplary user interfaces for changing the display state of a display, in accordance with some embodiments. The user interfaces in these FIGS. are used to illustrate the processes described below, including the processes in FIG. 8.

At FIG. 6A, computer system 600 displays, via display 610 (e.g., a touch screen display), wake screen user interface 602 while computer system 600 is in a normal power state (e.g., a normal power consumption mode (e.g., a mode that corresponds to higher power consumption than a lower power state) (e.g., a mode that corresponds to a brighter display, increased performance, and/or more frequent display updates)). Computer system 600 displays wake screen user interface 602 with a light appearance (e.g., as shown in FIG. 6A) when computer system 600 is in normal power state. Wake screen user interface 602 includes a number of user interface elements including date indicator 616 and time indicator 618. Date indicator 616 indicates the current date while time indicator 618 indicates the current time. Wake screen user interface 602 also includes flashlight affordance 614 and camera affordance 612. Computer systems 600 turns on a flashlight (e.g., a flashlight that is coupled to the backside of computer system 600) in response to detecting a selection (e.g., a tap input) of flashlight affordance 614. Further, computer system 600 launches a camera application (e.g., a camera application that is installed on computer system 600) in response to detecting a selection (e.g., a tap input) of camera affordance 612.

As illustrated in FIG. 6A, wake screen user interface 602 includes home affordance 622. Computer system 600 displays a home user interface in response to detecting a swipe gesture (e.g., an upward swipe gesture) on home affordance 622. As illustrated in FIG. 6A, computer system 600 includes hardware control 628. Computer system 600 transitions from one respective state (e.g., a low power state, a display off state, a normal power state, and/or a power off state) to a different respective state in response to detecting the activation of hardware control 628.

Additionally, as illustrated in FIG. 6A, wake screen user interface 602 includes status bar 608. Status bar 608 includes battery indicator 608a which depicts an indication of the battery power of computer system 600. Further, status bar 608 includes cellular signal indicator 608b which indicates the strength of a cellular signal of computer system 600. Furthermore, as illustrated in FIG. 6A, wake screen user interface 602 includes row of complications 620. Row of complications 620 includes calendar complication 620a, fitness complication 620b, and weather complication 620c. Calendar complication 620a includes an indication of an upcoming event (e.g., meetings and/or appointments) that is on the calendar of the user of computer system 600. Fitness complication 620b includes an indication of various fitness metrics (e.g., calories burned, number of times a user has stood during the day, cumulative exercise time, and/or an amount of movement of the user) for the user for a particular day. Weather complication 620c indicates the current weather conditions (e.g., the current temperature) at the physical location of computer system 600.

At FIG. 6A, wake screen user interface 602 includes wallpaper 606. Wallpaper 606 includes a visual element (e.g., a depiction of an individual). At FIG. 6A, computer system 600 displays the visual element of wallpaper 606 in the foreground of wake screen user interface 602 and computer system 600 displays time indicator 618 in the background of wake screen user interface 602. At FIG. 6A, a portion of the visual element of wallpaper 606 (e.g., the top of the individual's head) overlaps (e.g., occludes) a portion of time indicator 618. In some embodiments, wallpaper 606 is preselected (e.g., preselected by the manufacturer for computer system 600). In some embodiments, wallpaper 606 is selected by the user of computer system 600. In some embodiments, wake screen user interface 602 does not have different portions that are displayed with a simulated depth effect (e.g., wake screen user interface 602 does not have an image with a foreground portion that is displayed in front of some elements that are displayed in front of a background portion of the image). In some embodiments, wake screen user interface 602 includes additional user interface elements (e.g., more than the user interface elements illustrated in FIG. 6A). In some embodiments, wake screen user interface 602 includes less than all of the user interface elements that are shown in FIG. 6A. At FIG. 6A, while computer system 600 is in the normal power state, computer system 600 detects activation 650a of hardware control 628.

At FIG. 6B, in response to detecting activation 650a of hardware control 628, computer system 600 transitions from the normal power state (e.g., as shown at FIG. 6A) to a low power state and displays wake screen user interface 602 with a dark appearance (e.g., computer system 600 reduces the overall brightness of wake screen user interface 602). Computer system 600 applies a number of visual treatments to wake screen user interface 602 as a part of transitioning from the normal power state to the low power state (e.g., as described in greater detail below in reference to FIGS. 9A-9C). For example, computer system 600 non-uniformly reduces the brightness of wake screen user interface 602. Computer system 600 reduces the brightness of both the foreground portion of wake screen user interface 602 and the background portion of wake screen user interface 602. However, computer system 600 reduces the brightness of background portion of wake screen user interface 602 by a greater amount than the reduction of the brightness of the foreground portion of wake screen user interface 602. The amount of contrast between the foreground portion of wake screen user interface 602 and the background portion of wake screen user interface 602 increases because the brightness of the background portion of wake screen user interface 602 is decreased more than the brightness of the foreground portion of wake screen user interface 602. In some embodiments, computer system 600 transitions from the normal power state to the low power state in accordance with a determination that a set of one or more criteria are satisfied (e.g., and not in response to the detection of an input).

In one embodiment, computer system 600 reduces the brightness of wake screen user interface 602 by applying a vignette effect to wake screen user interface 602 and by desaturating wake screen user interface 602. Further, computer system 600 reduces the brightness of wake screen user interface 602 by reducing the luminance of display 610. The display of wake screen user interface 602 has an overall lower brightness when computer system 600 is in the low power state in comparison to the display of wake screen user interface 602 when computer system 600 is in the normal power state. In some embodiments, the reduction of the brightness of wake screen user interface 602 has a correlation to the ambient brightness of the physical environment of computer system 600 (e.g., the dimmer the physical environment the more the brightness of wake screen user interface 602 is decreased.) In some embodiments, computer system non-uniformly reduces the saturation of wake screen user interface 602.

Further, as part of transitioning from the normal power state to the low power state, computer system 600 changes the visual appearance of date indicator 616 and time indicator 618. Specifically, at FIG. 6B, computer system 600 displays date indicator 616 and time indicator 618 with a narrower font in comparison to the font of date indicator 616 and time indicator 618 at FIG. 6A. In some embodiments, computer system 600 visually obscures (e.g., blurs and/or dims) the visual appearance of one or more user interface objects (e.g., date indicator 616 and/or time indicator 618) as a part of computer system 600 transitioning from the normal power state to the low power state. In some embodiments, computer system 600 reduces the brightness of date indicator 616 and/or time indicator 618 as a part of transitioning from the normal power state to the low power state. In some embodiments, computer system 600 reduces the size of date indicator 616 and/or time indicator 618 as part of transitioning from the normal power state to the low power state.

At FIG. 6B, the visual content of wallpaper 606 does not overlap with time indicator 618. As a part of transitioning from the normal power state to the low power state, computer system 600 shifts the display location of the visual content of wallpaper 606 such that the visual content of wallpaper 606 does not overlap with time indicator 618. At FIG. 6B, computer system 600 does not display flashlight affordance 614, camera affordance 612, display battery indicator 608a, and cellular signal indicator 608b. Computer system 600 ceases the display of flashlight affordance 614, camera affordance 612, battery indicator 608a, and cellular signal indicator 608b as a part of transitioning from the normal power state to the low power state. In some embodiments, as a part of transitioning from the normal power state to the low power state, computer system 600 shifts the display of time indicator 618 such that the visual content of wallpaper 606 does not overlap with time indicator 618. In some embodiments, computer system 600 reduces the brightness of flashlight affordance 614, camera affordance 612, display battery indicator 608a, and cellular signal indicator 608b as a part of transitioning from the normal power state to the low power state. In some embodiments, computer system 600 reduces the size of the display of the visual content that is included in wallpaper 606 as part of transitioning from the normal power state to the low power state.

Figures 6C, 6D:
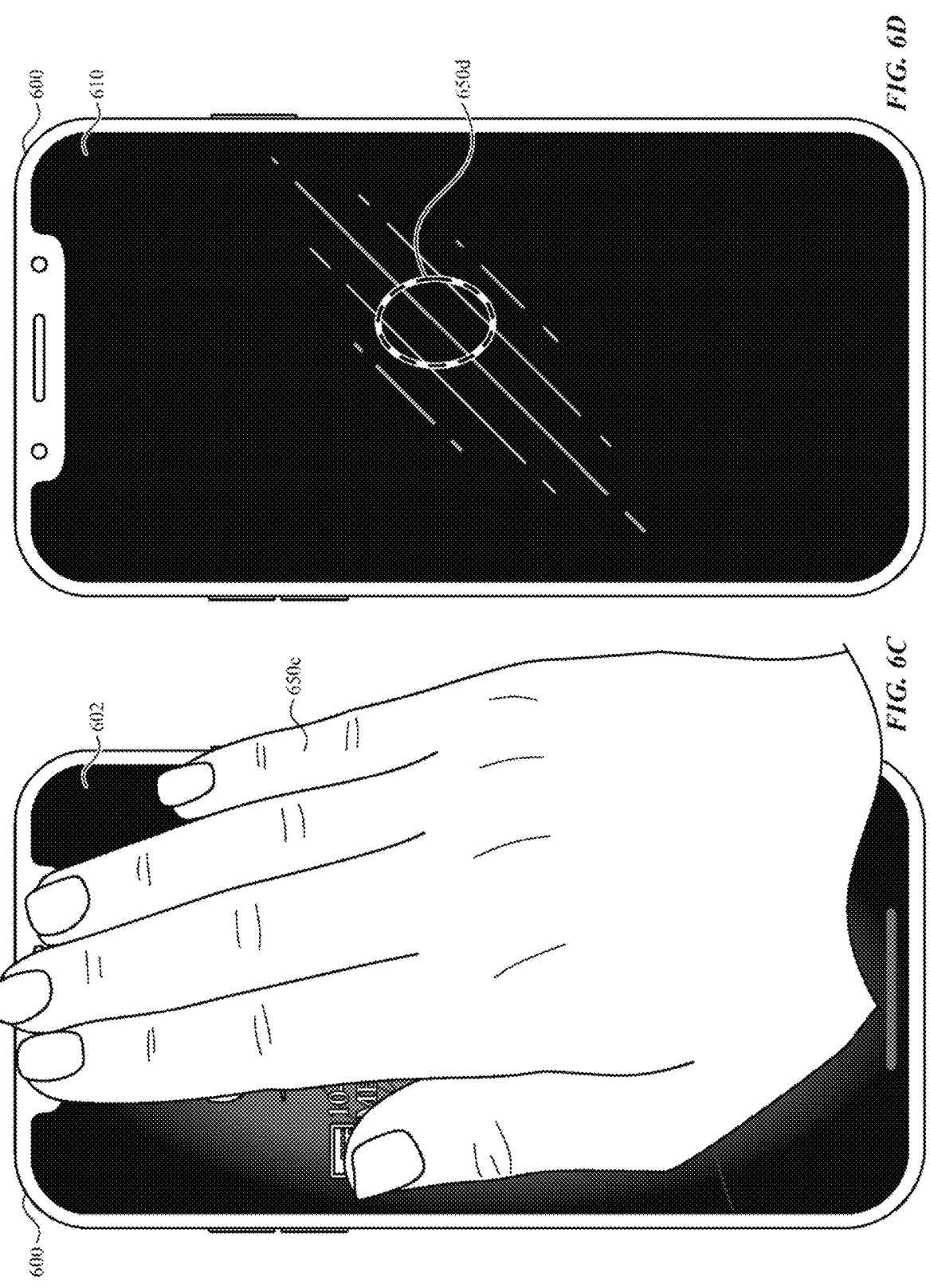
Figure 6F:
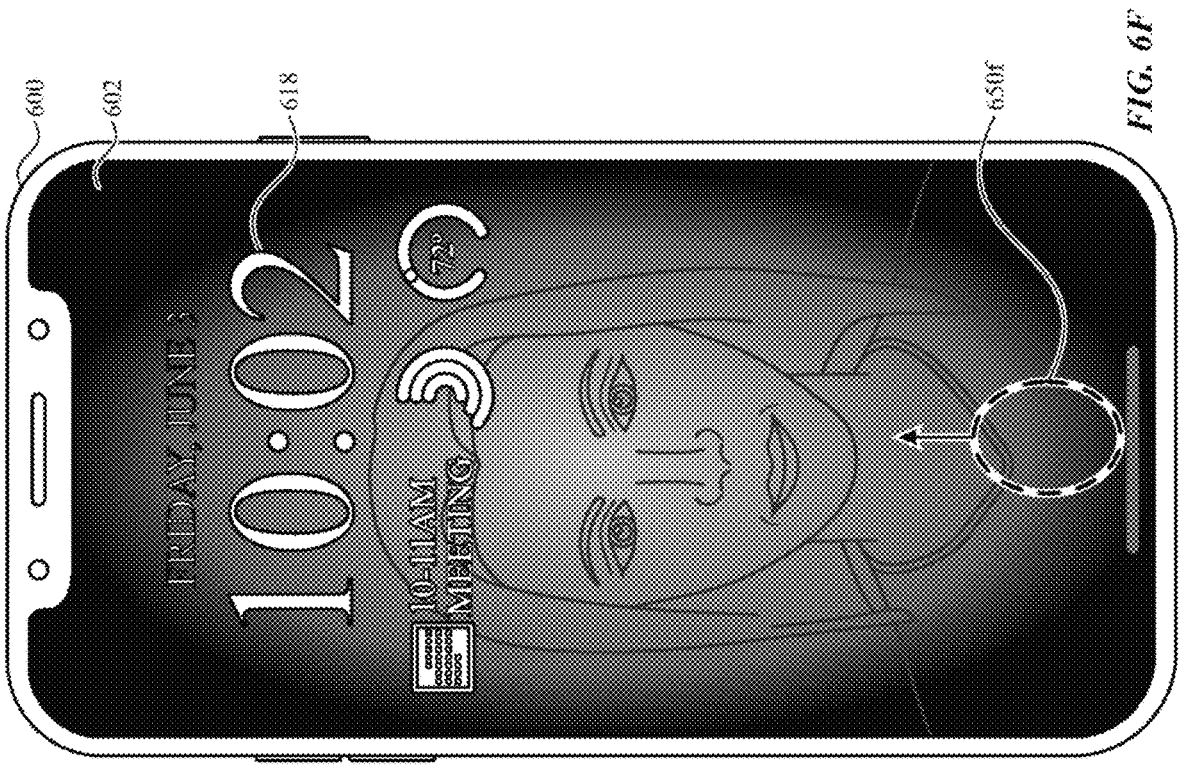

At FIG. 6C, computer system 600 is in the low power state and displays wake screen user interface 602 with the dark appearance. At FIG. 6C, while computer system 600 is in the low power state, computer system 600 detects hand cover gesture 650c (e.g., hand cover gesture 650c covers one or more sensors of computer system 600). In some embodiments, computer system 600 detects hand cover gesture 650c for an amount of time (e.g., 1 second, 3 seconds, 5 seconds, 10 seconds, or 15 seconds) that is greater than a time threshold.

At FIG. 6D, in response to detecting the hand cover gesture 650c, computer system 600 transitions from the low power state to a display off state. Computer system 600 does not illuminate display 610 while computer system 600 is in the display off state. That is, computer system 600 ceases to display all the user interface elements in response to computer system 600 transitioning from the low power state to the display off state. In some embodiments, computer system 600 can only transition to the display off state from the low power state. In some embodiments, computer system 600 displays one or more user interface elements as fading out (e.g., fading out at the same time) as part of transitioning from the low power state to the display off state. In some embodiments, computer system 600 transitions from the low power state to the display off state in response to detecting an activation of one or more hardware controls (e.g., power hardware control 628) that are coupled to computer system 600. At FIG. 6D, computer system 600 detects tap input 650*d* while computer system 600 is in the display off state.

Figure 6E:
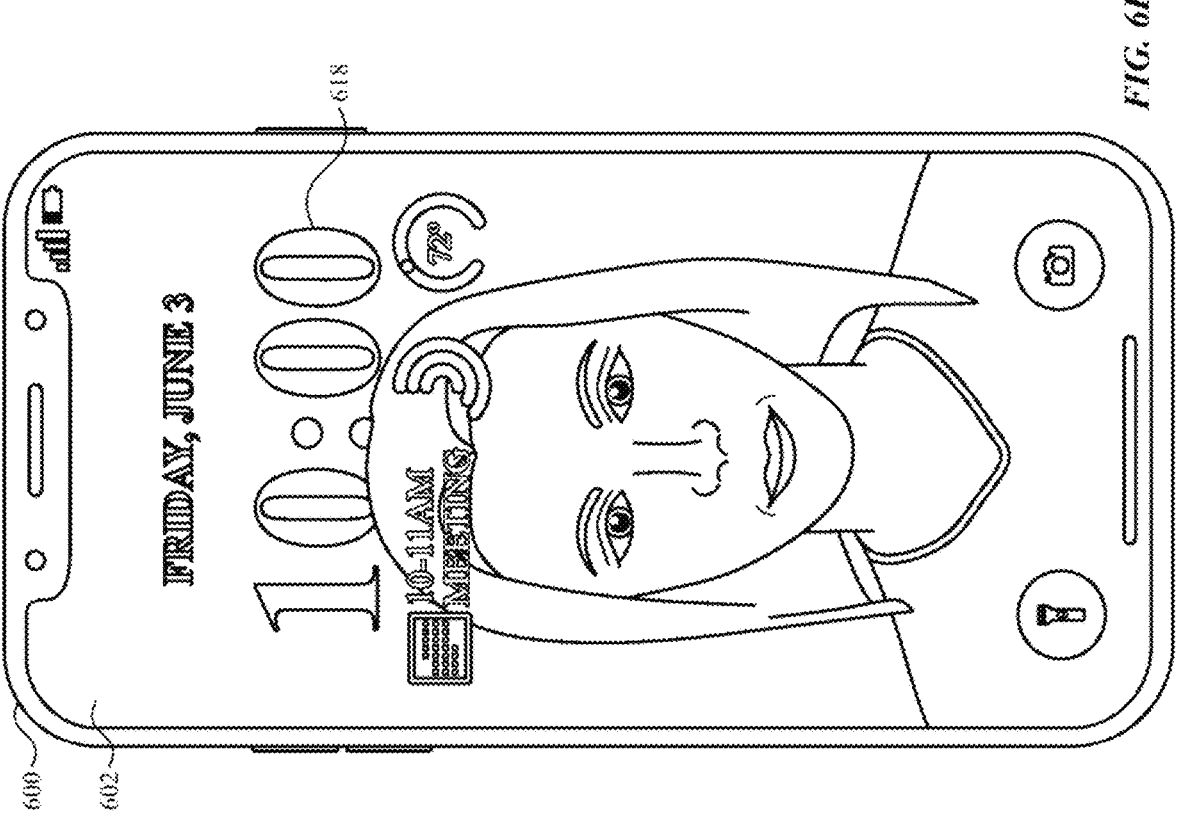

At FIG. 6E, in response to detecting tap input 650*d*, computer system 600 transitions from the display off state to the normal power state and displays wake screen user interface 602 with the light appearance (e.g., computer system 600 "wakes up" in response to detecting a tap input while computer system is in the display off state). As illustrated in FIG. 6E, time indicator 618 indicates that the current time is "10:00". In some embodiments, computer system 600 transitions from the display off state to the normal power state in response to detecting a swipe input (e.g., a horizontal swipe, a vertical swipe, a diagonal swipe, and/or a multi-directional swipe). In some embodiments, computer system 600 transitions from the display off state to the normal power state in response to detecting an activation of a hardware control button (e.g., power hardware control 628). In some embodiments, computer system 600 transitions from the display off state to the normal power state in response to detecting a raise to wake gesture (e.g., a user has raised computer system 600) (e.g., computer system 600 detects a change in the vertical positioning and/or angle of computer system 600 at a speed that is above a predetermined threshold) (e.g., computer system 600 detects a change in the orientation of computer system 600 (e.g., the display 610 of computer system 600 is rotated from a face down orientation to a faceup orientation and/or is tilted from being in a flat orientation relative to the earth's gravitational pull to being at least partially upright (e.g., tilted toward a user by at least a threshold amount such as 15, 30, 45, 50, 60, 70, 80, or 90 degrees relative to the flat orientation))).

As illustrated in FIG. 6F, time indicator 618 indicates that the current time is "10:02". Two minutes have elapsed between FIG. 6G and FIG. 6F. At FIG. 6F, a determination is made that computer system 600 has remained inactive (e.g., computer system 600 does not detect any user inputs (e.g., taps, swipe gestures, and/or activation of hardware control buttons) for two minutes (e.g., the length of time between FIG. 6G and FIG. 6F). Because, a determination is made that computer system 600 has remained inactive for two minutes, computer system 600 transitions from the normal power state to the low power state. Computer system 600 transitions from the normal power state to the low power state based on computer system 600 "timing out" (e.g., computer system 600 does not detect any user interaction for a predetermined amount of time (e.g., 10 seconds, 15 seconds, 30 seconds, 1 minute, 2 minutes, 3 minutes, or 5 minutes). In some embodiments, computer system 600 transitions from the low power state to the display off state in response to computer system 600 being inactive for the predetermined amount of time. In some embodiments, computer system 600 transitions from the normal power state to the low power state in accordance with a determination that a set of one or more criteria are satisfied (e.g., and not in response to the detection of an input). At FIG. 6F, computer system 600 detects swipe input 650*f* while computer system 600 is in the low power state.

Figures 6G, 6H:
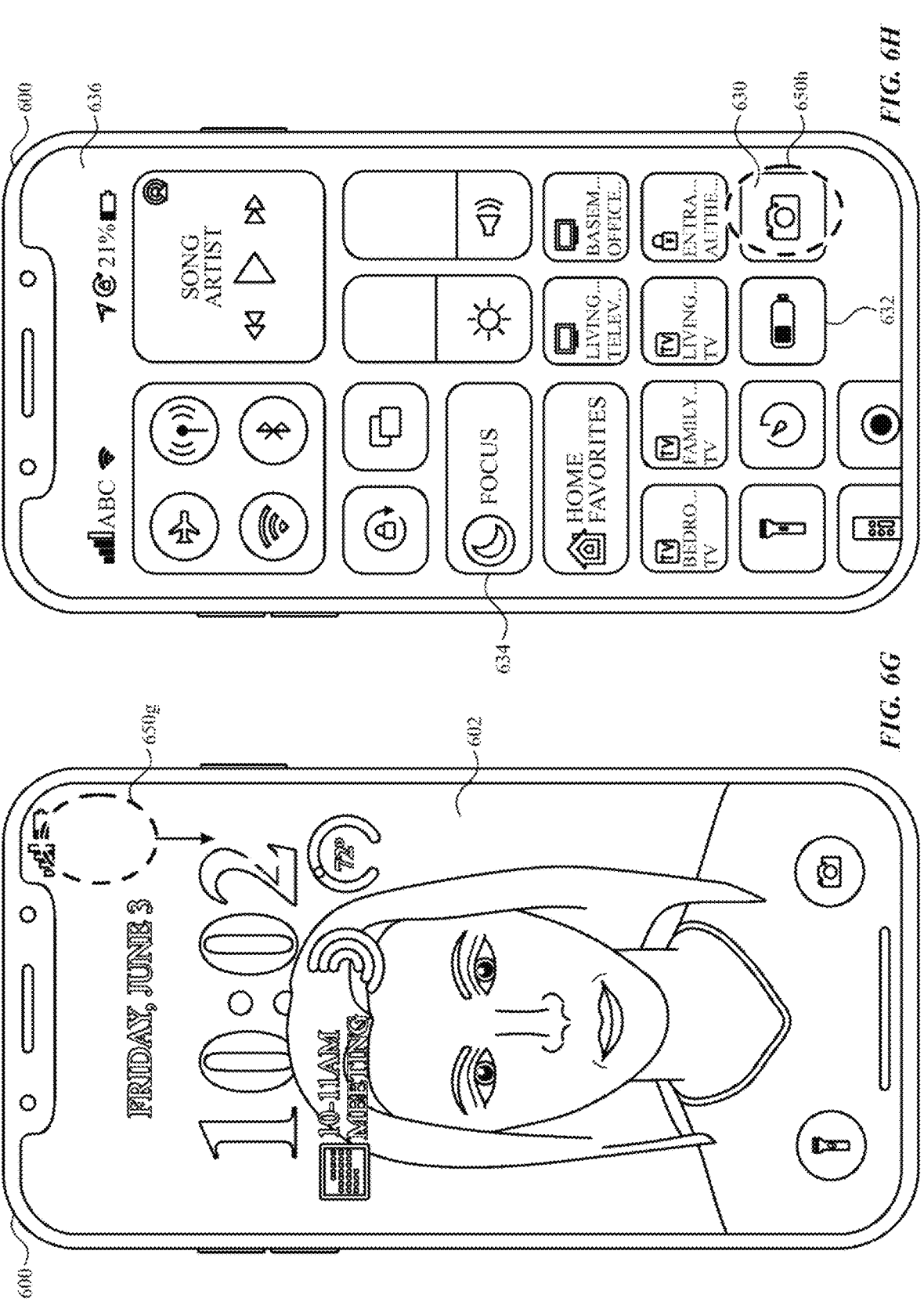

At FIG. 6G, in response to detecting swipe input 650*f*, computer system 600 transitions from the low power state to the normal power state and displays wake screen user interface 602 with the light appearance. In some embodiments, computer system 600 transitions from the low power state to the normal power state in response to detecting a tap input (e.g., a short tap (e.g., a tap and release) or a long tap (e.g., a tap and hold)). In some embodiments, computer system 600 transitions from the lower power state to the normal power state in response to detecting an activation of one or more hardware controls that are coupled to computer system 600. At FIG. 6G, computer system 600 detects swipe input 650*g* while computer system is in the normal power state. In some embodiments, swipe gesture 650*g* is a swipe gesture in the horizontal direction. In some embodiments, swipe gesture 650*g* is swipe gesture in the diagonal direction. In some embodiments, swipe gesture 650*g* is a multi-directional swipe gesture.

As illustrated in FIG. 6H, in response to detecting swipe input 650*g*, computer system 600 displays control center user interface 636. Control center user interface 636 includes a number of selectable affordances that control (e.g., set or modify) one or more settings on computer system 600 (e.g., one or more Wi-Fi settings, Bluetooth settings, display settings (e.g., brightness controls), and/or sound settings) or one or more accessory devices that are in communication with the computer system 600. As illustrated in FIG. 6H, control center user interface 636 includes, at least, camera application affordance 630, do not disturb affordance 634, and battery preservation affordance 632. In some embodiments, control center user interface 636 includes a subset of the affordances that are shown in FIG. 6H. In some embodiments, control center user interface 636 includes additional affordances that are not shown at FIG. 6H. At FIG. 6H, computer system 600 detects tap input 650*h* that corresponds to selection of camera application affordance 630.

At FIG. 6I, in response to detecting tap input 650*h*, computer system 600 displays camera application user interface 638. Camera application user interface 638 corresponds to a camera application (e.g., an application that provides a user with the ability to capture still photos and/or videos) that is installed on computer system 600. At FIG. 6I, computer system 600 is in the normal power state. In some embodiments, computer system 600 does not transition power states in response to detecting tap input 650*h*). At FIG. 6I, computer system 600 detects hand cover gesture 650*i* over one or more sensors of computer system 600.

At FIG. 6J, in response to detecting hand cover gesture 650*i*, computer system 600 transitions from the normal power state to the low power state and displays wake screen user interface 602 with the dark appearance (e.g., and ceases to display camera application user interface 638). As described in greater detail below in reference to FIGS. 9H-9K, when computer system 600 is displaying a respective user interface that is different than wake screen user interface 602 when computer system 600 detects a request to transition power states, computer system 600 replaces the display of the respective user interface with wake screen user interface 602 as a part of transitioning from the normal power state to the low power state. In some embodiments, computer system 600 replaces the display of the respective user interface with wake screen user interface 602 in response to detecting an activation of a hardware control button (e.g., power hardware control 628). In some embodiments, computer system 600 transitions from the normal power state to the display off state (e.g., as shown in FIG. 6D) in response to detecting hand cover gesture 650*i* while the respective user interface is displayed. In some embodiments, computer system 600 transitions from the normal power state to the low power state in accordance with a determination that a set of one or more criteria are satisfied (e.g., and not in response to the detection of an input). At FIG. 6J, computer system 600 detects hand cover gesture 650*j* while computer system 600 is in the low power state.

Figures 6K, 6L:
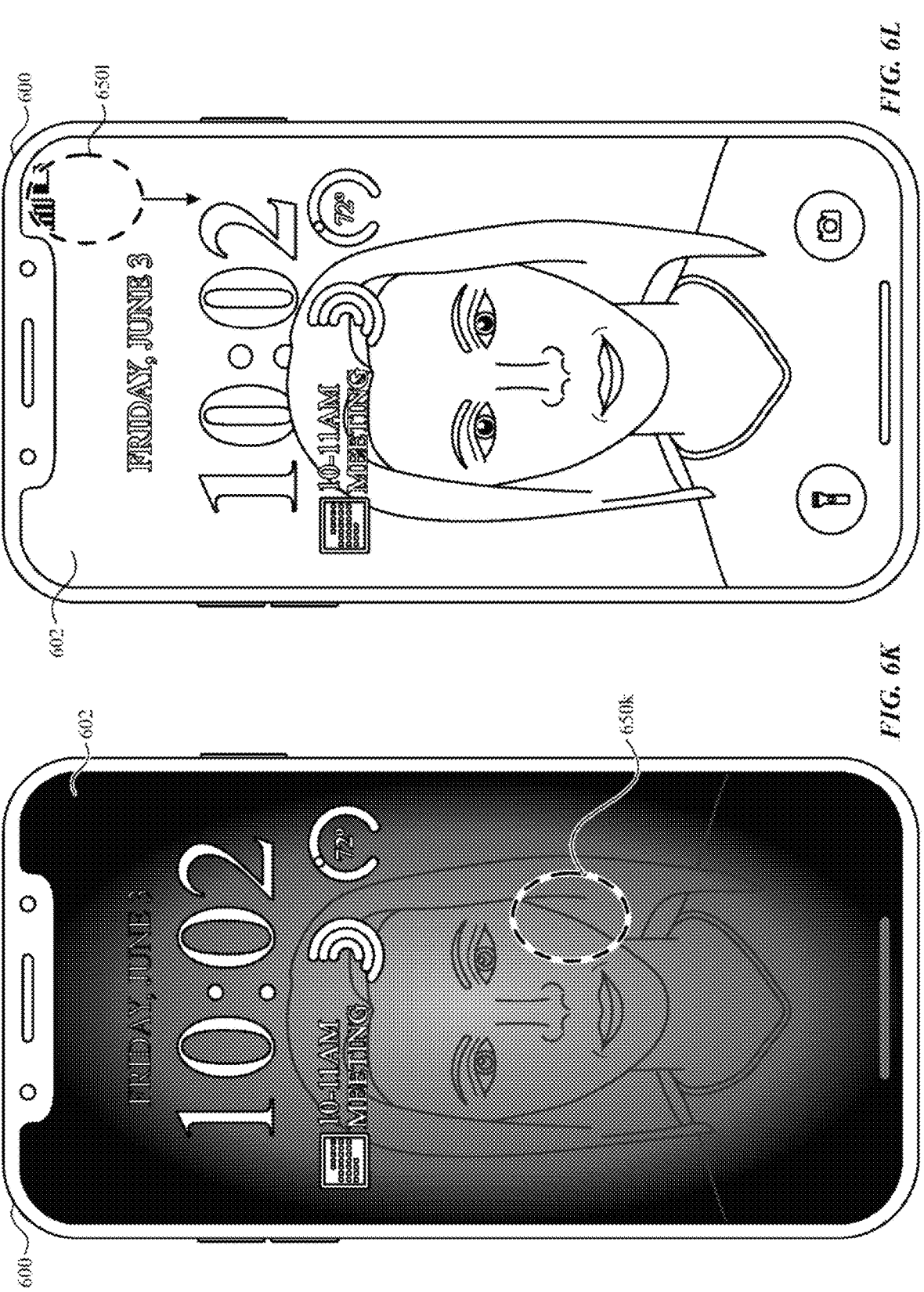

At FIG. 6K, a determination is made that computer system 600 detected a respective input (e.g., tap input 650*h* at FIG. 6H) within a threshold amount of time of detecting hand cover gesture 650*j*. As illustrated in FIG. 6K, because a determination is made that computer system 600 detected the respective input within the threshold amount of time of detecting hand cover gesture 650*j*, computer system 600 suppresses the display off state (e.g., in response to detecting hand cover gesture 650*j*) and computer system 600 remains in the lower power state (e.g., and maintains the display of wake screen user interface 602). Computer system 600 suppresses the display off state if computer system 600 has detected a user interaction within a threshold amount of time (e.g., 15 seconds, 30 seconds, 45 seconds, or 1 minute) of detecting a respective input (e.g., tap input, swipe input, activation of a hardware control and/or hand cover gesture) that would otherwise cause computer system 600 to transition to the display off state. Computer system 600 detected hand cover gesture 650*j* within the threshold amount of tap of detecting tap input 650*h* at FIG. 6H. Accordingly, computer system 600 does not transition from the low power state to the display off state in response to detecting hand cover gesture 650*j*. At FIG. 6K, computer system 600 detects tap input 650*k* while computer system 600 is in the low power state.

At FIG. 6L, in response to detecting tap input 650*k*, computer system 600 transitions from the low power state to the normal operating state and displays wake screen user interface 602 with the light appearance. In some embodiments, computer system 600 transitions from the low power state to the normal power state in accordance with a determination that a set of one or more criteria are satisfied (e.g., and not in response to the detection of an input). At FIG. 6L, computer system 600 detects swipe gesture 650*l*. In some embodiments, swipe gesture 650*l* is a swipe gesture in the horizontal direction. In some embodiment, swipe gesture 650*l* is swipe gesture in the diagonal direction. In some embodiments, swipe gesture 650*l* is a multi-directional swipe gesture. In some embodiments, computer system 600 transitions from the low power state to the normal power state in response to detecting that a user has performed a raise to wake gesture (e.g., the user raises computer system 600). In some embodiments, computer system 600 transitions from the low power state to the normal power state in response to detecting an activation of a hardware control (power hardware control 628) that is coupled to computer system 600. In some embodiments, computer system 600 remains in the lower power state if computer system 600 detects a request (e.g., a tap input and/or a raise to wake gesture) to transition from the low power state to the normal power state within a threshold amount of time of detecting a hand cover gesture.

Figures 6M, 6N:
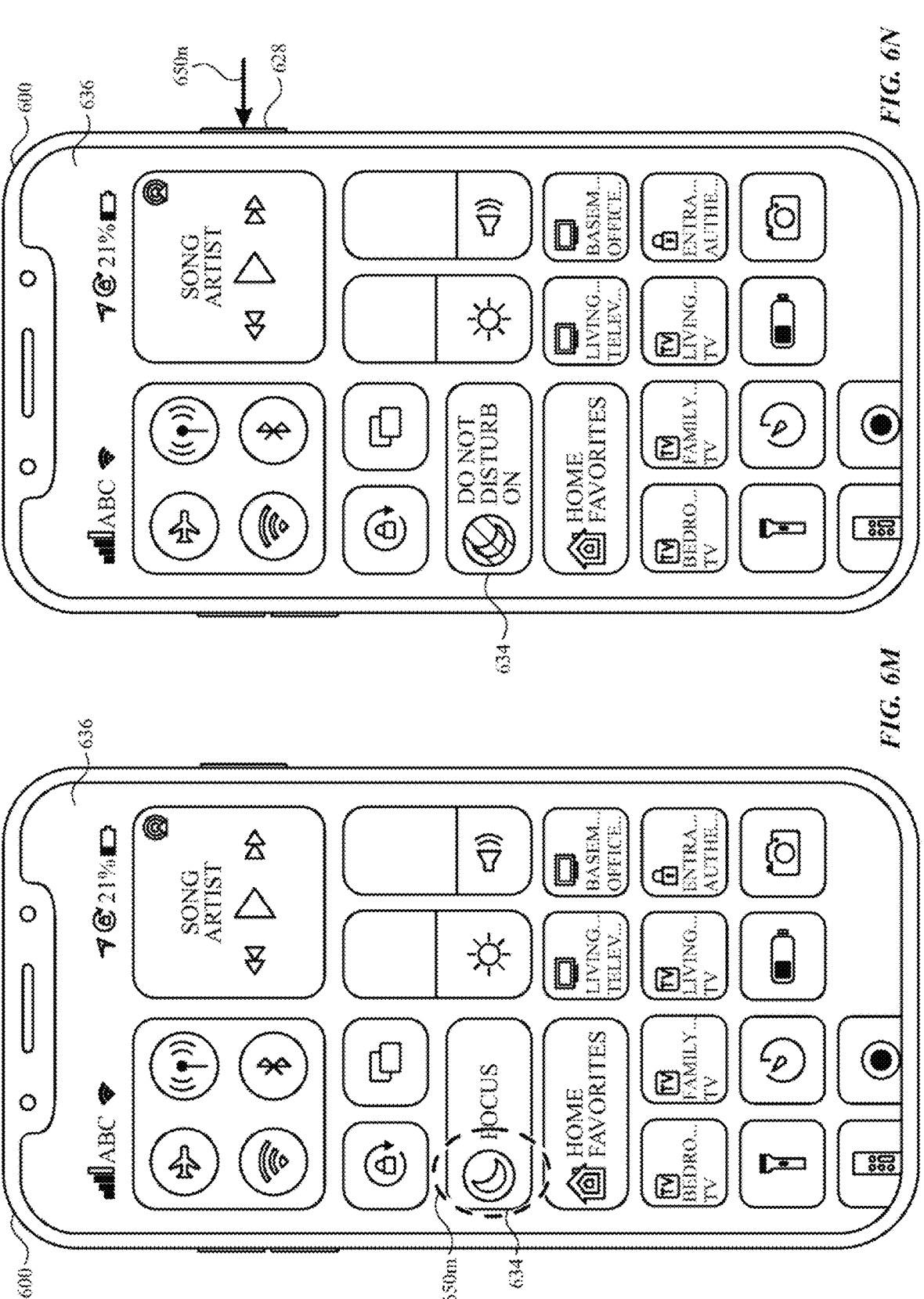

At FIG. 6M, in response to detecting swipe gesture 650*l*, computer system 600 displays control center user interface 636. At FIG. 6M, computer system 600 displays do-not-disturb affordance 634 at de-activated (e.g., computer system 600 displays do-not-disturb affordance 634 without bolding). As illustrated in FIG. 6M, computer system 600 displays the word "focus" within do-not-disturb affordance 634 while do-not-disturb affordance 634 is deactivated. At FIG. 6M, computer system 600 detects tap input 650*m* that corresponds to a selection of do-not-disturb affordance 634.

At FIG. 6N, in response to detecting tap input 650*m*, computer system 600 enters a do-not-disturb mode. Computer system 600 suppresses notifications, alerts, sounds, haptic outputs and/or any other distracting outputs while computer system 600 is in the do-not-disturb mode. As illustrated in FIG. 6N, computer system 600 displays do-not-disturb affordance 634 as activated (e.g., computer system 600 displays do-no-disturb affordance 634 with hatching and with bolding) while computer system 600 is in the do-not-disturb mode. Further, as illustrated in FIG. 6N, computer system 600 displays the phrase "do not disturb" within do-not-disturb affordance 634 while computer system 600 is in the do-not-disturb mode. In some embodiments, computer system 600 displays do-not-disturb affordance 634 as activated by inverting the colors of do-no-disturb affordance 634 (e.g., computer system 600 displays the black areas of do-not-disturb affordance 634 as white and the white areas of do-not-disturb affordance 643 as black). At FIG. 6N, computer system 600 detects activation 650*n* of hardware control 628 while computer system 600 is in the do-not-disturb mode.

Figures 6O, 6P:
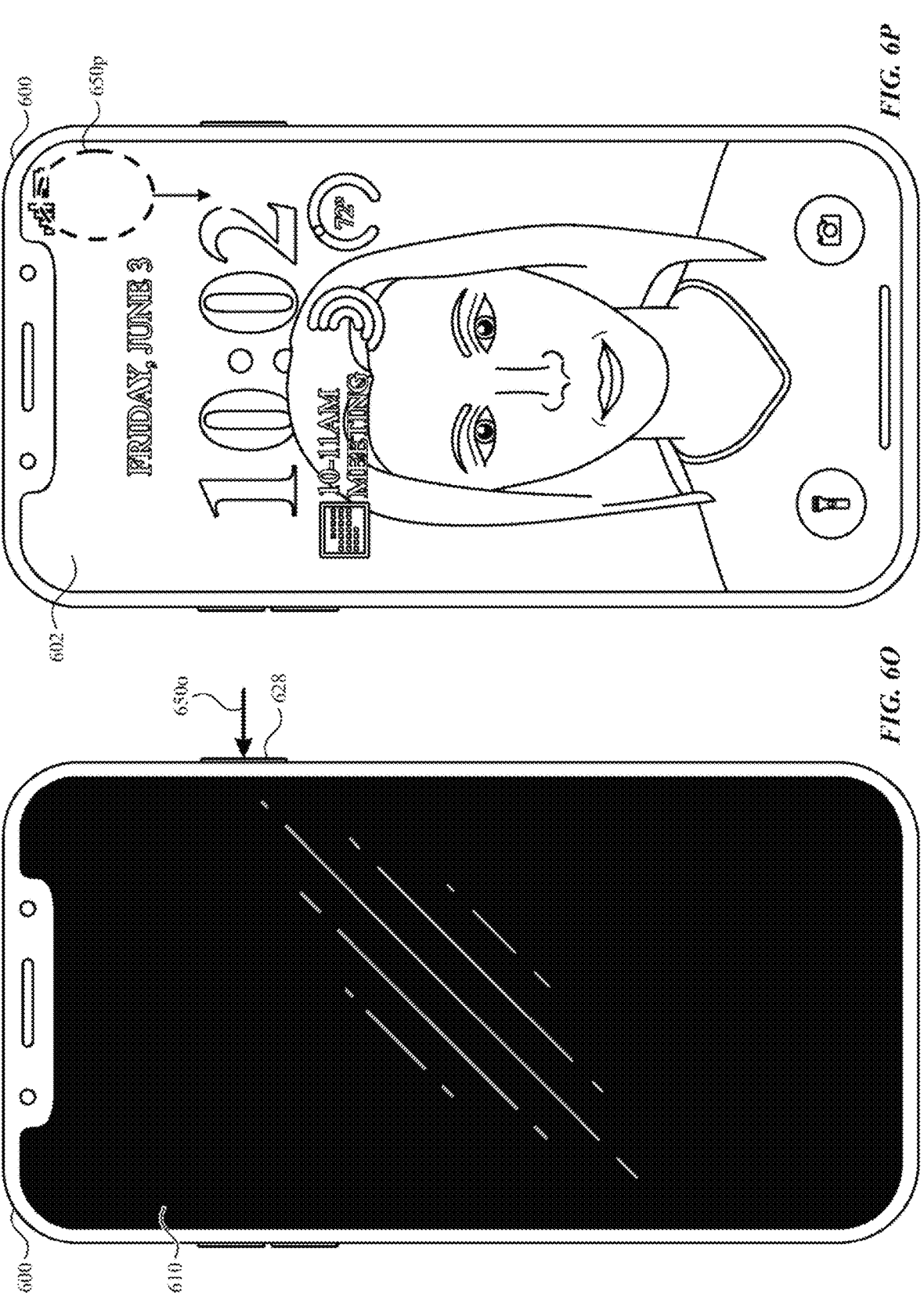

At FIG. 6O, in response to detecting activation 650*n* of hardware control 628 computer system 600 transitions from the normal power state to the display off state. Computer system 600 suppresses the low power state while computer system 600 is in the do-no-disturb mode. That is, while computer system 600 is in the do-not-disturb mode, computer system 600 transitions from the normal power state to the display off state in response to detecting a respective input that would cause computer system 600 to transition from the normal power state to the low power state if computer system 600 detected the respective input while computer system 600 was not in the do-not-disturb mode. At FIG. 6O, computer system 600 remains in the do-not-disturb mode while computer system 600 is in the display off state (e.g., computer system 600 does not exit the do-not-disturb mode as a part of transitioning from the normal power state to the display off state). At FIG. 6O, while computer system 600 is in the display off state, computer system 600 detects activation 650*o* of hardware control 628.

At FIG. 6P, in response to detecting activation 650*o* of hardware control 628, computer system 600 transitions from the display off state to the normal power state and displays wake screen user interface 602 with the light appearance. At FIG. 6P, computer system 600 remains in the do-not-disturb mode (e.g., computer system 600 does not exit the do-not disturb mode as a part of transitioning from the display off state to the normal power state). At FIG. 6P, while computer system 600 is in the normal power state, computer system 600 detects swipe gesture 650*p*.

Figures 6Q, 6R:
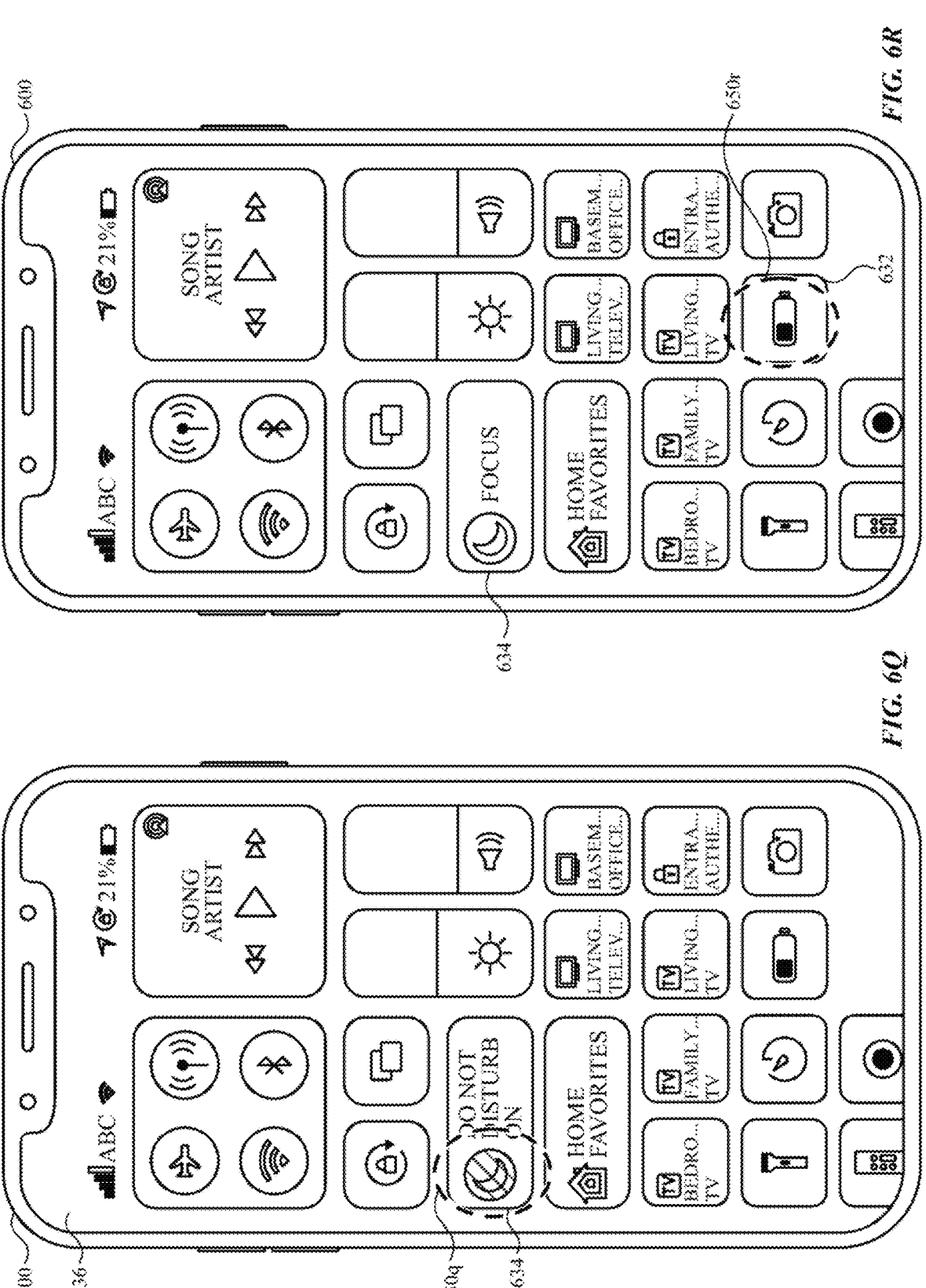
Figures 6S, 6T:
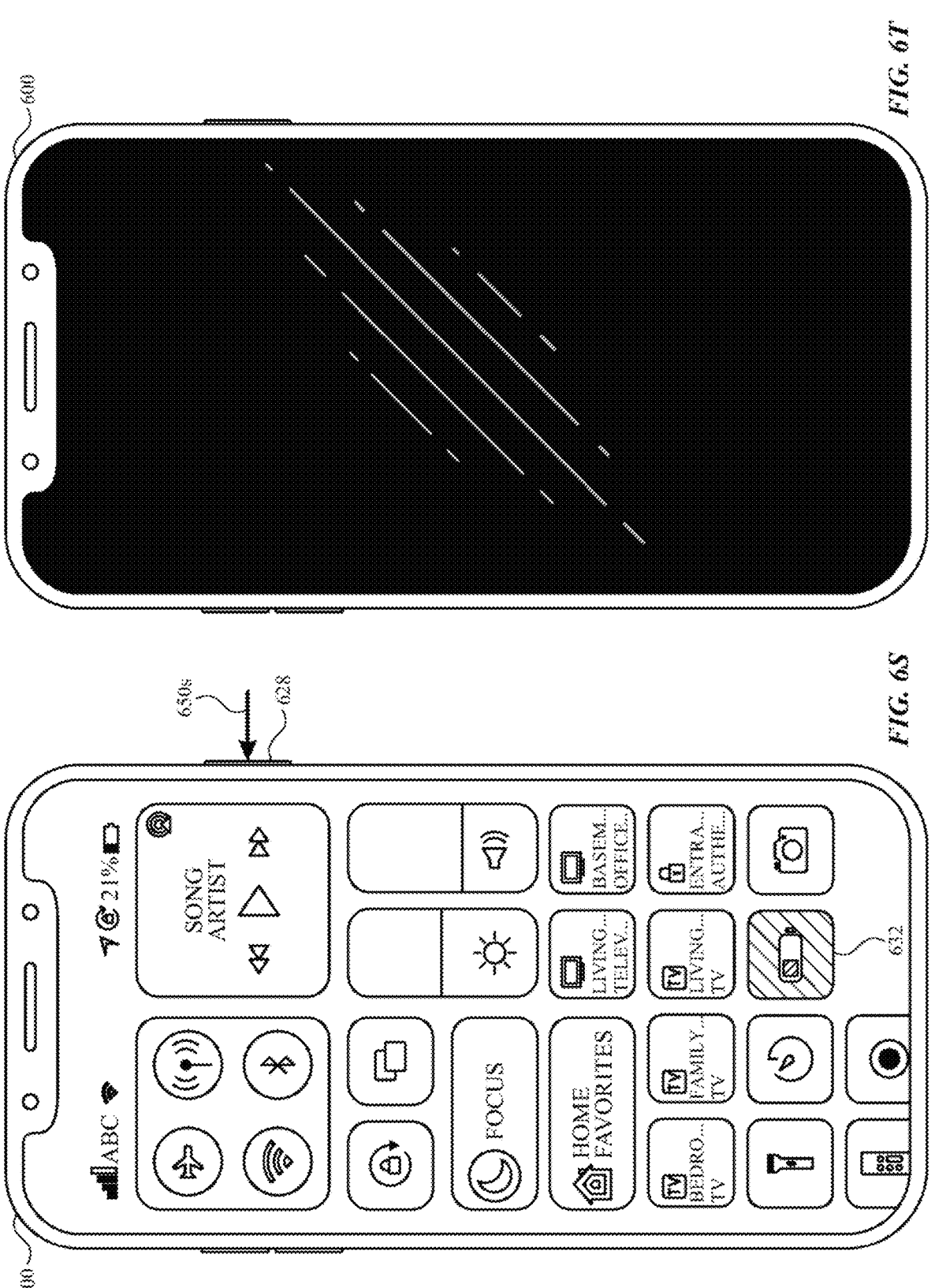

At FIG. 6Q, in response to detecting swipe gesture 650*p*, computer system 600 displays control center user interface 636. As illustrated in FIG. 6Q, because computer system 600 is in the do-not-disturb mode, (e.g., as explained above in reference to FIG. 6N), computer system 600 displays do-not-disturb affordance 634 as activated (e.g., computer system 600 displays do-not-disturb affordance 634 with hatching and as bolded). At FIG. 6Q, while computer system 600 is in the do-not-disturb mode, computer system 600 detects tap input 650*q* that corresponds to selection of do-not-disturb affordance 634.

At FIG. 6R, in response to detecting tap input 650*q*, computer system 600 exits the do-not disturb mode. At FIG.

6R, because computer system 600 no longer in the do-not-disturb mode, computer system 600 displays do-not-disturb affordance 634 as deactivated (e.g., computer system 600 displays do-not-disturb affordance 634 with no hatching and with no bolding). At FIG. 6R, computer system 600 is in the normal power state. While computer system 600 is in the normal power state, computer system 600 detects tap input 650r that corresponds to selection of battery preservation affordance 632.

At FIG. 6S, in response to detecting tap input 650r, computer system 600 enters a battery preservation mode. At FIG. 6S, computer system 600 remains in the normal power state (e.g., computer system 600 does not exit the normal power state in response to detecting tap input 650r on battery preservation affordance 632). While computer system 600 is in the battery preservation mode, the power consumption of computer system 600 is reduced such that the life of the battery of computer system 600 is extended. Further, while in battery preservation mode, computer system 600 does not perform various battery intensive operations (e.g., applications on computer system 600 do not refresh in the background and/or upload media items to cloud based servers).

As illustrated in FIG. 6S, because computer system 600 is in the battery preservation mode, computer system 600 displays battery preservation affordance 632 as activated (e.g., computer system 600 displays battery preservation affordance 632 as hatched and bolded). In some embodiments, computer system 600 automatically (e.g., without intervening user input) enters the battery preservation mode when the battery of computer system 600 falls below a power threshold. At FIG. 6S, computer system 600 detects activation 650s of hardware control 628 while computer system 600 is in the battery preservation mode.

At FIG. 6T, in response to detecting activation 650s of hardware control 628 computer system 600 transitions from the normal power state to the display off state. Computer system 600 suppresses the low power state while computer system 600 is in the battery preservation mode. That is, while computer system 600 is in the battery preservation mode, computer system 600 transitions from the normal power state to the display off state in response to detecting a respective input that would result in computer system 600 transitioning from the normal power state to the low power state if computer system 600 detected the respective input while computer system 600 was not in the battery preservation mode. Computer system 600 remains in the battery preservation mode while computer system 600 is in the display off state.

FIGS. 7A-7F illustrate exemplary user interfaces for controlling the display state of a display, in accordance with some embodiments. The user interfaces in these FIGS. are used to illustrate the processes described below, including the processes in FIG. 8.

Figure 7A:
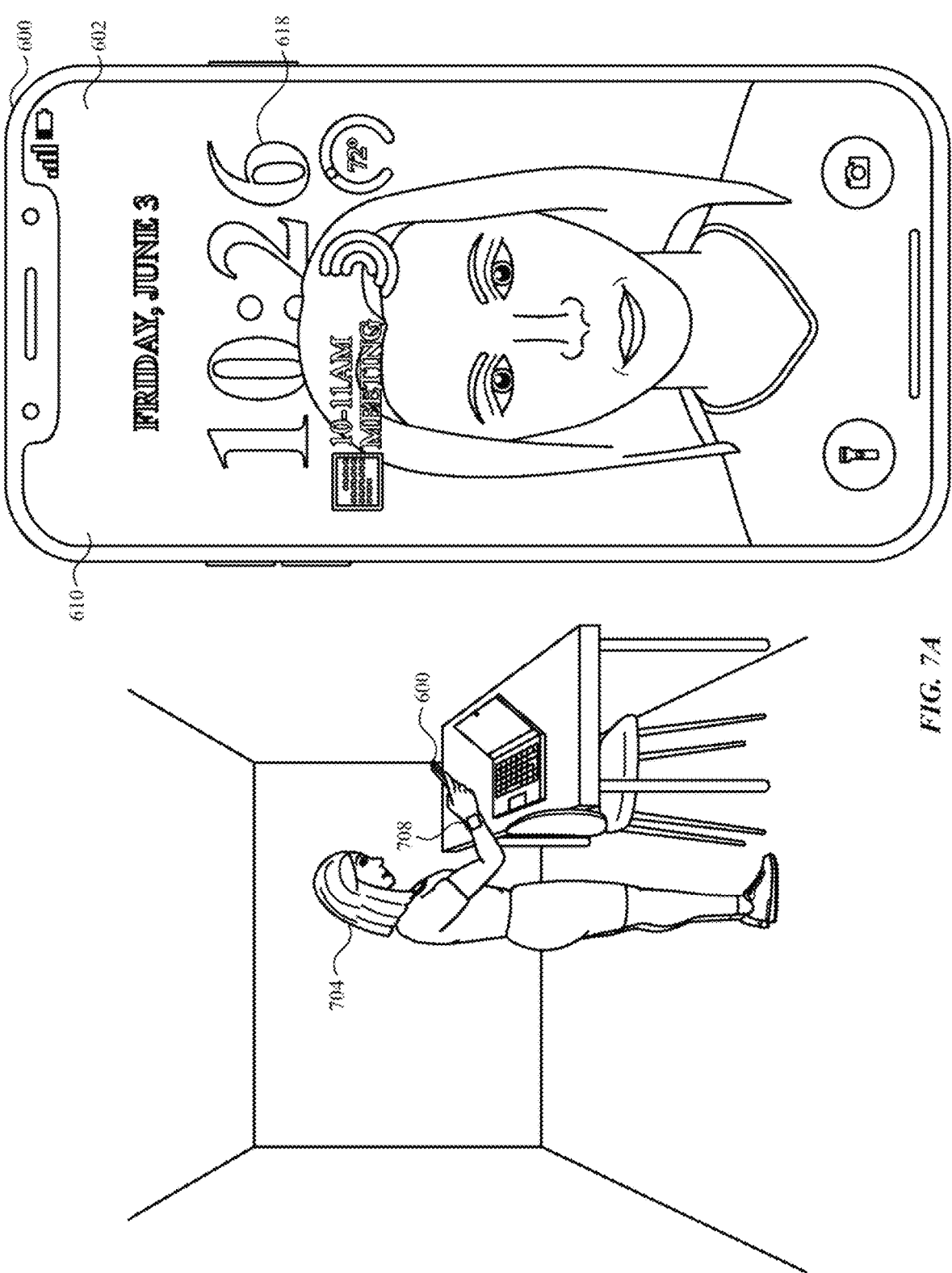

At FIG. 7A, computer system 600 is in the normal power state and displays wake screen user interface 602 with the light appearance. As illustrated in FIG. 7A, time indicator 618 indicates that the current time is "10:26". At FIG. 7A, user 704 places computer system 600 on the table and takes a seat at the desk.

Figure 7B:
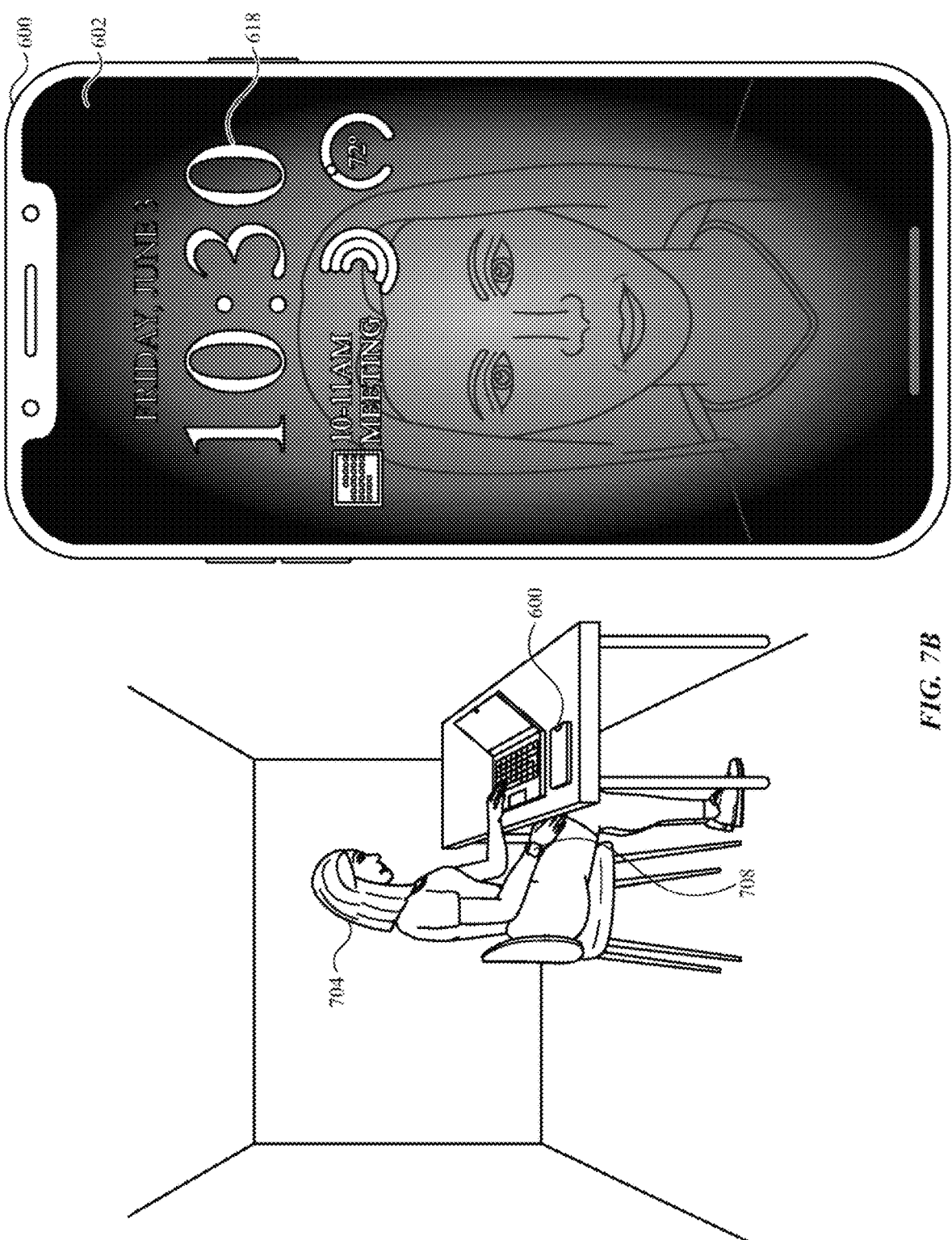

At FIG. 7B, the attention of user 704 is directed at the laptop computer that is positioned on the table. As illustrated in FIG. 7B, time indicator 618 indicates that the current time is "10:30". At FIG. 7B, a determination is made that computer system 600 has been inactive (e.g., computer system 600 has not detected any user interaction) for four minutes. At FIG. 6B, because a determination is made that computer system 600 has been inactive for four minutes, computer system 600 transitions from the normal power state to the low power state (e.g., as described above at FIG. 6F in reference to the "timing out" feature) and displays wake screen user interface 602 with the dark appearance. At FIG. 7B, the distance between external device 708 and computer system 600 is beneath a distance threshold (e.g., 1 foot, 3 feet, 5 feet, or 10 feet). At FIG. 7B, user 704 begins to walk away from computer system 600. In some embodiments, computer system 600 transitions from the normal power state to the low power state in accordance with a determination that a set of one or more criteria are satisfied (e.g., and not in response to the detection of an input).

Figure 7C:
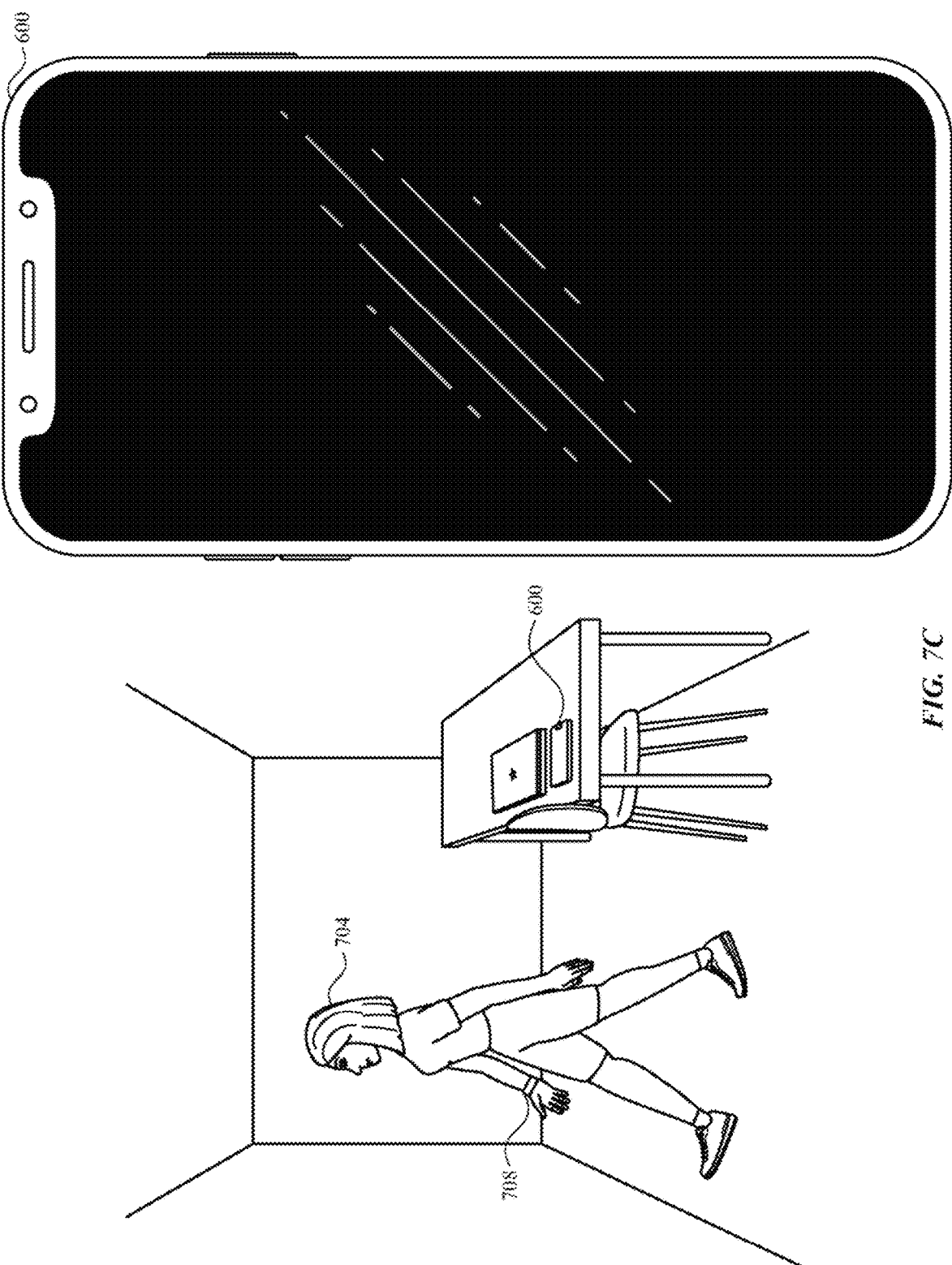

At FIG. 7C, the distance between external device 708 and computer system 600 has increased (e.g., in comparison to the distance between external device 708 and computer system 600 at FIG. 7B). At FIG. 7C, a determination is made that the distance between computer system 600 and external device 708 has transitioned from being less than the distance threshold to greater than the distance threshold. At FIG. 7C, because a determination is made that the distance between computer system 600 and external device 708 has transitioned from being less than the distance threshold to greater than the distance threshold, computer system 600 transitions from the low power state to the display off state.

Computer system 600 suppresses the low power state when external device 708 is out of range (e.g., the distance between external device 708 and computer system 600 is greater than the distance threshold) with computer system 600. Computer system 600 automatically (e.g., without intervening user input) transitions from the low power state to the display off state once it is determined that external device 708 is out of the range with computer system 600. In some embodiments, computer system 600 automatically transitions from the normal power state to the display off state when a determination is made that the distance between computer system 600 and external device 708 is greater than the distance threshold. At FIG. 7C, user 704 begins to walk back towards computer system 600.

Figure 7D:
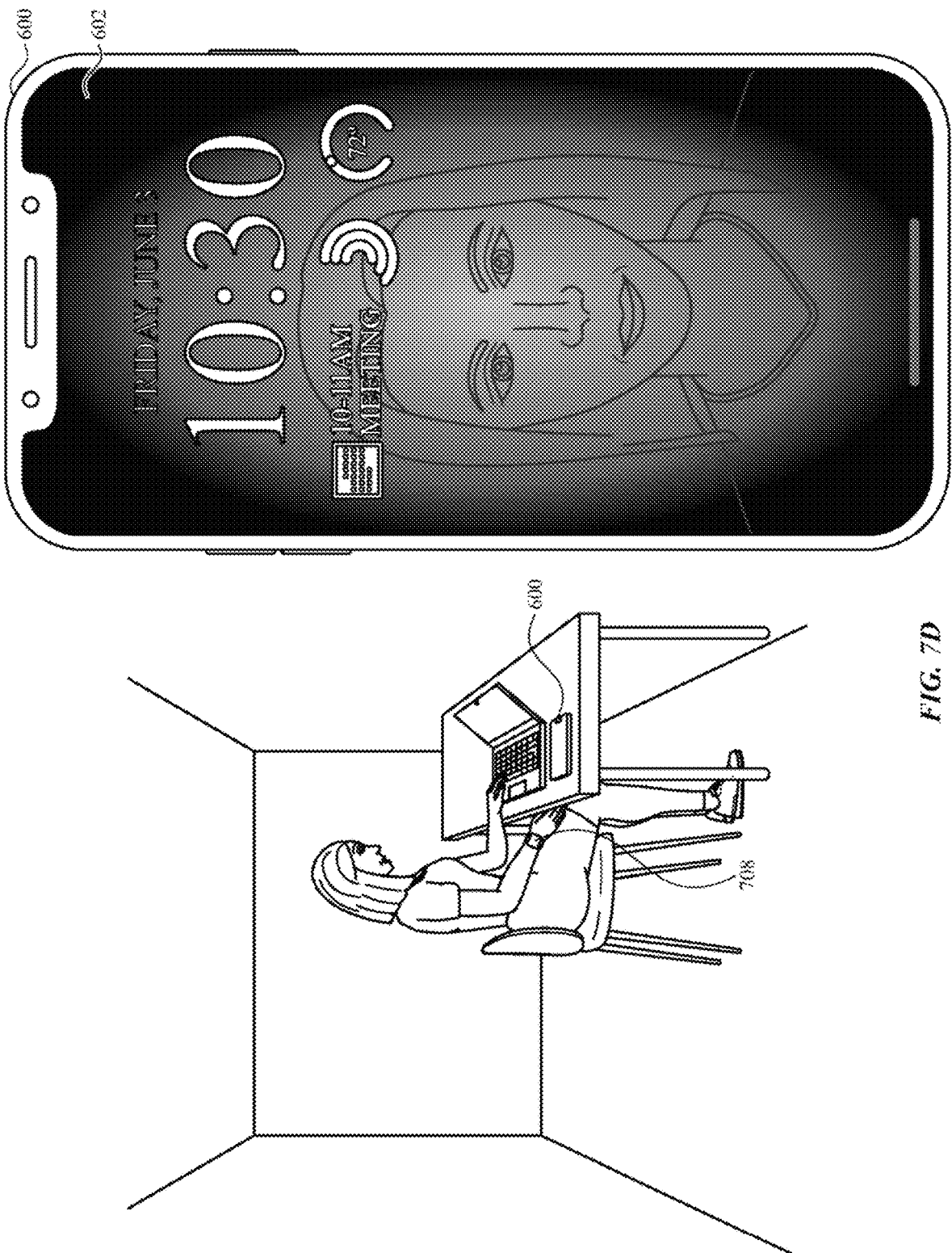

At FIG. 7D, the distance between external device 708 and computer system 600 has decreased (e.g., in comparison to the distance between external device 708 and computer system 600 at FIG. 7C). At FIG. 7D, a determination is made that the distance between external device 708 and computer system 600 has transitioned from being greater than the distance threshold to less than the distance threshold. At FIG. 7D, because a determination is made that the distance between computer system 600 and external device 708 has transitioned from being greater than the distance threshold to less than the distance threshold, computer system 600 transitions from the display off state to the low power state and displays wake screen user interface with the dark appearance. In some embodiments, computer system 600 displays a respective user interface that was most recently displayed prior to computer system 600 the transitioning to display off state. In some embodiments, computer system 600 automatically (e.g., without intervening user input) transitions from the display off state to the normal power state when a determination is made that the distance between computer system 600 and external device 708 is less than the distance threshold.

At FIG. 7E, computer system 600 receives a telecommunication signal that corresponds to an electronic message (e.g., text message). As illustrated in FIG. 7E, in response to receiving the telecommunication signal, computer system 600 displays wake screen user interface 602 (e.g., with the dark appearance) that includes notification 710. As discussed in greater detail below in reference to FIGS. 11B-

11D, the display of notification 710 sharply contrasts with the display of wake screen user interface 602. That is, notification 710 is displayed with a brighter appearance (e.g., dark text overlaid on top of a white background) while the average brightness of wake screen user interface 602 is darker. At FIG. 7E, display 610 of computer system 600 is facing upward (e.g., display 610 is not in contact with the surface of the desk). In some embodiments, computer system 600 transitions from the low power state to the normal power state as a part of displaying notification 710. In some embodiments, notification 710 is generated by an application (e.g., a weather application, a text message application and/or an electronic mail (e.g., e-mail) application) that is installed on computer system 600 or by the operating system of computer system 600. In some embodiments, computer system 600 ceases to display wake screen user interface 602 in response to detecting an input that corresponds to selection of notification 710. At FIG. 7E, user 714 places computer system 600 facedown on the table while computer system 600 is in the low power state (e.g., display 610 is touching the surface of the desk).

Figure 7F:

At FIG. 7F, a determination is made that the context of computer system 600 has changed (e.g., computer system 600 was positioned with display 610 facing upward at FIG. 7E and is positioned with display 610 facing downward at 7F). Because a determination is made that the context of computer system 600 has changed, computer system 600 transitions from the low power state to the display off state. Computer system 600 automatically (e.g., without intervening user input) transitions from the low power state to the display off state in response to detecting a change in context of computer system 600 (e.g., computer system 600 is positioned facedown, computer system 600 is place in the purse of a user, computer system 600 is positioned in the pocket of a user, computer system is placed in the back of a user). In some embodiments, computer system 600 transitions from the normal power state to the display off state in response to detecting a change in context of computer system 600.

FIG. 8 is a flow diagram illustrating a method for changing the display state of a display using a computer system in accordance with some embodiments. Method 800 is performed at a computer system (e.g., 100, 300, 500) that is in communication with a display generation component. Some operations in method 800 are, optionally, combined, the orders of some operations are, optionally, changed, and some operations are, optionally, omitted.

As described below, method 800 provides an intuitive way for changing the display state of a display. The method reduces the cognitive burden on a user for changing the display state of a display, thereby creating a more efficient human-machine interface. For battery-operated computing devices, enabling a user to change the display state of a display faster and more efficiently conserves power and increases the time between battery charges.

The computer system (e.g., 600) displays (802) a first user interface (e.g., 602) in a first mode (e.g., as described above in relation to FIGS. 6A, 6E, 6G, 6H, 6L-6N, 6P-6S, and/or 7A) (e.g., a wake screen user interface, a home screen user interface, or an application user interface).

While displaying the first user interface (e.g., 602) (e.g., in the first mode (e.g., as described above in relation to FIGS. 6A, 6E, 6G, 6H, 6L-6N, 6P-6S, and/or 7A)), the computer system detects (804) the occurrence of a first condition (e.g., as described above in relation to 650a, 650c, 650i, FIGS. 6E-6F, and/or FIGS. 7A-7B).

In response to detecting the occurrence of the first condition (e.g., as described above in relation to 650a, 650c, 650i, FIGS. 6E-6F, and/or FIGS. 7A-7B), the computer system transitions (806) (e.g., 600) from the first mode (e.g., a higher power consumption mode (e.g., a mode that corresponds to higher power consumption than a lower power consumption mode) (e.g., a mode that corresponds to a brighter display, increased performance, and/or more frequent display updates)) to a second mode (e.g., as described above in relation to FIGS. 6B, 6C, 6F, 6J, 6K, 7B, and/or 7D) of a second user interface (e.g., 602) (e.g., a lower power version of the first user interface or a different user interface such as a wake screen user interface) (e.g., a lower power consumption mode (e.g., lower power consumption in the second mode than in the first mode)) (e.g., a second brightness that is less than the brightness of the first mode), where: the display generation component (808) (e.g., 610) has a lower average brightness level in the second mode (e.g., as described above in relation to FIGS. 6B, 6C, 6F, 6J, 6K, 7B, and/or 7D relative to the first mode (e.g., as described above in relation to FIGS. 6A, 6E, 6G, 6H, 6L-6N, 6P-6S, and/or 7A); a first portion (810) (e.g., foreground as discussed in relation to FIGS. 6B, 6C, 6F, 6J, 6K, 7B, and/or 7D) (e.g., a first user interface element or a first user interface region) of the second user interface (e.g., 602) in the second mode (e.g., as described above in relation to FIGS. 6B, 6C, 6F, 6J, 6K, 7B, and/or 7D) is reduced in brightness by a first amount relative to the first user portion of the second user interface in the first mode (e.g., as described above in relation to FIGS. 6A, 6E, 6G, 6H, 6L-6N, 6P-6S, and/or 7A); and a second portion (812) (e.g., background as discussed in relation to FIGS. 6B, 6C, 6F, 6J, 6K, 7B, and/or 7D) (e.g., a second user interface element or a second user interface region) of the second user interface in the second mode (e.g., as described above in relation to FIGS. 6B, 6C, 6F, 6J, 6K, 7B, and/or 7D) is reduced in brightness by a second amount relative to the first user portion of the second user interface in the first mode (e.g., as described above in relation to FIGS. 6A, 6E, 6G, 6H, 6L-6N, 6P-6S, and/or 7A); and the second amount (814) is different from (e.g., greater than or less than) the first amount.

While the computer system (e.g., 600) is in the second mode (e.g., as described above in relation to FIGS. 6B, 6C, 6F, 6J, 6K, 7B, and/or 7D) (e.g., and after the computer system has transitioned from the first mode to the second mode), the computer system detects (816) (via one or more sensors that are in communication (e.g., wireless communication and/or wired communication) with the computer system) the occurrence of a second condition (e.g., as described above in relation to 650c, 650j, FIGS. 7B-7C, and 7F) (e.g., detecting an input (e.g., a tap gesture, a swipe input, tactile input on a hardware button that is integrated into the computer system, and/or a hand cover) (e.g., detect a change in the positional and/or spatial orientation of the computer system) (e.g., detect a change in the environment that the computer system is positioned within).

In response to detecting the occurrence of the second condition (e.g., as described above in relation to 650c, 650j, FIGS. 7B-7C, and 7F), the computer system transitions (818) from the second mode (e.g., as described above in relation to FIGS. 6B, 6C, 6F, 6J, 6K, 7B, and/or 7D) to a third mode (e.g., as described above in relation to FIGS. 6D, 6O, 6T, 7C, and 7F) (e.g., a lower power consumption mode (e.g., lower power consumption in the third mode than in the first mode and the second mode)) (e.g., the display generation component is on a display off state in the third mode).

In some embodiments, the display generation component (e.g., 610) has a lower average brightness level in the third mode relative to the second mode (e.g., the display generation component has a lower brightness level in the third mode relative to the first mode too). In some embodiments, detecting the change in context of the computer system includes one or more of: receiving data from one or more sensors indicating user activity is below a threshold activity level, determining that a predetermined period of time has elapsed without device receiving user input at one or more input devices (e.g., touch-screen, rotatable input mechanism, depressible input mechanism). In some embodiments, transitioning the computer system from the first mode to the second mode includes placing the computer system into a locked state (e.g., a state where the functionality of the computer system is limited). In some embodiments, when the computer system transitions from the second mode to the first mode, the lock state of the computer system is maintained. In some embodiments, the computer system displays a first user interface while the computer system is in the first mode and the computer system maintains the display of the first user interface while the computer system transitions is in the second mode. In some embodiments, the computer system displays a first user interface while the computer system is in the first mode and the computer displays a modified version of the first user interface while the computer system is in the second mode. Transitioning the computer system from the first mode to the second mode when a set of conditions are met (e.g., in response to detecting the occurrence of the first condition) allows the computer system to automatically manage the mode of operation of the computer system, to optionally conserve battery power, which automatically performs an operation. Transitioning the computer system from the first mode to the second mode when a set of conditions are met (e.g., in response to detecting the occurrence of the second condition) allows the computer system to automatically manage the mode of operation of the computer system, to optionally conserve battery power, which automatically performs an operation. Reducing the brightness of a first portion of the second user interface by a first amount and reducing a second portion of the second user interface by a second amount that is greater than the first amount as part of transitioning the computer system from the first mode to the second modes provides the user with visual feedback with respect to the present mode of the computer system, which provides improved visual feedback.

In some embodiments, as a part of displaying the first user interface (e.g., 602) in the first mode (e.g., as described above in relation to FIGS. 6A, 6E, 6G, 6H, 6L-6N, 6P-6S, and/or 7A), the computer system displays a first set of one or more user interface elements (e.g., 612 and/or 614) (e.g., the one or more user interface elements indicate the time and/or date) (e.g., the computer system performs one or more functions (e.g., turns on a light that is coupled to the computer system and/or launches a camera application) in response to detecting that the one or more user interface elements are selected). In some embodiments, as a part of transitioning the computer system (e.g., 600) from the first mode to the second mode (e.g., as described above in relation to FIGS. 6B, 6C, 6F, 6J, 6K, 7B, and/or 7D) of the second user interface (e.g., 602), the computer system ceases the display of the first set of one or more user interface elements (e.g., 612 and/or 614). In some embodiments, the one or more user interface elements are redisplayed in response to the computer system transitioning from the second mode back to the first mode. In some embodiments, ceasing to display the fest set of one or more user interface elements includes the computer system displaying the one or more user interface elements as fading out (e.g., the computer system displays the first set of one or more user interface elements as fading out at the same time or the computer system displays the one or more user interface elements as sequentially fading out). Ceasing the display of the first set of one or more user interface elements as a part of transitioning the computer system from the first mode to the second mode when conditions are met (e.g., in response to detecting the occurrence of the first condition) allows the computer system to automatically manage which user interface elements are displayed, to optionally conserve battery power, which performs an operation when a set of conditions has been met.

In some embodiments, as a part of displaying the first user interface (e.g., 602) in the first mode (e.g., as described above in relation to FIGS. 6A, 6E, 6G, 6H, 6L-6N, 6P-6S, and/or 7A), the computer system displays a second set of one or more user interface elements (e.g., 620a-620c and/or 622) (e.g., the second set of one or more user interface elements indicate the time and/or date) (e.g., the computer system performs one or more functions (e.g., turns on a light that is coupled to the computer system and/or launches a camera application) in response to detecting that the one or more user interface elements are selected) with a first brightness (e.g., 1 lux, 3 lux, or 5 lux). In some embodiments, transitioning the computer system (e.g., 600) from the first mode to the second mode (e.g., as described above in relation to FIGS. 6B, 6C, 6F, 6J, 6K, 7B, and/or 7D) of the second user interface (e.g., 602) includes dimming the brightness of the second set of one or more user interface elements (e.g., 620a-620c and/or 622) from the first brightness to a second brightness. In some embodiments, the first brightness of the second set of one or more user interface elements is darker than the average brightness of the first user interface. In some embodiments, the first brightness of the second set of one or more user interface elements is brighter than the average brightness of the first user interface. In some embodiments, the second brightness of the second set of one or more user interface elements is brighter than the average brightness of the second user interface. In some embodiments, the second brightness of the second set of one or more user interface elements is darker than the average brightness of the second user interface. In some embodiments, the computer system dims the second set of one or more user interface elements at the same time. In some embodiments, the computer system sequentially dims the second set of one or more user interface elements. In some embodiments, the computer system 600 displays a set of user interface objects on the first and second user interfaces, where the set of user interface objects displayed on the first and second user interfaces are displayed with the same brightness. Dimming the brightness of the second set of one or more user interface elements from a first brightness to a second brightness when prescribed conditions are met allows the computer system to automatically manage the display brightness of various user interface elements, to optionally conserve battery power, which performs an operation when a set of conditions has been met. Dimming the brightness of the second set of one or more user interface elements from a first brightness to a second brightness when the computer system transitions from the first mode to the second mode provides the user with visual feedback regarding the mode of operation of the computer system, which provides improved visual feedback.

In some embodiments, as a part of displaying the first user interface (e.g., 602) in the first mode (e.g., as described above in relation to FIGS. 6A, 6E, 6G, 6H, 6L-6N, 6P-6S, and/or 7A), the computer system displays a third set of one or more user interface elements (e.g., 612, 614, 620a-620c, and/or 622) (e.g., the third set of one or more user interface elements indicate the time and/or date) (e.g., the computer system performs one or more functions (e.g., turns on a light that is coupled to the computer system and/or launches a camera application) in response to detecting that the third set of one or more user interface elements are selected) with one or more visual properties (e.g., size, shape, color, clarity, orientation, and/or display location). In some embodiments, as a part of transitioning the computer system (e.g., 600) from the first mode to the second mode (e.g., as described above in relation to FIGS. 6B, 6C, 6F, 6J, 6K, 7B, and/or 7D) of the second user interface (e.g., 602), the computer system changes the visual property of the third set of one or more user interface elements (e.g., changing the size of the third set of one or more user interface elements, changing the location at which the third set of one or more user interface elements are displayed, blurring the visual appearance of the third set of one or more user interface elements, rotating the third set of the one more user interface elements). In some embodiments, the computer system changes the visual property of the one or more user interface elements at the same time. In some embodiments, the computer system changes the visual property of the one or more user interface elements sequentially. Changing the visual property of the third set of one or more user interface elements as part of transitioning the computer system from the first mode to the second modes when prescribed conditions are met (e.g., in response to detecting the occurrence of the first condition) allows the computer system to automatically manage the display appearance of the third set of user interface elements, which performs an operation when a set of conditions has been met.

In some embodiments, as a part of transitioning the computer system from the first mode (e.g., as described above in relation to FIGS. 6A, 6E, 6G, 6H, 6L-6N, 6P-6S, and/or 7A) to the second mode (e.g., as described above in relation to FIGS. 6B, 6C, 6F, 6J, 6K, 7B, and/or 7D), the computer system displays a fourth set of one or more user interface elements (e.g., 620a-620c and/or 622) (e.g., the fourth set of one or more user interface elements indicate the time and/or date) (e.g., the computer system performs one or more functions (e.g., turns on a light that is integrated in the computer system and/or launches a camera application) in response to detecting that the fourth set of one or more user interface elements are selected). In some embodiments, the detection of the occurrence of the second condition (e.g., as described above in relation to 650c, 650j, FIGS. 7B-7C, and 7F) occurs while the fourth set of one or more user interface elements are displayed. In some embodiments, as a part of transitioning the computer system (e.g., 600) from the second mode (e.g., as described above in relation to FIGS. 6B, 6C, 6F, 6J, 6K, 7B, and/or 7D) to the third mode (e.g., as described above in relation to FIGS. 6D, 6O, 6T, 7C, and 7F), the computer system ceases display of the fourth set of one or more user interface elements. In some embodiments, the computer system concurrently ceases the display of the fourth set of one or more user interface elements. In some embodiments, the computer system sequentially ceases the display of the fourth set of one or more user interface elements. Ceasing the display of the fourth set of one or more user interface elements as a part of transitioning the computer system from the second mode to the third mode when conditions are met (e.g., in response to detecting the occurrence of the first condition) allows the computer system to automatically manage whether the fourth set of one or more user interface elements are displayed, to optionally conserve battery power, which performs an operation when a set of conditions has been met.

In some embodiments, the third mode (e.g., as described above in relation to FIGS. 6D, 6O, 6T, 7C, and 7F) is a display off state (e.g., the display generation component of the computer system is not illuminated (e.g., the display generation component is in a sleep mode (e.g., where the display generation component does not display anything). In some embodiments, the computer system displays the first user interface in the first mode in response to detecting an input (e.g., a tap on the display generation component and/or an activation of a hardware button) while the computer system is in the display off state. Transitioning the computer system to a display off state as part of transitioning the computer system from the second mode to the third mode when prescribed conditions are met (e.g., in response to detecting the occurrence of the second condition) allows the computer system to automatically manage the display state of the display of the computer system, to optionally conserve battery power, which performs an operation when a set of conditions has been met.

In some embodiments, the first condition e.g., as described above in relation to 650a, 650c, 650i, FIGS. 6E-6F, and/or FIGS. 7A-7B) corresponds to the computer system (e.g., 600) being inactive (e.g., the computer system does not detect user interaction) for a predetermined amount of time (e.g., 3 seconds, 5 seconds, 10 seconds, 15 seconds, 30 seconds, 1 minute, 3 minutes, or 5 minutes) (e.g., as described above in relation to FIGS. 6E-6F). Transitioning the computer system from the first mode to the second mode based on the computer system being inactive the user with the ability to manage the mode of the computer system without displaying additional controls, which provides additional control options without cluttering the user interface with additional displayed controls.

In some embodiments, the computer system (e.g., 600) includes one or more hardware controls (e.g., 628). In some embodiments, the first condition e.g., as described above in relation to 650a, 650c, 650i, FIGS. 6E-6F, and/or FIGS. 7A-7B) corresponds to an activation (e.g., selection (e.g., selection by a user of the computer system)) of the one or more hardware controls (e.g., a sleep button of the computer system) (e.g., a volume button of the computer system) (e.g., selection of a power button of the computer system) (e.g., a button that is coupled (wirelessly coupled or wired) to the computer system). In some embodiments, selection of the one or more hardware controls corresponds to a short press (e.g., a press and release). In some embodiments, selection of the one or more hardware controls corresponds to a long press (e.g., a press and hold). Transitioning the computer system from the first mode to the second mode in response detecting the activation of one or more hardware controls provides the user with the ability to manage the mode of the computer system without displaying additional controls, which provides additional control options without cluttering the user interface with additional displayed controls.

In some embodiments, the computer system detects a tap gesture (e.g., 650d) (e.g., a tap (e.g., a tap gesture) that is performed by the user) (e.g., detecting a tap on the display generation component that is in communication with the computer system) (e.g., detecting a tap while the computer system is not in the first mode). In some embodiments, in response to detecting the tap gesture and in accordance with a determination that the computer system (e.g., 600) is in the second mode (e.g., as described above in relation to FIGS. 6B, 6C, 6F, 6J, 6K, 7B, and/or 7D), the computer system transitions from the second mode to the first mode (e.g., as described above in relation to FIGS. 6A, 6E, 6G, 6H, 6L-6N, 6P-6S, and/or 7A) (e.g., and displaying the first user interface). In some embodiments, in response to detecting the tap gesture and in accordance with a determination that the computer system is in the third mode (e.g., as described above in relation to FIGS. 6D, 6O, 6T, 7C, and/or 7F), the computer system transitions from the third mode to the first mode (e.g., and displaying the first user interface). In some embodiments, transitioning the computer system from the third mode or second mode to the first mode includes displaying an animation of one or more user interface elements fading in. In some embodiments, transitioning the computer system from the second mode to the first mode includes changing the visual appearance (e.g., the size, clarity, orientation, color, brightness, display location, and/or font) of one or more user interface elements. In some embodiments, transitioning the computer system from the third mode or second mode to the first mode includes displaying a respective user interface that was displayed prior to the computer system entering the third mode or the second mode. Transitioning the computer system from the second mode and/or the third mode to the first mode in response to detecting a tap input provides the user with the ability to manage the mode of the computer system without displaying additional controls, which provides additional control options without cluttering the user interface with additional displayed controls.

In some embodiments, the computer system detects a swipe gesture (e.g., 650f) (e.g., a vertical swipe gesture, a horizontal swipe gesture, a diagonal swipe gesture and/or a multi-directional swipe gesture) (e.g., a swipe gesture that is performed by the user) (e.g., detecting a swipe gesture on the display generation component that is in communication with the computer system) (e.g., detecting a swipe gesture while the computer system is not in the first mode). In some embodiments, in response to detecting the swipe gesture and in accordance with a determination that the computer system (e.g., 600) is in the second mode (e.g., as described above in relation to FIGS. 6B, 6C, 6F, 6J, 6K, 7B, and/or 7D), the computer system transitions from the second mode to the first mode (e.g., as described above in relation to FIGS. 6A, 6E, 6G, 6H, 6L-6N, 6P-6S, and/or 7A) (e.g., and displaying the first user interface). In some embodiments, in response to detecting the swipe gesture and in accordance with a determination that the computer system is in the third mode (e.g., as described above in relation to FIGS. 6D, 6O, 6T, 7C, and 7F), the computer system transitions from the third mode to the first mode (e.g., and displaying the first user interface). In some embodiments, transitioning the computer system from the third mode or second mode to the first mode includes displaying an animation of one or more user interface elements fading in. In some embodiments, transitioning the computer system from the second mode to the first mode includes changing the visual appearance (e.g., the size, clarity, orientation, color, brightness, display location, and/or font) of one or more user interface elements. In some embodiments, transitioning the computer system from the third mode or second mode to the first mode includes displaying a respective user interface that was displayed prior to the computer system entering the third mode or the second mode. Transitioning the computer system from the second mode and/or the third mode to the first mode in response to detecting a swipe gesture provides the user with the ability to manage the mode of the computer system without displaying additional controls, which provides additional control options without cluttering the user interface with additional displayed controls.

In some embodiments, the computer system detects an activation (e.g., via. 650o) of a hardware control (e.g., 628) (e.g., a sleep button, volume button, and/or a power button) (e.g., the activation of the hardware control is performed by the user) (e.g., detecting activation of the hardware control while the computer system is not in the first mode). In some embodiments, in response to detecting the activation of the hardware control and in accordance with a determination that the computer system (e.g., 600) is in the second mode (e.g., as described above in relation to FIGS. 6B, 6C, 6F, 6J, 6K, 7B, and/or 7D), the computer system transitions from the second mode to the first mode (e.g., as described above in relation to FIGS. 6A, 6E, 6G, 6H, 6L-6N, 6P-6S, and/or 7A) (e.g., and displaying the first user interface). In some embodiments, in response to detecting the activation of the hardware control and in accordance with a determination that the computer system is in the third mode (e.g., as described above in relation to FIGS. 6D, 6O, 6T, 7C, and 7F), the computer system transitions from the third mode to the first mode (e.g., and displaying the first user interface). In some embodiments, transitioning the computer system from the third mode or second mode to the first mode includes displaying an animation of one or more user interface elements fading in. In some embodiments, transitioning the computer system from the second mode to the first mode includes changing the visual appearance (e.g., the size, clarity, orientation, color, brightness, display location, and/or font) of one or more user interface elements. In some embodiments, transitioning the computer system from the third mode or second mode to the first mode includes displaying a respective user interface that was displayed prior to the computer system entering the third mode or the second mode. In some embodiments, activation of the hardware control is a short press (e.g., press and release). In some embodiments, the activation of the hard control is a long press (e.g., a press and hold). Transitioning the computer system from the second mode and/or the third mode to the first mode in response to detecting the activation of a hardware control provides the user with the ability to manage the mode of the computer system without displaying additional controls, which provides additional control options without cluttering the user interface with additional displayed controls.

In some embodiments, the second condition (e.g., as described above in relation to 650c, 650j, FIGS. 7B-7C, and 7F) corresponds to a change in context of the computer system (e.g., 600) (e.g., the change in context indicates that the user is not viewing the display generation component of the computer system) (e.g., the computer system is placed face down on a surface, the computer system is placed in a pocket of the user, or the computer system is placed in a purse of the user). Transitioning the computer system from the second mode to the third mode in response to detecting a change in context of the computer system provides the user with the ability to manage the display mode of the computer system, to optionally conserve battery power, without displaying additional controls, which provides additional control options without cluttering the user interface with additional displayed controls.

In some embodiments, the computer system (e.g., 600) is in communication (e.g., wireless communication or wired communication) with an external device (e.g., 708) (e.g., an external device that is worn by the user) (e.g., a smart device (e.g., smart watch) that is worn by the user). In some embodiments, the distance between the computer system (e.g., 600) and the external device (e.g., 708) is a first distance (e.g., 1 foot, 5 feet, 10 feet, 20 feet, 50 feet, or 100 feet). In some embodiments, while the computer system is in the second mode (e.g., as described above in relation to FIGS. 6B, 6C, 6F, 6J, 6K, 7B, and/or 7D), the computer system detects a first change in the distance between the computer system and the external device from the first distance to a second distance (e.g., as described above in relation to FIGS. 7A-7D) (e.g., the distance between the computer system and the external device is determined using a Bluetooth, Wi-Fi, and/or an ultra-wideband connection between the computer system and the external device) (e.g., the second distance is greater than the first distance). In some embodiments, in response to detecting the change in distance between the computer system and the external device from the first distance to the second distance and in accordance with a determination that the second distance is greater than a distance threshold (e.g., 5 feet, 10 feet, 15 feet, 20 feet, 50 feet, or 100 feet) (e.g., as described above in relation to FIGS. 7A-7D), the computer system transitions from the second mode to the third mode (e.g., as described above in relation to FIGS. 6D, 6O, 6T, 7C, and 7F) (e.g., the computer system transitions from the second mode to the third mode based on the external device moving away from the computer system) (e.g., the computer system automatically (e.g., without intervening user input) transitions from the second mode to the third mode). In some embodiments, in accordance with a determination that a distance between the computer system and the external device is less than the distance threshold, the computer system stays in the second mode. In some embodiments, the computer system detects the first change in the distance between the computer system and the external device from the first distance to a third distance while the computer system is in the first mode and in response to detecting the change in distance between the computer system and the external device from the first distance to the third distance and in accordance with a determination that the third distance is greater than the distance threshold, the computer system transitions from the first mode to the third mode Transitioning the computer system from the second mode to the third mode in response to detecting the change in distance between the computer system and the external device provides the user with the ability to manage the display mode of the computer system, to optionally conserve battery power, without displaying additional controls, which provides additional control options without cluttering the user interface with additional displayed controls.

In some embodiments, while the computer system (e.g., 600) is at the second distance and while the computer system is in the third mode (e.g., as described above in relation to FIGS. 6D, 6O, 6T, 7C, and 7F), the computer system detects a second change in the distance between the computer system and the external device from the second distance to a third distance (e.g., 1 foot, 3 feet, 5 feet, 15 feet, 40 feet, or 80 feet) (e.g., the external device moves closer to the computer system) (e.g., as described above in relation to FIGS. 7C-7D). In some embodiments, in response to detecting the second change in distance between the computer system and the external device from the second distance to the third distance and in accordance with a determination that the third distance is less than the distance threshold (e.g., the external device moves back in range with the computer system) (e.g., as described above in relation to FIGS. 7C-7D), the computer system transitions from the third mode to the second mode (e.g., as described above in relation to FIGS. 6B, 6C, 6F, 6J, 6K, 7B, and/or 7D) (e.g., automatically (e.g., without intervening user input) transitioning the computer system from the third mode to the second mode). In some embodiments, in response to detecting the second change in distance between the computer system and the external device from the second distance to the third distance and in accordance with a determination that the third between the computer system and the external device is greater than the distance threshold, the computer system stays in the third mode. Transitioning the computer system from the third mode to the second mode in response to detecting the change in distance between the computer system and the external device from a second distance to a third distance provides the user with the ability to manage the display mode of the computer system without displaying additional controls, which provides additional control options without cluttering the user interface with additional displayed controls.

In some embodiments, after detecting the occurrence of the second condition (e.g., as described above in relation to 650c, 650j, FIGS. 7B-7C, and 7F), the computer system displays the first user interface (e.g., 602) in the first mode (e.g., as described above in relation to FIGS. 6A, 6E, 6G, 6H, 6L-6N, 6P-6S, and/or 7A). In some embodiments, while displaying the first user interface in the first mode, the computer system detects a second occurrence of the first condition (e.g., as described above in relation to 650a, 650c, 650i, 650n, FIGS. 6E-6F, and/or FIGS. 7A-7B). In some embodiments, in response to detecting the second occurrence of the first condition (e.g., as described above in relation to 650n) and in accordance with a determination that the computer system (e.g., 600) is in a do-not-disturb mode (e.g., as described in relation to FIG. 6N) (e.g., a mode where notifications (e.g., text message notifications, phone call notifications, and/or notifications generated from applications installed on the computer system are suppressed (e.g., the computer system does not present the notification), the computer system transitions from the first mode to the third mode (e.g., as described above in relation to FIGS. 6D, 6O, 6T, 7C, and 7F) (e.g., as described above in relation to FIGS. 6N-6O) (e.g., the second mode of the computer system is suppressed while the computer system is in the do-not-disturb mode). In some embodiments, in response to detecting the second occurrence of the first condition and in accordance with a determination that the computer system is not in the do-not-disturb mode, transitioning the computer system from the first mode to the second mode. Transitioning the computer system from the first mode to the third mode in response to detecting the second occurrence of the first condition when conditions are met (e.g., the computer system is in a do-not-disturb mode), allows the computer system to automatically manage the illumination of the display of the computer system, to optionally conserve battery power, which performs an operation when a set of conditions has been met, without requiring additional user input. Transitioning the computer system from the first mode to the third mode in response to detecting the second occurrence of the first condition and in accordance with a determination that the computer system is in a do-no-disturb mode provides the user with visual feedback with respect to whether the computer system is in a do-not-disturb mode, which provides improved visual feedback.

In some embodiments, after detecting the occurrence of the second condition (e.g., as described above in relation to 650c, 650j, FIGS. 7B-7C, and 7F), the computer system displays the second user interface (e.g., 602) in the second mode (e.g., as described above in relation to FIGS. 6B, 6C, 6F, 6J, 6K, 7B, and/or 7D). In some embodiments, while displaying the second user interface in the second mode, the computer system detects a second occurrence of the second condition. In some embodiments, in response to detecting the second occurrence of the second condition and in accordance with a determination that the computer system (e.g., 600) has detected a user interaction (e.g., as described above in relation to 650h) (e.g., the computer system has detected a user input (e.g., a tap on the display generation component, a swipe gesture on the display generation component, an activation of a hardware control, and/or a raise of the computer system) within a predetermined amount of time since the detection of the second occurrence of the second condition (e.g., as described above in relation to 650c, 650j, FIGS. 7B-7C, and 7F) (e.g., 10 seconds, 30 seconds, or 1 minute), the computer system forgoes transitioning the computer system from the second mode to the third mode (e.g., as described above in relation to FIGS. 6D, 6O, 6T, 7C, and 7F) (e.g., the computer system remains in the second mode) (e.g., the computer system maintains display of the second user interface in the second mode). In some embodiments, in response to detecting the second occurrence of the second condition and in accordance with a determination that a user has not interacted with the computer system within the predetermined amount of time since the detection of the occurrence of the second condition, the computer systems transitions from the second mode to third mode. Forgoing the transition from the second mode to the third mode in response to detecting the second occurrence of the second condition when prescribed conditions are met (in accordance with a determination that the computer system has detected a user interaction within a predetermined amount of time since the detection of the second occurrence of the second condition) allows the computer system to automatically prevent the display of the computer system from entering a display off state when the user has an heightened interest in the display of the computer system, which performs an operation when a set of conditions has been met. Forgoing the transition from the second mode to the third mode in response to detecting the second occurrence of the second condition and in accordance with a determination that the computer system has detected a user interaction within a predetermined amount of time since the detection of the second occurrence of the second condition provides the user with visual feedback regarding the state of the computer system (e.g., whether the computer system has recently detected a user interaction), which provides improved visual feedback.

In some embodiments, after detecting the occurrence of the second condition (e.g., as described above in relation to 650c, 650j, FIGS. 7B-7C, and 7F), the computer system displays the first user interface (e.g., 602) in the first mode (e.g., as described above in relation to FIGS. 6A, 6E, 6G, 6H, 6L-6N, 6P-6S, and/or 7A). In some embodiments, while displaying the first user interface in the first mode, the computer system detects a third occurrence of the first condition (e.g., as described above in relation to 650a, 650c, 650i, 650s, FIGS. 6E-6F, and/or FIGS. 7A-7B). In some embodiments, in response to detecting the third occurrence of the first condition (e.g., as described above) and in accordance with a determination that the computer system (e.g., 600) is in a low power mode (e.g., the computer system has reduced functionality while the computer system is in the low power mode) (e.g., the computer system reduces background activity while the computer system is in the low power mode) (e.g., the low power mode can be enter automatically (e.g., upon the battery of the computer system being below a threshold or the computer system can prompt the user to enter the low power mode), the computer system transitions (e.g., as described above in relation to FIGS. 6S-6T) the computer system from the first mode to the third mode (e.g., as described above in relation to FIGS. 6D, 6O, 6T, 7C, and 7F). In some embodiments, in response to detecting the occurrence of the first condition and in accordance with a determination that the computer system is not in the low power mode, transitioning the computer system from the first mode to the second mode. In some embodiments, the computer system automatically (e.g., without intervening user input) enters the low power mode when the power level of the computer system is below a threshold level. Transitioning the computer system from the first mode to the third mode in response to detecting an occurrence of the first condition and when prescribed conditions are met (e.g., the computer system is in a low power mode) allows the computer system to automatically manage the illumination of the display of the computer system, to optionally conserve battery power, when the conservation of the computer system's battery is of heightened importance, which performs an operation when a set of conditions has been met.

In some embodiments, the occurrence of the second condition (e.g., as described above in relation to 650c, 650j, FIGS. 7B-7C, and 7F) corresponds to a user input (e.g., an explicit user input (e.g., an input that corresponds to a user's intention to place the computer system in the third mode)) (e.g., a user activation of a hardware control button and/or a hand cover gesture (e.g., a hand cover gesture that covers one or more sensors that are coupled to the computer system). In some embodiments, the computer system (e.g., 600) can only transition to the third mode (e.g., as described above in relation to FIGS. 6D, 6O, 6T, 7C, and 7F) from the second mode (e.g., as described above in relation to FIGS. 6B, 6C, 6F, 6J, 6K, 7B, and/or 7D) (e.g., the computer system cannot transition directly from the first mode to the third mode). In some embodiments, the computer system transitions from the first mode to the second mode in response to detecting an occurrence of the second condition. Transitioning the computer system from the second mode to the third mode in response to detecting a user input provides the user with the ability to manage the display mode of the computer system without displaying additional controls, which provides additional control options without cluttering the user interface with additional displayed controls.

In some embodiments, while the computer system (e.g., 600) is in the second mode (e.g., as described above in relation to FIGS. 6B, 6C, 6F, 6J, 6K, 7B, and/or 7D) or the third mode (e.g., as described above in relation to FIGS. 6D, 6O, 6T, 7C, and 7F), the computer system detects a first request to transition the computer system to the first mode (e.g., as described above in relation to FIGS. 6A, 6E, 6G, 6H, 6L-6N, 6P-6S, and/or 7A) (e.g., the request to transition the computer system to the first mode corresponds to the computer system detecting that the user has raised the computer system and/or the computer system detecting a tap on the display generation component that is in communication with the computer system). In some embodiments, in response to detecting the first request to transition the computer system to the first mode and in accordance with a determination that the computer system is in the second mode, the computer system transitions from the second mode to the first mode. In some embodiments, in response to detecting the first request to transition the computer system to the first mode and in accordance with a determination that the computer system is in the third mode, the computer system transitions the computer system from the third mode to the first mode (e.g., as described above in relation to FIGS. 6D and 6K). Transitioning the computer system from the second mode or the third mode to the first mode in response to detecting the request to transition the computer system to the first mode provides the user with the ability to manage the display mode of the computer system without displaying additional controls, which provides additional control options without cluttering the user interface with additional displayed controls.

In some embodiments, an amount of time (e.g., 15 seconds, 30 seconds, or 1 minute) has elapsed since the computer system (e.g., 600) detected a hand cover gesture (e.g., a gesture (e.g., such as 650*c* and/or 650*j*) that includes the user placing their hand over one or more sensors that are coupled to the computer system). In some embodiments, while the computer system is in the second mode (e.g., as described above in relation to FIGS. 6B, 6C, 6F, 6J, 6K, 7B, and/or 7D) or the third mode (e.g., as described above in relation to FIGS. 6D, 60, 6T, 7C, and 7F), the computer system detects a second request to place the computer system in the first mode (e.g., as described above in relation to FIGS. 6A, 6E, 6G, 6H, 6L-6N, 6P-6S, and/or 7A) (e.g., the request to transition the computer system to the first mode corresponds to the computer system detecting that the user has raised the computer system and/or the computer system detecting a tap on the display generation component that is in communication with the computer system). In some embodiments, in response to detecting the second request to transition the computer system to the first mode and in accordance with a determination that the amount of time is greater than a time threshold (e.g., 15 seconds, 30 seconds, or 1 minute), the computer system transitions to the first mode. In some embodiments, in response to detecting the second request to transition the computer system to the first mode and in accordance with a determination the amount of time is less than the time threshold, the computer system forgoes transitioning the computer system to the first mode (e.g., the computer system is maintained in either the second mode or the third mode). Forgoing the transition of the computer system from the second mode or the third mode to the first mode in response to detecting a second request to transition the computer system when conditions are met (e.g., in accordance with a determination the amount of time is less than the time threshold) allows the computer system to automatically manage (e.g., maintain) the display mode of the computer system when certain conditions are met, which performs an operation when a set of conditions has been met.

In some embodiments, the computer system (e.g., 600) is located in a physical environment. In some embodiments, as a part of transition the computer system from the first mode (e.g., as described above in relation to FIGS. 6A, 6E, 6G, 6H, 6L-6N, 6P-6S, and/or 7A) to the second mode (e.g., as described above in relation to FIGS. 6B, 6C, 6F, 6J, 6K, 7B, and/or 7D), the computer system: in accordance with a determination that the physical environment has a first amount of brightness (e.g., 0.1 lux, 0.3 lux, 0.5 lux, 1 lux, 5 lux, 10 lux, 13 lux, 15 lux, or 20 lux) (e.g., natural brightness or artificial brightness), displays the second user interface (e.g., 602) with a first amount of brightness (e.g., 0.1 lux, 0.3 lux, 0.5 lux, 1 lux, 5 lux, 10 lux, 13 lux, 15 lux, or 20 lux); and in accordance with a determination that the physical environment has a second amount of brightness, that is greater than the first amount of brightness, displays the second user interface with a second amount of brightness that is greater than the first amount of brightness (e.g., the brightness of the display of the computer system while the computer system is in the second mode is dependent at least upon the brightness of the physical environment). In some embodiments, the brightness of the display of the computer system is dynamically updated based on the brightness of the physical environment changing (e.g., the brightness of the computer system changes in real time as the brightness of the physical environment changes (e.g., the dimmer the physical environment is the dimmer the brightness of the computer system). Displaying the second user interface with a first amount of brightness when a first set of conditions are met and displaying the second user interface with a second amount of brightness when a second set of conditions are met, allows the computer system to automatically adjust the brightness of the display of the computer system based on ambient lighting, which performs an operation when a set of conditions has been met without requiring further user input.

Note that details of the processes described above with respect to method 800 (e.g., FIG. 8) are also applicable in an analogous manner to the methods described below. For example, methods 1000 and 1200 optionally includes one or more of the characteristics of the various methods described above with reference to method 800. For example, the method of suppressing the lower power state when the computer system is in a respective mode can be applied to methods 1000 and 1200. For brevity, these details are not repeated below.

FIGS. 9A-9V illustrate exemplary user interfaces for transitioning between display states of a display, in accordance with some embodiments. The user interfaces in these FIGS. are used to illustrate the processes described below, including the processes in FIG. 10.

At FIG. 9A, computer system 600 is in the normal power state and displays wake screen user interface 602 with the light appearance. As described in greater detail above in the discussion of FIG. 6A, wake screen user interface 602 includes battery indicator 608*a*, cellular signal indicator 608*b*, time indicator 618, date indicator 616, row of complications 620, home affordance 622, flashlight affordance 614, and camera affordance 612. For the purposes of the following discussion, wake screen user interface 602 is a first type of user interface (e.g., a respective user interface that includes wallpaper 606) (e.g., a user interface that computer system 600 initially displays after computer system 600 transitions from a sleep state to an active state (e.g., computer system 600 "wakes up")). At FIG. 9A, computer system 600 detects activation 950*a* of hardware control 628 while computer system 600 displays the first type of user interface.

At FIG. 9B1, in response to detecting activation 950*a* of hardware control 628, computer system 600 begins to transition from the normal power state to the low power state. FIG. 9B1 represents a first image of the sequence of images of a first animation that computer system 600 displays as part of transitioning from the normal power state to the low power state. Because computer system 600 was displaying a first type of user interface when computer system 600 detected activation 950*a* of hardware control 628, computer system 600 displays the first animation (e.g., and not a second animation) as part of transitioning from the normal power state to the low power state. In some embodiments, computer system 600 transitions from the normal power state to the low power state in accordance with a determination that a set of one or more criteria are satisfied (e.g., and not in response to the detection of an input).

As described above, wake screen user interface 602 includes wallpaper 606 that includes a visual element (e.g., the depiction of an individual). Wake screen user interface 602 is divided into a foreground portion and a background portion. The foreground portion of wake screen user interface 602 includes the visual element of wallpaper 606 while the background portion of wake screen user interface 602 does not include the visual element of wallpaper 606. At FIG. 9B1, computer system 600 begins to apply a number of visual treatments to wake screen user interface 602 while computer system 600 transitions from the normal power state to the low power state. Because wake screen user interface 602 includes a foreground portion and background portion, the visual treatments modify the visual appearance of the foreground portion of wake screen user interface 602 relative to the background portion of wake screen user interface 602. Both the background portion and the foreground portion of wake screen user interface 602 are modified such that content (e.g., the depiction of the individual) included in the foreground portion of wake screen user interface 602 remains visible.

At FIG. 9B1, as part of the first animation, computer system 600 applies a vignette effect to wake screen user interface 602. Computer system 600 displays the periphery of wake screen user interface 602 with a reduction in brightness and/or saturation in comparison to the center of wake screen user interface 602. Furthermore, as part of displaying the first animation, computer system 600 decreases the saturation of wake screen user interface 602 (e.g., computer system 600 uniformly or non-uniformly decreases the saturation of wake screen user interface 602). Additionally, as part of displaying the first animation, computer system 600 dims the display of home affordance 622 of wake screen user interface 602. In some embodiments, computer system 600 changes the color of time indicator 618 from a first color to a second color a color that has a lower amount of contrast with the modified background of wake screen user interface 602.

At FIG. 9B1, computer system 600 dims both the background portion of wake screen user interface 602 and the foreground portion of wake screen user interface 602. However, during the first animation computer system 600 dims the background portion of wake screen user interface 602 more than the foreground portion of wake screen user interface 602. Dimming the background portion of wake screen user interface 602 more than the foreground portion of wake screen user interface 602 helps maintain the visibility of the visual content that is included in the foreground portion of wake screen user interface 602. Dimming the foreground portion of wake screen user interface 602 less than the background portion of wake screen user interface 602 results in an increase in the contrast between the foreground portion of wake screen user interface 602 and the background portion of wake screen user interface 602. In some embodiments, when wake screen user interface 602 does not have a foreground portion and a background portion, computer system 600 uniformly applies a dimming treatment to wake screen user interface 602.

At FIG. 9B1, the content that is included in the foreground portion of wake screen user interface 602 (e.g., the depiction of the individual) does not overlap with the display of time indicator 618. Computer system 600 shifts the display location of the content in the foreground portion of wake screen user interface 602 relative to time indicator 618 such that the content does not overlap with time indicator 618 during the first animation. In some embodiments, computer system 600 shifts the display location of time indicator 618 such that time indicator does not overlap with the foreground portion of wallpaper 606. In some embodiments, as part of displaying the first animation, computer system 600 reduces the size of the content in the foreground portion of wake screen user interface 602 (e.g., such that the content in the foreground does not overlap with time indicator 618).

At FIG. 9B1, computer system 600 is fading out the display of camera affordance 612, flashlight affordance 614, battery indicator 608a, and cellular signal indicator 608b out of wake screen user interface 602. Accordingly, as illustrated in FIG. 9B, computer system 600 displays camera affordance 612, flashlight affordance 614, battery indicator 608a, and cellular signal indicator 608b with a reduction of brightness (e.g., in comparison to the display of camera affordance 612, flashlight affordance 614, battery indicator 608a and cellular signal indicator 608b at FIG. 9A). In some embodiments, the display of the first animation includes blurring (e.g., visually obscuring) at least one of camera affordance 612, flashlight affordance 614, battery indicator 608a and cellular signal indicator 608b. In some embodiments, during the display of the first animation, computer system 600 marginally reduces the brightness of status information (e.g., time indicator 618, date indicator 616, cellular signal indicator 608b, and/or battery indicator 608a) (e.g., by less than 20%) while computer system 600 significantly reduces (e.g., by more than 50%) the overall brightness of wake screen user interface 602.

FIG. 9B2 represents a second image of the sequence of images of the first animation that computer system 600 displays as part of transitioning from the normal power state to the low power state. Computer system 600 progressively applies the above described visual treatments to wake screen user interface 602 during the duration of the first animation. Accordingly, at FIG. 9B2, the intensity of the effects of the above described visual treatments increases (e.g., in comparison to the intensity of the effects of the visual treatments at FIG. 9B1).

At FIG. 9B2, computer system 600 continues to dim home affordance 622 and computer system 600 continues to dim the foreground portion of wake screen user interface 602 relative to the background portion of wake screen user interface 602. Accordingly, at FIG. 9B2, wake screen user interface 602 has a decreased overall brightness in comparison to wake screen user interface 602 at FIG. 9B1. Continuing to dim the foreground portion of user interface wake screen 602 relative to the background portion of wake screen user interface 602 increases the level of contrast between the foreground portion of wake screen user interface 602 and the background portion of wake screen user interface 602. At FIG. 9B2, computer system 600 continues to shift the visual element of wallpaper 606 away from time indicator 618. Accordingly, at FIG. 9B2, there is more space between time indicator 618 and the visual element of wallpaper 606 (e.g., in comparison to the space between time indicator 618 and the visual element of wall paper 606 at FIG. 9B1).

Furthermore, at FIG. 9B2, computer system 600 continues to fade the display of camera affordance 612, flashlight affordance 614, battery indicator 608a, and cellular signal indicator 608b out of wake screen user interface 602. Accordingly, as illustrated in FIG. 9B2, computer system 600 displays camera affordance 612, flashlight affordance 614, battery indicator 608a, and cellular signal indicator 608b with a reduction of brightness (e.g., in comparison to the display of camera affordance 612, flashlight affordance 614, battery indicator 608a and cellular signal indicator 608b at FIG. 9B1). Additionally, at FIG. 9B2, computer system 600 reduces the thickness of the font of time indicator 618 (e.g., in comparison to the thickness of the font of time indicator at FIG. 9B1).

Figure 9C:

At FIG. 9C, computer system 600 is in the low power state and displays wake screen user interface 602 with the dark appearance. At FIG. 9C, the first animation of the transition of computer system 600 from the normal power state to the low power state is complete. At FIG. 9C, computer system 600 has applied all of the above described visual treatments (e.g., the dimming, vignette effect, desaturation etc.) to wake screen user interface 602.

At FIG. 9C, computer system 600 receives a telecommunication signal that corresponds to an electronic message (e.g., text message). As illustrated at FIG. 9C, in response to receiving the telecommunication signal, computer system 600 displays notification 904 with a light appearance (e.g., the text of notification 904 is black while the background of notification 904 is white) within wake screen user interface 602. Additionally, as illustrated in FIG. 9C, time indicator 618 indicates that the current time is "9:42".

Figures 9D, 9E:
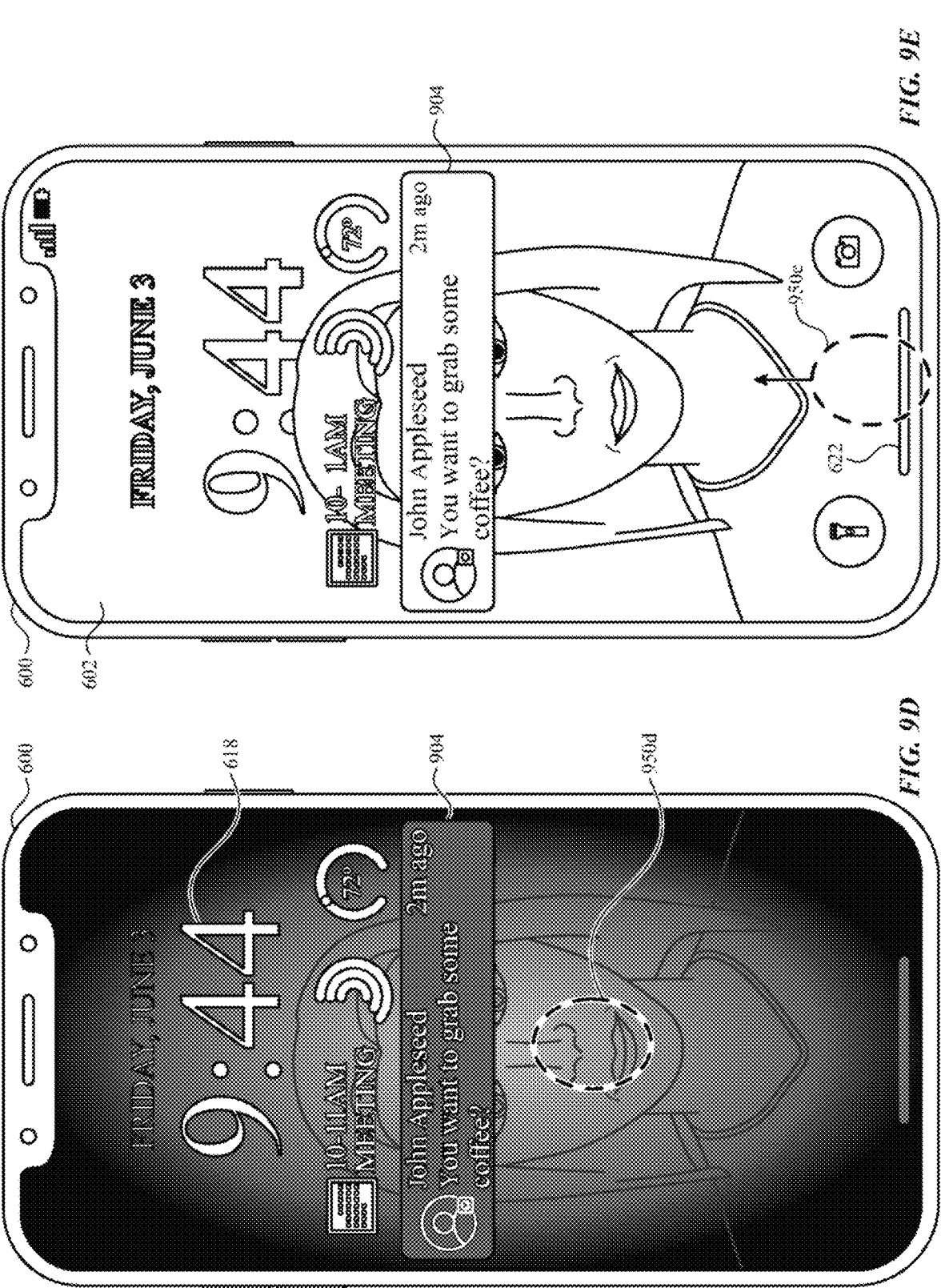

As illustrated in FIG. 9D, time indicator 618 indicates that the current time "9:44". Two minutes have elapsed between FIGS. 9C and 9D. As discussed in greater detail below, because two minutes have elapsed since the initial display of notification 904, computer system 600 transitions the display notification 904 from a light appearance to a dark appearance. The text of notification 904 is white and the background of notification 904 is black when notification 904 is displayed with the dark appearance. At FIG. 9D, computer system 600 remains in the low power state (e.g., computer system 600 does not change power states as a part of changing the visual appearance of notification 904 from the light appearance to the dark appearance). At FIG. 9D, computer system 600 detects tap input 950*d*.

At FIG. 9E, in response to detecting tap input 950*d*, computer system 600 transitions from the low power state to the normal power state and displays wake screen user interface 602 with the light appearance. As a part of transitioning from the low power state to the normal power state, computer system 600 changes the appearance of notification 904 from the dark appearance to the light appearance. As explained above, computer system 600 displays the text of notification 904 as black and the background of notification 904 as white while computer system 600 displays notification 904 with the light appearance. In some embodiments, computer system 600 does not change the appearance of notification 904 from the dark appearance to the light appearance as a part of transitioning from low power state to the normal power state. At FIG. 9E, while computer system 600 is in the normal power state, computer system 600 detects swipe gesture 950*e* that corresponds to selection of home affordance 622. In some embodiments, computer system 600 transitions from the low power state to the normal power state in accordance with a determination that a set of one or more criteria are satisfied (e.g., and not in response to the detection of an input).

Figures 9F, 9G:
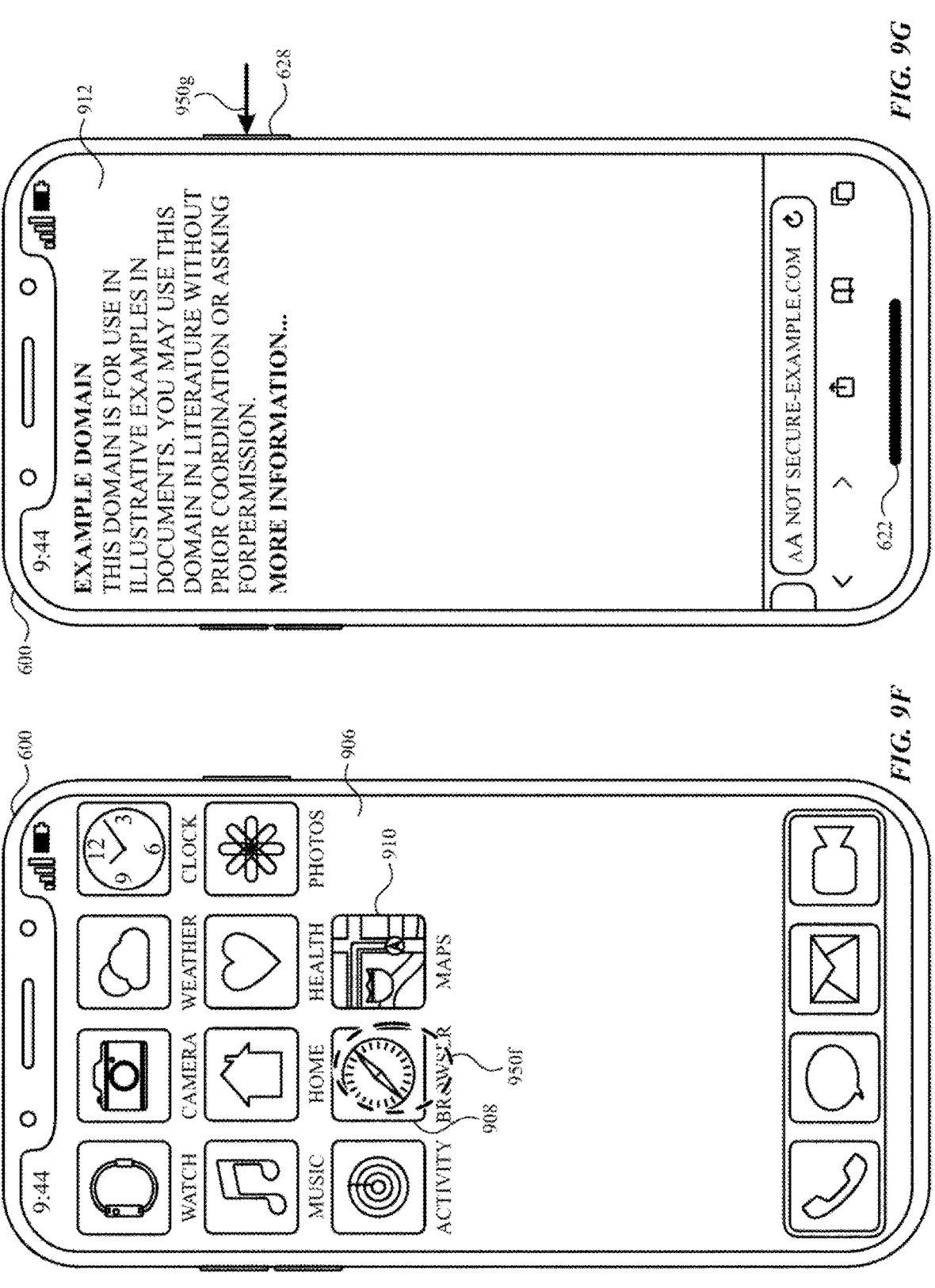

As illustrated in FIG. 9F, in response to detecting swipe gesture 950*e* that corresponds to selection of home affordance 622, computer system 600 displays home screen user interface 906. Home screen user interface 906 includes a number of application icons where each respective application icon corresponds to an application that is installed on computer system 600. As illustrated in FIG. 9F, home screen user interface 906 includes map application icon 910 and internet browser application icon 908. Map application icon 910 corresponds to a map application that is installed on computer system 600 and internet browser application icon

908 corresponds to an internet browser that is installed on computer system 600. At FIG. 6F, computer system 600 detects tap input 950*f* that corresponds to selection of internet browser application icon 908.

As illustrated in FIG. 9G, in response to detecting tap input 950*f*, computer system 600 displays web page user interface 912. Web page user interface 912 corresponds to a respective webpage of a respective website. Web page user interface 912 is a different type of user interface (e.g., a user interface that does not include wake screen user interface 602) (e.g., a web-based user interface) (e.g., a user interface that corresponds to an application that is installed on computer system 600) than wake screen user interface 602. As illustrated at FIG. 9G, computer system 600 displays home affordance 622 with a black color while computer system 600 displays web page user interface 912. At FIG. 9G, home affordance 622 is darker than the background of web page user interface 912. At FIG. 9H, computer system 600 detects activation 950*h* of hardware control 628 while computer system 600 displays the second type of user interface.

Figures 9H, 9I:
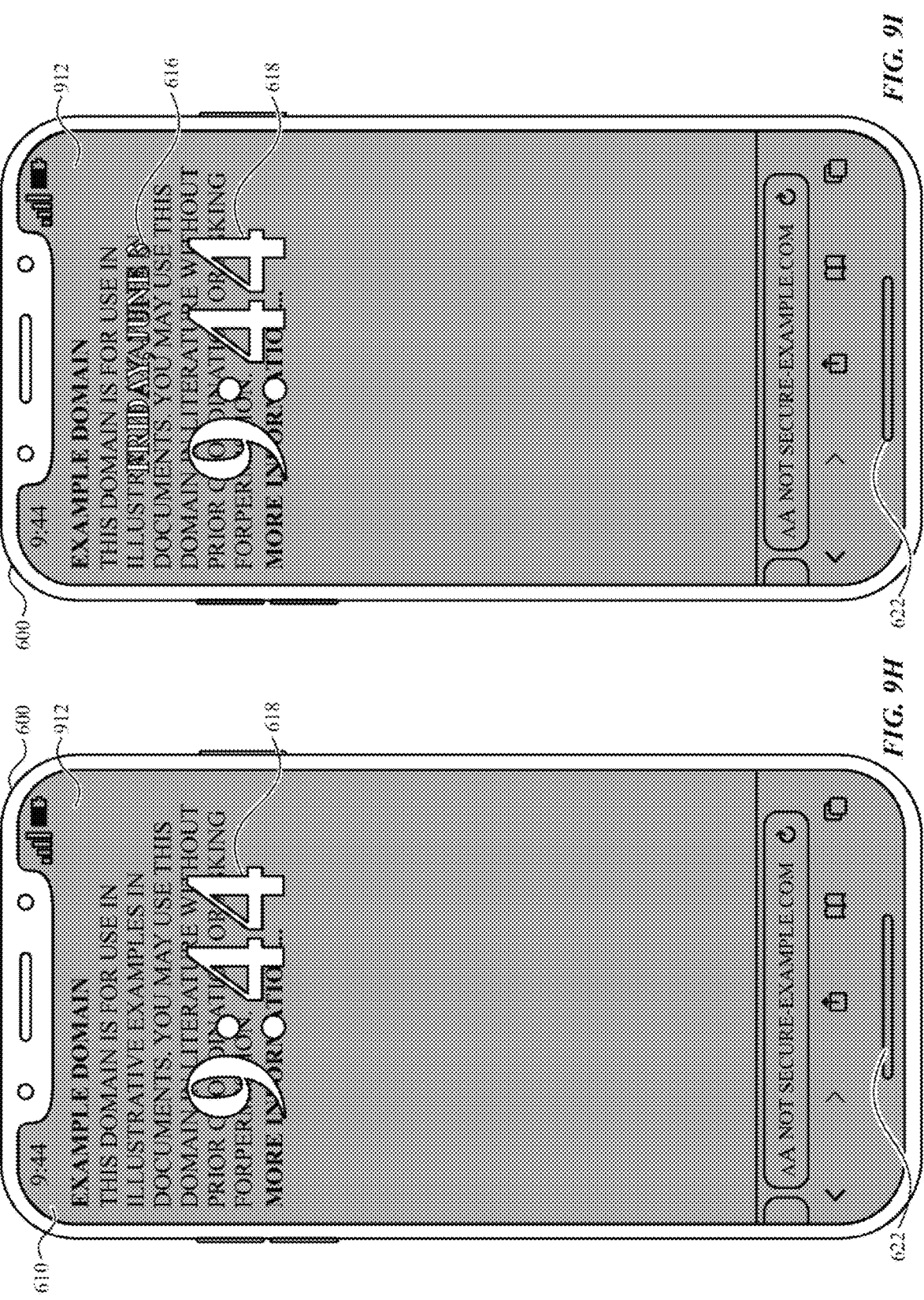

At FIG. 9H, in response to detecting activation 950*h* of hardware control 628, computer system 600 begins to transition from the low power state to the normal power state. At FIG. 9H, a determination is made that computer system 600 is displaying a second type of user interface when computer system 600 detects activation 950*h* of hardware control 628. Because a determination is made that computer system 600 is displaying a second type of user interface when computer system 600 detects activation 950*h* of hardware control 628, computer system 600 displays a second animation, that is different from the first animation (e.g., as described above), as part of transitioning from the normal power state to the low power state. In some embodiments, the second animation spans over a larger period of time than the first animation. In some embodiments, the second animation includes a different number of images (e.g., more or less) than the first animation.

FIG. 9H represents a first image of the second animation. At FIG. 9H, as part of displaying the second animation, computer system 600 dims the display of home affordance 622 and uniformly dims the display of web page user interface 912. While computer system 600 displays home affordance 622 and web page user interface 912 as dimmed, computer system 600 displays time indicator 618 (e.g., computer system 600 displays time indicator 618 as fading in). During the second animation, computer system 600 displays the various system elements (e.g., time indicator 618, date indicator, row of complications 620, and wallpaper 606) as sequentially (e.g., one at a time) fading in over a sequence of images of the second animation. In some embodiments, computer system 600 displays time indicator 618 before dimming home affordance 622 and web page user interface 912.

FIG. 9I represents a second image of the second animation. At FIG. 9I, computer system 600 maintains the dimmed display of web page user interface 912 and home affordance 622. As illustrated in FIG. 9I, computer system 600 maintains the display of time indicator 618. At FIG. 9I, computer system 600 displays date indicator 616 as fading in while computer system 600 displays time indicator 618, web page user interface 912, and home affordance 622. In some embodiments, computer system 600 displays date indicator 616 as fading in faster than the display of time indicator 619 fading in. In some embodiments, computer system 600 changes the display location of time indicator 618 as a part of displaying date indicator 616 fading in.

Figures 9J, 9K:
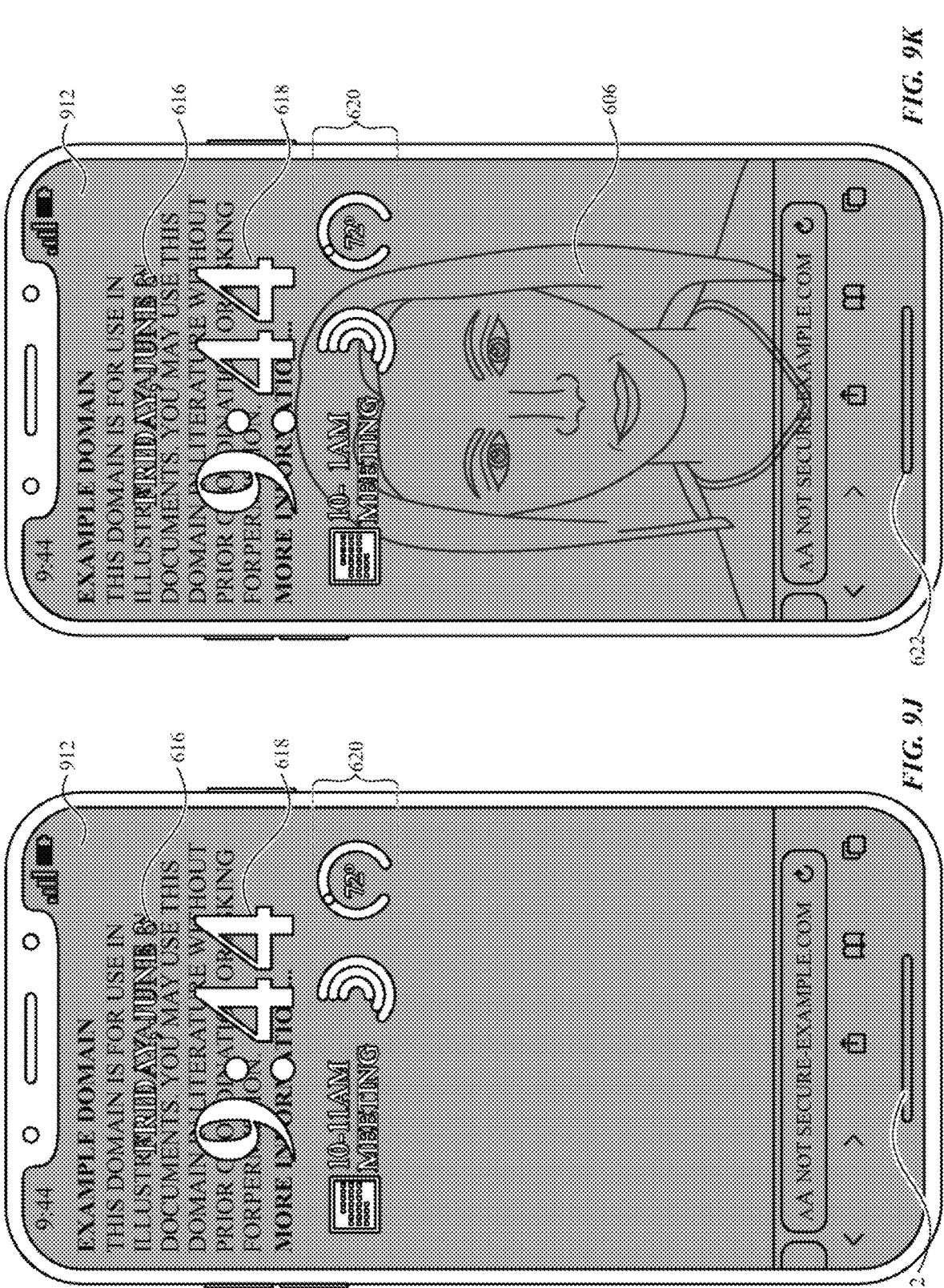
Figure 9N:
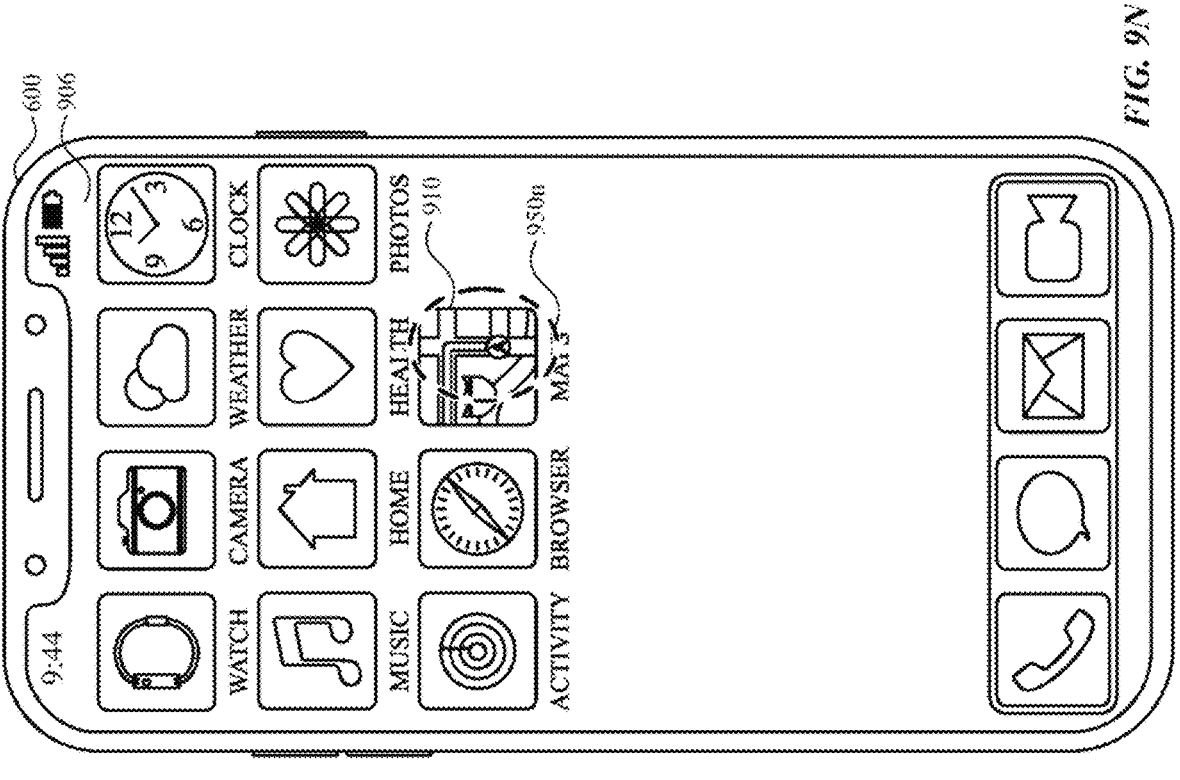

FIG. 9J represents a third image of the second animation. As illustrated in FIG. 9J, computer system 600 maintains the dimmed display of web page user interface 912 and home affordance 622. Additionally, as illustrated in FIG. 9J, computer system 600 maintains the display of date indicator 616 and time indicator 618. At FIG. 9J, computer system 600 displays row of complications 620 as fading in while computer system 600 displays time indicator 618, web page user interface 912, home affordance 622, and date indicator 616. In some embodiments, computer system 600 displays each respective complication in row of complications 620 as fading in at the same time. In some embodiments, computer system 600 displays each respective complication in row of complications 620 as individually fading in.

FIG. 9K represents a fourth image of the second animation. As illustrated in FIG. 9K, computer system 600 maintains the dimmed display of web page user interface 912 and home affordance 622. Additionally, as illustrated in FIG. 9K, computer system 600 maintains the display of date indicator 616, time indicator 618 and row of complications 620. At FIG. 9K, computer system 600 displays wallpaper 606 as fading in while computer system 600 displays row of complications 620, time indicator 618, date indicator 616, and web page user interface 912. In some embodiments, computer system 600 initially displays the content that is included in wallpaper 606 as overlapping date indicator 616 and/or time indicator 618 and computer system 600 shifts the display location of the content included in wallpaper 606 as computer system 600 displays wallpaper 606 as fading in.

FIG. 9L1 represents a fifth image of the second animation. At FIG. 9L1, computer system 600 ceases display of web page user interface 912 and displays wake screen user interface 602. During the second animation computer system 600 applies the various visual treatments (e.g., the vignette effect, the desaturation, dimming of wake screen user interface 602) as described above in relation to FIGS. 9B1 and 9B2 to wake screen user interface 602. Computer system 600 progressively applies the visual treatments during the duration of the second animation (e.g., the effects of the visual treatments get more pronounced as the second animation progresses) to wake screen user interface 602. At FIG. 9L1, computer system begins to dim wake screen user interface 602 and apply the vignette effect to wake screen user interface 602.

At FIG. 9L1, as part of displaying the second animation, computer system 600 fades out the display battery indicator 608a and cellular signal indicator 608b. Further, at FIG. 9L1, computer system 600 reduces the thickness of the font of time indicator 618 (e.g., in comparison to the thickness of the font of time indicator at FIG. 9K). In some embodiments, computer system 600 applies the various visual treatments to wake screen user interface 602 at the conclusion of the second animation. In some embodiments, computer system 600 applies the various visual treatments in a predetermined order. In some embodiments, computer system 600 applies the various visual treatments at random. In some embodiments, computer system 600 applies the various visual treatments at various stages of the second animation.

At FIG. 9L2, computer system 600 has completed the transition from the normal power state to the low power state and displays wake screen user interface 602 with the dark appearance. As illustrated in FIG. 9L2, computer system 600 displays home affordance 622 with a color that is brighter than the overall brightness of wake screen user interface 602. That is, during the second animation, computer system 600 transitions the color of home affordance 622 from having an appearance that is darker than the background of web page user interface 912 to a color that is lighter than the background of wake screen user interface 602. In some embodiments, before displaying the final image of the second animation, computer system 600 displays wake screen user interface 602 with an elevated amount of brightness before dimming the brightness of wake screen user interface 602. The above description of the second animation is exemplary and non-limiting. In some embodiments, computer system 600 displays the sequence of row of complications 620, time indicator 618, web page user interface 912, date indicator 616, wallpaper 606 as fading in a different order than the order shown in FIGS. 9H-9L1. In some embodiments, computer system 600 displays two or more of row of complications 620, time indicator 618, date indicator 616, wallpaper 606 as fading in at the same time. In some embodiments, computer system 600 ceases the display of web page user interface 912 before displaying any user interface elements as fading in. At FIG. 9L2, computer system 600 detects tap input 9501 while computer system 600 is in the low power state. It should be noted that the illustrated stage of the transition from FIG. 9L1 to FIG. 9L2 is the same as the illustrated stage of the transition from FIG. 9B1 to FIG. 9B2, even though in FIGS. 9L1-9L2, the device is transitioning to the low power state from an application and in FIGS. 9B1-9B2 the device is transitioning to the low power state from the wake screen. In some embodiments this stage of the transition to a low power state is consistent when transitioning to the low power state from a plurality of different user interfaces (e.g., different applications, and/or different system user interfaces such as a home screen with one or more application icons and/or widgets, a system control user interface, or a notification user interface).

Figure 9M:
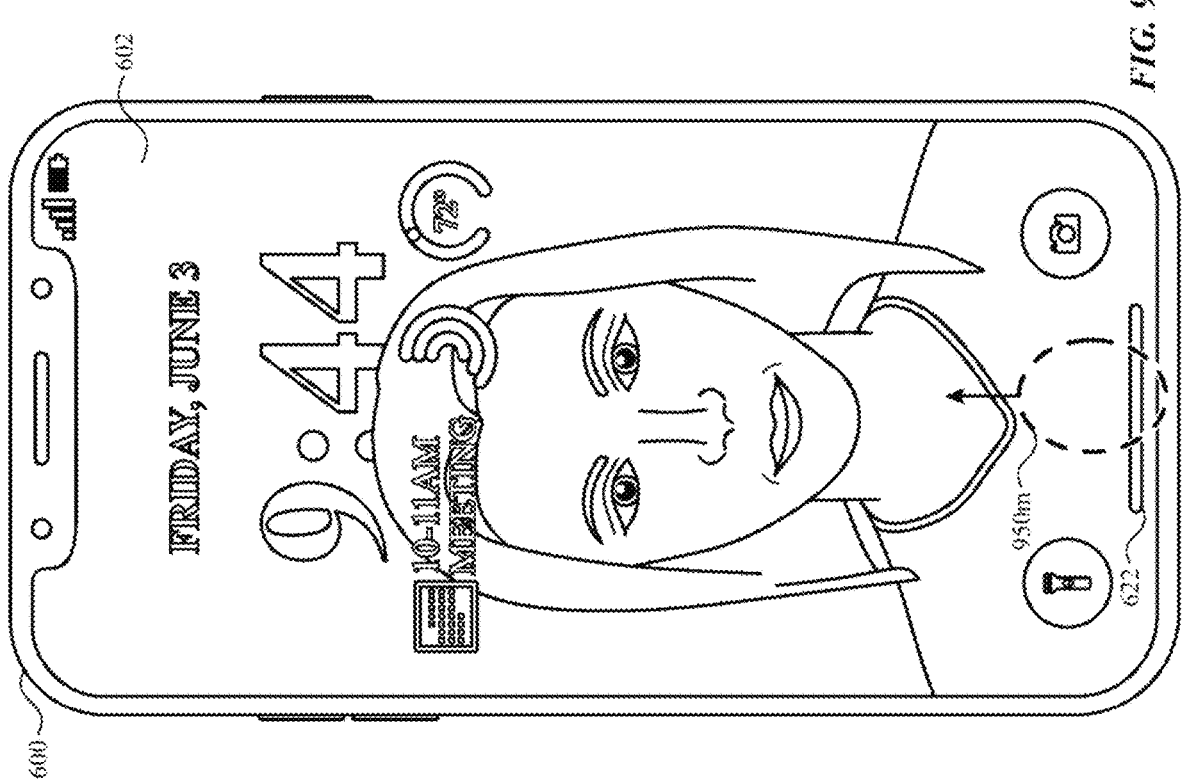

At FIG. 9M, in response to detecting tap input 9501, computer system 600 transitions from the low power state to the normal power state and displays wake screen user interface 602 with the light appearance. At FIG. 9M, computer system 600 detects swipe gesture 950m that corresponds to selection of home affordance 622. In some embodiments, computer system 600 transitions from the low power state to the normal power state in accordance with a determination that a set of one or more criteria are satisfied (e.g., and not in response to the detection of an input).

At FIG. 9N, in response to detecting swipe gesture 950m, computer system 600 displays home screen user interface 906. At FIG. 9N, computer system 600 detects tap input 950n that corresponds to selection of map application icon 910.

Figures 9O, 9P:
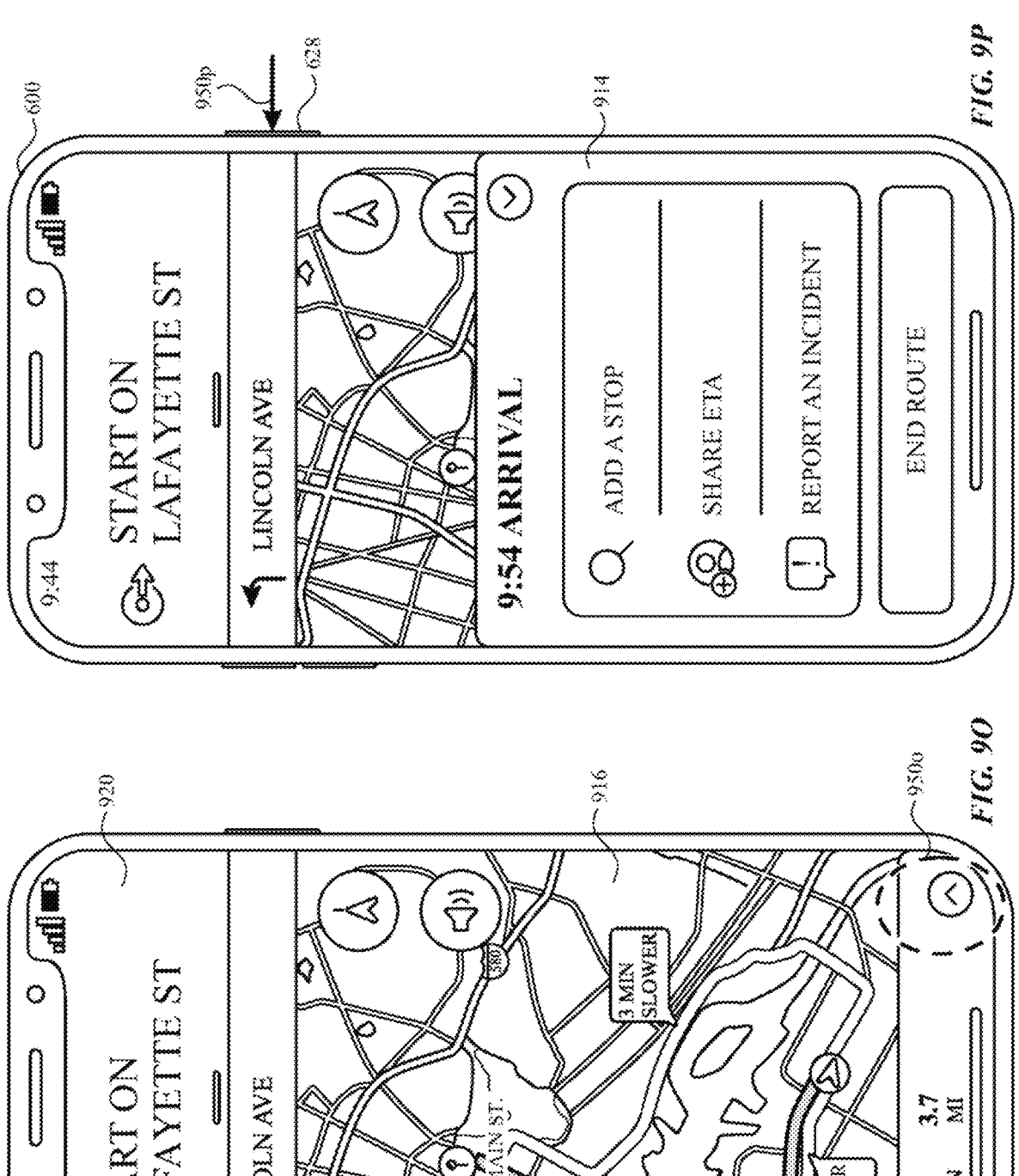

At FIG. 9O, in response to detecting tap input 950n, computer system 600 displays map user interface 920 that corresponds to a map application that is installed on computer system 600. Computer system 600 uses a GPS signal to display turn by turn directions 916 on maps user interface 920. Turn by turn directions 916 includes a real-time representation of the location of computer system 600. As illustrated in FIG. 9O, computer system 600 displays navigation information user interface 914 as part of maps user interface 920. Navigation information user interface 914 includes various information regarding the turn by turn directions such as, the estimated time of arrival, how long the trip will take, and how far the destination is from computer system 600. At FIG. 9O, computer system 600 detects tap input 950o on navigation information user interface 914 while computer system is in the normal power state.

At FIG. 9P, in response to detecting tap input 950o on navigation information user interface 914, computer system 600 expands the display of navigation information user interface 914. The expanded version of navigation information user interface 914 provides the user with additional options such as adding a stop along to the route and/or sharing the estimated time of arrival of the user with an individual. At FIG. 9P, computer system 600 is in the normal power state. At FIG. 9P, computer system 600 detects activation 950*p* of hardware control 628 while computer system 600 is in the normal power state.

Figures 9Q, 9R:
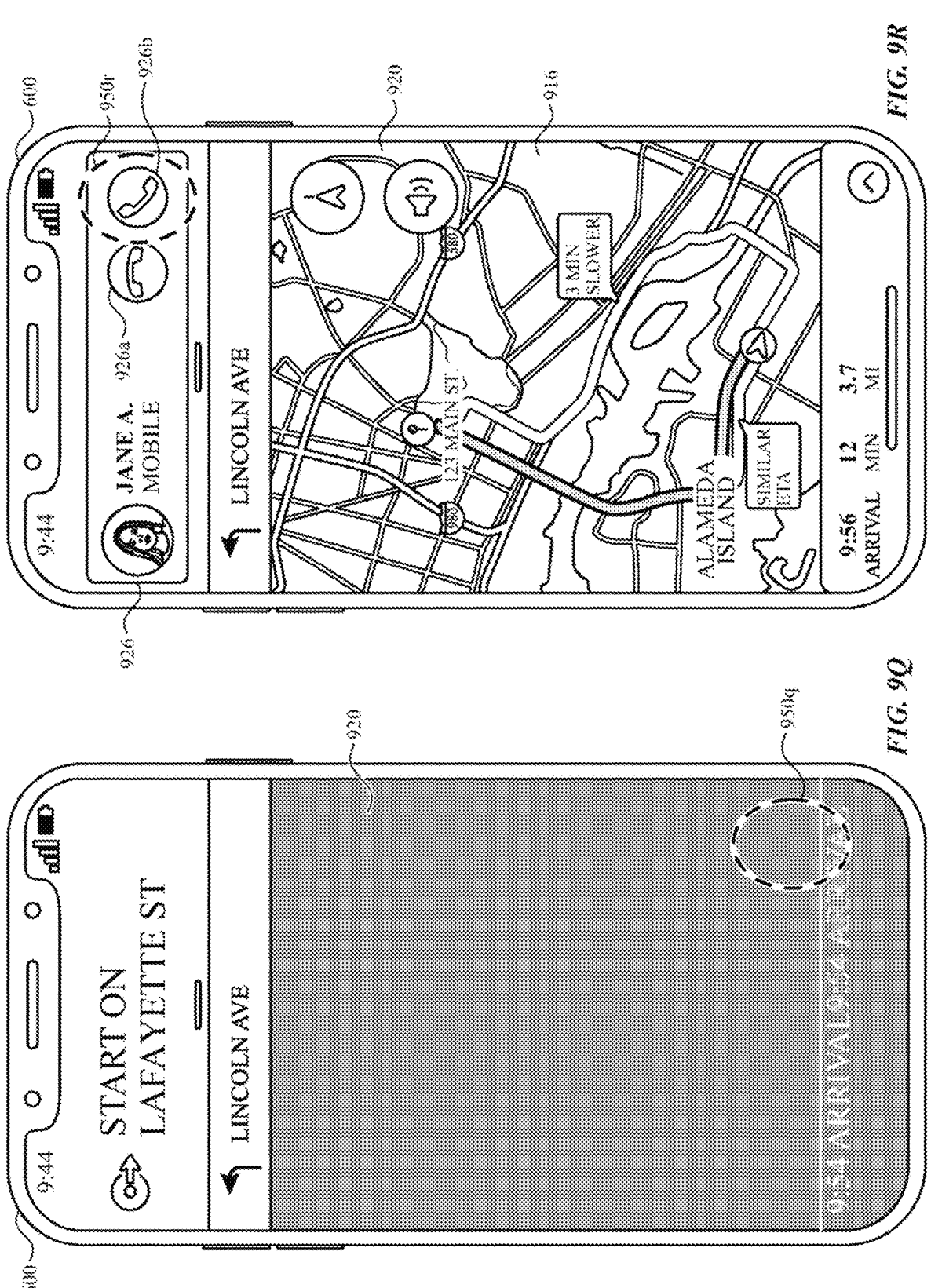

At FIG. 9Q, in response to detecting activation 950*p* of hardware control 628, computer system 600 transitions from the normal power state to the low power state. At FIG. 9Q, a determination is made that the maps application has a low power state (e.g., the maps application has limited functionality while computer system is in the low power state). Because a determination is made that the maps application has a low power state, computer system 600 displays maps user interface 920 in a low power state (e.g., instead of displaying the second animation as discussed above).

At in FIG. 9Q, as a part of displaying maps user interface 920 in the low power state, computer system 600 visually obscures (e.g., blurs and/or dims) turn by turn directions 916 that were previously displayed at FIG. 9P. Computer system 600 visually obscures high fidelity information (e.g., information that is updated at a high frequency or that needs to be updated at a high frequency to ensure accuracy of the information) (e.g., the real-time location of computer system 600) that has reduced accuracy while computer system 600 displays maps user interface in the low power state. As illustrated in FIG. 9Q, computer system 600 maintains the brightness of important information (e.g., the estimated time of arrival) that remains accurate while computer system 600 displays maps user interface 920 in the low power state (e.g., when updated at a low frequency). In some embodiments, in accordance with a determination that the maps application has a dark mode (e.g., a mode in which the computer system 600 displays user interface elements with a reduced overall luminance (e.g., in comparison to the normal display mode), optionally by reducing a brightness of the background of a respective user interface and/or optionally inverting light/dark contrast relationships between content (e.g., text)) computer system 600 displays map user interface 920 in the dark mode. In some embodiments, when a determination is made that a respective application does not have a low power state, computer system 600 displays the second animation (e.g., as described above in relation to FIGS. 9H-9L) (e.g., the animation that results in the display of wake screen user interface 602) in response to detecting activation 950*p* of hardware control 628 while computer system 600 displays a respective user interface from the respective application. At FIG. 9Q, computer system 600 detects tap input 950*q* while computer system 600 is in the low power state.

At FIG. 9R, in response to detecting tap input 950*q*, computer system 600 transitions from the low power state to the normal power state and displays map user interface 920 in its normal state. At FIG. 9R, because computer system 600 is in the normal power state, computer system 600 does not visually obscure hi-fidelity information such as turn by turn navigation directions 916.

At FIG. 9R a determination is made that computer system 600 is receiving a request to connect with an external device (e.g., computer system 600 is receiving a phone call). Because a determination is made that computer system 600 is receiving a phone call, computer system 600 displays phone call notification 926. As illustrated in FIG. 9R, phone call notification 926 includes decline affordance 926*a* and accept affordance 926*b*. At FIG. 9R, computer system 600 detects tap input 950*r* that corresponds to selection of accept affordance.

Figures 9S, 9T:
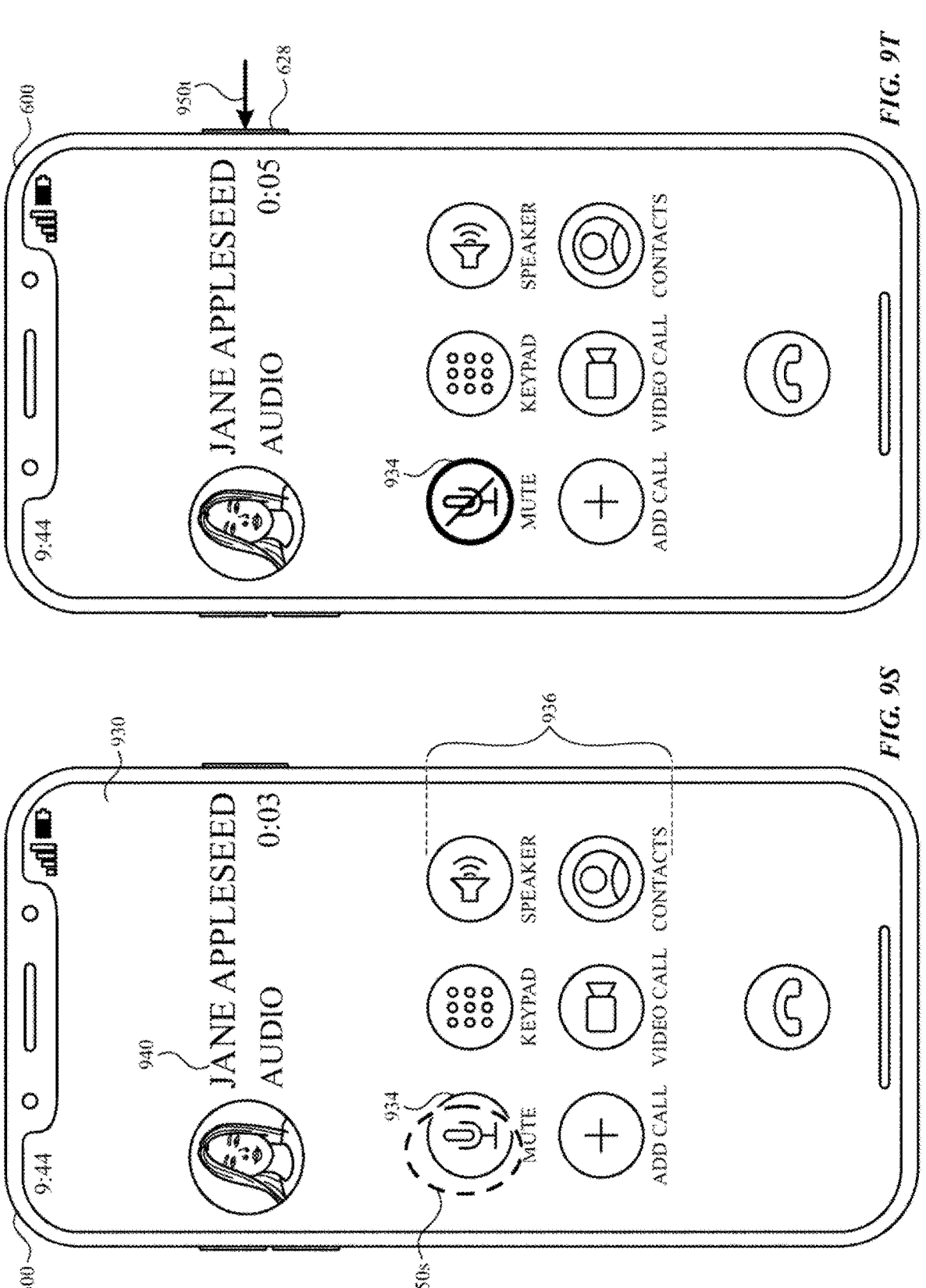
Figures 9U, 9V:
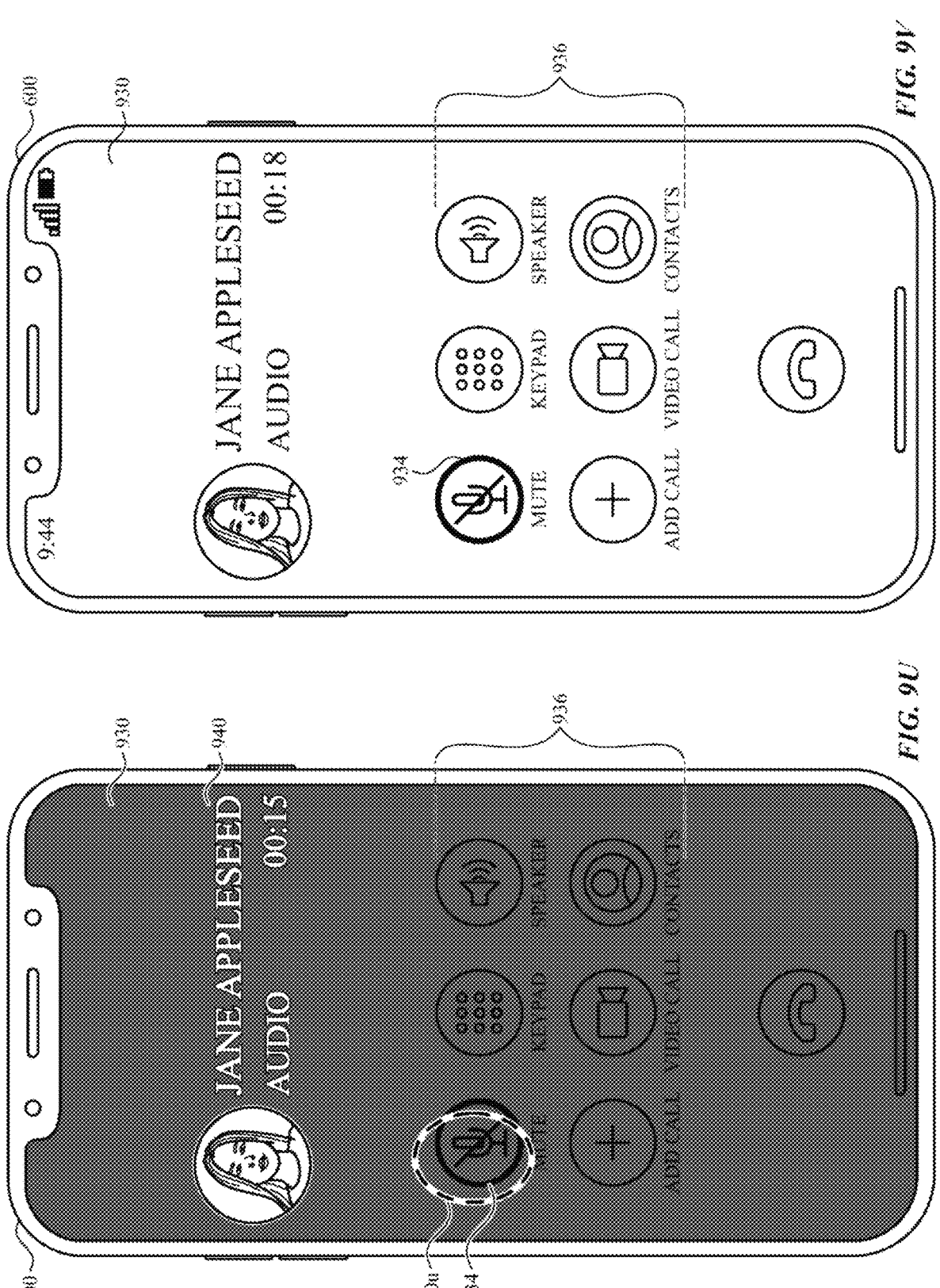
Figure 1I:
Figure 1I:

At FIG. 9S, in response to detecting tap input 950*r*, computer system 600 accepts the request to connect with the external device and displays phone call user interface 930. Phone call user interface 930 is associated with a telephone application that is installed on computer system 600. As illustrated in FIG. 9S, phone call user interface 930 includes contact information 940. Contact information 940 includes a representation of an individual that is associated with the external device that is connected to computer system 600 (e.g., who owns the external device). Additionally, as illustrated in FIG. 9S, phone call user interface 930 displays group of phone call affordances 936. Each respective affordance in group of phone call affordances 936 corresponds to a respective phone call function. Computer system 600 performs a respective function in response to detecting an input on a respective affordance that is included in group of phone call affordances 936. As illustrated in FIG. 9S, group of phone call affordances 936 includes mute affordance 934. At FIG. 9S, computer system 600 detects tap input 950*s* that corresponds to selection of mute affordance 934.

At FIG. 9T, in response to detecting tap input 950*s*, computer system 600 enters a mute mode. Computer system 600 suppresses the transmission of audio data to the external device (e.g., computer system 600 deactivates one or more microphones of computer system 600) while in the mute mode. As illustrated in FIG. 9T, while computer system 600 is in the mute mode, computer system 600 displays mute affordance 934 as bolded. At FIG. 9T, computer system 600 is in the normal power state. At FIG. 9T, computer system 600 detects activation 950*t* of hardware control 628.

At FIG. 9U, in response to detecting activation 950*t* of hardware control 628, computer system 600 transitions from the normal power state to the low power state. Additionally, at FIG. 9U, a determination is made that the phone application has a low power state. Because a determination is made that the phone application has a low power state, computer system 600 displays phone call user interface 930 in the low power state (e.g., instead of displaying the second animation as discussed above). As illustrated in FIG. 9U, computer system displays phone call user interface 930 with a reduced overall brightness (e.g., in comparison to phone call user interface at FIG. 9T) while computer system 600 displays phone call user interface 930 in the low power state. In some embodiments, computer system 600 transitions from the normal power state to the low power state in accordance with a determination that a set of one or more criteria are satisfied (e.g., and not in response to the detection of an input).

As illustrated in FIG. 9U, while computer system 600 displays phone call user interface 930 in the low power state, computer system 600 displays each respective affordance in group of phone call affordances 936 with a reduced brightness and computer system 600 maintains the brightness of contact information 940. None of the respective affordances that are included in group of affordances 936 can be selected while computer system 600 displays group of phone call affordances 936 with the reduced brightness. In some embodiments, computer system 600 displays each affordance in group of phone call affordances 936 with a blurred visual appearance while phone call user interface 930 is displayed in the low power state. In some embodiments, computer system 600 ceases to display each respective affordance in group of phone call affordances 936 while computer system 600 displays phone call user interface 930 win the low power state. At FIG. 9U, while computer system is in the low power state, computer system 600 detects tap input 950*u* at the display location of mute affordance 934.

At FIG. 9V, in response to detecting tap input 950*u*, computer system 600 transitions from the low power state to the normal power state. At FIG. 9V, because computer system 600 is not in the low power state, computer system 600 displays phone call user interface 930 at its normal brightness. As illustrated in FIG. 9V, computer system 600 displays mute affordance 934 as activated (e.g., computer system 600 displays mute affordance 934 as bolded). Because computer system 600 was in the low power state when computer system 600 detected tap input 950*u* at the display location of mute affordance 934, tap input 950*u* does not correspond to a selection of mute affordance 934.

FIG. 10 is a flow diagram illustrating a method for transitioning between display states of a display using a computer system in accordance with some embodiments. Method 1000 is performed at a computer system (e.g., 100, 300, 500) that is in communication with a display generation component. Some operations in method 1000 are, optionally, combined, the orders of some operations are, optionally, changed, and some operations are, optionally, omitted.

As described below, method 1000 provides an intuitive way for transitioning between display states of a display. The method reduces the cognitive burden on a user for transitioning between display states of a display, thereby creating a more efficient human-machine interface. For battery-operated computing devices, enabling a user to transition between display states of a display faster and more efficiently conserves power and increases the time between battery charges.

The computer system (e.g., 600) displays (1002), via the display generation component (e.g., 610), a first user interface (e.g., 602, 912, 920, and/or 930) (e.g., a user interface that corresponds to an application that is installed on the computer system by the manufacturer of the computer system (e.g., a home screen or a wake screen of the operating system of the computer system) or a user interface that corresponds to another application such as a third party application installed on the computer system).

While the first user interface (e.g., 602, 912, 920, and/or 930) is displayed and while the computer system (e.g., 600) is in a first mode (e.g., as described above in relation to FIGS. 9A, 9E, 9G, 9O, 9R, 9S, and/or 9V) (e.g., a higher power consumption mode (e.g., a mode that corresponds to higher power consumption than a lower power consumption mode) (e.g., a mode that corresponds to a brighter display, increased performance, and/or more frequent display updates)), the computer system detects (1004) the occurrence of a condition (e.g., as described in relation to 950*a*, 950*g*, 950*p*, and/or 950*t*) (e.g., the occurrence of the condition is indicative of reduced user activity or reduced user interaction with the computer system (e.g., the lapse of a predetermined amount of time (e.g., 5 seconds, 25 seconds, or 45 seconds) during which the computer system detects no user interaction) (e.g., detecting an input (e.g., a tap gesture, a swipe input, an input on a hardware button that is coupled to the computer system, and/or a hand cover).

In response to (1006) detecting the occurrence of the condition (e.g., as described in relation to 950*a*, 950*g*, 950*p*, and/or 950*t*) and in accordance with a determination that the first user interface (e.g., 602, 912, 920, and/or 930) corresponds to a first type of user interface (e.g., 602) (e.g., a user interface that corresponds to a wake user interface (e.g., a user interface that the computer system initially displays after the computer system transitions from a sleep state to a wake state) of the computer system), the computer system (e.g., 600) transitions (1008) from the first mode (e.g., as described above in relation to FIGS. 9A, 9E, 9G, 9O, 9R, 9S, and/or 9V) to a second mode (e.g., as described above in relation to FIGS. 9H-9L, 9Q, and/or 9U) which is a lower power consumption mode for the display generation component (e.g., 610) of the computer system than the first mode (e.g., a lower power consumption mode (e.g., lower power consumption in the second mode than in the first mode)) (e.g., a second brightness that is less than the brightness of the first mode). As a part of transitioning the computer system from the first mode to the second mode, the computer system displays, via the display generation component, a first animation (e.g., as discussed above in relation to FIGS. 9A-9E) (e.g., an animation that includes reducing the brightness of the display of the computer system) (e.g., an animation that includes fading out the first user interface and/or fading in the second user interface) (e.g., an animation that includes ceasing to display a subset of user interface objects that is included in the first user interface) (e.g., an animation that includes changing the appearance of user interface objects that are included in the first user interface) that results in the display of a second user interface (e.g., 912, 920, and/or 930) in the second mode (e.g., a dimmed version of the wake screen of the computer system) (e.g., the second user interface is displayed while the computer system is in the second mode) (e.g., the first user interface is not displayed while the second user interface is displayed).

In response to (1006) detecting the occurrence of the condition (e.g., as described in relation to 950*a*, 950*g*, 950*p*, and/or 950*t*) and in accordance with a determination that the first user interface (e.g., 602, 912, 920, and/or 930) corresponds to a second type of user interface (e.g., 912, 920, and/or 930) (e.g., a user interface that corresponds to an application (e.g., an application that is installed on the computer system by the manufacturer of the computer system (e.g., an application that corresponds to the operating system of the computer system) and/or a third-party application that is installed on the computer system)), the computer system (e.g., 600) transitions (1010) from the first mode (e.g., as described above in relation to FIGS. 9A, 9E, 9G, 9O, 9R, 9S, and/or 9V) to the second mode (e.g., as described above in relation to FIGS. 9H-9L, 9Q, and/or 9U). As a part of transitioning the computer system from the first mode to the second mode, the computer system displays, via the display generation component (e.g., 610), a second animation (e.g., as discussed above in relation to FIGS. 9H-9K, 9Q, and/or 9U) (e.g., an animation that includes fading out the first user interface and/or fading in the second user interface) (e.g., the second animation includes overlaying the second user interface on top of the first user interface (e.g., a portion of the first user interface and the second user interface are concurrently displayed during the duration of the second animation) for a duration of the second animation) different from the first animation, that results in the display of the second user interface in the second mode. In some embodiments, the duration (e.g., 0.02, 0.05, 0.1, 0.2, 0.5, 1, 3, or 5 seconds) of the display first animation and the duration of the display of the second animation are the same. In some embodiments, the duration of the display of the first animation is shorter than the duration of the display of the second animation. In some embodiments, duration of the display of the first animation is longer than the duration of the display of the second animation. In some embodiments, transitioning the computer system from the first mode to the second mode also includes placing the computer system into a locked state (e.g., a state where the functionality of the computer system is limited). In some embodiments, displaying the first user interface includes displaying a first set of user interface objects and displaying the second user interface includes displaying the first set of user interface objects. In some embodiments, displaying the second user interface includes displaying a subset of user interface objects that are included in the display of the first user interface. In some embodiments, the first animation includes a first portion and a second portion and the second animation includes a first portion and a second portion and the first portion of the first animation is different from the first portion of the second animation (e.g., as illustrated in FIGS. 9A-9B1 and FIGS. 9G-9K) while the second portion of the first animation is the same as the second portion of the second animation (e.g., as illustrated in FIGS. 9B1-9B2 and FIGS. 9L1-9L2). Displaying a first animation or a second animation that results in the display of a second user interface in the second mode in response to detecting the occurrence of the condition when conditions are met allows the computer system to automatically manage the sequence of images that are displayed as part of the computer system transitioning from the first mode to the second mode, which performs an operation when a set of conditions are met. Displaying a first animation or second animation that results in the display of the second user interface provides the user with visual feedback regarding the state of the computer system (e.g., the computer system has detected the occurrence of the condition), which provides improved visual feedback.

As a part of displaying the first animation (e.g., as discussed above in relation to FIGS. 9A-9C), the computer system darkens (e.g., non-uniform darkening) a first wallpaper (e.g., a visual element (still photo and/or animation) that is displayed in the background of the first user interface and/or the second user interface) and displaying the second animation (e.g., as discussed above in relation to FIGS. 9H-9L2, 9Q, and/or 9U) includes darkening the first wallpaper. In some embodiments, the degree at which the first wallpaper is darkened is the same in the first animation and the second animation. In some embodiments, the first wallpaper is darkened more during the first animation than the second animation. In some embodiments, the first wallpaper is darkened more during the second animation than the first animation. In some embodiments, first wallpaper is darkened non-uniformly. Darkening the first wallpaper as a part of transitioning the computer system from the first mode to the second mode provides the user with visual feedback regarding the present operating mode of the computer system (e.g., whether the computer system is in the first mode or second mode), which provides improved visual feedback.

As a part of displaying the second animation (e.g., as discussed above in relation to FIGS. 9H-9L2, 9Q, and/or 9U), the computer system displays the second user interface (e.g., 912, 920, and/or 930) at a first brightness level (e.g., average brightness) (e.g., 0.3 lux, 0.5 lux, 1 lux, 5 lux, 10 lux, 13 lux, 15 lux, or 20 lux) before displaying the second user interface at a second brightness level. In some embodiments, the first brightness level is greater than the second brightness level (e.g., the second user interface is displayed at the second brightness level at the conclusion of the second animation). In some embodiments, the first brightness level is the same brightness level of the display of the second type of user interface when the computer system is in the first mode. In some embodiments, the first brightness level is the greater than the brightness level of the display of the second type of user interface when the computer system is in the first mode. Displaying the second user interface at a first brightness level before displaying the second user interface at a second brightness level as part of transitioning the computer system from the first mode to the second mode when certain conditions are met (e.g., in accordance with a determination that the first user interface corresponds to a second type of user interface) allows the computer system to automatically dim the display of the second user interface, to optionally conserve battery power, which performs an operation when a set of conditions has been met.

In some embodiments, the first user interface (e.g., 602, 912, 920, and/or 930) includes a first set of one or more system elements (e.g., 616, 618, and/or 620) (e.g., selectable lock screen controls and/or status information (e.g., information relating to the state of the computer system and/or information relating to the date and/or time)). In some embodiments, as a part of displaying the first animation (e.g., as discussed above in relation to FIGS. 9A-9E), the computer system visually blurs the one or more system elements (e.g., the one or more system elements are displayed as blurred in the second user interface at the conclusion of the first animation) (e.g., the system elements are not selectable while the system elements are displayed as visually blurred). In some embodiments, blurring the first set of one or more system elements includes blurring less than all of the system elements that are included in the first type of user interface. In some embodiments, the first set of one or more system elements ceases to be displayed as blurred in response to the computer system detecting an input (e.g., a user input on the surface of the display generation component and/or a selection of a hardware button that is coupled to the computer system). In some embodiments, blurring the one or more system elements causes the one or more system elements to cease to be displayed. Visually blurring the one or more system elements when prescribed conditions are satisfied (e.g., in accordance with a determination that the first user interface corresponds to a first type of user interface) allows the computer system to automatically to manage the display of the one or more system elements, to optionally conserve battery power, which performs an operation when a set of conditions has been met.

In some embodiments, the first user interface (e.g., 602, 912, 920, and/or 930) (e.g., where the first user interface is the first type of user interface) includes a second set of one or more system elements (e.g., 612 and/or 614) (e.g., the one or more system elements are selectable while the first user interface is displayed) (e.g., information relating to the state of the computer system and/or information relating to the date and/or time). In some embodiments, the second user interface (e.g., 912, 920, and/or 930) does not include the second set of one or more system elements (e.g., displaying the first animation includes ceasing to display the second set of one or more system elements). In some embodiments, the first user interface ceases to be displayed in response to one or more of the system elements being selected. In some embodiments, the first user interface maintains being displayed in response to the one or more system elements being selected. Ceasing the display of a second set of one or more system elements as a part of transitioning the computer system from the first mode to the second mode provides the user with visual feedback regarding the present operating mode of the computer system (e.g., whether the computer system is in the first mode or second mode), which provides improved visual feedback.

In some embodiments, the first user interface (e.g., 602, 912, 920, and/or 930) (e.g., where the first user interface is the first type of user interface) includes a home screen affordance (e.g., 622) with (e.g., the home screen affordance is a graphical element that indicates a location at which a home navigation gesture (e.g. a swipe gesture) can be detected by the computer system) (e.g., a home screen of the computer system is displayed in response to the computer system detecting the home navigation gesture on the home screen affordance) a first visual appearance that is darker than a background of the first user interface (e.g., 602, 912, 920, and/or 930) (e.g., darker than the average brightness of the first user interface). In some embodiments, the second user interface (e.g., 912, 920, and/or 930) includes the home screen affordance with a second visual appearance that is brighter than the background of the second user interface (e.g., the second visual appearance is dimmer than the first visual appearance) (e.g., displaying the first animation includes dimming the visual appearance of the home screen affordance). In some embodiments, the home screen affordance is inactive (e.g., the computer system does not respond to the home navigation gesture) while the home screen affordance is displayed with the second visual appearance. In some embodiments, the computer system displays the first user interface in response to detecting the home navigation gesture while the home screen affordance is displayed with the second visual appearance. Changing the display of the home screen affordance from an appearance that is darker than the background of the first user interface to an appearance that is brighter than the background of the second user interface as part of transitioning the computer system from the first mode to the second mode provides the user with visual feedback regarding the present operating mode of the computer system (e.g., whether the computer system is in the first mode or second mode), which provides improved visual feedback.

In some embodiments, the first user interface (e.g., 602, 912, 920, and/or 930) (e.g., where the first user interface corresponds to the first type of user interface) includes a first foreground portion (e.g., that includes a first set of content that is visible to a user) with first content (e.g., an image) and a first background portion with a first visual appearance (e.g., the foreground portion is displayed as overlaid top of the background portion). In some embodiments, the second user interface (e.g., 912, 920, and/or 930) includes a second foreground portion with the first content and a second background portion with a second visual appearance (e.g., that is different than the first visual appearance). In some embodiments, the first content is more visible (e.g., brighter) than the second background (e.g., as discussed above in relation to FIG. 9C). (e.g., displaying the first animation includes modifying the background portion (e.g., and modifying the visual appearance of the foreground portion) such the content in the foreground portion is more visible (e.g., remains visible) (e.g., remains visible to the user) than the background portion while the computer system is in the second mode. In some embodiments, the computer system modifies the background portion and not the foreground portion. In some embodiments, the background portion includes content that is occluded by the content in the foreground prior to the computer system displaying the first animation. In some embodiments, when the content included in the foreground portion occludes the content included in the background portion, displaying the first animation includes shifting the content included in the foreground portion such that the content included in the foreground portion does not occlude the content included in the background portion. Increasing the visibility of the first content relative to the background of the first user interface as part of transitioning the computer system from the first mode to the second mode provides the user with visual feedback regarding the present operating mode of the computer system (e.g., whether the computer system is in the first mode or second mode), which provides improved visual feedback.

In some embodiments, the brightness of the first foreground portion is greater than the brightness of second foreground portion and the brightness of the first background portion is greater than the brightness of second background portion (e.g., the average brightness of the first user interface is greater than the average brightness of the second user interface). In some embodiments, the difference in the brightness between the first foreground portion and the second foreground portion is smaller than the difference in the brightness between the first background portion and the second background portion (e.g., as described above in relation to FIGS. 9A-9C and 6B) (e.g., displaying the first animation includes dimming the foreground portion (e.g., the brightness of foreground portion is dimmed non-uniformly) (e.g., the foreground portion of the first user interface includes content that is displayed as overlaid on top of content that is included in background portion of the first user interface) of the first user interface by a first amount (e.g., 1 lux, 3 lux, or 5 lux) and dimming the background portion of the first user interface (e.g., the brightness of the background portion is dimmed non-uniformly) by a second amount (e.g., 1 lux, 3 lux, or 5 lux) that is greater than the first amount). In some embodiments, the amount that the foreground portion is dimmed as a function of the amount that the background portion is dimmed. Displaying the foreground portion of a user interface as brighter than the background portion of the user interface when the computer system is in the second mode provides the user with visual feedback regarding the present operating mode of the computer system (e.g., whether the computer system is in the first mode or second mode), which provides improved visual feedback.

In some embodiments, the first user interface (e.g., 602, 912, 920, and/or 930) does not include a vignette effect (e.g., a reduction of the brightness and/or saturation of the computer system at the periphery of the computer system (e.g., the brightness of the display of the computer system decreases as the distance to the periphery of the computer system decreases)) (e.g., the computer system is the brightest in the center and darkest at the edges of the computer system). In some embodiments, the second user interface (e.g., 912, 920, and/or 930) includes the vignette effect (e.g., displaying the first animation includes applying a vignette effect to one or more portions (e.g., the foreground portion and/or the background portion) (e.g., less than the entirety of the first user interface) (e.g., the computer system does not apply vignette to status information (e.g., indications time and date)) of the first user interface. In some embodiments, the vignette effect that is applied to the background portion of the first user interface and not the foreground portion of the first user interface. In some embodiments, the vignette effect is applied to both the background portion of the first user interface and the foreground portion of the first user interface. In some embodiments, the vignette effect that is applied to the one or more portions of the first user increases as the distance from the center of the display generation component increases. Applying a vignette effect as part of transitioning the computer system from the first mode to the second mode provides the user with visual feedback regarding the present operating mode of the computer system (e.g., whether the computer system is in the first mode or second mode), which provides improved visual feedback.

In some embodiments, the first foreground portion and the first background portion have a first amount of contrast. In some embodiments, the second foreground portion and the second background portion have a second amount of contrast that is greater than the first amount of contrast (e.g., displaying the first animation includes increasing an amount of contrast between the foreground portion of the first user interface and the background portion of the first user interface) (e.g., the contrast between the foreground portion of the first user interface and the background portion of the first user interface is increased by dimming the foreground portion less than the background portion). Increasing the amount of contrast between a foreground portion and a background portion of a user interface as a part of transitioning the computer system from the first mode to the second mode provides a user with visual feedback regarding the present operating mode of the computer system (e.g., whether the computer system is in the first mode or second mode), which provides improved visual feedback.

In some embodiments, the first user interface (e.g., 602, 912, 920, and/or 930) includes a first amount of saturation. In some embodiments, the second user interface (e.g., 912, 920, and/or 930) includes a second amount of saturation that is less than the first amount of saturation (e.g., displaying the first animation includes decreasing the saturation of the first user interface). In some embodiments, both the foreground portion of the first user interface and background portion of the first user interface are desaturated. In some embodiments, either the foreground portion of the first user interface or the background portion of the first user interface is desaturated. In some embodiments, the foreground portion of the first user interface is desaturated by a different amount than the background portion of the first user interface. Decreasing the amount of saturation in the user interface as a part of transitioning the computer system from the first mode to the second mode provides a user with visual feedback regarding the present operating mode of the computer system (e.g., whether the computer system is in the first mode or second mode), which improves visual feedback.

In some embodiments, the first user interface (e.g., 602, 912, 920, and/or 930) (e.g., where the first user interface corresponds to the first type of user interface) includes a time and/or date user interface element (e.g., 616 and/or 618) (e.g., user interface element(s) that indicates the current date and/or the current time) with a first color (e.g., black, white, or any other color that allows for the time and/or date user interface to be viewed against the background of the first user interface). In some embodiments, the second user interface (e.g., 912, 920, and/or 930) includes the time and/or date user interface element with a second color (e.g., that is different from the first color). In some embodiments, the second color has a smaller amount of contrast with the second background portion than the first color (e.g., the color of the time and/or date user interface element changes such that the contrast between the time and/or date user interface elements and the background portion of the second user interface remains suitable for viewing (e.g., the brightness of the time and/or date user interface element corresponds to the modification of the brightness of the background portion of the first user interface). In some embodiments, the second color is a different shade of the first color. In some embodiments, the background portion and the time/and or date user interface element are displayed as the same color (e.g., different shades of the same color). Changing the color of the time and/or date user interface such that the time and/or date user interface element has a greater amount of contrast with the second background as part of transitioning the computer system from the first mode to the second mode provides a user with visual feedback regarding the present operating mode of the computer system (e.g., whether the computer system is in the first mode or second mode), which improves visual feedback.

In some embodiments, the first user interface (e.g., 602, 912, 920, and/or 930) has a first overall brightness and (e.g., where the first user interface corresponds to the first type of user interface) includes one or more status information user interface elements (e.g., 608a-608c) with a first brightness (e.g., an indication of the time and/or an indication of the date) (e.g., information relating to the state of the computer system and/or information relating to the date and/or time). In some embodiments, the second user interface (e.g., 912, 920, and/or 930) has a second overall brightness and incudes the one or more status information user interface elements with a second brightness (e.g., that is different than the first brightness). In some embodiments, the difference between the first overall brightness and the second overall brightness is larger than the difference between the first brightness and the second brightness (e.g., displaying the first animation includes reducing the brightness (e.g., marginally reducing the brightness (e.g., the brightness is reduced by less than 20%)) of the one or more status information user interface elements and reducing the overall brightness of the first user interface, where the overall brightness of the first user interface is reduced more than brightness of the one or more status information user interface elements (e.g., the brightness of the one or more status information user interface elements is reduced by a fraction (e.g., 0.2, 0.4, 0.6) of a first factor and the overall brightness of the first user interface is reduced by a multiple (e.g., 2×, 3×, or 4× (e.g., a whole number multiple of the first factor) of the first factor. In some embodiments, displaying the first animation includes reducing the brightness of the one or more status information user interface elements by a multiple of the first factor and reducing the overall brightness of the first user interface by a fraction of the first factor). Decreasing the brightness of the one or more status information user elements less than the overall brightness of the displayed user interface as part of transitioning the computer system from the first mode to the second mode provides a user with visual feedback regarding the present operating mode of the computer system (e.g., whether the computer system is in the first mode or second mode), which improves visual feedback.

In some embodiments, in accordance with a determination that the first user interface (e.g., 602, 912, 920, and/or 930) includes a third foreground portion (e.g., content (e.g., a portrait, an astronomical object, and/or an emoji) that is included in the first user interface that obscures content that is included in the background of the first user interface while the computer system is in the first mode) (e.g., content that is included in the first user interface that is occluded by content in the second foreground) and a third background portion, the visual relationship (e.g., comparative size, contrast, comparative display location, spatial orientation, and/or comparative color) of the third foreground portion relative to the third background portion before the first animation (e.g., as discussed above in relation to FIGS. 9A-9E) differs from the visual relationship of the third foreground portion relative to the third background portion after the first animation (e.g., as described above in relation to FIG. 9B) (e.g., displaying the first animation includes modifying the second foreground relative to the second background) (e.g., the second foreground is modified based on the modifications to the second background or the second background is modified based on the modifications to the second foreground). In some embodiments, in accordance with a determination that the first user interface does not include a second foreground and a second background, displaying the first animation includes uniformly modifying the first user interface. Changing the visual relationship of the third foreground portion and the third background portion as part of the first animation when prescribed conditions are met (e.g., in accordance with a determination that the first user interface corresponds to a first type of user interface) allows the computer system to automatically apply different visual treatments to the foreground portion and the background portion such that the visibility of content in the foreground portion remains visible to the user, which performs an operation when a set of conditions has been met.

In some embodiments, the first user interface (e.g., 602, 912, 920, and/or 930) includes a time user interface object (e.g., a user interface object that indicates the current time). In some embodiments, before displaying the first animation (e.g., as discussed above in relation to FIGS. 9A-9E), the time user interface object overlaps with a first portion (e.g., a portion of the content that is included in the second foreground of the first user interface) (e.g., partially overlaps with the first portion of the second foreground (e.g., a portion of the time user interface object overlaps with the first portion of the second foreground) of the third foreground portion of the first user interface. In some embodiments, after displaying the first animation (e.g., the first portion of the second foreground is moved in a direction (e.g., up, down, left, and/or right) (e.g., the size of the first portion of the second foreground is reduced) (e.g., relative to the time user interface object) the first portion of the third foreground portion does not overlap with the time user interface object (e.g., as described in relation to FIGS. 9A-9B). In some embodiments, both the first portion of the second foreground and the second background are shifted relative to each other. In some embodiments, the display of the time user interface object is shifted (e.g., and the first portion of the second foreground is not shifted) to remove the overlap with the first portion of the second foreground. In some embodiments, displaying the first animation includes shifting the time user interface object relative to the first portion of the second foreground. Shifting the time user interface element such that the time user interface element no longer overlaps with a first portion of the third foreground portion as part of transitioning the computer system from the first mode to the second mode when conditions are met (e.g., in accordance with a determination that the first user interface corresponds to a first type of user interface) allows the computer system to automatically remove visual obstructions to the time user interface element, which performs an operation when a set of conditions has been met.

In some embodiments, as a part of modifying the second foreground relative to the second background, the computer system reduces the brightness of the second foreground (e.g., the brightness of the second foreground can be reduced uniformly or non-uniformly) by a first amount and reducing the brightness of the second background (e.g., the brightness of the second background can be reduced uniformly or non-uniformly) by a second amount. In some embodiments, the second amount is greater than the first amount. In some embodiments, the first amount that the brightness of the second foreground is reduced by is a function of the second amount of brightness that the second background is reduced by. Reducing the brightness of the second background more than the brightness of the second foreground as part of transitioning the computer system from the first mode to the second mode when conditions are met (e.g., in accordance with a determination that the first user interface corresponds to a first type of user interface) allows the computer system to automatically variably adjust a brightness setting of the display of the computer system, which performs an action when conditions are met.

In some embodiments, after detecting the occurrence of the condition (e.g., as described in relation to 950a, 950g, 950p, and/or 950t) and while the computer system (e.g., 600) is in the first mode (e.g., as described above in relation to FIGS. 9A, 9E, 9G, 9O, 9R, 9S, and/or 9V), the computer system displays, via the display generation component (e.g., 610), a third user interface in the first mode (e.g., the third user interface corresponds to an application that is installed on the computer system). In some embodiments, while displaying the third user interface, the computer system detects a second occurrence of the condition (e.g., as described in relation to 950a, 950g, 950p, and/or 950t) (e.g., the occurrence of the condition is indicative of reduced user activity or reduced user interaction with the computer system (e.g., the lapse of a predetermined amount of time (e.g., 0.25 seconds, 0.5 seconds, 1 second, 3 seconds, 5 seconds, 25 seconds, or 45 seconds) during which the computer system detects no user interaction) (e.g., detecting an input (e.g., a tap gesture, a swipe input, an input on a hardware button that is coupled to the computer system, and/or a hand cover). In some embodiments, in response to detecting the second occurrence of the condition and in accordance with a determination that the third user interface corresponds to an application (e.g., an application that is installed on the computer system) (e.g., a maps application, a phone call application, a voice memos, application and/or a television remote application) that has a low power state (e.g., a version of the application that is presented to the user while the computer system is in a lower power consumption mode), the computer system transitions from the first mode to the second mode (e.g., as described above in relation to FIGS. 9H-9L, 9Q, and/or 9U). As a part of transitioning the computer system from the first mode to the second mode, the computer system displays, via the display generation component (e.g., 610), a third animation (e.g., that is different from the first animation and the second animation) that results in the display of a fourth user interface (e.g., a fourth user interface that corresponds to the application while computer system is in the second low power mode) in the second mode.

In some embodiments, in response to detecting the second occurrence of the condition and in accordance with a determination that the third user interface corresponds to an application that does not have a low power state, the computer system transitions from the first mode to the second mode. As a part of transitioning the computer system from the first mode to the second mode, the computer system displays, via the display generation component, the second animation (e.g., as discussed above in relation to FIGS. 9H-9K, 9Q, and/or 9U). In some embodiments, the computer system is performing an operation that corresponds to the application (e.g., performing a phone call operation, providing directions to a user, recording a voice memo) when the second occurrence of the condition is detected and the computer system continues to perform the operation that corresponds to the application after the second occurrence of the condition is detected. Displaying the second animation or the third animation as part of transitioning the computer system from the first mode to the second mode provides the user with visual feedback regarding the state of the computer system (e.g., the computer system has detected the second occurrence of the condition), which provides improved visual feedback. Displaying the third animation in response to detecting the second occurrence of the condition when prescribed conditions are met (in accordance with a determination that the third user interface corresponds to an application that has a low power state) allows the computer system to automatically control the types of animations that are displayed, which automatically performs an operation when a set of conditions has been met.

In some embodiments, the third user interface includes a third set of one or more system elements (e.g., 914) (e.g., selectable system elements) (e.g., status information (e.g., status information regarding the computer system and/or status information regarding a function that the computer system is performing (e.g., providing a user with directions and/or a phone call). In some embodiments, before the third animation (e.g., as described above in relation to FIGS. 9P-9Q) the third set of one or more system elements are not visually obscured (e.g., darkened and/or blurred). In some embodiments, after the third animation the third set of one or more system elements are visually obscured (e.g., displaying the third animation includes visually obscuring (e.g., darkening and/or blurring) the visual appearance of the third set of one or more system elements (e.g., the third set of one or more system elements cannot be selected while the third set of one or more system elements are visually obscured). In some embodiments, the computer system ceases to display the third set of one or more system elements as a result of the third set of one or more system elements being visually obscured. In some embodiments, third set of one or more system elements are selectable while the first set of user interface objects are visually obscured. Blurring out one or more system elements as part of displaying the third animation when prescribed conditions are met (e.g., in accordance with a determination that the third user interface corresponds to an application that has a low power mode) allows the computer system to automatically manage which system elements are visible to the user and which system elements are not visible to the user, which automatically performs an operation when a set of conditions has been satisfied.

In some embodiments, the third set of one or more system elements (e.g., 914) are not selectable while the third set of one or more system elements are visually obscured. In some embodiments, while the third set of one or more system elements are visually obscured, the computer system transitions from the second mode to the first mode in response to detecting an input at the location of the display of the third set of one or more system elements. Displaying system elements that are not selectable as visually obscured provides a user with visual feedback with respect to whether a respective system element is selectable while the computer system is in the second mode, which provides improved visual feedback.

In some embodiments, the third user interface (e.g., 920) includes a fourth set of one or more system elements (e.g., 614) and a fifth set of one or more system elements (e.g., 940) (e.g., selectable user interface objects) (e.g., status information (e.g., status information regarding the computer system and/or status information regarding a function that the computer system is performing (e.g., providing a user with directions and/or a phone call). In some embodiments, before the third animation (e.g., as described above in relation to FIGS. 9P-9Q) the fourth set of one or more system elements and the fifth set of one or more system have a first amount of brightness (e.g., the first the fourth set of one or more system elements and the fifth set of one or more system elements are displayed with the same brightness). In some embodiments, after the third animation the fourth set of one or more system elements have a second amount of brightness that is less than the first amount of brightness and the fifth set of one or more system elements have the first amount of brightness (e.g., displaying the third animation includes reducing the brightness of the fourth set of one or more system elements and maintaining the brightness of the fifth set of one or more system elements). In some embodiments, the fourth set of one or more system elements are not selectable while the fourth set of one or more system elements are displayed with the third amount of brightness and the fifth set of one or more system elements are selectable while the fifth set of one or more system elements are displayed with the second amount of brightness. Reducing the brightness of the fourth set of one or more system elements while maintaining the brightness of the fifth set of one or more system elements as part of displaying the third animation when a set of conditions are met (e.g., in accordance with a determination that the third user interface corresponds to an application that has a low power mode), allows the computer system to automatically variably manage the brightness of the display of the computer system, to optionally conserve battery power, which performs an operation when a set of conditions are met.

In some embodiments, before the third animation (e.g., as described above in relation to FIGS. 9P-9Q), the third user interface (e.g. 920 and/or 930) includes a first set of information (e.g., dynamic information (e.g., directions and/or the location of the computer system)) (e.g., information that is updated at a high frequency (e.g., information that is updated every 0.2 seconds, 0.5 seconds, or 1 second (e.g., turn by turn directions))) (e.g., as described above in relation to FIGS. 9P-9Q). In some embodiments, in accordance with a determination that the first set of information does not satisfy a first level of confidence threshold (e.g., the first set of information is no longer accurate), the fourth user interface does not include the first set of information (e.g., as described above in relation to FIGS. 9P-9Q) (e.g., displaying the third animation includes ceasing the display of the first set of information) (e.g., the fourth user interface does not include the first set of information). In some embodiments, in accordance with a determination that the first set of information does satisfy the level of confidence threshold, the fourth user interface includes the first set of information. In some embodiments, the first set of information is a subset of information (e.g., the fourth user interface will not include the millisecond portion of a running timer but will include the portion of the running timer that tracks time on the basis of minutes or seconds). Ceasing to display the first set of information as a part of transitioning the computer system from the first mode to the second mode when prescribed conditions are met (e.g., in accordance with a determination that the first set of information does not satisfy a first level of confidence threshold) allows the computer system to automatically manage the display of unreliable information while the computer system is in the second mode, which automatically performs an operation when a set of conditions has been satisfied.

In some embodiments, as a part of displaying the third user interface (e.g., user interface of FIG. 9P), the computer system displays a second set of information (e.g., 616, 618, and/or 940) (e.g., directions, an indication of the date, and/or an indication of the current time) with a first amount of brightness. In some embodiments, in accordance with a determination that the second set of information satisfies a second level of confidence threshold, the fourth user interface (e.g., user interface of FIG. 9Q) includes the second set of information with the first amount of brightness (e.g., displaying the third animation includes maintaining the brightness of information that satisfies the second level of confidence threshold). In some embodiments, in accordance with a determination that the second set of information does not satisfy the level of confidence threshold, the fourth animation includes displaying the second set of information with a second amount of brightness that is less than the first amount of brightness. In some embodiments, the fourth user interface includes the second set of information with a different visual appearance than when the second set of information is included in the third user interface (e.g., size of the second set of information, location of the display of the second set of information is different). Maintaining the brightness level of a second set of information as part of displaying the second animation when conditions are met (e.g., in accordance with a determination that the second set of information satisfies a second level of confidence threshold) allows the computer system to automatically manage the brightness of the display of reliable information that is of interest to the user while the computer system is in the second mode, which automatically performs an operation when a set of conditions has been satisfied.

In some embodiments, before displaying the third animation (e.g., as described above in relation to FIGS. 9P-9Q), the computer system (e.g., 600) is in (e.g., operating in) a normal display mode (e.g., the brightness of the display generation component is not modified (e.g., not dimmed) (e.g., black text is shown on a white background) (e.g., a non-dark mode). In some embodiments, in accordance with a determination that the application (e.g., the application that corresponds to the third user interface) has a dark mode, (e.g., a mode in which the computer system displays user interface elements with a reduced overall luminance (e.g., in comparison to the normal display mode), optionally by reducing a brightness of the background of a respective user interface and/or optionally inverting light/dark contrast relationships between content (e.g., text) and the background of the respective user interface) (e.g., a mode where the brightness of the display of the computer system is decreased) (e.g., a mode where the appearance of text is inverted (e.g., white text is shown on a black background)) (e.g., a mode that reduces the battery consumption of the computer system), after the third animation, the computer system is in (e.g., operating in) a dark display mode. In some embodiments, the computer system exits the dark display mode (and reenters the normal display mode) in response to detecting a user input (e.g., a tap, a raise of the computer system, or selection of a hardware button that is coupled to the computer system). In some embodiments, in accordance with a determination that the application does not have a dark mode, the computer system remains in the normal display mode after the third animation. Transitioning the computer system from a normal display mode to a dark mode as part of transitioning the computer system from the first mode to the second mode when prescribed conditions are met (e.g., in accordance with a determination that the application has a dark mode), allows the computer system to automatically manage the brightness of the display of the computer system, to optionally conserve battery power, which automatically performs an operation when a set of conditions has been satisfied.

In some embodiments, the first user interface (e.g., 602, 912, 920, and/or 930) includes one or more notification (e.g., a notification generated by an application that is installed on the computer system) (e.g., one or more selectable notification) user interface objects (e.g., 904). In some embodiments, the computer system ceases to display the first user interface in response to detecting selection of the one or more notification user interface objects. Displaying one or more notification user interface objects on the first user interface provides the user with visual feedback with respect to notifications that are generated by the computer system and/or received by the computer system, which provides improved visual feedback.

In some embodiments, first user interface (e.g., 602, 912, 920, and/or 930) includes a date and/or time user interface object (e.g., 616 and/or 618) (e.g., the date and/or time user interface object indicates the current time and the current date). In some embodiments, the font of the date and/or time user interface object is changes during the first animation and/or the second animation. In some embodiments, the location of the display of the font and/or time user interface changes during the first animation and/or the second animation.

In some embodiments, the first user interface (e.g., 602, 912, 920, and/or 930) (e.g., where the first user interface corresponds to the first type of user interface) includes one or more complication user interface objects (e.g., 620) (e.g., complication user interface objects that correspond to one or more applications that are installed on the computer system). In some embodiments, the second user interface includes the one or more complication user interface objects.

In some embodiments, the computer system, after detecting the occurrence of the condition (e.g., as described in relation to 950*a*, 950*g*, 950*p*, and/or 950*t*), displays, via the display generation component (e.g., 610), the second user interface (e.g., 912, 920, and/or 930) (e.g., in the second mode). In some embodiments, while the second user interface is displayed, the detects a user input (e.g., 950*a*, 950*g*, 950*p*, and/or 950*t*) (e.g., a tap (e.g., a tap on the display generation component of the computer system), activation of a hardware button (e.g., a hardware button that is coupled to the computer system) and/or raising the computer system). In some embodiments, in response to detecting the user input, the computer system ceases display of the second user interface and displays the first user interface (e.g., 602, 912, 920, and/or 930) (e.g., in the first mode) (e.g., where the first user interface corresponds to the first type of user interface). Ceasing display of the second user interface and displaying the first user interface in response to detecting a user input provides the user with the ability to control the display of the computer system without displaying additional controls, which provides additional control options without cluttering the user interface with additional displayed controls.

In some embodiments, displaying the first user interface (e.g., 602, 912, 920, and/or 930) includes displaying a second wallpaper (e.g., a system wallpaper (e.g., an image that is displayed on a wake screen of the computer system)). In some embodiments, in accordance with a determination that the second wallpaper is a first type of wallpaper (e.g., the wallpaper contains a first image and/or first animation) (e.g., the wallpaper has depth (e.g., a foreground and a background or the wallpaper does not have depth (e.g., the wallpaper does not have a foreground and a background), the computer system displays the first animation (e.g., as discussed above in relation to FIGS. 9A-9E) includes displaying a first sequence of images. In some embodiments, in accordance with a determination that the second wallpaper is a second type of wallpaper (e.g., the wallpaper includes a second image and/or second animation that is different than the first image and/or the second animation), the computer system displays the first animation includes displaying a second sequence of images, that is different from the first sequence of images (e.g., the second sequence of images have a different amount of images, the content included in the second sequence of images is different from the content included in the first sequence of images, the duration of the first sequence of images is different than the duration of the second sequence of images). In some embodiments, displaying the first sequence of images includes displaying the foreground of the first user interface shifting relative to the background of the first user interface and displaying the second sequence of images includes displaying the background of the first user interface shift relative to the foreground of the first user interface. In some embodiments, displaying the first sequence of images includes changing the visual appearance (e.g., size, shape, color, orientation) of content that is included in the foreground of the first user interface and maintaining the visual appearance of content in the background of the first user interface and displaying the second sequence of images includes maintaining the visual appearance of content included in the foreground of the first user interface and changing the visual appearance of content included in the background of the first user interface. In some embodiments, the first sequence of images for two different wallpapers (e.g., two wallpapers that include two different portraits) of the same type of wallpaper (e.g., wallpapers with depth) is the same (e.g., display the foreground as fading in first and display the background as fading in second) but the animation for the two different wallpapers is different (e.g., different foreground visual elements and different background visual elements). In some embodiments, the second sequence of images for two different wallpapers of the same type of wallpaper (e.g., wallpaper that does not include depth) is the same (e.g., concurrently display the wallpaper as translating (e.g., sliding in) from the edge of the computer system while zooming in on the wallpaper but the animation for the two different wallpapers is different (e.g., because the content that is included in the two different wallpapers is different). Displaying a first sequence of images or a second sequence of images when prescribed conditions are met allows a computer system to automatically tailor the first animation to a type of wallpaper, which performs automatically performs an operation when a set of conditions are met.

In some embodiments, the first animation (e.g., as discussed above in relation to FIGS. 9A-9E) and/or second animation (e.g., as discussed above in relation to FIGS. 9H-9K, 9Q, and/or 9U) includes: displaying a first user interface element (e.g., 616, 618, and/or 620) (e.g., an indication of the current time, an indication of the date, one or more complications, or the background of the second user interface) as fading in (e.g., the visual appearance of the first user interface element increases in brightness and/or clarity over a period of time (e.g., 0.01, 0.05, 0.1, 0.3, 0.5 seconds, 1 second, 1.5 seconds, or 2 seconds,) (e.g., without displaying a different user interface element as fading in); after displaying at least a portion of (e.g., or all of) the first user interface element (e.g., 616, 618, and/or 620) fading in and while the first user interface element is displayed, displaying a second user interface element (e.g., 616, 618, and/or 620) (e.g., an indication of the current time, an indication of the date, one or more complications, or the background of the second user interface) fading in; and after displaying at least a portion of (e.g., or all of) the second user interface element (e.g., 616, 618, and/or 620) fading in and while the first user interface element and the second user interface element are displayed, displaying a third user interface element (e.g., an indication of the current time, an indication of the date, one or more complications, or the background of the second user interface) fading in. In some embodiments, it takes the same amount of time for any one of the user interface elements to fade into the second user interface. In some embodiments, there is an overlap in the display of one or more user interface elements fading into the second user interface. Sequentially displaying the first, second, and third user interface elements as fading in as part of transitioning the computer system from the first mode to the second mode provides a user with visual feedback regarding the status of the computer system's transition from the first mode to the second mode, which provides improved visual feedback.

Note that details of the processes described above with respect to method 1000 (e.g., FIG. 10) are also applicable in an analogous manner to the methods described throughout. For example, methods 800 and 1200 optionally includes one or more of the characteristics of the various methods described above with reference to method 1000. For example, the method of displaying the second animation can be applied to methods 900 and 1200. For brevity, these details are not repeated below.

FIGS. 11A-11O illustrate exemplary user interfaces for displaying notification, in accordance with some embodiments. The user interfaces in these FIGS. are used to illustrate the processes described below, including the processes in FIG. 12.

At FIG. 11A, computer system 600 is in the low power state (e.g., as described above) and displays wake screen user interface 602 with the dark appearance. At FIG. 11A, computer system 600 has not recently received and/or generated any notifications. Accordingly, at FIG. 11A, computer system 600 does not display any notifications.

At FIG. 11B, computer system 600 receives a telecommunication signal that corresponds to an electronic message (e.g., a text message) from an external computer system. In response to computer system 600 receiving the telecommunication signal, computer system 600 displays notification 1108 as overlaid on top of wake screen user interface 602. As illustrated in FIG. 11B, notification 1108 includes content 1108a. Content 1108a includes an indication of the sender of the electronic message (e.g., John Appleseed), a preview of the content of the notification, and an indication of when computer system 600 received the notification 1108. Notification 1108 is not selectable while computer system 600 is in the low power state. In some embodiments, content 1108a of notification 1108 is representative of the entirety of the content included in notification 1108. In some embodiments, notification 1108 does not include the one or more portions of preview of content 1108a. In some embodiments, in response to computer system 600 displaying notification 1108, computer system 600 transitions from the low power state to the normal power state. In some embodiments, computer system 600 displays notification 1108 in response to detecting that a charging process for computer system 600 has begun. In some embodiments, computer system 600 displays notification 1108 in response to detecting that a mode of computer system 600 has changed (e.g., computer system 600 enters/leaves a silent mode (e.g., a mode where computer system 600 suppresses audible alerts and/or notifications)). In some embodiments, computer system 600 displays notification 1108 in response to detecting that an external wireless device (e.g., a smart watch, a smart phone, laptop, and/or tablet) has connected to computer system 600. In some embodiments, computer system 600 displays notification 1108 in response an application that is installed on computer system 600 generating notification 1108. In some embodiments, computer system 600 displays notification 1108 in response to the operating system of computer system 600 generating notification 1108.

As illustrated in FIG. 11B, computer system 600 displays notification 1108 with a light appearance when notification 1108 is initially displayed. Content 1108a of notification 1108 has a dark appearance (e.g., black or a shade of black or gray) and the background of notification 1108 has a light appearance (e.g., white) while computer system 600 displays notification 1108 with the light appearance. As illustrated in FIG. 11B, time indicator 618 indicates that the current time is "9:41".

FIG. 11C illustrates an intermediate step of transitioning the display appearance of notification 1108 from the light appearance to a dark appearance. As illustrated in FIG. 11C, time indicator 618 indicates that the current time is "9:42" (e.g., one minute has elapsed since FIG. 11B). Computer system 600 transitions the visual appearance of notification 1108 from the light appearance to the dark appearance after computer system 600 has displayed notification 1108 for a predetermined amount of time (e.g., 15 seconds, 30 seconds, 45 seconds, 1 minute, or 2 minutes). In some embodiments, computer system 600 transitions the appearance of notification 1108 from the light appearance to the dark appearance in response to detecting a request to transition computer system 600 from the normal power state to the low power state. In some embodiments, computer system 600 transitions the display of notification 1108 from the light appearance to the dark appearance in response to detecting that the context of computer system 600 has changed (e.g., computer system 600 is placed face down).

Computer system 600 gradually transitions (e.g., over a predetermined amount of time) (e.g., computer system 600 gradually changes the color of content 1108a of notification 1108 from black to white and gradually changes the background of notification 1108 from white to black) the display of notification 1108 from the light to the dark appearance. Computer system 600 displays content 1108a of notification 1108 with a light appearance (e.g., white or other light color) and the background of notification 1108 with a dark appearance (e.g., black or other dark color) when notification 1108 has the dark appearance. Accordingly, at FIG. 11C, computer system 600 displays content 1108a as fading from black to white and computer system 600 displays the background of notification 1108 as fading from white to black. At FIG. 11C, computer system 600 remains in the lower power state and maintains the display of wake screen user interface 602 with the dark appearance during the transition of notification 1108 from the light appearance to the dark appearance.

At FIG. 11C, computer system 600 is concurrently changing the display appearance of both content 1108a of notification 1108 and the background of notification 1108. In some embodiments, computer system 600 displays the transition of content 1108a of notification 1108 from a dark color to a light color before computer system 600 displays the transition of the background of notification 1108 from a light color to a dark color, or vice versa.

At FIG. 11D, computer system 600 has completed the transition of the display of notification 1108 from the light appearance to the dark appearance (e.g., notification 1108 is displayed with the dark appearance at FIG. 11D). As illustrated in FIG. 11D, while computer system 600 displays notification 1108 with the dark appearance, content 1108a of notification 1108 is displayed as white and the background of notification 1108 is displayed as black. In some embodiments, the brightness of content 1108a, while notification 1108 is displayed in the light appearance, is based on the overall brightness (e.g., average brightness) of wake screen user interface 602. In some embodiments, the brightness of content 1108a, while notification 1108 is displayed with the light appearance, is based on the ambient brightness of the physical environment of computer system 600 (e.g., the dimmer the ambient brightness the dimmer the brightness of content 1108a). At FIG. 11D, computer system 600 detects tap input 1150d at the display location of notification 1108 while computer system 600 is in the low power state.

Figure 11E:
FIGS. 11A-11O illustrate exemplary user interfaces for displaying notifications.
Figures 1G, 1H:
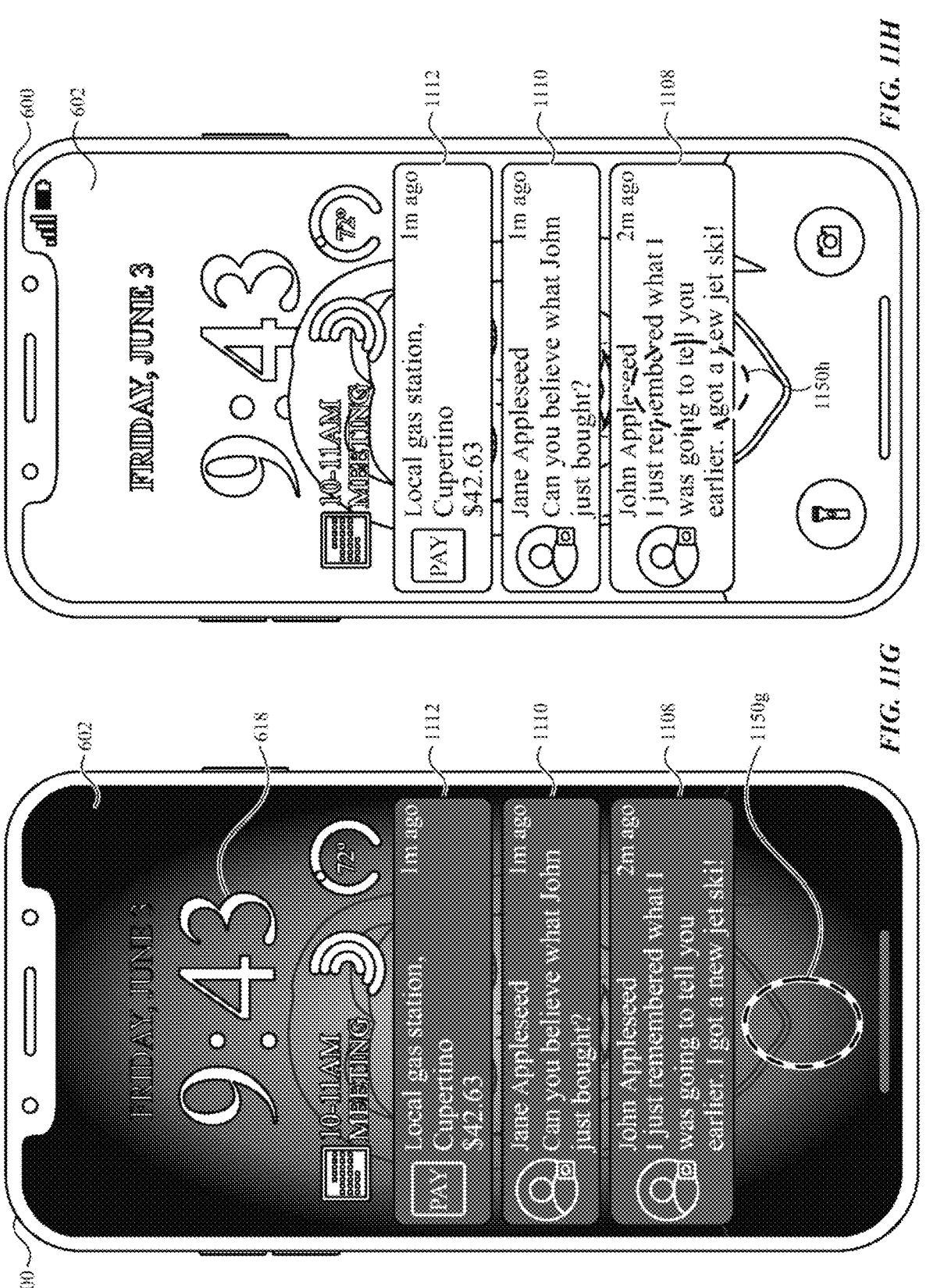

At FIG. 11E, in response to detecting tap input 1150d, computer system 600 transitions from the low power state to the normal power state and displays user interface 602 with the light appearance. As illustrated in FIG. 11E, computer system 600 displays notification 1108 with the light appearance. Computer system 600 transitions the display of notification 1108 from the dark appearance to the light appearance as part of transitioning from the low power state to the normal power state. In some embodiments, Computer system 600 concurrently displays the animation of wake screen user interface 602 transitioning from the low power state to the normal power state (e.g., as described above in relation to FIGS. 9B-9C) and the transition of the display of notification 1108 from the dark appearance to the light appearance. In some embodiments, computer system 600 transitions from the low power state to the normal power state in accordance with a determination that a set of one or more criteria are satisfied (e.g., and not in response to the detection of an input).

At FIG. 11E, computer system 600 brightens the overall display of wake screen user interface 602 in response to detecting a tap input on notification 1108 while computer system is in the low power state. In some embodiments, computer system 600 displays the transition of notification 1108 from the light appearance to the dark appearance before computer system 600 displays wake screen user interface 602 transitioning from the dark appearance (e.g., the display of wake screen user interface 602 while computer system 600 is in the low power state) to the light appearance (e.g., the display of wake screen user interface 602 while computer system 600 is in the normal power state) or vice versa. At FIG. 11E, while computer system 600 is in the normal power state, computer system 600 detects activation 1150e of hardware control 628 (e.g., a power button or other button of the device).

At FIG. 11F1, in response to detecting activation 1150e of hardware control 628, computer system transitions from the normal power state to the low power state and displays wake screen user interface 602 with the dark appearance. As illustrated in FIG. 11F1, computer system 600 displays notification 1108 with the dark appearance. Computer system 600 transitions the display appearance of notification 1108 from the light appearance to the dark appearance as part of transitioning from the normal power state to the low power state. In some embodiments, computer system 600 transitions from the normal power state to the lower power state in accordance with a determination that a set of one or more criteria are satisfied (e.g., and not in response to the detection of an input).

At FIG. 11F2, computer system 600 receives a second telecommunication signal that corresponds to a second electronic message (e.g., text message). In response to receiving the second telecommunication signal, computer system 600 displays notification 1110. As illustrated in FIG. 11F2, computer system 600 concurrently displays notification 1110 and notification 1108. However, because computer system 600 is initially displaying notification 1110 at FIG. 11F2, computer system 600 displays notification 1110 with the light appearance. As illustrated in FIG. 11F2, while computer system 600 displays notification 1110 with the light appearance, computer system 600 displays notification 1108 with the dark appearance because computer system 600 does not initially display notification 1108 at FIG. 11F2. In some embodiments, computer system 600 displays both notification 1110 and notification 1108 with the light appearance in response to receiving the second telecommunication signal. At FIG. 11F2, computer system 600 is moved in close proximity with wireless terminal 1120 (e.g., a payment terminal, transit terminal, user identification terminal and/or other wireless terminal).

As illustrated in FIG. 11F3, computer system 600 is in close proximity with wireless terminal 1120. Wireless terminal 1120 is able to communicate with computer system 600 via a near field communication connection to help facilitate a secure operation (e.g., a financial transaction, a transit system entry or exit operation, or a user identification operation). At FIG. 11F3, a determination is made that computer system 600 is connected to wireless terminal 1120 via a near field communication connection. Because a determination is made that computer system 600 is connected to wireless terminal 1120 via the near field communication connection, computer system 600 displays notification 1112. As illustrated in FIG. 11F3, because computer system 600 initially displays notification 1112 at FIG. 11F3, computer system 600 displays notification 1112 with the light appearance.

As illustrated in FIG. 11F3, computer system 600 concurrently displays both notification 1112 and notification 1110 with the light appearance (e.g., because the time that has elapsed since notification 1112 and notification 1110 were initially displayed is beneath a time threshold (e.g., 5, 10, 15, 25, 40, or 55 seconds) while computer system 600 displays notification 1108 with the dark appearance (e.g., because the time that has elapsed since notification 1108 was initially displayed is above the time threshold)). In some embodiments, computer system 600 concurrently displays notification 1112, notification 1110, and notification 1108 with the light appearance. In some embodiments, the order in which computer system 600 displays notification 1112, notification 1110, and notification 1118 indicates the order in which computer system 600 receives and/or generates the notifications (e.g., the newest notification is displayed above the older notifications or the oldest notification is displayed above the newer notifications). At FIG. 11F3, time indicator 618 indicates that the current time is "9:42".

As illustrated in FIG. 11G, time indicator 618 indicates that the current time is "9:43" (e.g., one minute has elapsed since FIG. 11F3). As illustrated in FIG. 11G, computer system 600 displays wake screen user interface 602 and each of notification 1112, notification 1110, and notification 1108 with the dark appearance. As explained above, computer system 600 transitions the display a respective notification from the light appearance to the dark appearance after computer system 600 displays the respective notification for a predetermined amount of time. Accordingly, because one minute has elapsed since notification 1110 and 1112 were initially displayed, computer system 600 transitions the display appearance of notification 1110 and 1112 at FIG. 11G. In some embodiments, computer system 600 concurrently displays the transition of each notification 1112 and notification 1110 from the light appearance to the dark appearance. In some embodiments, computer system 600 sequentially displays the transition of notification 1112 and notification 1110 from the light appearance to the dark appearance (e.g., computer system 600 only displays a respective notification transitioning from the light appearance to the dark appearance at any given moment in time).

At FIG. 11G, while computer system 600 is in the low power state, computer system detects tap input 1150g.

At FIG. 11H, in response to detecting tap input 1150g, computer system 600 transitions from the low power state to the normal power state and displays wake screen user interface 602 with the light appearance. Additionally, in response to detecting tap input 1150g, computer system 600 transitions the display of notification 1112, notification 1110, and notification 1108 from the dark appearance to the light appearance. Accordingly, as illustrated in FIG. 11H, computer system 600 displays notification 1112, notification 1110, and notification 1108 with the light appearance. In some embodiments, computer system 600 does not transition the appearance of notifications 1108, notification 1110, and notification 1112 from the dark appearance to the light appearance in response to detecting tap input 1150g. In some embodiments, in response to detecting tap input 1150g, computer system 600 transitions the display of the most recently received notifications (e.g., notification 1110 and notification 1112) from the dark appearance to the light appearance and maintains the display appearance of the older notifications (e.g., notification 1108). In some embodiments, computer system 600 concurrently displays the transition of notification 1112, notification 1110, and notification 1108 from the dark appearance to the light appearance. In some embodiments, computer system 600 sequentially displays the transition of each of notification 1112, notification 1110, and notification 1108 from the dark appearance to the light appearance (e.g., computer system 600 only displays a respective notification as transitioning from the light appearance to the dark appearance at any given moment in time). In some embodiments, computer system 600 transitions from the low power state to the normal power state in accordance with a determination that a set of one or more criteria are satisfied (e.g., and not in response to the detection of an input). At FIG. 11H, computer system 600 detects tap input 1150h that corresponds to selection of notification 1108.

Figures 11I, 11J:
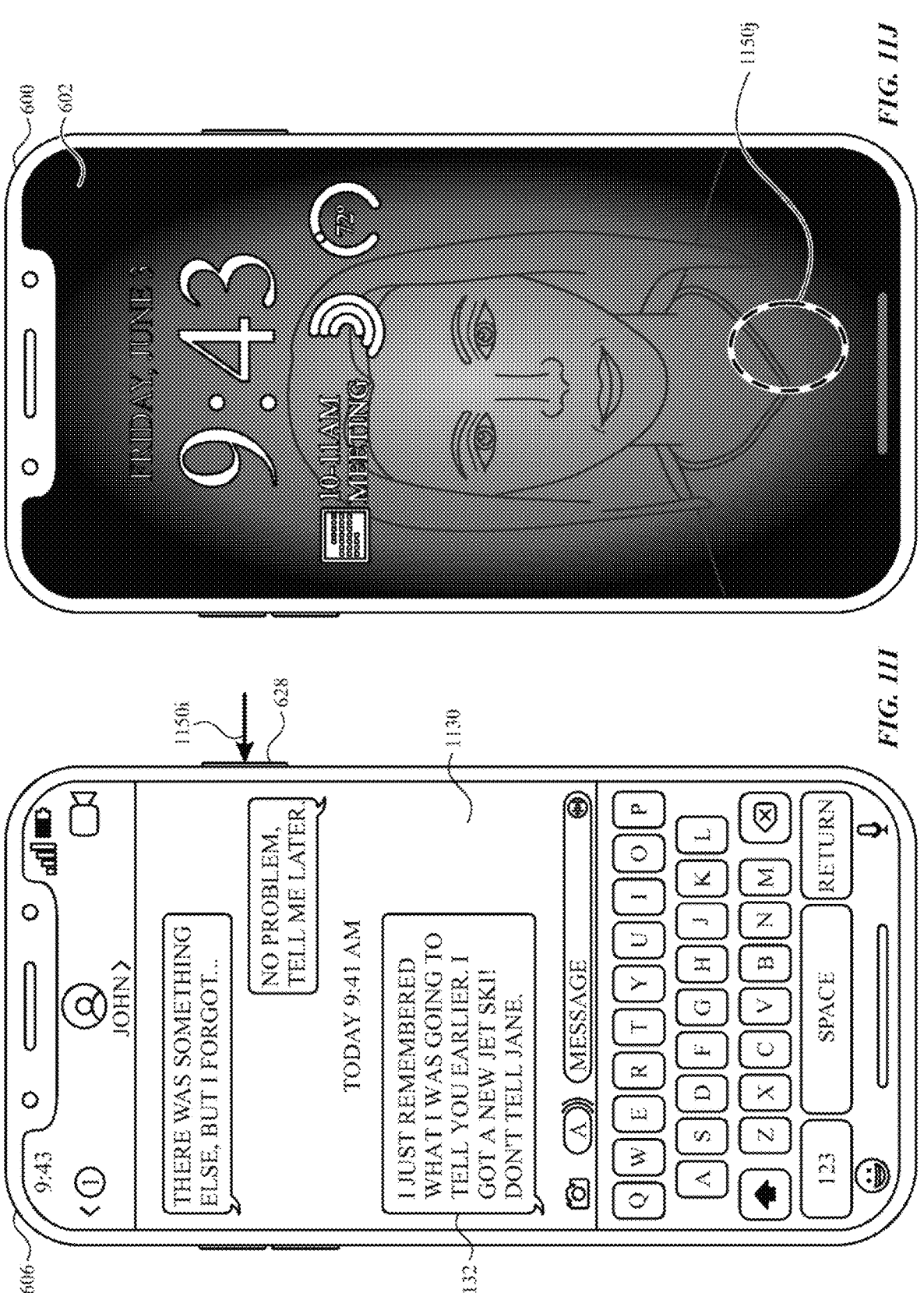
Figure 1I:
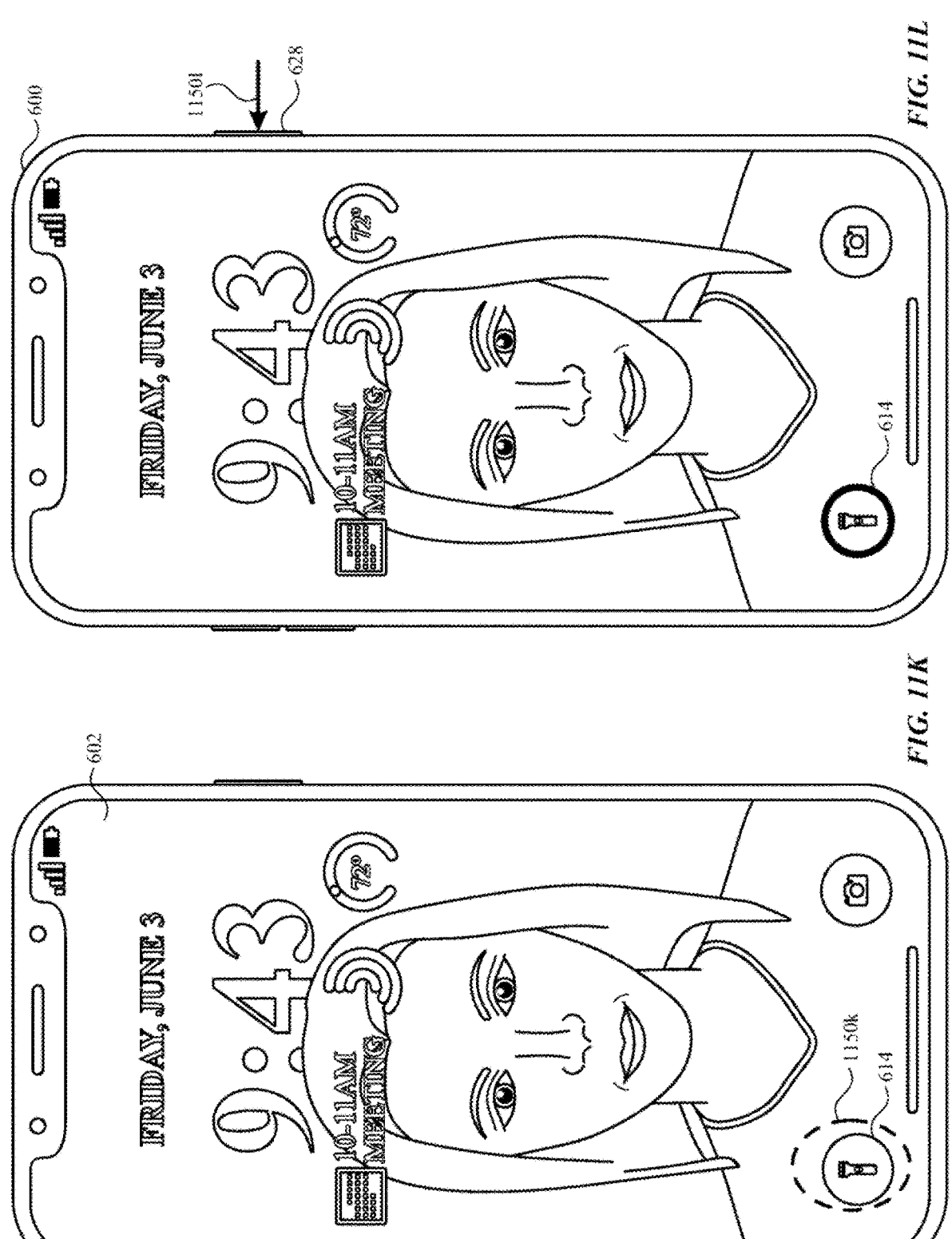

As illustrated in FIG. 11I, in response to detecting tap input 1150h that corresponds to notification 1108, computer system 600 displays message user interface 1130. Message user interface 1130 corresponds to a text messaging application that is installed on computer system 600. As illustrated in FIG. 11I, message user interface 1130 displays a messaging transcript between the user of computer system 600 and a user of an external device. Further, as illustrated in FIG. 11I, message user interface 1130 includes text message 1132. Text message 1132 includes a representation of the entirety of the content of notification 1108. In contrast, content 1108a included a representation of a preview of some of the content of notification 1108. In some embodiments, in response to detecting a selection of notification 1108, computer system 600 does not redisplay text from content 1108a of notification 1108. In some embodiments, in response to detecting a selection of notification 1108, computer system 600 redisplays text from content 1108a of notification 1108 and no additional content. At FIG. 11I, while computer system 600 is in the normal power state, computer system 600 detects activation 1150i of control 628.

At FIG. 11J, in response to detecting activation 1150i of hardware control 628, computer system 600 transitions from the normal power state to the low power state and redisplays wake screen user interface 602 with the dark appearance. At FIG. 11J, computer system 600 does not redisplay notification 1108, notification 1110, nor notification 1112 upon wake screen user interface 602 being redisplayed. Computer system 600 dissociates the display of notification 1108, notification 1110, and notification 1112 with wake screen user interface 602 in response to detecting the selection of at least one of notification 1108, notification 1102 or notification 1112. In some embodiments, computer system 600 displays one or more of notification 1108, notification 1110, or notification 1112, with the dark appearance as a part of redisplaying wake screen user interface 602. At FIG. 11J, while computer system 600 is in the lower power state, computer system 600 detects tap input 1150*j*. In some embodiments, computer system 600 transitions from the normal power state to the low power state in accordance with a determination that a set of one or more criteria are satisfied (e.g., and not in response to the detection of an input).

At FIG. 11K, in response to detecting tap input 1150*j*, computer system 600 transitions from the low power state to the normal power state and displays wake screen user interface 600 with the light appearance. As illustrated in FIG. 11K, computer system 600 displays wake screen user interface 602 with flashlight affordance 614. At FIG. 11K, computer system 600 detects tap input 1150*k* that corresponds to selection of flashlight affordance 614. In some embodiments, computer system 600 transitions from the low power state to the normal power state in accordance with a determination that a set of one or more criteria are satisfied (e.g., and not in response to the detection of an input).

At FIG. 11L, in response to detecting tap input 1150*k*, computer system 600 activates a flashlight that is coupled to computer system 600 (e.g., the flashlight is not depicted in FIG. 11L). As illustrated in FIG. 11L, because the flashlight is activated, computer system 600 displays flashlight affordance 614 with a bolded appearance (e.g., in comparison to the appearance of flashlight affordance 614 at FIG. 11K). In some embodiments, in response to detecting tap input 1150*k*, computer system 600 outputs haptic feedback (e.g., to alert the user that computer system 600 has activated the flashlight). In some embodiments, the flashlight that is coupled to computer system 600 is used as a flash during a media capturing process. At FIG. 11L, while computer system 600 is in the normal power state, computer system 600 detects activation 11501 of hardware control 628.

Figures 11M, 11N:
Figure 110:
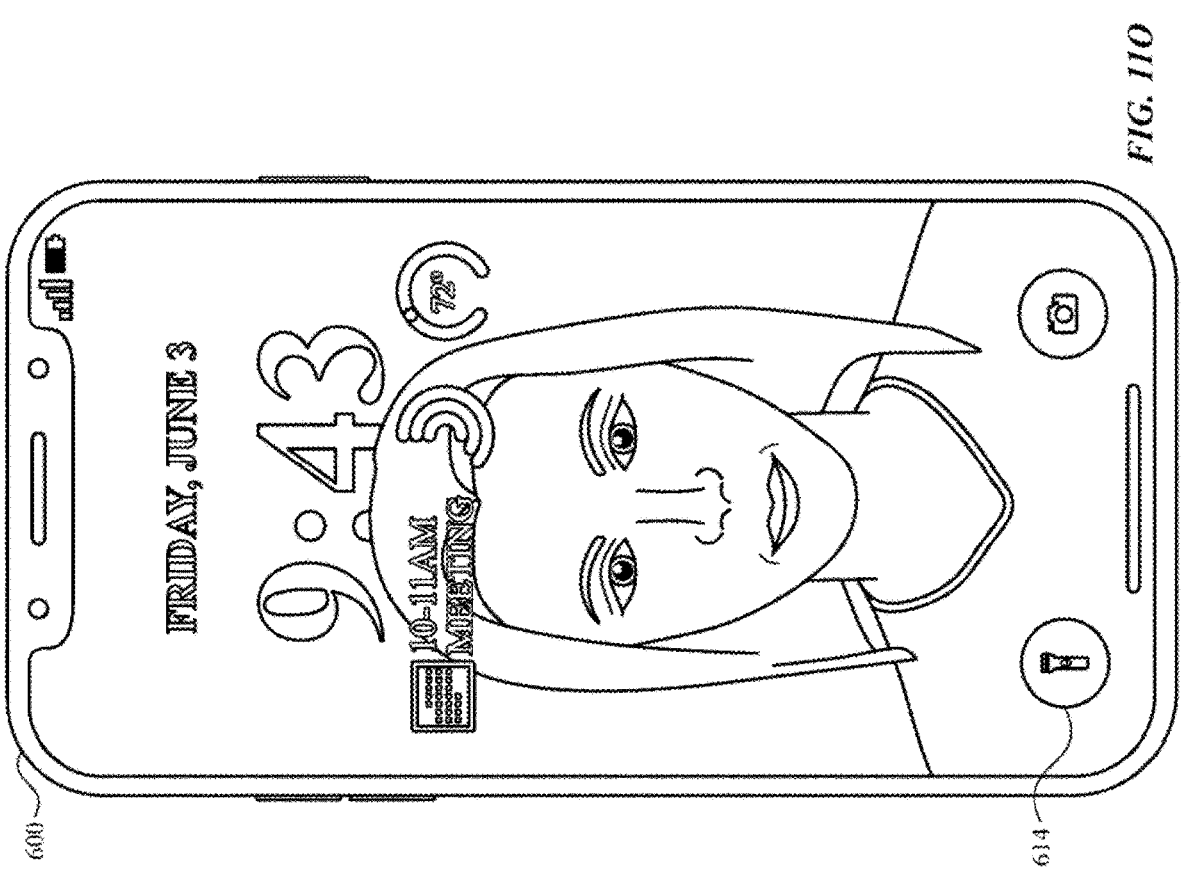

At FIG. 11M, in response to detecting activation 11501 of hardware control 628, computer system 600 transitions from the normal power state to the low power state and displays wake screen user interface 602 with the dark appearance. At FIG. 11M, the flashlight that is coupled to computer system 600 remains active (e.g., computer system 600 does not deactivate the flashlight as a part of transitioning from the normal power state to the low power state). At FIG. 11M, a determination is made that the flashlight that is coupled to computer system 600 is active. As explained above, computer system 600 ceases to display flashlight affordance 614 as a part of transitioning from the normal power state to the low power state. However, because a determination is made that the flashlight that is coupled to computer system 600 is active, computer system 600 displays flashlight affordance 614 while computer system 600 is in the low power state. In some embodiments, computer system 600 transitions from the normal power state to the low power state in accordance with a determination that a set of one or more criteria are satisfied (e.g., and not in response to the detection of an input).

As illustrated in FIG. 11M, computer system 600 displays flashlight affordance 614 with a light appearance (e.g., computer system 600 inverts the black and white colors of flashlight affordance 614) (e.g., the background of flashlight affordance 614 is black and the representation of a flashlight that is included in flashlight affordance 614 is white). Flashlight affordance 614 is selectable while computer system 600 displays flashlight affordance 614 with the light appearance. At FIG. 11M, while computer system 600 is in the low power state, computer system 600 detects tap input 1150*m* that corresponds to selection of flashlight affordance 614.

At FIG. 11N, in response to detecting tap input 1150*m*, computer system 600 deactivates (e.g., turns off) the flashlight that is coupled to computer system 600. At FIG. 11N, computer system 600 remains in the low power state. Computer system 600 does not transition from the low power state to the normal power state in response to detecting tap input 1150*m* and/or deactivating the flashlight. At FIG. 11N, because the flashlight is no longer active and because computer system 600 is in the lower power state, computer system 600 ceases to display flashlight affordance 614. Because flashlight affordance 614 ceases to be displayed, computer system 600 cannot activate the flashlight without exiting the low power state. In some embodiments, computer system 600 displays flashlight affordance 614 as visually obscured (e.g., blurred and/or dimmed) in response to detecting tap input 1150*m*. In some embodiments, computer system 600 maintains the display of flashlight affordance 614 in response to detecting tap input 1150*m*. At FIG. 11N, while computer system 600 is in the low power state, computer system 600 detects tap input 1150*n* (e.g., computer system 600 detects tap input at substantially the same location on display 610 as tap input 1150*m*).

At FIG. 11O, in response to detecting tap input 1150*n*, computer system 600 transitions from the low power state to the normal power state. At FIG. 9O, the flashlight that is coupled to computer system 600 remains inactive. Accordingly, as illustrated in FIG. 11O, computer system 600 displays flashlight affordance 614 without the bolded appearance. In some embodiments, computer system 600 transitions from the low power state to the normal power state in accordance with a determination that a set of one or more criteria are satisfied (e.g., and not in response to the detection of an input).

FIG. 12 is a flow diagram illustrating a method for displaying notification in accordance with some embodiments. Method 1200 is performed at a computer system (e.g., 100, 300, 500) that is in communication with a display generation component. Some operations in method 1000 are, optionally, combined, the orders of some operations are, optionally, changed, and some operations are, optionally, omitted.

As described below, method 1000 provides an intuitive way for displaying notification. The method reduces the cognitive burden on a user for displaying notification, thereby creating a more efficient human-machine interface. For battery-operated computing devices, enabling a user to display notifications faster and more efficiently conserves power and increases the time between battery charges.

While the computer system (e.g., 600) is in a first mode of operation (e.g., as described in relation to FIGS. 11E, 11H, 11I, 11K, 11L, and/or 11O) (e.g., a higher power consumption mode (e.g., a mode that corresponds to higher power consumption than a lower power consumption mode) (e.g., a mode that corresponds to a brighter display, increased performance, and/or more frequent display updates)), the computer system displays (1202) a wake screen user interface (e.g., 602) (e.g., an user interface that the computer system initially displays once the computer system transitions from an inactive state (e.g., sleep state) to an active state) with a first wake-screen appearance e.g., as described in relation to FIGS. 11E, 11H, 11I, 11K, 11L, and/or 11O).

After displaying the wake screen user interface (e.g., 602) with the first wake-screen appearance (e.g., as described in relation to FIGS. 11E, 11H, 11I, 11K, 11L, and/or 11O) and while the computer system (e.g., 600) is in a second mode of operation (e.g., FIGS. 11A-11D, 11F1, 11G, 11J, 11M, and/or 11N) (e.g., a low power mode) (e.g., a lower power consumption mode (e.g., lower power consumption in the second mode than in the first mode)) (e.g., the display of the computer system has a lower average brightness in the second mode than when the computer system is in the first mode), where the second mode of operation is a lower power mode of operation than the first mode of operation (e.g., as described in relation to FIGS. 11E, 11H, 11I, 11K, 11L, and/or 11O), the computer system displays (1204) the wake screen user interface (e.g., 602) with a second wake-screen appearance (e.g., FIGS. 11A-11D, 11F1, 11G, 11J, 11M, and/or 11N) that has a reduced average brightness relative to the first wake-screen appearance.

After displaying the wake screen user interface (e.g., 602) with the first wake-screen appearance, the computer system detects (1206) the occurrence of an event (e.g., 1150e, 1150i, 11501 and/or FIGS. 11A-11B) (e.g., while the device is in a low power mode of operation such as the second mode of operation or a third mode of operation which is a lower power mode of operation than the second mode of operation).

In response to detecting the occurrence of the event, displaying (1208) a first notification (e.g., 1108, 1110, and/or 1112) (e.g., a selectable user interface element) corresponding to the event on the wake screen user interface (e.g., 602), including, in accordance with (1210) a determination that the first notification is to be displayed while the computer system is in the second mode of operation (e.g., FIGS. 11A-11D, 11F1, 11G, 11J, 11M, and/or 11N), the computer system: displays (1212) the first notification on the wake screen user interface (e.g., 602) with a first notification appearance (e.g., as described above in relation to FIGS. 11B and/or 11C) (e.g., the first notification is displayed in a light mode when the first notification is displayed with the first notification appearance (e.g., the first notification is displayed with a greater brightness than the brightness (e.g., average brightness) of the second wake-screen appearance (e.g., the brightness of the first notification appearance is similar to the brightness of the first wake-screen appearance) while concurrently displaying a respective portion of the wake screen user interface with the second wake-screen appearance; and after displaying the first notification (e.g., 1108, 1110, and/or 1112) on the wake screen user interface (e.g., 602) with the first notification appearance (e.g., as described above in relation to FIGS. 11B and/or 11C), displays (1214) the first notification with a second notification appearance (e.g., as described above in relation to FIGS. 11C and/or 11D) (e.g., the second notification appearance corresponds to a dark mode for the notification) (e.g., the second notification appearance has a lower brightness (e.g., average brightness) than the average brightness of the first wake-screen appearance) (e.g., the second notification appearance has a higher brightness than the second wake screen appearance) (e.g., the second notification appearance has a lower brightness than the first wake screen appearance) that has a reduced average brightness relative to the first notification appearance while concurrently displaying the respective portion of the wake screen user interface with the second wake-screen appearance. In some embodiments, the first notification transitions from the first notification appearance to the second notification appearance after the first notification has been displayed with the first notification appearance for a predetermined amount of time (e.g., 0.01, 0.02, 0.05, 0.1, 0.2, 0.5, 1, 2, or 5 seconds). In some embodiments, the first notification transitions from the first notification appearance to the second notification appearance in response to the computer system remaining inactive (e.g., the computer system does not detect any user interactions) for a predetermined period of time (e.g., 1, 2, 5, 15, 30, 45, 60, or 90 seconds). In some embodiments, the notification transitions from the first notification appearance to the second notification appearance in response to the computer system detecting a change in orientation of the computer system (e.g., the computer system is placed face down on a surface). Displaying the first notification on the wake screen with a first notification appearance while concurrently displaying a respective portion of the wake screen with the second wake screen appearance when conditions are met (e.g., in accordance with a determination that the first notification is displayed while the computer system is in the second mode of operation) allows the computer system to automatically visually emphasize the first notification by displaying the first notification with an appearance that contrasts with the appearance of the wake screen, which performs an operation when a set of conditions are satisfied without additional user input. Displaying the first notification with the second notification appearance while concurrently displaying a respective portion of the wake screen with the second wake screen appearance after displaying the first notification with the first notification appearance when conditions are met (e.g., the computer system is in the second mode of operation) automatically allows the computer system to visually de-emphasize the appearance of the first notification, which performs an operation when a set of conditions are satisfied without additional user input.

In some embodiments, after displaying the first notification (e.g., 1108, 1110, and/or 1112) with the second notification appearance (e.g., as described above in relation to FIGS. 11C and/or 11D), the computer system detects a second occurrence of the event (e.g., as described in relation to FIGS. 11F1 and 11F2). In some embodiments, in response to detecting the second occurrence of the event, the computer system displays a second notification (e.g., 1108, 1110, and/or 1112) (e.g., the second notification is different from the first notification). In some embodiments, as a part displaying the second notification, the computer system: in accordance with a determination that the second notification is to be displayed while the computer system is in the first mode of operation (e.g., as described in relation to FIGS. 11E, 11H, 11I, 11K, 11L, and/or 11O), displays the second notification with the first notification appearance (e.g., as described above in relation to FIGS. 11B and/or 11C) while concurrently displaying the respective portion of the wake screen user interface with the first wake-screen appearance. In some embodiments, the first notification appearance has substantially the same brightness (e.g., average brightens) as the first wake-screen appearance. In some embodiments, the first notification transitions from the first notification appearance to the second notification appearance concurrently with the computer system transitioning from the first mode of operation to the second mode of operation. In some embodiments, the first notification transitions from the first notification appearance to the second notification appearance before/after the computer system transitions from the first mode of operation to the second mode of operation. Displaying the second notification with the first notification appearance when prescribed conditions are met (e.g., in accordance with a determination that the second notification is to be displayed while the computer system is in the first mode of operation) allows the computer system to automatically manage the visual appearance of the second notification such that there is not a strong contrast between the display of second notification and the display of the wake screen, which automatically performs an operation without additional user input.

In some embodiments, after displaying the second notification (e.g., 1108, 1110, and/or 1112) with the first notification appearance (e.g., as described above in relation to FIGS. 11B and/or 11C) while concurrently displaying the respective portion of the wake screen user interface with the first wake screen appearance, the computer system transitions from the first mode of operation (e.g., as described in relation to FIGS. 11E, 11H, 11I, 11K, 11L, and/or 11O) to the second mode of operation (e.g., FIGS. 11A-11D, 11F1, 11G, 11J, 11M, and/or 11N) (e.g., while the visibility of the first notification is maintained) (e.g., the computer system display the wake screen user interface with the second wake screen appearance as a part of transitioning from the first mode of operation to the second mode of operation) (e.g., the computer system transitions from the first mode of operation to the second mode of operation as described above with respect to FIGS. 6B-6D, 9A-9C, and 9G-9L2); and displays the second notification with the second notification appearance (e.g., as described above in relation to FIGS. 11C and/or 11D) while concurrently displaying the respective portion of the wake screen user interface with the second wake screen appearance (e.g., the second notification is displayed with the second notification appearance while the computer system is in the second operation mode). In some embodiments, the second notification transitions from having the first notification appearance to having the second notification appearance as a part of the computer system transitioning from the first mode of operation to the second mode of operation. In some embodiments, the first notification (e.g., 1108, 1110, and/or 1112) includes content (e.g., a preview of text, a textual indication of an application that is installed on the computer system and/or a graphical representation of an application that is installed on the computer system) while the first notification is displayed with the first notification appearance (e.g., as described above in relation to FIGS. 11B and/or 11C) or the second notification appearance (e.g., as described above in relation to FIGS. 11C and/or 11D) (e.g., the content has a first visual appearance when the first notification is displayed with the first notification appearance and the content has a second visual appearance (e.g., that is different from the first visual appearance) when the first notification is displayed with the second notification appearance. Displaying the second notification with the second notification appearance while concurrently displaying the respective portion of the wake screen with the second wake screen appearance provides a user with visual feedback with respect to the present state of the computer system (e.g., the computer system is in the second mode of operation), which provides improved visual feedback. Displaying the first notification with content provides the user with visual feedback regarding the type of notification and/or the content included in the notification that the computer system generated and/or received, which provides improved visual feedback.

In some embodiments, while displaying the wake screen user interface (e.g., 602) with the first wake screen appearance, the computer system displays a set of wake screen information (e.g., 616, 618, and/or 1108) (e.g., an indication of the current time, an indication of the current time, and/or one or more user interface elements that indicate a status of different applications and/or functions of the computer system). In some embodiments, as a part of displaying the wake screen user interface with the second wake screen appearance, the computer system displays the set of wake screen information (e.g., the set of wake screen information has a first visual appearance when the wake screen user interface is displayed with the first wake screen appearance and the set of wake screen information has a second visual appearance (e.g., that is different from the first visual appearance) when the wake screen user interface is displayed with the second wake screen appearance). In some embodiments, the set of wake screen information has the same visual appearance when the wake screen user interface is displayed with the first wake screen appearance and when the wake screen user interface is displayed with the second wake screen appearance. Displaying the wake screen user interface with a set of wake screen information provides the user with visual feedback regarding the state of the computer system and/or the state of various applications that are installed on the computer system, which provides improved visual feedback.

In some embodiments, as a part of displaying the respective portion of the wake screen user interface with the second wake screen appearance, the computer system displays a first portion (e.g., that includes 616 and/or 618) (e.g., less than the entirety of the wake screen) of the wake screen user interface that is above the display of the first notification (e.g., 1108, 1110, and/or 1112) (e.g., the first portion of the wake screen user interface is closer to a terminal end of the computer system than the display of the notification) (e.g., the first portion of the wake screen user interface is above the display of the notification from the perspective of a user) with the second wake screen appearance and displaying a second portion (e.g., a portion that includes 622) of the wake screen user interface (e.g., less than the entirety of the wake screen user interface) that is below the display of the notification (e.g., the second portion of the wake screen is closer to a respective side of the computer system than the display of the notification is to the respective side) (e.g., the second portion of the wake screen is below the display of the notification from the perspective of a user) with the second wake screen appearance (e.g., the first portion of the wake screen and the second portion of the wake screen are separated by 180 degrees). In some embodiments, displaying the respective portion of the wake screen with the second wake-screen appearance includes displaying a portion of the wake screen that is to the left and/or right of the notification with the second wake screen appearance. In some embodiments, the first portion of the wake screen does not overlap with the second portion of the wake screen. In some embodiments, the first portion of the wake screen does overlap with the second portion of the wake screen. In some embodiments, the entirety of the wake screen has the second wake screen appearance. Displaying a first portion of the wake screen with the second wake screen appearance and a second portion of the wake screen with the second wake screen appearance provides a user with visual feedback regarding the present mode of operation of the computer system, which provides improved visual feedback.

In some embodiments, while the first notification (e.g., 1108, 1110, and/or 1112) corresponding to the event is displayed on the wake screen user interface (e.g., 602), the computer system displays a third notification e.g., 1108, 1110, and/or 1112) (e.g., the third notification is displayed in response to the detection of the occurrence of a second event (e.g., the second event is different than the event)) (e.g., the second notification is different (e.g., the second notification includes different content, is displayed at a different size, is a different shape and/or is a different color)). In some embodiments, both the first notification and the second notification correspond to (and/or include content from) a same application. In some embodiments, the first notification and the second notification are displayed in the order in which the first notification and the second notification were generated (e.g., the notification that is generated first is displayed above the notification that is generated second) (e.g., the notification that is generated first is displayed below the notification that is generated second). Concurrently displaying the first notification and the second notification provides the user with visual feedback regarding the state of the computer system (e.g., the computer system has generated and/or received at least two notifications), which provides improved visual feedback.

In some embodiments, the first notification (e.g., 1108, 1110, and/or 1112) is displayed with the first notification appearance (e.g., as described above in relation to FIGS. 11B and/or 11C). In some embodiments, the third notification (e.g., 1108, 1110, and/or 1112) is displayed with the first notification appearance (e.g., the first notification and the third notification are concurrently displayed with the first notification appearance).

In some embodiments, the third notification (e.g., 1108, 1110, and/or 1112) is displayed prior to the detection of the occurrence of the event (e.g., the third notification is displayed before the first notification is displayed). In some embodiments, because the third notification is displayed prior to the first notification, the third notification is displayed above the first notification. In some embodiments, because the third notification is displayed prior to the first notification, the third notification is displayed below the first notification. In some embodiments, the computer system displays the third notification with the second notification appearance prior to the detection of the occurrence of the event.

In some embodiments, the first notification (e.g., 1108, 1110, and/or 1112) is displayed with the second notification appearance (e.g., as described above in relation to FIGS. 11C and/or 11D). In some embodiments, in accordance with a determination that that the computer system is in the second mode of operation (e.g., FIGS. 11A-11D, 11F1, 11G, 11J, 11M, and/or 11N), the computer system displays the second notification (e.g., 1108, 1110, and/or 1112) includes displaying the second notification with the first notification appearance (e.g., as described above in relation to FIGS. 11B and/or 11C) (e.g., the second notification was generated more recently than the first notification). In some embodiments, after the second notification is displayed with the first appearance, the computer system displays the second notification with the second notification appearance. In some embodiments, in accordance with a determination that the computer system is in the first mode of operation, the second notification is not displayed with the second notification appearance. In some embodiments, in accordance with a determination that the computer system is in the first mode of operation, the second notification is displayed with the second notification appearance after the second notification is displayed with the first notification appearance. Displaying the second notification with the first notification appearance while the first notification is displayed with the second notification when conditions are met (e.g., the computer system is in the second mode of operation), allows the computer system to automatically visually emphasize a newer notification while the computer system displays an older notification, which automatically performs an operation when a set of conditions are met without additional user input.

In some embodiments, the first notification (e.g., 1108, 1110, and/or 1112) includes text (e.g., text that is a preview of the content of the notification, a time indication of when the notification was generated, and/or text that describes the content of the notification and/or reason for the notification) and a background. (e.g., the text is displayed on top of the background). In some embodiments, as a part of displaying the first notification (e.g., 1108, 1110, and/or 1112) with the first notification appearance (e.g., as described above in relation to FIGS. 11B and/or 11C), the computer system displays the text as darker than the background (e.g., the text is displayed as a dark color and the background is displayed as a light color) (e.g., the text has a sufficient amount of contrast with the background of the notification such that a user can easily view the text). In some embodiments, the notification includes a graphical representation of an application that is installed on the computer system and, while the first notification is displayed with the first notification appearance, the graphical representation of the application that is installed on the computer system is displayed as darker than the background of notification. Displaying the text of the first notification as darker than the background of the first notification when conditions are met (e.g., the first notification is displayed while the computer system is in the second mode), allows the computer system to automatically contrast the display the content included in the notification with the display of the wake screen user interface, which automatically performs an operation when a set of conditions are met without additional user input.

In some embodiments, as a part of displaying the first notification (e.g., 1108, 1110, and/or 1112) with the second notification appearance (e.g., as described above in relation to FIGS. 11C and/or 11D), the computer system displays the text as lighter (e.g., brighter) than the background (e.g., the text is displayed as white or another light color and the background is displayed as a shade of black or grey or another dark color) (e.g., the text has a sufficient amount of contrast with the background such that a user can easily view the text). In some embodiments, the notification includes a graphical representation of an application that is installed on the computer system and, while the first notification is displayed with the second notification appearance, the graphical representation of the application that is installed on the computer system is displayed as brighter than the background of notification. Displaying the text of the first notification as lighter than the background of the first notification when conditions are met (e.g., the first notification is displayed while the computer system is in the second mode operation) allows the computer system to automatically visually deemphasize the first notification after the first notification is initially displayed, which performs an operation when conditions are met without additional user input.

In some embodiments, while the wake screen user interface (e.g., 602) is displayed with the second wake screen appearance and while the first notification (e.g., 1108, 1110, and/or 1112) is displayed (e.g., the first notification is displayed with the second notification appearance) (e.g., and while the computer system is in the second mode of operation), the computer system detects a first input (e.g., 1150d) (e.g., a tap on the display generation component or another selection input) directed to the display of the first notification (e.g., the first tap input is detected at a location on the display generation component that corresponds to the display location of the first notification). In some embodiments, in response to detecting the first input, the computer system transitions from the second mode of operation (e.g., FIGS. 11A-11D, 11F1, 11G, 11J, 11M, and/or 11N) to the first mode of operation (e.g., as described in relation to FIGS. 11E, 11H, 11I, 11K, 11L, and/or 11O) (e.g., gradually transitioning the computer system (e.g., transitioning the computer system from the first mode of operation to the second mode of operation over a predetermined period of time (e.g., 0.01, 0.02, 0.05, 0.1, 0.2, 0.5, 1, or 2 seconds)). In some embodiments, as a part of transitioning the computer system from the second mode of operation to the first mode of operation, the computer system displays the wake screen user interface with the first wake screen appearance (e.g., and ceasing to display the wake screen user interface with the second wake screen appearance). In some embodiments, transitioning the computer system from the second mode of operation to the first mode of operation includes changing the visual appearance of one or more user interface objects. In some embodiments, transitioning the computer system from the second mode of operation to the first mode of operation includes changing the appearance of the first notification from the second notification appearance to the first notification appearance. In some embodiments, the computer system transitions from the second mode of operation to the first mode operation in response to detecting a swipe input. In some embodiments, the computer system transitions from the second mode of operation to the first mode operation in response to detecting an activation of one or more hardware buttons that are coupled to the computer system (e.g., volume button and/or power button). Transitioning the computer system from the second mode of operation to the first mode of operation in response to detecting the first input provides the user with visual feedback regarding the state of the computer system (e.g., the computer system has detected the first input), which provides the user with improved visual feedback.

In some embodiments, the first notification (e.g., 1108, 1110, and/or 1112) is displayed with a first set of information. In some embodiments, the first notification corresponds to a first application. In some embodiments, while the first notification is displayed with the first notification appearance (e.g., as described above in relation to FIGS. 11B and/or 11C) (e.g., and while the wake screen user interface is displayed with the first wake screen appearance) (e.g., and while the computer system is in the first mode of operation), the computer system detects a second input (e.g., 1150h) (e.g., a tap on the display generation component or another selection input) that corresponds to a selection of the first notification (e.g., the second selection input is detected at a location on the display generation component that corresponds to the display location of the first notification). In some embodiments, in response to detecting the second input, the computer system displays a user interface (e.g., 1130) that corresponds to the first application (e.g., and ceasing display of the wake screen user interface). In some embodiments, the user interface includes the first set of information and a second set of information (e.g., the second set of information is different than the first set of information). In some embodiments, the user interface includes the second set of information and not the first set of information. In some embodiments, the user interface includes the first set of information and not the second set of information. In some embodiments, the first set of information that is included in the first notification has a first visual appearance and the first set of information that is included in the user interface that corresponds to the application has a second visual appearance that is different (e.g., different color and/or different size) from the first visual appearance. Displaying a user interface that corresponds to the first application in response to detecting the second input that corresponds to selection of the first notification provides the user with visual feedback with respect to the state of the computer system (e.g., the computer system has detected the selection of the first notification), which provides improved visual feedback.

In some embodiments, the event is the receipt of a near-field communication signal (e.g., as described in relation to FIG. 11E) (e.g., the computer system receives a signal from a terminal (e.g., a terminal that is used to purchase goods, a terminal that scans personal identification cards, a terminal that is used to grant an individual access to public transportation) while the computer system is in close proximity to the terminal). In some embodiments, in response to receiving the near-field communication signal, the computer system transmits one or more pieces of digital identification credential information that is requested by the computer system that generated the near-field communication signal without transmitting one or more pieces of digital credential information that is stored on the computer system that is not being requested by the computer system that generated the near-field communication signal. In some embodiments, the one or more pieces of digital identification credential information are associated with a digital identification credential stored on the computer system. Displaying the first notification in response to receiving the near-field communication signal provides the user with visual feedback with respect to the state of the computer system (e.g., the computer system has received the near-field communication signal), which provides improved visual feedback.

In some embodiments, the event is an event that corresponds to an application (e.g., as described above in relation to FIGS. 11H-11G) (e.g., an application that is installed on the computer system provides content for the notification) (e.g., the application generates the notification or the computer system generates the notification based on information provided by the application). Displaying the first notification in response to detecting an event that corresponds to an application provides the user with visual feedback with respect to the state of the computer system (e.g., the computer system has detected the event that corresponds to the application), which provides improved visual feedback).

In some embodiments, the event is an external wireless device (e.g., smart phone, speaker, smart watch, and/or laptop) connecting to the computer system (e.g., as described above in reference to FIG. 11B) (e.g., via Bluetooth, ultra-wideband, and/or another short range wireless communication). In some embodiments, the external wireless device is registered to the same account as the computer system (e.g., there is common ownership between the external wireless device and the computer system). In some embodiments, the external wireless device is not registered to the same account as the computer system (e.g., there is not common ownership between the external wireless device and the computer system). Displaying the first notification in response to detecting that an external wireless device has connected to the computer system provides the user with visual feedback with respect to the state of the computer system (e.g., the computer system has connected to an external device), which provides improved visual feedback.

In some embodiments, the event is an initiation of a charging process (e.g., wireless charging or wired charging) (e.g., as described above in reference to FIG. 11B). In some embodiments, when the event corresponds to an initiation of a charging process, the notification includes an indication of current battery level of the computer system. Displaying the first notification in response to detecting the initiation of a charging process provides the user with visual feedback with respect to the state of the computer system (e.g., the computer system initiated a charging process), which provides improved visual feedback.

In some embodiments, the event is a change of the mode of the computer system (e.g., as described above in reference to FIG. 11B) (e.g., the computer system enters or leaves a silent mode (e.g., a mode where the computer system does not output audio alerts (e.g., audio alerts that correspond to the computer system receiving a phone call and/or an electronic message))). Displaying the first notification in response to detecting that the mode of the computer system has changed provides the user with visual feedback with respect to the state of the computer system (e.g., the computer system has transitioned from one respective mode to a different respective mode), which provides improved visual feedback.

In some embodiments, as a part of displaying the first notification (e.g., 1108, 1110, and/or 1112) with the second notification appearance (e.g., as described above in relation to FIGS. 11C and/or 11D), the computer system displays the notification as gradually (e.g., over a period of time (e.g., 0.01, 0.02, 0.05, 0.1, 0.2, 0.5, 1, or 2 seconds) fading from the first notification appearance (e.g., as described above in relation to FIGS. 11B and/or 11C) to the second notification appearance (e.g., the notification (e.g., and any content that the notification contains) remains visible while the computer system displays the notification as fading from the first notification appearance to the second notification appearance). In some embodiments, the computer system displays a cross fade of the first notification appearance and the second notification appearance. Gradually fading the first notification from the first notification appearance to the second appearance when conditions are met (e.g., the computer system is in the second mode of operation) allows the computer system to automatically de-emphasize the visual appearance of the first notification over a period of time, which performs an operation when conditions are met without additional user input.

In some embodiments, the computer system (e.g., 600) includes a light source (e.g., a flashlight function of the computer system) (e.g., optionally, the light source is used as a flash for one or more cameras that are in communication with the computer system when the computer system is capturing media) (e.g., the light source is coupled to the computer system). In some embodiments, while the computer system is in the second mode of operation (e.g., FIGS. 11A-11D, 11F1, 11G, 11J, 11M, and/or 11N) (e.g., and while the wake screen user interface is displayed with the second wake-screen appearance), the computer system in accordance with a determination that the light source is activated (e.g., the light source is illuminated), displays the wake screen user interface (e.g., 602) with the second wake screen appearance includes displaying a light source affordance (e.g., 614) (e.g., the computer system toggles the light source on and off in response to detecting a tap input on the light source affordance) with a brightness greater than the brightness (e.g., average brightness) of the second wake screen appearance (e.g., the light source affordance visually contrasts with the second wake screen appearance when the light affordance is displayed with the brightness that is greater than the brightness of the second wake screen appearance (e.g., the light source affordance is brighter than the second wake screen appearance)); and in accordance with a determination that the light source is not activated (e.g., the light source is not illuminated), displays the wake screen user interface with the second wake screen appearance includes displaying the light source affordance with reduced visibility (e.g., the light source affordance is dimmed and/or blurred or the light source affordance is not visible). In some embodiments, while the computer system is in the second mode of operation, the computer system dynamically changes the visual appearance of the light source affordance in response to detecting a selection of the light source affordance. In some embodiments, while the computer system is in the second mode, the computer system ceases to display the light source affordance in response to detecting selection of the light source affordance. Displaying the light source affordance with a brightness that is greater than the brightness of the second wake screen appearance when conditions are met (e.g., when a light source is activated), allows the computer system to automatically visually emphasize the light source affordance at times (e.g., when the light source is on) when a user has an increased amount of interest in the light source affordance, which performs an operation when conditions are met without requiring additional user input.

In some embodiments, while the computer system is in the second mode of operation (e.g., FIGS. 11A-11D, 11F1, 11G, 11J, 11M, and/or 11N) and while the light source affordance (e.g., 614) is displayed with the light appearance (e.g., the light source is activated), the computer system detects a third input (e.g., 1150k) (e.g., a tap input, a long press input, or another selection input) that corresponds to selection of the light source affordance (e.g., the computer system detects the third tap input at a location of the display generation component that corresponds to the display of the light source affordance). In some embodiments, in response to detecting the third input that corresponds to selection of the light source affordance, the computer system deactivates the light source (e.g., turning off the light source). In some embodiments, the computer system outputs haptic feedback (e.g., the computer system vibrates) in response to detecting the third tap input that corresponds to selection of the light source affordance. In some embodiments, the third tap input is a long press (e.g., press and hold). In some embodiments, the third tap input is a short press (e.g., a press and release). In some embodiments, the computer system changes the visual appearance of the light source affordance in response to detecting the third tap input that corresponds to selection of the light source affordance. In some embodiments, while the computer system is in the second mode of operation, the computer system ceases to display the light source affordance in response to detecting the third tap input that corresponds to selection of the light source affordance. Deactivating the light source in response to detecting the third input that corresponds to selection of the light source affordance provides the user with visual feedback regarding the state of the computer system (e.g., the computer system detected the third input), which provides improved visual feedback.

In some embodiments, in response to detecting the third input (e.g., 1150k) that corresponds to selection of the light source (e.g. 614), the computer system maintains the mode of operation of the computer system (e.g., the computer system does not transition from the second mode of operation in response to detecting the third tap input) (e.g., the display of computer system is maintained in the second mode of operation) (e.g., as discussed above in relation to FIGS. 11K-11L).

In some embodiments, e third input is detected at a first location on the display generation component (e.g., the first location corresponds to the location of the display of the light source affordance). In some embodiments, after deactivating the light source and while the computer system is in the second mode of operation (e.g., FIGS. 11A-11D, 11F1, 11G, 11J, 11M, and/or 11N) (e.g., and while the wake screen user interface is displayed with the second wake screen appearance), the computer systems detects a fourth input (e.g., 1150n) (e.g., a tap input, long press input, or other selection input) at the first location of the display generation component (e.g., the light source affordance is not displayed at the first location when the light source is inactive and the computer system is in the second mode of operation) (e.g., the light source affordance is displayed at the first location when the light source is inactive and when the computer system is in the second mode of operation, but the light source affordance is not selectable). In some embodiments, in response to detecting the fourth input at the first location on the wake screen user interface (e.g., 602), the computer system forgoes activating the light source.

In some embodiments, in response to detecting the fourth input (e.g., 1150n) at the first location on the wake screen user interface (e.g., 602), the computer system transitions the computer system from the second mode of operation (e.g., FIGS. 11A-11D, 11F1, 11G, 11J, 11M, and/or 11N) to the first mode of operation (e.g., as described in relation to FIGS. 11E, 11H, 11I, 11K, 11L, and/or 11O). In some embodiments, as a part of transitioning the computer system from the second mode of operation to the first mode of operation, the computer system displays the wake screen user interface with the first wake screen appearance (e.g., the computer system "wakes up" in response to detecting a tap at the first location of the wake screen user interface while the computer system is in the second mode and the light source is inactive). In some embodiments, while the computer system is in the first mode of operation and while the wake screen user interface is displayed with the first wake screen appearance, the computer system detects a fifth input (e.g., a tap input, long press input, or other selection input) at the first location of the display generation component (e.g., the computer system redisplays the light source affordance at the location as a part of transitioning the computer system from the second mode to the first mode). In some embodiments, in response to detecting the fifth input, the computer system activates the light source. In some embodiments, the computer changes the visual appearance of the light source affordance in response to detecting the third input (e.g., the colors of the light source affordance are inverted (e.g., white areas of the light source affordance turn black and black areas of the light source affordance turn white)). In some embodiments, the light source remains active when the computer system transitions from the first mode to the second mode. In some embodiments, transitioning from the first mode to the second mode includes deactivating the light source. In some embodiments, transitioning from the first mode to the second mode includes dimming the brightness of the light source. Transitioning the computer system from the second mode of operation to the first mode of operation in response to detecting the fourth input at the first location on the wake screen user interface provides the user with the ability to manage the mode of operation of the computer system without displaying additional controls, which provides additional control options without cluttering the user interface with additional displayed controls. Activating the light source in response to detecting the fifth input provides the user with visual feed-back regarding the state of the computer system (e.g., the computer system has detected the fifth input), which provides improved visual feedback.

Note that details of the processes described above with respect to method 1200 (e.g., FIG. 12) are also applicable in an analogous manner to the methods described throughout. For example, methods 800 and 1000 optionally includes one or more of the characteristics of the various methods described above with reference to method 1200. For example, the method of changing the visual appearance of notifications can be applied to methods 800 and 1000. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the improvement of the longevity of the life of a battery of the computer system. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to automatically display helpful or useful information (e.g., content of interest to a user) that may otherwise be cumbersome to access manually. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific consid- erations. For instance, in the US, collection of or access to certain health data may be governed by federal and/or state laws, such as the Health Insurance Portability and Account- ability Act (HIPAA); whereas health data in other countries may be subject to other regulations and policies and should be handled accordingly. Hence different privacy practices should be maintained for different personal data types in each country.

Despite the foregoing, the present disclosure also con- templates embodiments in which users selectively block the use of, or access to, personal information data. That is, the present disclosure contemplates that hardware and/or soft- ware elements can be provided to prevent or block access to such personal information data. For example, in the case of displaying private data such as calendar data or health data, the present technology can be configured to allow users to select to "opt in" or "opt out" of participation in the collection of personal information data during registration for services or anytime thereafter. In yet another example, users can select to limit the length of time private data such as calendar data or health-related data is maintained or entirely prohibit the development of data models or profiles derived from such data mood profile. In addition to provid- ing "opt in" and "opt out" options, the present disclosure contemplates providing notifications relating to the access or use of personal information. For instance, a user may be notified upon downloading an app that their personal infor- mation data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identi- fiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and displayed to users by inferring preferences based on non-personal information data or a bare minimum amount of personal information, such as the content being requested by the device associated with a user, other non-personal information available to the device, or publicly available information.

What is claimed is:

1. A computer system configured to communicate with a display generation component, the computer system com- prising:

one or more processors; and memory storing one or more programs configured to be executed by the one or more processors, the one or more programs including instructions for:

displaying a first user interface in a first mode;

while displaying the first user interface, detecting a first occurrence of a first condition;

in response to detecting the first occurrence of the first condition, transitioning the computer system from the first mode to a second mode of a second user interface, wherein:

the display generation component has a lower aver- age brightness level in the second mode relative to the first mode;

a first portion of the second user interface in the second mode is reduced in brightness by a first amount relative to the first portion of the second user interface in the first mode;

a second portion of the second user interface in the second mode is reduced in brightness by a second amount relative to the first portion of the second user interface in the first mode; and the second amount is different from the first amount;

while the computer system is in the second mode, detecting an occurrence of a second condition;

in response to detecting the occurrence of the second condition, transitioning the computer system from the second mode to a third mode, wherein the display generation component has a lower average bright- ness level in the third mode relative to the second mode;

after detecting the occurrence of the second condition, displaying the first user interface in the first mode;

while displaying the first user interface in the first mode, detecting a second occurrence of the first condition; and in response to detecting the second occurrence of the first condition:

in accordance with a determination that the computer system is in a low power mode, transitioning the computer system from the first mode to the third mode; and in accordance with a determination that the computer system is not in the low power mode, transitioning the computer system from the first mode to the second mode.

2. The computer system of claim 1, wherein displaying the first user interface in the first mode includes displaying a first set of one or more user interface elements, and wherein transitioning the computer system from the first mode to the second mode of the second user interface includes ceasing the display of the first set of one or more user interface elements.

3. The computer system of claim 1, wherein displaying the first user interface in the first mode includes displaying a second set of one or more user interface elements with a first brightness, and wherein transitioning the computer system from the first mode to the second mode of the second user interface includes dimming the brightness of the second set of one or more user interface elements from the first brightness to a second brightness.

4. The computer system of claim 1, wherein displaying the first user interface in the first mode includes displaying a third set of one or more user interface elements with one or more visual properties, and wherein transitioning the computer system from the first mode to the second mode of the second user interface includes changing the one or more visual properties of the third set of one or more user interface elements.

5. The computer system of claim 1, wherein transitioning the computer system from the first mode to the second mode of the second user interface includes displaying a fourth set of one or more user interface elements, wherein the detection of the occurrence of the second condition occurs while the fourth set of one or more user interface elements is displayed, and wherein transitioning the computer system from the second mode to the third mode includes ceasing display of the fourth set of one or more user interface elements.

6. The computer system of claim 5, wherein the third mode is a display off state.

7. The computer system of claim 1, wherein the one or more programs further include instructions for:
  detecting a tap gesture; and
  in response to detecting the tap gesture:
    in accordance with a determination that the computer system is in the second mode, transitioning the computer system from the second mode to the first mode; and
    in accordance with a determination that the computer system is in the third mode, transitioning the computer system from the third mode to the first mode.

8. The computer system of claim 1, wherein the one or more programs further include instructions for:
  detecting a swipe gesture; and
  in response to detecting the swipe gesture:
    in accordance with a determination that the computer system is in the second mode, transitioning the computer system from the second mode to the first mode; and
    in accordance with a determination that the computer system is in the third mode, transitioning the computer system from the third mode to the first mode.

9. The computer system of claim 1, wherein the computer system includes one or more hardware controls, and wherein the one or more programs further include instructions for:
  detecting an activation of the one or more hardware controls; and
  in response to detecting the activation of the one or more hardware controls:
    in accordance with a determination that the computer system is in the second mode, transitioning the computer system from the second mode to the first mode; and
    in accordance with a determination that the computer system is in the third mode, transitioning the computer system from the third mode to the first mode.

10. The computer system of claim 1, wherein the second condition corresponds to a change in context of the computer system.

11. The computer system of claim 10, wherein the computer system is configured to communicate with an external device, and wherein a distance between the computer system and the external device is a first distance, and wherein the one or more programs further include instructions for:

while the computer system is in the second mode, detecting a first change in the distance between the computer system and the external device from the first distance to a second distance; and
  in response to detecting the first change in distance between the computer system and the external device from the first distance to the second distance and in accordance with a determination that the second distance is greater than a distance threshold, transitioning the computer system from the second mode to the third mode.

12. The computer system of claim 11, wherein the one or more programs further include instructions for:
  while the computer system is at the second distance and while the computer system is in the third mode, detecting a second change in the distance between the computer system and the external device from the second distance to a third distance; and
  in response to detecting the second change in distance between the computer system and the external device from the second distance to the third distance and in accordance with a determination that the third distance is less than the distance threshold, transitioning the computer system from the third mode to the second mode.

13. The computer system of claim 10, wherein the one or more programs further include instructions for:
  after detecting the occurrence of the second condition, displaying the first user interface in the first mode;
  while displaying the first user interface in the first mode, detecting a third occurrence of the first condition; and
  in response to detecting the third occurrence of the first condition:
    in accordance with a determination that the computer system is in a do-not-disturb mode, transitioning the computer system from the first mode to the third mode.

14. The computer system of claim 10, wherein the one or more programs further include instructions for:
  after detecting the occurrence of the second condition, displaying the second user interface in the second mode;
  while displaying the second user interface in the second mode, detecting a second occurrence of the second condition; and
  in response to detecting the second occurrence of the second condition:
    in accordance with a determination that the computer system has detected a user interaction within a predetermined amount of time since the detection of the second occurrence of the second condition, forgoing transitioning the computer system from the second mode to the third mode.

15. The computer system of claim 1, wherein the occurrence of the second condition corresponds to a user input.

16. The computer system of claim 1, wherein the one or more programs further include instructions for:
  while the computer system is in the second mode or the third mode, detecting a first request to transition the computer system to the first mode; and
  in response to detecting the first request to transition the computer system to the first mode:
    in accordance with a determination that the computer system is in the second mode, transitioning the computer system from the second mode to the first mode; and in accordance with a determination that the computer system is in the third mode, transitioning the computer system from the third mode to the first mode.

17. The computer system of claim 16, wherein an amount of time has elapsed since the computer system detected a hand cover gesture, and wherein the one or more programs further include instructions for:

while the computer system is in the second mode or the third mode, detecting a second request to transition the computer system to the first mode; and in response to detecting the second request to transition the computer system to the first mode:

in accordance with a determination that the amount of time is greater than a time threshold, transitioning the computer system to the first mode; and in accordance with a determination that the amount of time is less than the time threshold, forgoing transitioning the computer system to the first mode.

18. The computer system of claim 1, wherein the computer system is located in a physical environment, and wherein transitioning the computer system from the first mode to the second mode of the second user interface includes:

in accordance with a determination that the physical environment has a first amount of brightness, displaying the second user interface with a first amount of brightness; and in accordance with a determination that the physical environment has a second amount of brightness, that is greater than the first amount of brightness, displaying the second user interface with a second amount of brightness that is greater than the first amount of brightness.

19. The computer system of claim 1, wherein transitioning the computer system from the first mode to the second mode of the second user interface includes:

placing the computer system into a locked state;

reducing a brightness of the first portion of the second user interface in the second mode by the first amount relative to a brightness of the first portion of the second user interface in the first mode; and reducing a brightness of the second portion of the second user interface in the second mode by the second amount relative to the brightness of the first portion of the second user interface in the first mode.

20. A non-transitory computer-readable storage medium storing one or more programs configured to be executed by one or more processors of a computer system that is in communication with a display generation component, the one or more programs including instructions for:

displaying a first user interface in a first mode;

while displaying the first user interface, detecting a first occurrence of a first condition;

in response to detecting the first occurrence of the first condition, transitioning the computer system from the first mode to a second mode of a second user interface, wherein:

the display generation component has a lower average brightness level in the second mode relative to the first mode;

a first portion of the second user interface in the second mode is reduced in brightness by a first amount relative to the first portion of the second user interface in the first mode;

a second portion of the second user interface in the second mode is reduced in brightness by a second amount relative to the first portion of the second user interface in the first mode; and the second amount is different from the first amount;

while the computer system is in the second mode, detecting an occurrence of a second condition;

in response to detecting the occurrence of the second condition, transitioning the computer system from the second mode to a third mode, wherein the display generation component has a lower average brightness level in the third mode relative to the second mode;

after detecting the occurrence of the second condition, displaying the first user interface in the first mode;

while displaying the first user interface in the first mode, detecting a second occurrence of the first condition; and in response to detecting the second occurrence of the first condition:

in accordance with a determination that the computer system is in a low power mode, transitioning the computer system from the first mode to the third mode; and in accordance with a determination that the computer system is not in the low power mode, transitioning the computer system from the first mode to the second mode.

21. The non-transitory computer-readable storage medium of claim 20, wherein displaying the first user interface in the first mode includes displaying a first set of one or more user interface elements, and wherein transitioning the computer system from the first mode to the second mode of the second user interface includes ceasing the display of the first set of one or more user interface elements.

22. The non-transitory computer-readable storage medium of claim 20, wherein displaying the first user interface in the first mode includes displaying a second set of one or more user interface elements with a first brightness, and wherein transitioning the computer system from the first mode to the second mode of the second user interface includes dimming the brightness of the second set of one or more user interface elements from the first brightness to a second brightness.

23. The non-transitory computer-readable storage medium of claim 20, wherein displaying the first user interface in the first mode includes displaying a third set of one or more user interface elements with one or more visual properties, and wherein transitioning the computer system from the first mode to the second mode of the second user interface includes changing the one or more visual properties of the third set of one or more user interface elements.

24. The non-transitory computer-readable storage medium of claim 20, wherein transitioning the computer system from the first mode to the second mode of the second user interface includes displaying a fourth set of one or more user interface elements, wherein the detection of the occurrence of the second condition occurs while the fourth set of one or more user interface elements is displayed, and wherein transitioning the computer system from the second mode to the third mode includes ceasing display of the fourth set of one or more user interface elements.

25. The non-transitory computer-readable storage medium of claim 20, wherein the one or more programs further include instructions for:

detecting a tap gesture; and in response to detecting the tap gesture:

in accordance with a determination that the computer system is in the second mode, transitioning the computer system from the second mode to the first mode; and in accordance with a determination that the computer system is in the third mode, transitioning the computer system from the third mode to the first mode.

26. The non-transitory computer-readable storage medium of claim 20, wherein the computer system includes one or more hardware controls, and wherein the one or more programs further include instructions for:

detecting an activation of the one or more hardware controls; and in response to detecting the activation of the one or more hardware controls:

in accordance with a determination that the computer system is in the second mode, transitioning the computer system from the second mode to the first mode; and in accordance with a determination that the computer system is in the third mode, transitioning the computer system from the third mode to the first mode.

27. The non-transitory computer-readable storage medium of claim 20, wherein the second condition corresponds to a change in context of the computer system.

28. The non-transitory computer-readable storage medium of claim 27, wherein the computer system is configured to communicate with an external device, and wherein a distance between the computer system and the external device is a first distance, and wherein the one or more programs further include instructions for:

while the computer system is in the second mode, detecting a first change in the distance between the computer system and the external device from the first distance to a second distance; and in response to detecting the first change in distance between the computer system and the external device from the first distance to the second distance and in accordance with a determination that the second distance is greater than a distance threshold, transitioning the computer system from the second mode to the third mode.

29. The non-transitory computer-readable storage medium of claim 28, wherein the one or more programs further include instructions for:

while the computer system is at the second distance and while the computer system is in the third mode, detecting a second change in the distance between the computer system and the external device from the second distance to a third distance; and in response to detecting the second change in distance between the computer system and the external device from the second distance to the third distance and in accordance with a determination that the third distance is less than the distance threshold, transitioning the computer system from the third mode to the second mode.

30. The non-transitory computer-readable storage medium of claim 20, wherein transitioning the computer system from the first mode to the second mode of the second user interface includes:

placing the computer system into a locked state;

reducing a brightness of the first portion of the second user interface in the second mode by the first amount relative to a brightness of the first portion of the second user interface in the first mode; and reducing a brightness of the second portion of the second user interface in the second mode by the second amount relative to the brightness of the first portion of the second user interface in the first mode.

31. A method, comprising:

at a computer system that is in communication with a display generation component:

displaying a first user interface in a first mode;

while displaying the first user interface, detecting a first occurrence of a first condition;

in response to detecting the first occurrence of the first condition, transitioning the computer system from the first mode to a second mode of a second user interface, wherein:

the display generation component has a lower average brightness level in the second mode relative to the first mode;

a first portion of the second user interface in the second mode is reduced in brightness by a first amount relative to the first portion of the second user interface in the first mode;

a second portion of the second user interface in the second mode is reduced in brightness by a second amount relative to the first portion of the second user interface in the first mode; and the second amount is different from the first amount;

while the computer system is in the second mode, detecting an occurrence of a second condition;

in response to detecting the occurrence of the second condition, transitioning the computer system from the second mode to a third mode, wherein the display generation component has a lower average brightness level in the third mode relative to the second mode;

after detecting the occurrence of the second condition, displaying the first user interface in the first mode;

while displaying the first user interface in the first mode, detecting a second occurrence of the first condition; and in response to detecting the second occurrence of the first condition:

in accordance with a determination that the computer system is in a low power mode, transitioning the computer system from the first mode to the third mode; and in accordance with a determination that the computer system is not in the low power mode, transitioning the computer system from the first mode to the second mode.

32. The method of claim 31, wherein displaying the first user interface in the first mode includes displaying a first set of one or more user interface elements, and wherein transitioning the computer system from the first mode to the second mode of the second user interface includes ceasing the display of the first set of one or more user interface elements.

33. The method of claim 31, wherein displaying the first user interface in the first mode includes displaying a second set of one or more user interface elements with a first brightness, and wherein transitioning the computer system from the first mode to the second mode of the second user interface includes dimming the brightness of the second set of one or more user interface elements from the first brightness to a second brightness.

34. The method of claim 31, wherein displaying the first user interface in the first mode includes displaying a third set of one or more user interface elements with one or more visual properties, and wherein transitioning the computer system from the first mode to the second mode of the second user interface includes changing the one or more visual properties of the third set of one or more user interface elements.

35. The method of claim 31, wherein transitioning the computer system from the first mode to the second mode of the second user interface includes displaying a fourth set of one or more user interface elements, wherein the detection of the occurrence of the second condition occurs while the fourth set of one or more user interface elements is displayed, and wherein transitioning the computer system from the second mode to the third mode includes ceasing display of the fourth set of one or more user interface elements.

36. The method of claim 31, further comprising:
detecting a tap gesture; and
in response to detecting the tap gesture:
   in accordance with a determination that the computer system is in the second mode, transitioning the computer system from the second mode to the first mode; and
   in accordance with a determination that the computer system is in the third mode, transitioning the computer system from the third mode to the first mode.

37. The method of claim 31, wherein the computer system includes one or more hardware controls, the method further comprising:
detecting an activation of the one or more hardware controls; and
in response to detecting the activation of the one or more hardware controls:
   in accordance with a determination that the computer system is in the second mode, transitioning the computer system from the second mode to the first mode; and
   in accordance with a determination that the computer system is in the third mode, transitioning the computer system from the third mode to the first mode.

38. The method of claim 31, wherein the second condition corresponds to a change in context of the computer system.

39. The method of claim 38, wherein the computer system is in communication with an external device, and wherein a distance between the computer system and the external device is a first distance, the method further comprising:

while the computer system is in the second mode, detecting a first change in the distance between the computer system and the external device from the first distance to a second distance; and
in response to detecting the first change in distance between the computer system and the external device from the first distance to the second distance and in accordance with a determination that the second distance is greater than a distance threshold, transitioning the computer system from the second mode to the third mode.

40. The method of claim 39, further comprising:
while the computer system is at the second distance and while the computer system is in the third mode, detecting a second change in the distance between the computer system and the external device from the second distance to a third distance; and
in response to detecting the second change in distance between the computer system and the external device from the second distance to the third distance and in accordance with a determination that the third distance is less than the distance threshold, transitioning the computer system from the third mode to the second mode.

41. The method of claim 31, wherein transitioning the computer system from the first mode to the second mode of the second user interface includes:
placing the computer system into a locked state;
reducing a brightness of the first portion of the second user interface in the second mode by the first amount relative to a brightness of the first portion of the second user interface in the first mode; and
reducing a brightness of the second portion of the second user interface in the second mode by the second amount relative to the brightness of the first portion of the second user interface in the first mode.

* * * * *